US008396768B1

(12) United States Patent
Kaisermayr et al.

(10) Patent No.: US 8,396,768 B1
(45) Date of Patent: Mar. 12, 2013

(54) MANAGING CONSISTENT INTERFACES FOR HUMAN RESOURCES BUSINESS OBJECTS ACROSS HETEROGENEOUS SYSTEMS

(75) Inventors: Martin Kaisermayr, Antibes (FR); Edwin Bach, Walldorf (DE)

(73) Assignee: SAP AG, Walldorf (DE)

( * ) Notice: Subject to any disclaimer, the term of this patent is extended or adjusted under 35 U.S.C. 154(b) by 481 days.

(21) Appl. No.: 11/864,786

(22) Filed: Sep. 28, 2007

Related U.S. Application Data

(60) Provisional application No. 60/848,497, filed on Sep. 28, 2006.

(51) Int. Cl.
*G06Q 40/00* (2006.01)

(52) U.S. Cl. ........................................................ 705/35

(58) Field of Classification Search ..................... 705/35
See application file for complete search history.

(56) References Cited

U.S. PATENT DOCUMENTS

| | | | | |
|---|---|---|---|---|
| 3,223,321 | A | 12/1965 | Baumgartner | |
| 5,126,936 | A | 6/1992 | Champion et al. | |
| 5,210,686 | A | 5/1993 | Jernigan | |
| 5,247,575 | A * | 9/1993 | Sprague et al. | 705/53 |
| 5,255,181 | A | 10/1993 | Chapman et al. | |
| 5,321,605 | A | 6/1994 | Chapman et al. | |
| 5,463,555 | A | 10/1995 | Ward et al. | |
| 5,787,237 | A | 7/1998 | Reilly | |
| 5,812,987 | A | 9/1998 | Luskin et al. | |
| 5,966,695 | A | 10/1999 | Melchione et al. | |
| 5,970,465 | A | 10/1999 | Dietrich et al. | |
| 5,970,475 | A | 10/1999 | Barnes et al. | |
| 5,983,284 | A * | 11/1999 | Argade | 710/1 |
| 6,047,264 | A | 4/2000 | Fisher et al. | |
| 6,073,137 | A * | 6/2000 | Brown et al. | 707/104.1 |
| 6,092,196 | A | 7/2000 | Reiche | |
| 6,104,393 | A * | 8/2000 | Santos-Gomez | 715/763 |
| 6,115,690 | A | 9/2000 | Wong | |
| 6,125,391 | A | 9/2000 | Meltzer et al. | |
| 6,138,118 | A | 10/2000 | Koppstein et al. | |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 * | 5/2001 | Huang | 345/440 |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

Kravitz, Editor, "FSML—Financial Services Markup Language", version 1.50, Jul. 14, 1999 (as viewed on Feb. 22, 2010 at http://xml.coverpages.org/FSML-v1500a.pdf).*

(Continued)

*Primary Examiner* — Leland Marcus

(74) *Attorney, Agent, or Firm* — Fish & Richardson P.C.

(57) ABSTRACT

A business object model, which reflects data that is used during a given business transaction, is utilized to generate consistent interfaces. This business object model facilitates commercial transactions by providing consistent interfaces that are suitable for use across industries, across businesses, and across different departments within a business during a business transaction. Messages are generated in a consistent format to take advantage of the consistent interfaces. Specifically, messages include a hierarchically organized message package that allow receiving interfaces to process the received message according to the message package's the hierarchical structure. The receiving application can then generate an appropriate response according to the hierarchical organization of the received message package.

2 Claims, 268 Drawing Sheets

| Package | level1 | level2 | level3 | Cardinality | Datatype Name |
|---|---|---|---|---|---|
| FinancialAccounting-ViewOfProjectMessage 39000 | FinancialAccounting-ViewOfProjectMessage 39002 | | | | FinancialAccounting-ViewOfProjectMessage 39006 |
| Selection 39008 | | FinancialAccountingViewOfProjectSelectionByID 39010 | | 1 39012 | |
| | | | FinancialAccounting-ViewOf ProjectID 39016 | 1 39018 | FinancialAccounting-ViewOnProjectID 39022 |
| | | | FiscalYearID 39024 | 0..1 39026 | FiscalYearID 39030 |

U.S. PATENT DOCUMENTS

| | | | | |
|---|---|---|---|---|
| 6,311,165 | B1 * | 10/2001 | Coutts et al. | 705/21 |
| 6,327,700 | B1 | 12/2001 | Chen et al. | |
| 6,331,972 | B1 | 12/2001 | Harris et al. | |
| 6,332,163 | B1 | 12/2001 | Bowman-Amuah | |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,542,912 | B2 | 4/2003 | Meltzer et al. | |
| 6,591,260 | B1 | 7/2003 | Schwartzhoff et al. | |
| 6,725,122 | B2 | 4/2004 | Mori et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,536,697 | B2 * | 5/2009 | Wiseman et al. | 719/315 |
| 7,574,383 | B1 | 8/2009 | Parasnis et al. | |
| 7,617,328 | B2 | 11/2009 | Lewis et al. | |
| 7,627,504 | B2 | 12/2009 | Brady et al. | |
| 7,634,482 | B2 | 12/2009 | Mukherjee et al. | |
| 7,788,319 | B2 | 8/2010 | Schmidt et al. | |
| 7,805,383 | B2 | 9/2010 | Veit et al. | |
| 7,853,491 | B2 | 12/2010 | Wittmer et al. | |
| 7,865,426 | B2 | 1/2011 | Volpert | |
| 7,873,965 | B2 | 1/2011 | Hayton et al. | |
| 7,895,209 | B2 | 2/2011 | Spence et al. | |
| 7,941,236 | B2 | 5/2011 | Spearman | |
| 2001/0042032 | A1 | 11/2001 | Crawshaw et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 * | 7/2002 | Coutts et al. | 705/35 |
| 2002/0107765 | A1 | 8/2002 | Walker | |
| 2002/0112171 | A1 | 8/2002 | Ginter et al. | |
| 2002/0138318 | A1 | 9/2002 | Ellis et al. | |
| 2002/0147668 | A1 * | 10/2002 | Smith et al. | 705/30 |
| 2002/0152104 | A1 | 10/2002 | Ojha et al. | |
| 2002/0152145 | A1 | 10/2002 | Wanta et al. | |
| 2002/0156693 | A1 | 10/2002 | Stewart et al. | |
| 2002/0156930 | A1 | 10/2002 | Velasquez | |
| 2002/0157017 | A1 | 10/2002 | Mi et al. | |
| 2002/0169657 | A1 | 11/2002 | Singh et al. | |
| 2002/0184070 | A1 | 12/2002 | Chen et al. | |
| 2002/0186876 | A1 | 12/2002 | Jones et al. | |
| 2002/0194045 | A1 * | 12/2002 | Shay et al. | 705/8 |
| 2003/0004799 | A1 | 1/2003 | Kish | |
| 2003/0069648 | A1 | 4/2003 | Douglas et al. | |
| 2003/0086594 | A1 | 5/2003 | Gross | |
| 2003/0120502 | A1 | 6/2003 | Robb et al. | |
| 2003/0120665 | A1 * | 6/2003 | Fox et al. | 707/100 |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0195815 | A1 | 10/2003 | Li et al. | |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0216978 | A1 | 11/2003 | Sweeney et al. | |
| 2003/0220875 | A1 | 11/2003 | Lam et al. | |
| 2003/0229522 | A1 | 12/2003 | Thompson et al. | |
| 2003/0229550 | A1 | 12/2003 | DiPrima et al. | |
| 2003/0233295 | A1 | 12/2003 | Tozawa et al. | |
| 2003/0236748 | A1 | 12/2003 | Gressel et al. | |
| 2004/0015366 | A1 * | 1/2004 | Wiseman et al. | 705/1 |
| 2004/0024662 | A1 | 2/2004 | Gray et al. | |
| 2004/0034577 | A1 | 2/2004 | Van Hoose et al. | |
| 2004/0039665 | A1 | 2/2004 | Ouchi | |
| 2004/0073510 | A1 | 4/2004 | Logan | |
| 2004/0083201 | A1 | 4/2004 | Sholl et al. | |
| 2004/0083233 | A1 | 4/2004 | Willoughby | |
| 2004/0133445 | A1 | 7/2004 | Rajan et al. | |
| 2004/0138942 | A1 | 7/2004 | Pearson et al. | |
| 2004/0148227 | A1 | 7/2004 | Tabuchi et al. | |
| 2004/0172360 | A1 | 9/2004 | Mabrey et al. | |
| 2004/0187140 | A1 * | 9/2004 | Aigner et al. | 719/328 |
| 2004/0220910 | A1 | 11/2004 | Zang et al. | |
| 2004/0254945 | A1 | 12/2004 | Schmidt et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038744 | A1 | 2/2005 | Viijoen | |
| 2005/0049903 | A1 * | 3/2005 | Raja | 705/7 |
| 2005/0071262 | A1 | 3/2005 | Kobeh et al. | |
| 2005/0080640 | A1 | 4/2005 | Bhaskaran et al. | |
| 2005/0108085 | A1 | 5/2005 | Dakar et al. | |
| 2005/0131947 | A1 | 6/2005 | Laub et al. | |
| 2005/0159997 | A1 | 7/2005 | John | |
| 2005/0171833 | A1 | 8/2005 | Jost et al. | |
| 2005/0182639 | A1 | 8/2005 | Dale | |
| 2005/0187797 | A1 | 8/2005 | Johnson | |
| 2005/0187866 | A1 | 8/2005 | Lee | |
| 2005/0194431 | A1 | 9/2005 | Fees et al. | |
| 2005/0194439 | A1 | 9/2005 | Zuerl et al. | |
| 2005/0197849 | A1 | 9/2005 | Fotteler et al. | |
| 2005/0197851 | A1 | 9/2005 | Veit | |
| 2005/0197878 | A1 | 9/2005 | Fotteler et al. | |
| 2005/0197881 | A1 | 9/2005 | Fotteler et al. | |
| 2005/0197882 | A1 | 9/2005 | Fotteler et al. | |
| 2005/0197886 | A1 | 9/2005 | Veit | |
| 2005/0197887 | A1 | 9/2005 | Zuerl et al. | |
| 2005/0197896 | A1 | 9/2005 | Veit et al. | |
| 2005/0197897 | A1 | 9/2005 | Veit et al. | |
| 2005/0197898 | A1 | 9/2005 | Veit et al. | |
| 2005/0197899 | A1 | 9/2005 | Veit et al. | |
| 2005/0197900 | A1 | 9/2005 | Veit | |
| 2005/0197901 | A1 | 9/2005 | Veit et al. | |
| 2005/0197902 | A1 | 9/2005 | Veit | |
| 2005/0197928 | A1 | 9/2005 | Fotteler et al. | |
| 2005/0197941 | A1 | 9/2005 | Veit | |
| 2005/0209732 | A1 | 9/2005 | Audimoolam et al. | |
| 2005/0210406 | A1 | 9/2005 | Biwer et al. | |
| 2005/0216321 | A1 | 9/2005 | Veit | |
| 2005/0216421 | A1 * | 9/2005 | Barry et al. | 705/64 |
| 2005/0222888 | A1 | 10/2005 | Hosoda et al. | |
| 2005/0222896 | A1 | 10/2005 | Rhyne et al. | |
| 2005/0222945 | A1 * | 10/2005 | Pannicke et al. | 705/39 |
| 2005/0228821 | A1 | 10/2005 | Gold | |
| 2005/0234754 | A1 | 10/2005 | Veit | |
| 2005/0246240 | A1 | 11/2005 | Padilla | |
| 2005/0256753 | A1 | 11/2005 | Veit et al. | |
| 2006/0004934 | A1 | 1/2006 | Guldner et al. | |
| 2006/0005098 | A1 | 1/2006 | Lotz et al. | |
| 2006/0020515 | A1 | 1/2006 | Lee et al. | |
| 2006/0026552 | A1 | 2/2006 | Mazzitelli et al. | |
| 2006/0026586 | A1 | 2/2006 | Remmel et al. | |
| 2006/0036941 | A1 | 2/2006 | Neil | |
| 2006/0047574 | A1 | 3/2006 | Sundaram et al. | |
| 2006/0047598 | A1 | 3/2006 | Hansen | |
| 2006/0059005 | A1 | 3/2006 | Horn et al. | |
| 2006/0059059 | A1 | 3/2006 | Horn et al. | |
| 2006/0059060 | A1 | 3/2006 | Horn et al. | |

| | | | |
|---|---|---|---|
| 2006/0069598 A1 | 3/2006 | Schweitzer et al. | |
| 2006/0069629 A1 | 3/2006 | Schweitzer et al. | |
| 2006/0069632 A1 | 3/2006 | Kahn et al. | |
| 2006/0074728 A1 | 4/2006 | Schweitzer et al. | |
| 2006/0080338 A1 | 4/2006 | Seubert et al. | |
| 2006/0085336 A1 | 4/2006 | Seubert et al. | |
| 2006/0085412 A1 * | 4/2006 | Johnson et al. | 707/4 |
| 2006/0085450 A1 | 4/2006 | Seubert et al. | |
| 2006/0089885 A1 | 4/2006 | Finke et al. | |
| 2006/0095373 A1 | 5/2006 | Venkatasubramanian et al. | |
| 2006/0184435 A1 | 8/2006 | Mostowfi | |
| 2006/0212376 A1 | 9/2006 | Snyder et al. | |
| 2006/0280302 A1 | 12/2006 | Baumann et al. | |
| 2006/0282360 A1 | 12/2006 | Kahn et al. | |
| 2007/0027742 A1 | 2/2007 | Emuchay et al. | |
| 2007/0043583 A1 | 2/2007 | Davulcu et al. | |
| 2007/0055688 A1 | 3/2007 | Blattner | |
| 2007/0078799 A1 | 4/2007 | Huber-Buschbeck et al. | |
| 2007/0112574 A1 | 5/2007 | Greene | |
| 2007/0124227 A1 | 5/2007 | Dembo et al. | |
| 2007/0129978 A1 | 6/2007 | Shirasu et al. | |
| 2007/0132585 A1 | 6/2007 | Llorca et al. | |
| 2007/0150387 A1 | 6/2007 | Seubert et al. | |
| 2007/0150836 A1 | 6/2007 | Deggelmann et al. | |
| 2007/0156428 A1 | 7/2007 | Brecht-Tillinger et al. | |
| 2007/0156545 A1 | 7/2007 | Lin | |
| 2007/0156552 A1 | 7/2007 | Manganiello | |
| 2007/0156690 A1 | 7/2007 | Moser et al. | |
| 2007/0165622 A1 | 7/2007 | O'Rourke et al. | |
| 2007/0214065 A1 | 9/2007 | Kahlon et al. | |
| 2007/0225949 A1 | 9/2007 | Sundararajan et al. | |
| 2007/0226090 A1 | 9/2007 | Stratton | |
| 2007/0255639 A1 | 11/2007 | Seifert | |
| 2007/0265860 A1 | 11/2007 | Herrmann et al. | |
| 2007/0265862 A1 | 11/2007 | Freund et al. | |
| 2007/0294159 A1 | 12/2007 | Cottle | |
| 2008/0005012 A1 | 1/2008 | Deneef | |
| 2008/0021754 A1 | 1/2008 | Horn et al. | |
| 2008/0040243 A1 | 2/2008 | Chang et al. | |
| 2008/0046104 A1 | 2/2008 | Van Camp et al. | |
| 2008/0046421 A1 | 2/2008 | Bhatia et al. | |
| 2008/0120129 A1 | 5/2008 | Seubert et al. | |
| 2008/0120190 A1 | 5/2008 | Joao et al. | |
| 2008/0120204 A1 | 5/2008 | Conner et al. | |
| 2008/0133303 A1 | 6/2008 | Singh et al. | |
| 2008/0154969 A1 | 6/2008 | DeBie | |
| 2008/0162266 A1 | 7/2008 | Griessmann et al. | |
| 2008/0184265 A1 | 7/2008 | Kasi et al. | |
| 2008/0196108 A1 | 8/2008 | Dent et al. | |
| 2008/0215354 A1 | 9/2008 | Halverson et al. | |
| 2008/0243578 A1 | 10/2008 | Veit | |
| 2008/0288317 A1 | 11/2008 | Kakar | |
| 2009/0006203 A1 | 1/2009 | Fordyce et al. | |
| 2009/0063287 A1 | 3/2009 | Tribout et al. | |
| 2009/0077074 A1 | 3/2009 | Hosokawa | |
| 2009/0089198 A1 | 4/2009 | Kroutik | |
| 2009/0164497 A1 | 6/2009 | Steinmaier et al. | |
| 2009/0192926 A1 | 7/2009 | Tarapata | |
| 2009/0193432 A1 | 7/2009 | McKegney et al. | |
| 2009/0222360 A1 | 9/2009 | Schmitt et al. | |
| 2009/0248431 A1 | 10/2009 | Schoknecht et al. | |
| 2009/0248547 A1 | 10/2009 | Doenig et al. | |
| 2009/0271245 A1 | 10/2009 | Joshi et al. | |
| 2009/0300578 A1 | 12/2009 | Neil | |
| 2009/0326988 A1 | 12/2009 | Barth et al. | |
| 2010/0014510 A1 | 1/2010 | Boreli et al. | |
| 2010/0070391 A1 | 3/2010 | Storr et al. | |
| 2010/0070395 A1 | 3/2010 | Elkeles et al. | |
| 2010/0106555 A1 | 4/2010 | Mneimneh et al. | |
| 2010/0161425 A1 | 6/2010 | Sideman | |
| 2011/0046775 A1 | 2/2011 | Bailey et al. | |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

SAP Structured Entity Relationship Model (SAP-SERM) for R/3 System Release 4.0 Introduction and Index; Dec. 1998; 26 pages.

SAP Structured Entity Relationship Model (SAP-SERM) for R/3 System Release 4.0 (Part I); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf; 36 pages.

"UML in the .com Enterprise: Modeling CORBA, Components, XML/XMI and Metadata Workshop"; http://www.omg.org/news/meetings/workshops/uml_presentations.htm.

Medjahed, Brahim et al: "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Wokshop, Palm Springs, CA; Nov. 2000.

Kappel, Gerti et al.; "A Framework for Workflow Management Systems Based on Objects, Rules, and Roles"; ACM Comuting Surveys; ACM Press: vol. 32; Mar. 2000; 5 pages.

Skonnard, Aaron et al.; "BizTalk Server 2000; Architecture and Tools for Trading Partner Integration"; MSDn Magazine: 2000; ms-help://ms.msdnqtr.2003apr.1033/dnmag00/htmal/biztalk.htm; 7 pages.

Microsoft; "Creating and XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3.

Meltzer, Bart et al.; "XML and Electronic Commerce: Enabling the Network Economy"; SIGMOD Record; ACM Press; vol. 27, No. 4; Dec. 1998; pp. 21-24.

Huhns, Michael N. et al.; "Automating Supply-Chain Management"; Jul. 15-19, 2002; pp. 1017-1024.

Soederstroem, Eva; "Standardising the Business Vocabulary fo Standards"; SAC, Madrid, Spain; 2002; pp. 1048-1052.

Bastide. Remi et al.; "Formal Specification of CORBA Services: Experience and Lessons Learned": 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David; "Essential Business Object Design"; Communications of the ACM; vol. 43, No. 2; Feb. 2000; pp. 117-119.

Cole, James et al.; "Extending Support for Contracts in ebXML"; IEEE; 2001; pp. 119-127.

DiNitto, Elisabetta et al.; "Deriving Executable Process Descriptions from UML,"; ICSE '02; May 19-25, 2002; pp. 155-165.

Stumptner, Markus et al.; "On the Road to Behavior-Based Integration"; First Asia-Pacific Conferences on Conceptual Modelling; Dunedin, New Zealand; Jan. 2004; pp. 15-22.

Gosain, Sanjay et al.; "The Impact of Common E-Business Interfaces"; Communications of the ACM; vol. 46, No. 2; Dec. 2003; pp. 186-195.

Damodaran, Suresh; "B2B Integration over the Internet with XML—RosettaNet Successes and Challenges"; WWW2004; May 17-22, 2004; pp. 188-195.

Schulze, Wolfgang et al.: "Standardising on Workflow-Management—The OMG Workflow Management Facility": SIGGROUP Bulletin; vol. 19, No. 1 : Apr. 1998; pp. 24-30.

Sutherland, Jeff; "Business Objects in Corporate Information Systems"; ACM Computing Surveys; vol. 27, No. 2; Jun. 1995; pp. 274-276.

Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM: vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the $17^{th}$ Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; $27^{th}$ Australasian Computer Science Conference: Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ehXML"; S1GMOD Record; vol. 31, No. 1: Mar. 2002: pp. 37-42.
Siegel. Jon: "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45. No. 10; Oct. 2002; pp. 45-52.
Terai, Koichi et al.; "Coordinating Web Services Based on Business Models": 2003; pp. 473-478.
Aversano. Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture": StandardView; vol. 6, No. 1; Mar. 1998; pp. 4-13.
Dogac. Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando. Florida; May 19-25, 2002; pp. 604-614.
Fipgar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. I; Mar. 2002; pp. 97-106.
Maamar, Zakaria et al.: "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
He, Ning et al.; "B2B Contract Implementation Using Windows DNS"; 2001; pp. 71-79.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390).
Newton's Telecom Dictionary; 18th Edition; pp. 347, 454.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Notice of Allowance issued in related U.S. Appl. No. 11/864,832 on Aug. 23, 2010; 4 pages.
Office Action issued in related U.S. Appl. No. 11/864,871 on Apr. 21, 2010; 20 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,149 on Aug. 26, 2010; 15 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 12/060,171 on Jul. 1, 2010; 19 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.

Office Action issued in related U.S. Appl. No. 11/155,368 on May 14, 2009; 6 pages.
Office Action issued in related U.S. Appl. No. 11/155,368 on Dec. 10, 2009; 43 pages.
Advisory Action issued in U.S. Appl. No. 11/155,368 on Mar. 31, 2010; 3 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; 8 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) issued in European Application No. 05757432.9 on Apr. 12, 2011; 5 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in related U.S. Appl. No. 11/864,871 on Oct. 1, 2010; 30 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
Gable, Julie; "Enterprise Application Integration"; Information Management Journal; Mar./Apr. 2002; pp. 48-52.
Communication Pursuant to Article 94(3) issued in European Application No. 05766672.9 on Jul. 14, 2011; 4 pages.
Notice of Allowance issued in related U.S. Appl. No. 11/731,857 on Dec. 14, 2011; 7 pages.
Office Action issued in U.S. Appl. No. 12/147,414 on Oct. 26, 2011; 27 pages.

Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/323,116 on Jan. 27, 2012; 7 pages.
Notice of Allowance issued in U.S. Appl. No. 12/323,139 on Mar. 14, 2012; 10 pages.
Office Action issued in U.S. Appl. No. 12/571,140 on Sep. 26, 2011; 14 pages.
Notice of Allowance issued in U.S. Appl. No. 12/571,140 on Mar. 20, 2012; 16 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/060,192 on Sep. 6, 2011; 18 pages.
Notice of Allowance issued in U.S. Appl. No. 12/060,192 on Mar. 2, 2012; 18 pages.
Notice of Allowance issued in related U.S. Appl. No. 12/060,178 on Sep. 2, 2011; 9 pages.
Notice of Allowance issued in U.S. Appl. No. 12/060,062 on Mar. 20, 2012; 16 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in related U.S. Appl. No. 11/864,866 on Mar. 13, 2012; 7 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Notice of Allowance issued in related U.S. Appl. No. 11/864,832 on Jan. 9, 2012;12 pages.
Office Action issued in related U.S. Appl. No. 11/864,863 on Dec. 22, 2011; 20 pages.
Notice of Allowance issued in U.S. Appl. No. 11/640,422 on Sep. 29, 2011; 7 pages.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Office Action issued in U.S. Appl. No. 13/349,477 on Jun. 29, 2012; 13 pages.
Notice of Allowance issued in U.S. Appl. No. 12/323,116 on Jun. 11, 2012; 10 pages.
Office Action issued in U.S. Appl. No. 12/571,154 on Apr. 2, 2012; 13 pages.
Notice of Allowance issued in U.S. Appl. No. 12/060,155 on Apr. 24, 2012; 15 pages.
Notice of Allowance issued in U.S. Appl. No. 12/815,618 on May 10, 2012; 7 pages.
Office Action issued in U.S. Appl. No. 12/816,083 on May 9, 2012; 20 pages.
Office Action issued in U.S. Appl. No. 12/815,639 on May 24, 2012; 7 pages.
Office Action issued in U.S. Appl. No. 12/816,293 on Apr. 25, 2012; 10 pages.
Notice of Allowance issued in U.S. Appl. No. 11/640,422 on May 22, 2012; 7 pages.

* cited by examiner

FIG. 27E
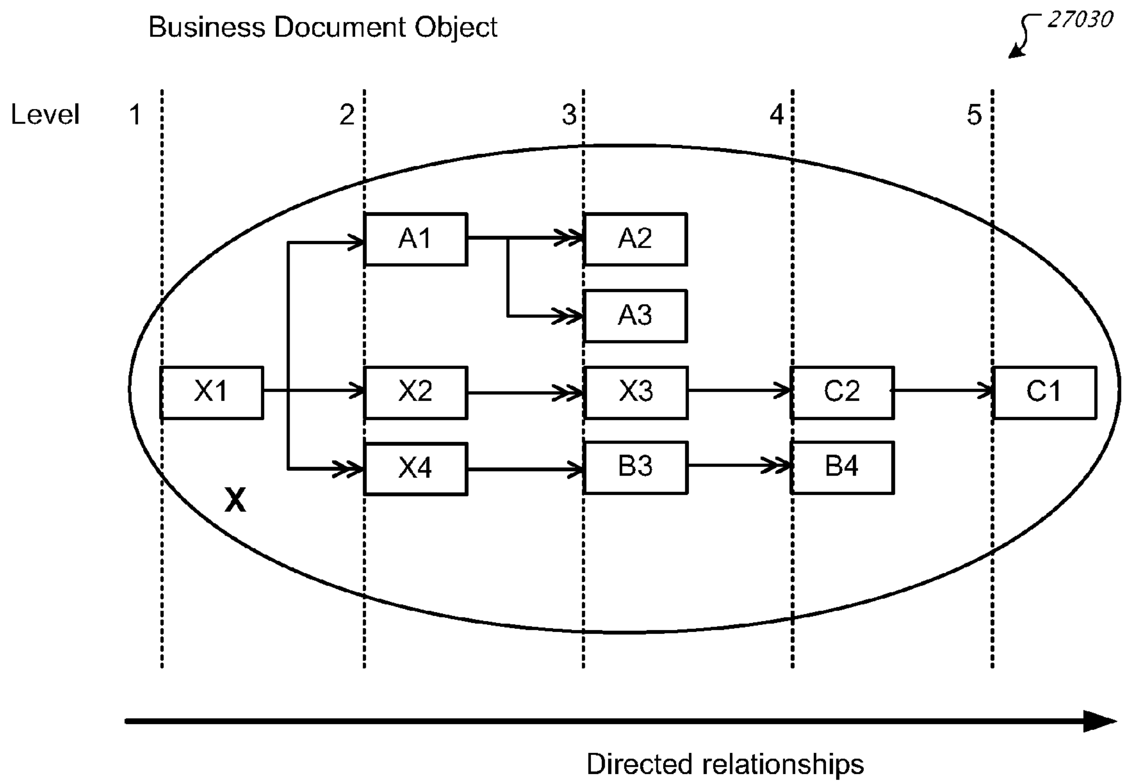
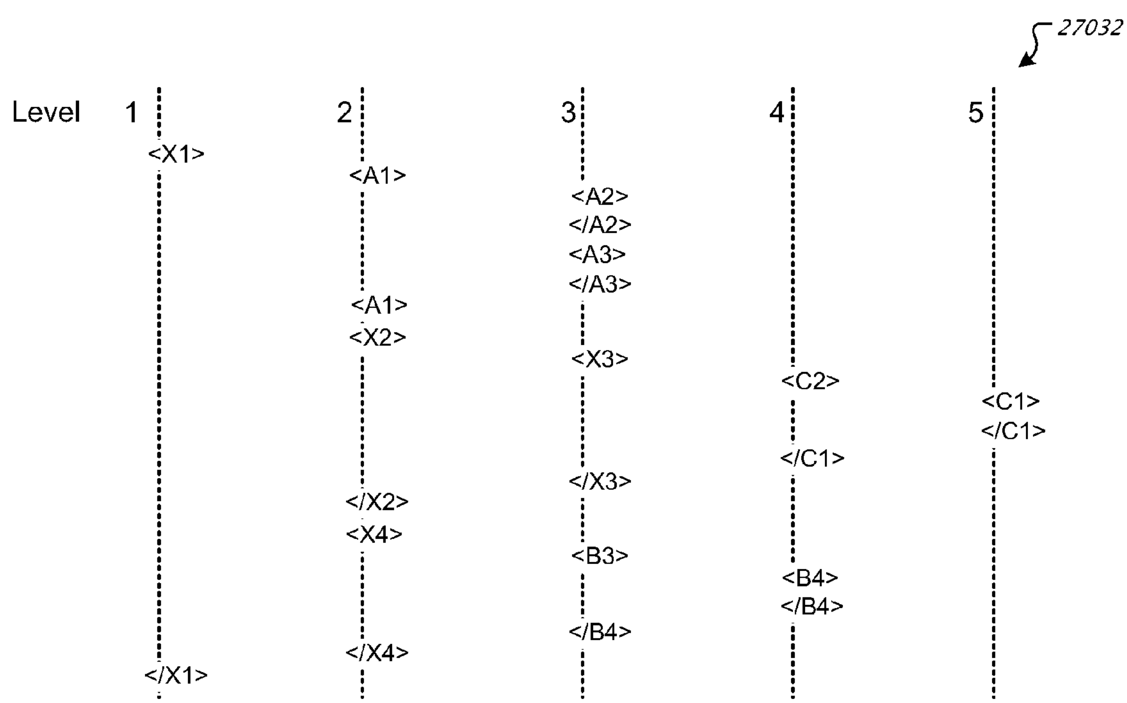

FIG. 39

| Package | level1 | level2 | level3 | Cardinality | Datatype Name |
|---|---|---|---|---|---|
| FinancialAccounting-ViewOfProjectMessage 39000 | FinancialAccounting-ViewOfProjectMessage 39002 | | | | FinancialAccounting-ViewOfProjectMessage 39006 |
| Selection 39008 | | FinancialAccountingViewOfProjectSelectionByID 39010 | | 1 39012 | |
| | | | FinancialAccounting-ViewOf ProjectID 39016 | 1 39018 | FinancialAccounting-ViewOnProjectID 39022 |
| | | | FiscalYearID 39024 | 0..1 39026 | FiscalYearID 39030 |

FIG. 40-1

| Package | level1 | level2 | level3 | level4 | level5 | Cardinality | Datatype Name |
|---|---|---|---|---|---|---|---|
| FinancialAccounting-ViewOfProjectMes-sage 40000 | FinancialAc-counting-ViewOfPro-jectMessage 40002 | | | | | | FinancialAccounting-ViewOfProjectMes-sage 40004 |
| FinancialAccount-ingViewOfProject 40006 | | Financia-lAccounting ViewOfPro-ject 40008 | | | | 0..1 40010 | |
| | | | ID 40012 | | | 1 40014 | AccountingViewOn-ProjectID 40016 |
| | | | Fis-calYearID 40018 | | | 0..1 40020 | FiscalYearID 40022 |

FIG. 40-2

| Package | level1 | level2 | level3 | level4 | level5 | Cardinality | Datatype Name |
|---|---|---|---|---|---|---|---|
| | | | SystemAdministrativeData 40024 | | | 0..1 40026 | SystemAdministrativeData 40028 |
| | | | MappingCode 40030 | | | 0..1 40032 | FinancialAccountingViewOfProject MappingCode 40034 |
| | | | MappingName 40036 | | | 0..1 40038 | FinancialAccountingViewOfProjectMappingName 40040 |
| | | | ControllingTypeCode 40042 | | | 0..1 40044 | AccountingViewOfProject ControllingTypeCode 40046 |

FIG. 40-3

| Package | level1 | level2 | level3 | level4 | level5 | Cardinality | Datatype Name |
|---|---|---|---|---|---|---|---|
| | | | Controlling-TypeName 40048 | | | 0..1 40050 | AccountingViewOfProject ControllingTypeName 40052 |
| | | | Controll-ingLevel-Number-Value 40054 | | | 0..1 40056 | NumberValueQualifier:Level 40058 |
| Project 40060 | | | Project 40062 | | | 0..1 40064 | |
| | | | | ID 40066 | | 1 40068 | ProjectID 40070 |
| Element 40072 | | | Element 40074 | | | 0..n 40076 | |
| | | | | ProjectElemen-tID 40078 | | 1 40080 | ProjectElementID 40082 |

FIG. 40-4

| Package | level1 | level2 | level3 | level4 | level5 | Cardinality | Datatype Name |
|---|---|---|---|---|---|---|---|
| | | | | TypeCode 40084 | | 1 40086 | ProjectElementType-Code 40088 |
| | | | | TypeName 40090 | | 1 40092 | ProjectElement-TypeName 40094 |
| FinancialAc-count-ingRepresen tation 40096 | | | | InternalOrder 40098 | | 0..1 40100 | |
| | | | | | ID 40102 | 1 40104 | InternalOrderID 40106 |
| | | | | WorkBreak-downStructure Element 40108 | | 0..1 40110 | |

FIG. 40-5

| Package | level1 | level2 | level3 | level4 | level5 | Cardinality | Datatype Name |
|---|---|---|---|---|---|---|---|
| | | | | | ID 40112 | 1 40114 | WorkBreakdownStructure ElementID 40116 |
| | | | | BudgetCarryingWorkBreakdownStructureElement 40118 | | 0..1 40120 | |
| | | | | | ID 40122 | 1 40124 | WorkBreakdownStructure ElementID 40126 |
| Organizational 40128 | | | | CostCentre 40130 | | 0..1 40132 | |
| | | | | | ID 40134 | 1 40136 | CostCentreID 40138 |

FIG. 40-6

| Package | level1 | level2 | level3 | level4 | level5 | Cardinality | Datatype Name |
|---|---|---|---|---|---|---|---|
| | | | | | ControllingA-realD 40140 | 1 40142 | ControllingAreaID 40144 |
| | | | | ProfitCenter 40146 | | 0..1 40148 | |
| | | | | | ID 40150 | 1 40152 | ProfitCentreID 40154 |
| | | | | Programme 40156 | | 0..1 40158 | |
| | | | | | ID 40160 | 1 40162 | OrganizationalCen-treID 40164 |
| | | | | | ProgrammeDe-finitionID 40166 | 1 40168 | ProgramDefinitionID 40170 |

FIG. 40-7

| Package | level1 | level2 | level3 | level4 | level5 | Cardinality | Datatype Name |
|---|---|---|---|---|---|---|---|
| | | | | | Programme ApprovalFiscalYearID 40172 | 1 40174 | FiscalYearIDQualifier:Approval 40176 |
| Budget 40178 | | | | BudgetItem 40180 | | 0..n 40182 | |
| | | | | | Valuation-ViewTypeCode 40184 | 1 40186 | ControllingValuation-ViewTypeCode 40188 |
| | | | | | OverallBudgetAmount 40190 | 0..1 40192 | AmountQualifier:Budget 40194 |
| | | | | | FinancialYear-BudgetAmount 40196 | 0..1 40198 | AmountQualifier:Budget 40200 |

FIG. 40-8

| Package | level1 | level2 | level3 | level4 | level5 | Cardinality | Datatype Name |
|---|---|---|---|---|---|---|---|
| | | | | | OverallRe-leasedBudge-tAmount 40202 | 0..1 40204 | AmountQuali-fier:Budget 40206 |
| | | | | | FinancialYear-Re-leasedBudgetA mount 40208 | 0..1 40210 | AmountQuali-fier:Budget 40212 |
| Log 40214 | | Log 40216 | | | | 0..1 40218 | Log 40220 |

FIG. 41-1

| Package | level1 | level2 | level3 | level4 | level5 | Cardinality | Datatype Name |
|---|---|---|---|---|---|---|---|
| FinancialAccountingViewOfProjectMessage 41000 | FinancialAccountingViewOfProjectMessage 41002 | | | | | | FinancialAccountingViewOfProjectMessage 41004 |
| MessageHeader 41006 | | MessageHeader 41008 | | | | 0..1 41010 | BasicBusinessDocumentMessageHeader 41012 |
| FinancialAccountingViewOfProject 41014 | | FinancialAccounting ViewOfProject 41016 | | | | 0..1 41018 | |

FIG. 41-2

| Package | level1 | level2 | level3 | level4 | level5 | Cardinality | Datatype Name |
|---|---|---|---|---|---|---|---|
| | | | ID 41020 | | | 1 41022 | AccountingViewOnProjectID 41024 |
| | | | FiscalYearID 41026 | | | 0..1 41028 | FiscalYearID 41030 |
| | | | SystemAd-ministrative-Data 41032 | | | 0..1 41034 | SystemAdministrativeData 41036 |
| | | | Mapping-TypeCode 41038 | | | 0..1 41040 | FinancialAccountingViewOf-ProjectTypeCode 41042 |
| | | | Controlling-TypeCode 41044 | | | 0..1 41046 | AccountingViewOfProject ControllingTypeCode 41048 |

FIG. 41-3

| Package | level1 | level2 | level3 | level4 | level5 | Cardinality | Datatype Name |
|---|---|---|---|---|---|---|---|
| | | | Controll-ingLevel-Number-Value 41050 | | | 0..1 41052 | NumberValueQualifier:Level 41054 |
| Project 41056 | | | Project 41058 | | | 0..1 41060 | |
| | | | | ID 41062 | | 1 41064 | ProjectID 41066 |
| Ele-ment 41068 | | | Element 41070 | | | 0..n 41072 | |
| | | | | ProjectEle-mentID 41074 | | 1 41076 | ProjectElementID 41078 |

FIG. 41-4

| Package | level1 | level2 | level3 | level4 | level5 | Cardinality | Datatype Name |
|---|---|---|---|---|---|---|---|
| | | | | TypeCode 41080 | | 0..1 41082 | FinancialAccountingViewOf-Project ElementTypeCode 41084 |
| Financia-lAccount-ingReprese ntation 41086 | | | | InternalOr-der 41088 | | 0..1 41090 | |
| | | | | | ID 41092 | 1 41094 | InternalOrderID 41096 |
| | | | | WorkBreak-downStruc-ture Element 41098 | | 0..1 41100 | |

FIG. 41-5

| Package | level1 | level2 | level3 | level4 | level5 | Cardinality | Datatype Name |
|---|---|---|---|---|---|---|---|
| | | | | | ID 41102 | 1 41104 | WorkBreakdownStructure ElementID 41106 |
| | | | | BudgetCarryingWorkBreakdownStructureElement 41108 | | 0..1 41110 | |
| | | | | | ID 41112 | 1 41114 | WorkBreakdownStructure ElementID 41116 |
| Organizational 41118 | | | | CostCentre 41120 | | 0..1 41122 | |
| | | | | | ID 41124 | 1 41126 | CostCentreID 41128 |

FIG. 41-6

| Package | level1 | level2 | level3 | level4 | level5 | Cardinality | Datatype Name |
|---|---|---|---|---|---|---|---|
| | | | | | Controllin-gAreaID 41130 | 1 41132 | ControllingAreaID 41134 |
| | | | | ProfitCenter 41136 | | 0..1 41138 | |
| | | | | | ID 41140 | 1 41142 | ProfitCentreID 41144 |
| | | | | Program-mePosition 41146 | | 0..1 41148 | |
| | | | | | ID 41150 | 1 41152 | OrganizationalCentreID 41154 |
| | | | | | Pro-grammeDe-finitionID 41156 | 1 41158 | ProgramDefinitionID 41160 |

FIG. 41-7

| Package | level1 | level2 | level3 | level4 | level5 | Cardinality | Datatype Name |
|---|---|---|---|---|---|---|---|
| | | | | | ProgrammeApprovalFiscalYearID 41162 | 1 41164 | FiscalYearIDQualifier:Approval 41166 |
| Budget 41168 | | | | BudgetItem 41170 | | 0..n 41172 | |
| | | | | | Valuation-ViewType-Code 41174 | 1 41176 | ControllingValuationView-TypeCode 41178 |
| | | | | | Overall-BudgetA-mount 41180 | 1 41182 | AmountQualifier:Budget 41184 |
| | | | | | Finan-cialYear-BudgetA-mount 41186 | 0..1 41188 | AmountQualifier:Budget 41190 |

FIG. 41-8

| Package | level1 | level2 | level3 | level4 | level5 | Cardinality | Datatype Name |
|---|---|---|---|---|---|---|---|
| | | | | | OverallReleased-BudgetAmount 41192 | 0..1 41194 | AmountQualifier:Budget 41196 |
| | | | | | FinancialYearReleased BudgetAmount 41198 | 0..1 41200 | AmountQualifier:Budget 41202 |
| Log 41204 | | Log 41206 | | | | 0..1 41208 | Log 41210 |

FIG. 42

| Package | level1 | level2 | level3 | Cardinality | Datatype Name |
|---|---|---|---|---|---|
| FinancialAccounting-ViewOfProjectMes-sage 42000 | FinancialAccounting-ViewOfProjectMessage 42002 | | | | FinancialAccounting-ViewOfProjectMessage 42004 |
| Selection 42006 | | FinancialAccountingViewOfProject SimpleSelectionByProjectID 42008 | | 1 42010 | |
| | | | ProjectID 42012 | 1 42014 | ProjectID 42016 |

FIG. 43

| Package | level1 | level2 | level3 | Cardinality | Datatype Name |
|---|---|---|---|---|---|
| FinancialAccountingViewOfProjectMessage 43000 | FinancialAccountingViewOfProjectMessage 43002 | | | | FinancialAccountingViewOfProjectMessage 43004 |
| FinancialAccountingViewOfProject 43006 | | FinancialAccounting ViewOfProject 43008 | | 0..n 43010 | |
| | | | ID 43012 | 1 43014 | AccountingViewOnProjectID 43016 |
| | | | SystemAdministrativeData 43018 | 0..1 43020 | SystemAdministrativeData 43022 |
| Log 43024 | | Log 43026 | | 0..1 43028 | Log 43030 |

FIG. 44

| Package | level1 | level2 | level3 | Cardinality | Datatype Name |
|---|---|---|---|---|---|
| FinancialAccounting-ViewOfProjectMessage 44000 | FinancialAccounting-ViewOfProjectMessage 44002 | | | | FinancialAccounting-ViewOfProjectMes-sage 44004 |
| Selection 44006 | | FinancialAccounting-ViewOfProjectStructure-SelectionByID 44008 | | 1 44010 | |
| | | | FinancialAccounting-ViewOfProjectID 44012 | 1 44014 | FinancialAccounting-ViewOnProjectID 44016 |
| | | | FiscalYearID 44018 | 0..1 44020 | FiscalYearID 44022 |

FIG. 45-1

| Package | level1 | level2 | level3 | level4 | level5 | Cardinality | Datatype Name |
|---|---|---|---|---|---|---|---|
| FinancialAccountingViewOfProject-Message 45000 | FinancialAccountingViewOfProjectMessage 45002 | | | | | | FinancialAccounting-ViewOfProjectMessage 45006 |
| FinancialAccountingViewOfProject 45008 | | FinancialAccounting ViewOfProject 45010 | | | | 0..1 45012 | |
| | | | ID 45016 | | | 1 45018 | AccountingViewOnProjectID 45022 |
| | | | FiscalYearID 45024 | | | 0..1 45026 | FiscalYearID 45030 |
| | | | SystemAdministrativeData 45032 | | | 0..1 45034 | SystemAdministrative-Data 45038 |

FIG. 45-2

| Package | level1 | level2 | level3 | level4 | level5 | Cardinality | Datatype Name |
|---|---|---|---|---|---|---|---|
| | | | Mapping-Code 45040 | | | 0..1 45042 | FinancialAccounting-ViewOfProject MappingCode 45046 |
| | | | Mapping-Name 45048 | | | 0..1 45050 | FinancialAccounting-ViewOfPrjectMappingName 45054 |
| | | | Controlling-TypeCode 45056 | | | 0..1 45058 | AccountingViewOfPro-jectControllingTypeCode 45062 |
| | | | Controlling-TypeName 45064 | | | 0..1 45066 | AccountingViewOfPro-ject ControllingTypeName 45070 |

FIG. 45-3

| Package | level1 | level2 | level3 | level4 | level5 | Cardinality | Datatype Name |
|---|---|---|---|---|---|---|---|
| | | | Controll-ingLevel-Number-Value 45072 | | | 0..1 45074 | NumberValueQuali-fier:Level 45078 |
| Project 45080 | | | Project 45082 | | | 0..1 45084 | |
| | | | | ID 45088 | | 1 45090 | ProjectID 45094 |
| Element 45096 | | | Element 45098 | | | 0..n 45100 | |
| | | | | ProjectEle-mentID 45104 | | 1 45106 | ProjectElementID 45110 |

FIG. 45-4

| Package | level1 | level2 | level3 | level4 | level5 | Cardinality | Datatype Name |
|---|---|---|---|---|---|---|---|
| | | | | TypeCode 45112 | | 1 45114 | ProjectElementType-Code 45118 |
| | | | | TypeName 45120 | | 1 45122 | ProjectElement-TypeName 45126 |
| FinancialAc-counting Representa-tion 45128 | | | | InternalOr-der 45130 | | 0..1 45132 | |
| | | | | | ID 45136 | 1 45138 | InternalOrderID 45142 |
| | | | | WorkBreak-downStruc-ture Element 45144 | | 0..1 45146 | |

FIG. 45-5

| Package | level1 | level2 | level3 | level4 | level5 | Cardinality | Datatype Name |
|---|---|---|---|---|---|---|---|
| | | | | | ID 45150 | 1 45152 | WorkBreakdownStructure ElementID 45156 |
| | | | | BudgetCarryingWorkBreakdownStructureElement 45158 | | 0..1 45160 | |
| | | | | | ID 45164 | 1 45166 | WorkBreakdownStructure ElementID 45170 |

FIG. 45-6

| Package | level1 | level2 | level3 | level4 | level5 | Cardinality | Datatype Name |
|---|---|---|---|---|---|---|---|
| Organ-iza-tional 45172 | | | | CostCentre 45174 | | 0..1 45176 | |
| | | | | | ID 45180 | 1 45182 | CostCentreID 45186 |
| | | | | | Controllin-gAreaID 45188 | 1 45190 | ControllingAreaID 45194 |
| | | | | ProfitCenter 45196 | | 0..1 45198 | |
| | | | | | ID 45202 | 1 45204 | ProfitCentreID 45208 |
| | | | | Programme 45210 | | 0..1 45212 | |

FIG. 45-7

| Package | level1 | level2 | level3 | level4 | level5 | Cardinality | Datatype Name |
|---|---|---|---|---|---|---|---|
| | | | | | ID 45216 | 1 45218 | OrganizationalCentreID 45222 |
| | | | | | Pro-grammeDe finitionID 45224 | 1 45226 | ProgramDefinitionID 45230 |
| | | | | | Pro-gramme Approval-Fis-calYearID 45232 | 1 45234 | FiscalYearIDQuali-fier:Approval 45238 |
| Log 45240 | | Log 45242 | | | | 0..1 45244 | Log 45248 |

FIG. 95

| Package | | level1 | level2 | level3 | Cardinality | Datatype Name |
|---|---|---|---|---|---|---|
| EmployeeTimeSheetAllowedControllingKeyFigure-ByEmployeeQueryMessage 95000 | | EmployeeTimeSheetAllowedControllingKeyFigure-ByEmployeeQueryMessage 95002 | | | | EmployeeTimeSheetAllowedControlling-KeyFigureByEmployeeQueryMessage 95004 |
| | MessageHeader 95006 | | MessageHeader 95008 | | 1 95010 | BusinessDocument-MessageHeader 95012 |
| | Selection 95014 | | EmployeeTime-SheetAllowedCon-trollingKeyFigure-SelectionByEm-ployee 95016 | | 1 95018 | EmployeeTimeShee-tAllowedControlling-KeyFigureSelection-ByEmployee 95020 |
| | | | | Employee_ID 95022 | 0..1 95024 | EmployeeID 95026 |
| | | | | WorkAgree-ment_ID 95028 | 0..1 95030 | WorkAgreementID 95032 |

FIG. 96-1

| Package | Level 1 | Level 2 | Level 3 | Cardinality | Datatype Name |
|---|---|---|---|---|---|
| EmployeeTimeSheetAllowedControllingKeyFigureByEmployeeResponseMessage 96000 | EmployeeTimeSheetAllowedControllingKeyFigureByEmployeeResponseMessage 96002 | | | | EmployeeTimeSheetAllowedControllingKeyFigureByEmployeeResponseMessage 96004 |
| MessageHeader 96006 | | MessageHeader 96008 | | 1 96010 | BusinessDocumentMessageHeader 96012 |
| EmployeeTimeSheet 96014 | | EmployeeTimeSheetAllowedControllingKeyFigure 96016 | | 0..n 96018 | EmployeeTimeSheetAllowedControllingKeyFigure 96020 |
| | | | WorkAgreementID 96022 | 1 96024 | WorkAgreementID 96026 |
| | | | Code 96028 | 1 96030 | ControllingKeyFigureCode 96032 |

FIG. 96-2

| Package | Level 1 | Level 2 | Level 3 | Cardinality | Datatype Name |
|---|---|---|---|---|---|
| | | | Measure-UnitCode 96034 | 1 96036 | MeasureUnitCode 96038 |
| | | | Note 96040 | 0..1 96042 | Note 96044 |
| Log 96046 | | Log 96048 | | 0..1 96050 | Log 96052 |

FIG. 97

| Package | Level 1 | Level 2 | Level 3 | Cardinality | Datatype Name |
|---|---|---|---|---|---|
| EmployeeTimeSheetAllowedCurrencyByEmployeeQueryMessage 97000 | EmployeeTimeSheetAllowedCurrencyByEmployeeQueryMessage 97002 | | | | EmployeeTimeSheetAllowedCurrencyByEmployeeQueryMessage 97004 |
| MessageHeader 97006 | | MessageHeader 97008 | | 1 97010 | BusinessDocumentMessageHeader 97012 |
| Selection 97014 | | EmployeeTimeSheetAllowedCurrencySelectionByEmployee 97016 | | 1 97018 | EmployeeTimeSheetAllowedCurrencySelectionByEmployee 97020 |
| | | | Employee_ID 97022 | 0..1 97024 | EmployeeID 97026 |
| | | | WorkAgreement_ID 97028 | 0..1 97030 | WorkAgreement_ID 97032 |
| | | | DatePeriod 97034 | 1 97036 | CLOSED_DatePeriod 97038 |

FIG. 98-1

| Package | Level 1 | Level 2 | Level 3 | Cardinality | Datatype Name |
|---|---|---|---|---|---|
| EmployeeTimeSheetAllowedCurrencyByEmployeeResponseMessage 98000 | EmployeeTimeSheetAllowedCurrencyByEmployeeResponseMessage 98002 | | | | EmployeeTimeSheetAllowedCurrencyByEmployeeResponseMessage 98004 |
| MessageHeader 98006 | | MessageHeader 98008 | | 1 98010 | BusinessDocumentMessageHeader 98012 |
| EmployeeTimeSheet 98014 | | EmployeeTimeSheetAllowedCurrency 98016 | | 0..n 98018 | EmployeeTimeSheetAllowedCurrency 98020 |
| | | | WorkAgreementID 98022 | 1 98024 | WorkAgreementID 98026 |
| | | | Code 98028 | 1 98030 | CurrencyCode 98032 |

FIG. 98-2

| Package | Level 1 | Level 2 | Level 3 | Cardinality | Datatype Name |
|---|---|---|---|---|---|
| | | | ValidityPeriod 98034 | 1 98036 | CLOSED_DatePeriod 98038 |
| | | | Note 98040 | 0..1 98042 | Note 98044 |
| Log 98046 | | Log 98048 | | 0..1 98050 | Log 98052 |

FIG. 99

| Package | Level 1 | Level 2 | Level 3 | Cardinality | Datatype Name |
|---|---|---|---|---|---|
| EmployeeTimeSheetAllowedEmployeeTimeItemTypeByEmployeeQueryMessage 99000 | EmployeeTimeSheetAllowedEmployeeTimeItemTypeByEmployeeQueryMessage 99002 | | | | EmployeeTimeSheetAllowedEmployeeTimeItemTypeByEmployeeQueryMessage 99004 |
| MessageHeader 99006 | | MessageHeader 99008 | | 1 99010 | BusinessDocumentMessageHeader 99012 |
| Selection 99014 | | EmployeeTimeSheetAllowedEmployeeTimeItemTypeSelectionByEmployee 99016 | | 1 99018 | EmployeeTimeSheetAllowedEmployeeTimeItemTypeSelectionByEmployee 99020 |
| | | | Employee_ID 99022 | 0..1 99024 | EmployeeID 99026 |
| | | | WorkAgreement_ID 99028 | 0..1 99030 | WorkAgreementID 99032 |

FIG. 100-1

| Package | Level 1 | Level 2 | Level 3 | Cardinality | Datatype Name |
|---|---|---|---|---|---|
| EmployeeTimeSheetAllowedEmployeeTimeItemTypeByEmployeeResponseMessage 100000 | EmployeeTimeSheetAllowedEmployeeTimeItemTypeByEmployeeResponseMessage 100002 | | | | EmployeeTimeSheetAllowedEmployeeTimeItemTypeByEmployeeResponseMessage 100004 |
| MessageHeader 100006 | | MessageHeader 100008 | | 1 100010 | BusinessDocumentMessageHeader 100012 |
| EmployeeTimeSheet 100014 | | EmployeeTimeSheetAllowedEmployeeTimeItemType 100016 | | 0..n 100018 | EmployeeTimeSheetAllowedEmployeeTimeItemType 100020 |
| | | | WorkAgreementID 100022 | 1 100024 | WorkAgreementID 100026 |

FIG. 100-2

| Package | Level 1 | Level 2 | Level 3 | Cardinality | Datatype Name |
|---|---|---|---|---|---|
| | | | Employ-eeTimeItem-CategoryCode 100028 | 1 100030 | Employ-eeTimeItemCate-goryCode 100032 |
| | | | Employ-eeTimeItem-TypeCode 100034 | 1 100036 | Employ-eeTimeItem-TypeCode 100038 |
| | | | ValidityPeriod 100040 | 1 100042 | CLOSED_DateP eriod 100044 |
| | | | Note 100046 | 0..1 100048 | Note 100050 |
| Log 100052 | | Log 100054 | | 0..1 100056 | Log 100058 |

FIG. 101-1

| Package | Level 1 | Level 2 | Level 3 | Cardinality | Datatype Name |
|---|---|---|---|---|---|
| EmployeeTimeSheetAllowedReceivingFundsManagementFunctionalAreaByEmployeeQueryMessage 101000 | EmployeeTimeSheetAllowedReceiving-FundsManagement-FunctionalAreaByEmployeeQuery-Message 101002 | | | | <MessageDataType> 101004 |
| MessageHeader 101006 | | MessageHeader 101008 | | 1 101010 | BusinessDocumentMessageHeader 101012 |
| Selection 101014 | | EmployeeTimeSheetAllowedReceiving-FundsManagement-FunctionalAreaSelectionByEmployee 101016 | | 1 101018 | EmployeeTimeSheetAllowedReceivingFundsManagementFunctionalAreaSelectionByEmployee 101020 |
| | | | Employee_ID 101022 | 0..1 101024 | EmployeeID 101026 |

FIG. 101-2

| Package | Level 1 | Level 2 | Level 3 | Cardinality | Datatype Name |
|---|---|---|---|---|---|
| | | | WorkAgreement_ID 101028 | 0..1 101030 | WorkAgreementID 101032 |

FIG. 102-1

| Package | Level 1 | Level 2 | Level 3 | Cardinality | Datatype Name |
|---|---|---|---|---|---|
| EmployeeTimeSheetAllowedReceivingFundsManagementFunctionalAreaByEmployeeResponseMessage 102000 | EmployeeTimeSheetAllowedReceivingFundsManagementFunctionalAreaByEmployeeResponseMessage 102002 | | | | EmployeeTimeSheetAllowedReceivingFundsManagementFunctionalAreaByEmployeeResponseMessage 102004 |
| MessageHeader 102006 | | MessageHeader 102008 | | 1 102010 | BusinessDocumentMessageHeader 102012 |
| EmployeeTimeSheet 102014 | | EmployeeTimeSheetAllowedReceivingFundsManagementFunctionalArea 102016 | | 0..n 102018 | EmployeeTimeSheetAllowedReceivingFundsManagementFunctionalArea 102020 |
| | | | WorkAgreementID 102022 | 1 102024 | WorkAgreementID 102026 |

FIG. 102-2

| Package | Level 1 | Level 2 | Level 3 | Cardinality | Datatype Name |
|---|---|---|---|---|---|
| | | | ID 102028 | 1 102030 | FundsManagement-FunctionalAreaID 102032 |
| | | | Description 102034 | 0..1 102036 | ReceivingFundsManagementFunctionalAreaDescription 102038 |
| | | | Note 102040 | 0..1 102042 | Note 102044 |
| Log 102046 | | Log 102048 | | 0..1 102050 | Log 102052 |

FIG. 103

| Package | Level 1 | Level 2 | Level 3 | Cardinality | Datatype Name |
|---|---|---|---|---|---|
| EmployeeTimeSheetAllowedMeasureUnitByEmployeeQueryMessage 103000 | EmployeeTimeSheetAllowedMeasureUnitByEmployeeQueryMessage 103002 | | | | EmployeeTimeSheetAllowedMeasureUnitByEmployeeQueryMessage 103004 |
| MessageHeader 103006 | | MessageHeader 103008 | | 1 103010 | BusinessDocumentMessageHeader 103012 |
| Selection 103014 | | EmployeeTimeSheetAllowedMeasureUnitSelectionByEmployee 103016 | | 1 103018 | EmployeeTimeSheetAllowedMeasureUnitSelectionByEmployee 103020 |
| | | | Employee_ID 103022 | 0..1 103024 | EmployeeID 103026 |
| | | | WorkAgreement_ID 103028 | 0..1 103030 | WorkAgreementID 103032 |

FIG. 104-1

| Package | level1 | level2 | level3 | Cardinality | Datatype Name |
|---|---|---|---|---|---|
| EmployeeTimeSheetAllowedMeasureUnitByEmployeeResponseMessage 104000 | EmployeeTimeSheetAllowedMeasureUnitByEmployeeResponseMessage 104002 | | | | EmployeeTimeSheetAllowedMeasureUnitByEmployeeResponseMessage 104004 |
| MessageHeader 104006 | | MessageHeader 104008 | | 1 104010 | BusinessDocumentMessageHeader 104012 |
| EmployeeTimeSheet 104014 | | EmployeeTimeSheetAllowedMeasureUnit 104016 | | 0..n 104018 | EmployeeTimeSheetAllowedMeasureUnit 104020 |
| | | | WorkAgreementID 104022 | 1 104024 | WorkAgreementID 104026 |
| | | | Code 104028 | 1 104030 | MeasureUnitCode 104032 |
| | | | Note 104034 | 0..1 104036 | Note 104038 |

FIG. 104-2

| Package | level1 | level2 | level3 | Cardinality | Datatype Name |
|---|---|---|---|---|---|
| Log 104040 | | Log 104042 | | 0..1 104044 | Log 104046 |

FIG. 105

| Package | Level 1 | Level 2 | Level 3 | Cardinality | Datatype Name |
|---|---|---|---|---|---|
| EmployeeTimeSheetAllowedNetworkByEmployeeQueryMessage 105000 | EmployeeTimeSheetAllowedNetworkByEmployeeQueryMessage 105002 | | | | <MessageDataType> 105004 |
| MessageHeader 105006 | | MessageHeader 105008 | | 1 105010 | BusinessDocumentMessageHeader 105012 |
| Selection 105014 | | EmployeeTimeSheetAllowedNetworkSelectionByEmployee 105016 | | 1 105018 | EmployeeTimeSheetAllowedNetworkSelectionByEmployee 105020 |
| | | | Employee_ID 105022 | 0..1 105024 | EmployeeID 105026 |
| | | | WorkAgreement_ID 105028 | 0..1 105030 | WorkAgreementID 105032 |

FIG. 106-1

| Package | Level 1 | Level 2 | Level 3 | Cardinality | Datatype Name |
|---|---|---|---|---|---|
| EmployeeTimeSheetAllowedNetworkByEmployeeResponseMessage 106000 | EmployeeTimeSheetAllowedNetworkByEmployeeResponseMessage 106002 | | | | <MessageDataType> 106004 |
| MessageHeader 106006 | | MessageHeader 106008 | | 1 106010 | BusinessDocumentMessageHeader 106012 |
| EmployeeTimeSheet 106014 | | EmployeeTimeSheetAllowedNetwork 106016 | | 0..n 106018 | EmployeeTimeSheetAllowedNetwork 106020 |
| | | | WorkAgreementID 106022 | 1 106024 | WorkAgreementID 106026 |
| | | | ID 106028 | 1 106030 | BusinessTransactionDocumentID 106032 |
| | | | Description 106034 | 0..1 106036 | ProjectNetworkDescription 106038 |

FIG. 106-2

| Package | Level 1 | Level 2 | Level 3 | Cardinality | Datatype Name |
|---|---|---|---|---|---|
| | | | OperationID 106040 | 0..1 106042 | OperationID 106044 |
| | | | OperationDe-scription 106046 | 0..1 106048 | OperationDescription 106050 |
| | | | OperationAc-tivityID 106052 | 0..1 106054 | OperationActivityID 106056 |
| | | | Note 106058 | 0..1 106060 | Note 106062 |
| Log 106064 | | Log 106066 | | 0..1 106068 | Log 106070 |

FIG. 107

| Package | Level 1 | Level 2 | Level 3 | Cardinality | Datatype Name |
|---|---|---|---|---|---|
| EmployeeTimeSheetAllowedOrderByEmployeeQueryMessage 107000 | EmployeeTimeSheetAllowedOrderByEmployeeQueryMessage 107002 | | | | EmployeeTimeSheetAllowedOrderByEmployeeQueryMessage 107004 |
| MessageHeader 107006 | | MessageHeader 107008 | | 1 107010 | BusinessDocumentMessageHeader 107012 |
| Selection 107014 | | EmployeeTimeSheetAllowedOrderSelectionByEmployee 107016 | | 1 107018 | EmployeeTimeSheetAllowedOrderSelectionByEmployee 107020 |
| | | | Employee_ID 107022 | 0..1 107024 | EmployeeID 107026 |
| | | | WorkAgreement_ID 107028 | 0..1 107030 | WorkAgreementID 107032 |

FIG. 108-1

| Package | Level 1 | Level 2 | Level 3 | Cardinality | Datatype Name |
|---|---|---|---|---|---|
| EmployeeTimeSheetAllowedOrderByEmployeeResponseMessage 108000 | EmployeeTimeSheetAllowedOrderByEmployeeResponseMessage 108002 | | | | <MessageDataType> 108004 |
| MessageHeader 108006 | | MessageHeader 108008 | | 1 108010 | BusinessDocumentMessageHeader 108012 |
| EmployeeTimeSheet 108014 | | EmployeeTimeSheetAllowedOrder 108016 | | 0..n 108018 | EmployeeTimeSheetAllowedOrder 108020 |
| | | | WorkAgreementID 108022 | 1 108024 | WorkAgreementID 108026 |
| | | | ID 108028 | 1 108030 | BusinessTransactionDocumentID 108032 |
| | | | Description 108034 | 0..1 108036 | OrderDescription 108038 |

FIG. 108-2

| Package | Level 1 | Level 2 | Level 3 | Cardinality | Datatype Name |
|---|---|---|---|---|---|
| | | | OperationID 108040 | 0..1 108042 | OperationID 108044 |
| | | | OperationDe-scription 108046 | 0..1 108048 | OperationDescription 108050 |
| | | | OperationActiv-ityID 108052 | 0..1 108054 | OperationActivityID 108056 |
| | | | Note 108058 | 0..1 108060 | Note 108062 |
| Log 108064 | | Log 108066 | | 0..1 108068 | Log 108070 |

FIG. 109

| Package | Level 1 | Level 2 | Level 3 | Cardinality | Datatype Name |
|---|---|---|---|---|---|
| EmployeeTimeSheetAllowedPurchaseOrderByEmployeeQueryMessage 109000 | EmployeeTimeSheetAllowedPurchaseOrderByEmployeeQueryMessage 109002 | | | | EmployeeTimeSheetAllowedPurchaseOrderByEmployeeQueryMessage 109004 |
| MessageHeader 109006 | | MessageHeader 109008 | | 1 109010 | BusinessDocumentMessageHeader 109012 |
| Selection 109014 | | EmployeeTimeSheetAllowedPurchaseOrderSelectionByEmployee 109016 | | 1 109018 | EmployeeTimeSheetAllowedPurchaseOrderSelectionByEmployee 109020 |
| | | | Employee_ID 109022 | 0..1 109024 | EmployeeID 109026 |
| | | | WorkAgreement_ID 109028 | 0..1 109030 | WorkAgreementID 109032 |

FIG. 110-1

| Package | Level 1 | Level 2 | Level 3 | Cardinality | Datatype Name |
|---|---|---|---|---|---|
| EmployeeTimeSheetAllowedPurchaseOrderByEmployeeResponseMessage 110000 | EmployeeTimeSheetAllowedPurchaseOrderByEmployeeResponseMessage 110002 | | | | <MessageDataType> 110004 |
| MessageHeader 110006 | | MessageHeader 110008 | | 1 110010 | BusinessDocumentMessageHeader 110012 |
| EmployeeTimeSheet 110014 | | EmployeeTimeSheetAllowedPurchaseOrder 110016 | | 0..n 110018 | EmployeeTimeSheetAllowedPurchaseOrder 110020 |
| | | | WorkAgreementID 110022 | 1 110024 | WorkAgreementID 110026 |
| | | | ID 110028 | 1 110030 | BusinessTransactionDocumentID 110032 |

FIG. 110-2

| Package | Level 1 | Level 2 | Level 3 | Cardinality | Datatype Name |
|---|---|---|---|---|---|
| | | | ItemID 110034 | 0..1 110036 | BusinessTransactionDocumentItemID 110038 |
| | | | Note 110040 | 0..1 110042 | Note 110044 |
| Log 110046 | | Log 110048 | | 0..1 110050 | Log 110052 |

FIG. 111

| Package | Level 1 | Level 2 | Level 3 | Cardinality | Datatype Name |
|---|---|---|---|---|---|
| EmployeeTimeSheetAllowedReceivingCostCentre-ByEmployeeQueryMessage 111000 | EmployeeTimeSheetAllowedReceiving-CostCentreByEmployeeQueryMessage 111002 | | | | EmployeeTimeSheetAllowedReceivingCostCentreByEmployeeQuery-Message 111004 |
| MessageHeader 111006 | | MessageHeader 111008 | | 1 111010 | BusinessDocumentMessageHeader 111012 |
| Selection 111014 | | EmployeeTimeSheetAllowedReceiving-CostCentreSelectionByEmployee 111016 | | 1 111018 | EmployeeTimeSheetAllowedReceivingCostCentreSelectionByEmployee 111020 |
| | | | Employee_ID 111022 | 0..1 111024 | EmployeeID 111026 |
| | | | WorkAgreement_ID 111028 | 0..1 111030 | WorkAgreementID 111032 |

FIG. 112-1

| Package | Level 1 | Level 2 | Level 3 | Cardinality | Datatype Name |
|---|---|---|---|---|---|
| EmployeeTimeSheetAllowedReceivingCostCentreByEmployeeResponseMessage 112000 | EmployeeTimeSheetAllowedReceivingCostCentreByEmployeeResponseMessage 112002 | | | | EmployeeTimeSheetAllowedReceivingCostCentreByEmployeeResponseMessage 112004 |
| MessageHeader 112006 | | MessageHeader 112008 | | 1 112010 | BusinessDocumentMessageHeader 112012 |
| EmployeeTimeSheet 112014 | | EmployeeTimeSheetAllowedReceivingCostCentre 112016 | | 0..n 112018 | EmployeeTimeSheetAllowedReceivingCostCentre 112020 |
| | | | WorkAgreementID 112022 | 1 112024 | WorkAgreementID 112026 |
| | | | ID 112028 | 1 112030 | CostCentreID 112032 |
| | | | Description 112034 | 0..1 112036 | ReceivingCostCentreDescription 112038 |

FIG. 112-2

| Package | Level 1 | Level 2 | Level 3 | Cardinality | Datatype Name |
|---|---|---|---|---|---|
| | | | ValidityPeriod 112040 | 1 112042 | CLOSED_DatePeriod 112044 |
| | | | Note 112046 | 0..1 112048 | Note 112050 |
| Log 112052 | | Log 112054 | | 0..1 112056 | Log 112058 |

FIG. 113

| Package | Level 1 | Level 2 | Level 3 | Cardinality | Datatype Name |
|---|---|---|---|---|---|
| EmployeeTimeSheetAllowedReceivingCostingActivity-ByEmployeeQueryMessage 113000 | EmployeeTimeSheetAllowedReceivingCostingActivity-ByEmployeeQueryMessage 113002 | | | | EmployeeTime-SheetAllowedReceiv-ingCostingActivity-ByEmployeeQuery-Message 113004 |
| MessageHeader 113006 | | MessageHeader 113008 | | 1 113010 | BusinessDocument-MessageHeader 113012 |
| Selection 113014 | | EmployeeTimeSheetAllowedReceiving-CostingActivitySe-lectionByEmployee 113016 | | 1 113018 | EmployeeTime-SheetAllowedReceiv-ingCostingActivitySe-lectionByEmployee 113020 |
| | | | Employee_ID 113022 | 0..1 113024 | EmployeeID 113026 |
| | | | WorkAgree-ment_ID 113028 | 0..1 113030 | WorkAgreementID 113032 |

FIG. 114-1

| Package | Level 1 | Level 2 | Level 3 | Cardinality | Datatype Name |
|---|---|---|---|---|---|
| EmployeeTimeSheetAllowedReceivingCostingActivityByEmployeeResponseMessage 114000 | EmployeeTimeSheetAllowedReceivingCostingActivityByEmployeeResponseMessage 114002 | | | | EmployeeTimeSheetAllowedReceiving-CostingActivity-ByEmployeeRe-sponseMessage 114004 |
| MessageHeader 114006 | | MessageHeader 114008 | | 1 114010 | BusinessDocument-MessageHeader 114012 |
| EmployeeTimeSheet 114014 | | EmployeeTimeShee-tAllowedReceiving-CostingActivity 114016 | | 0..n 114018 | EmployeeTimeShee-tAllowedReceiving-CostingActivity 114020 |
| | | | WorkA-gree-mentID 114022 | 1 114024 | WorkAgreementID 114026 |

FIG. 114-2

| Package | Level 1 | Level 2 | Level 3 | Cardinality | Datatype Name |
|---|---|---|---|---|---|
| | | | ID 114028 | 1 114030 | CostingActivityID 114032 |
| | | | Descrip-tion 114034 | 0..1 114036 | ReceivingCostingAc-tivityDescription 114038 |
| | | | Valid-ityPeriod 114040 | 1 114042 | CLOSED_DatePerio d 114044 |
| | | | Note 114046 | 0..1 114048 | Note 114050 |
| Log 114052 | | Log 114054 | | 0..1 114056 | Log 114058 |

FIG. 115

| Package | Level 1 | Level 2 | Level 3 | Cardinality | Datatype Name |
|---|---|---|---|---|---|
| EmployeeTimeSheetAllowedReceivingFundByEmployeeQueryMessage 115000 | EmployeeTimeSheetAllowedReceivingFundByEmployeeQueryMessage 115002 | | | | EmployeeTimeSheetAllowedReceivingFundByEmployeeQueryMessage 115004 |
| MessageHeader 115006 | | MessageHeader 115008 | | 1 115010 | BusinessDocumentMessageHeader 115012 |
| Selection 115014 | | EmployeeTimeSheetAllowedReceivingFundSelectionByEmployee 115016 | | 1 115018 | EmployeeTimeSheetAllowedReceivingFundSelectionByEmployee 115020 |
| | | | Employee_ID 115022 | 0..1 115024 | EmployeeID 115026 |
| | | | WorkAgreement_ID 115028 | 0..1 115030 | WorkAgreementID 115032 |

FIG. 116-1

| Package | Level 1 | Level 2 | Level 3 | Cardinality | Datatype Name |
|---|---|---|---|---|---|
| EmployeeTimeSheetAllowedReceivingFundByEmployeeResponseMessage 116000 | EmployeeTimeSheetAllowedReceivingFundByEmployeeResponseMessage 116002 | | | | EmployeeTimeSheetAllowedReceivingFundByEmployeeResponseMessage 116004 |
| MessageHeader 116006 | | MessageHeader 116008 | | 1 116010 | BusinessDocumentMessageHeader 116012 |
| EmployeeTimeSheet 116014 | | EmployeeTimeSheetAllowedReceivingFund 116016 | | 0..n 116018 | EmployeeTimeSheetAllowedReceivingFund 116020 |
| | | | WorkAgreementID 116022 | 1 116024 | WorkAgreementID 116026 |
| | | | ID 116028 | 1 116030 | FundsManagementFundID 116032 |

FIG. 116-2

| Package | Level 1 | Level 2 | Level 3 | Cardinality | Datatype Name |
|---|---|---|---|---|---|
| | | | Description 116034 | 0..1 116036 | ReceivingFundDe-scription 116038 |
| | | | Note 116040 | 0..1 116042 | Note 116044 |
| Log 116046 | | Log 116048 | | 0..1 116050 | Log 116052 |

FIG. 117

| Package | Level 1 | Level 2 | Level 3 | Cardinality | Datatype Name |
|---|---|---|---|---|---|
| EmployeeTimeSheetAllowedReceivingGrantByEmployeeQueryMessage 117000 | EmployeeTimeSheetAllowedReceivingGrantByEmployeeQueryMessage 117002 | | | | EmployeeTimeSheetAllowedReceivingGrantByEmployeeQueryMessage 117004 |
| MessageHeader 117006 | | MessageHeader 117008 | | 1 117010 | BusinessDocumentMessageHeader 117012 |
| Selection 117014 | | EmployeeTimeSheetAllowedReceivingGrantSelectionByEmployee 117016 | | 1 117018 | EmployeeTimeSheetAllowedReceivingGrantSelectionByEmployee 117020 |
| | | | Employee_ID 117022 | 0..1 117024 | EmployeeID 117026 |
| | | | WorkAgreement_ID 117028 | 0..1 117030 | WorkAgreementID 117032 |

FIG. 118-1

| Package | Level 1 | Level 2 | Level 3 | Cardinality | Datatype Name |
|---|---|---|---|---|---|
| EmployeeTimeSheetAllowedReceivingGrantByEmployeeResponseMessage 118000 | EmployeeTimeSheetAllowedReceivingGrantByEmployeeResponseMessage 118002 | | | | EmployeeTimeSheetAllowedReceivingGrantByEmployeeResponseMessage 118004 |
| MessageHeader 118006 | | MessageHeader 118008 | | 1 118010 | BusinessDocumentMessageHeader 118012 |
| EmployeeTimeSheet 118014 | | EmployeeTimeSheetAllowedReceivingGrant 118016 | | 0..n 118018 | EmployeeTimeSheetAllowedReceivingGrant 118020 |
| | | | WorkAgreementID 118022 | 1 118024 | WorkAgreementID 118026 |
| | | | ID 118028 | 1 118030 | GrantID 118032 |
| | | | Description 118034 | 0..1 118036 | ReceivingGrantDescription 118038 |

FIG. 118-2

| Package | Level 1 | Level 2 | Level 3 | Cardinality | Datatype Name |
|---|---|---|---|---|---|
| | | | Note 118040 | 0..1 118042 | Note 118044 |
| Log 118046 | | Log 118048 | | 0..1 118050 | Log 118052 |

FIG. 119

| Package | Level 1 | Level 2 | Level 3 | Cardinality | Datatype Name |
|---|---|---|---|---|---|
| EmployeeTimeSheetAllowedReceivingSalesOrder-ByEmployeeQueryMessage 119000 | EmployeeTimeSheetAllowedReceivingSalesOrder-ByEmployeeQueryMessage 119002 | | | | EmployeeTimeSheetAllowedReceivingSalesOrder-ByEmployeeQueryMes-sage 119004 |
| MessageHeader 119006 | | MessageHeader 119008 | | 1 119010 | BusinessDocumentMes-sageHeader 119012 |
| Selection 119014 | | EmployeeTimeShee-tAllowedReceiving-SalesOrderSelec-tionByEmployee 119016 | | 1 119018 | EmployeeTimeSheetAl-lowedReceivingSalesOr-derSelectionByEmployee 119020 |
| | | | Em-ployee_ID 119022 | 0..1 119024 | EmployeeID 119026 |
| | | | WorkAgree-ment_ID 119028 | 0..1 119030 | WorkAgreementID 119032 |

FIG. 120-1

| Package | Level 1 | Level 2 | Level 3 | Cardinality | Datatype Name |
|---|---|---|---|---|---|
| EmployeeTimeSheetAllowedReceivingSalesOrderByEmployeeResponseMessage 120000 | EmployeeTimeSheetAllowedReceivingSalesOrderByEmployeeResponseMessage 120002 | | | | EmployeeTimeSheetAllowedReceivingSalesOrderByEmployeeResponseMessage 120004 |
| MessageHeader 120006 | | MessageHeader 120008 | | 1 120010 | BusinessDocumentMessageHeader 120012 |
| EmployeeTimeSheet 120014 | | EmployeeTimeSheetAllowedReceivingSalesOrder 120016 | | 0..n 120018 | EmployeeTimeSheetAllowedReceivingSalesOrder 120020 |
| | | | WorkAgreementID 120022 | 1 120024 | WorkAgreementID 120026 |
| | | | ID 120028 | 1 120030 | BusinessTransactionDocumentID 120032 |

FIG. 120-2

| Package | Level 1 | Level 2 | Level 3 | Cardinality | Datatype Name |
|---|---|---|---|---|---|
| | | | ItemID 120034 | 0..1 120036 | BusinessTransactionDocumentItemID 120038 |
| | | | ItemDescription 120040 | 0..1 120042 | SalesOrderItemDescription 120044 |
| | | | Note 120046 | 0..1 120048 | Note 120050 |
| Log 120052 | | Log 120054 | | 0..1 120056 | Log 120058 |

FIG. 121

| Package | Level 1 | Level 2 | Level 3 | Cardinality | Datatype Name |
|---|---|---|---|---|---|
| EmployeeTimeSheetAllowedResourceClassByEmployeeQueryMessage 121000 | EmployeeTimeSheetAllowedResourceClassByEmployeeQueryMessage 121002 | | | | EmployeeTimeSheetAllowedResourceClassByEmployeeQueryMessage 121004 |
| MessageHeader 121006 | | MessageHeader 121008 | | 1 121010 | BusinessDocumentMessageHeader 121012 |
| Selection 121014 | | EmployeeTimeSheetAllowedResourceClassSelectionByEmployee 121016 | | 1 121018 | EmployeeTimeSheetAllowedResourceClassSelectionByEmployee 121020 |
| | | | Employee_ID 121022 | 0..1 121024 | EmployeeID 121026 |
| | | | WorkAgreement_ID 121028 | 0..1 121030 | WorkAgreementID 121032 |

FIG. 122-1

| Package | Level 1 | Level 2 | Level 3 | Cardinality | Datatype Name |
|---|---|---|---|---|---|
| EmployeeTimeSheetAllowedResourceClassByEmployeeResponseMessage 122000 | EmployeeTimeSheetAllowedResourceClassByEmployeeResponseMessage 122002 | | | | EmployeeTimeSheetAllowedResourceClassByEmployeeResponseMessage 122004 |
| MessageHeader 122006 | | MessageHeader 122008 | | 1 122010 | BusinessDocumentMessageHeader 122012 |
| EmployeeTimeSheet 122014 | | EmployeeTimeSheetAllowedResourceClass 122016 | | 0..n 122018 | EmployeeTimeSheetAllowedResourceClass 122020 |
| | | | WorkAgreementID 122022 | 1 122024 | WorkAgreementID 122026 |
| | | | ID 122028 | 1 122030 | ResourceClassID 122032 |

FIG. 122-2

| Package | Level 1 | Level 2 | Level 3 | Cardinality | Datatype Name |
|---|---|---|---|---|---|
| | | | Description 122034 | 0..1 122036 | ResourceClassDescrip-tion 122038 |
| | | | Measure-UnitCode 122040 | 1 122042 | MeasureUnitCode 122044 |
| | | | Note 122046 | 0..1 122048 | Note 122050 |
| Log 122052 | | Log 122054 | | 0..1 122056 | Log 122058 |

FIG. 123

| Package | Level 1 | Level 2 | Level 3 | Cardinality | Datatype Name |
|---|---|---|---|---|---|
| EmployeeTimeSheetAllowedServiceProductByEmployeeQueryMessage 123000 | EmployeeTimeSheetAllowedServiceProductByEmployeeQueryMessage 123002 | | | | EmployeeTimeSheetAllowedServiceProductByEmployeeQueryMessage 123004 |
| MessageHeader 123006 | | MessageHeader 123008 | | 1 123010 | BusinessDocumentMessageHeader 123012 |
| Selection 123014 | | EmployeeTimeSheetAllowedServiceProductSelectionByEmployee 123016 | | 1 123018 | EmployeeTimeSheetAllowedServiceProductSelectionByEmployee 123020 |
| | | | Employee_ID 123022 | 0..1 123024 | EmployeeID 123026 |
| | | | WorkAgreement_ID 123028 | 0..1 123030 | WorkAgreementID 123032 |

FIG. 124-1

| Package | level1 | level2 | level3 | Cardinality | Datatype Name |
|---|---|---|---|---|---|
| EmployeeTimeSheetAllowedServiceProductByEmployeeResponseMessage 124000 | EmployeeTimeSheetAllowedServiceProductByEmployeeResponseMessage 124002 | | | | EmployeeTimeSheetAllowedServiceProductByEmployeeResponseMessage 124004 |
| MessageHeader 124006 | | MessageHeader 124008 | | 1 124010 | BusinessDocumentMessageHeader 124012 |
| EmployeeTimeSheet 124014 | | EmployeeTimeSheetAllowedServiceProduct 124016 | | 0..n 124018 | EmployeeTimeSheetAllowedServiceProduct 124020 |
| | | | WorkAgreementID 124022 | 1 124024 | WorkAgreementID 124026 |
| | | | ID 124028 | 1 124030 | ProductID 124032 |

FIG. 124-2

| Package | level1 | level2 | level3 | Cardinality | Datatype Name |
|---|---|---|---|---|---|
| | | | Description 124034 | 0..1 124036 | ServiceProductDescription 124038 |
| | | | MeasureUnitCode 124040 | 1 124042 | MeasureUnitCode 124044 |
| | | | Note 124046 | 0..1 124048 | Note 124050 |
| Log 124052 | | Log 124054 | | 0..1 124056 | Log 124058 |

FIG. 125

| Package | level1 | level2 | level3 | Cardinality | Datatype Name |
|---|---|---|---|---|---|
| EmployeeTimeSheetAllowedTaskComponentByEmployeeQueryMessage 125000 | EmployeeTimeSheetAllowedTaskComponentByEmployeeQueryMessage 125002 | | | | EmployeeTimeSheetAllowedTaskComponentByEmployeeQueryMessage 125004 |
| MessageHeader 125006 | | MessageHeader 125008 | | 1 125010 | BusinessDocumentMessageHeader 125012 |
| Selection 125014 | | EmployeeTimeSheetAllowedTaskComponentSelectionByEmployee 125016 | | 1 125018 | EmployeeTimeSheetAllowedTaskComponentSelectionByEmployee 125020 |
| | | | Employee_ID 125022 | 0..1 125024 | EmployeeID 125026 |
| | | | WorkAgreement_ID 125028 | 0..1 125030 | WorkAgreementID 125032 |

FIG. 126-1

| Package | Level 1 | Level 2 | Level 3 | Cardinality | Datatype Name |
|---|---|---|---|---|---|
| EmployeeTimeSheetAllowedTaskComponentByEmployeeResponseMessage 126000 | EmployeeTimeSheetAllowedTaskComponentByEmployeeResponseMessage 126002 | | | | EmployeeTimeSheetAllowedTaskComponentByEmployeeResponseMessage 126004 |
| MessageHeader 126006 | | MessageHeader 126008 | | 1 126010 | BusinessDocumentMessageHeader 126012 |
| EmployeeTimeSheet 126014 | | EmployeeTimeSheetAllowedTaskComponent 126016 | | 0..n 126018 | EmployeeTimeSheetAllowedTaskComponent 126020 |
| | | | WorkAgreementID 126022 | 1 126024 | WorkAgreementID 126026 |
| | | | Code 126028 | 1 126030 | EmployeeTimeItemTaskComponent 126032 |

FIG. 126-2

| Package | Level 1 | Level 2 | Level 3 | Cardinality | Datatype Name |
|---|---|---|---|---|---|
| | | | TaskType-Code 126034 | 0..1 126036 | EmployeeTimeItem-TaskType 126038 |
| | | | Note 126040 | 0..1 126042 | Note 126044 |
| Log 126046 | | Log 126048 | | 0..1 126050 | Log 126052 |

FIG. 127

| Package | Level 1 | Level 2 | Level 3 | Cardinality | Datatype Name |
|---|---|---|---|---|---|
| EmployeeTimeSheetAllowedTaskLevelByEmployeeQueryMessage 127000 | EmployeeTimeSheetAllowedTaskLevelByEmployeeQueryMessage 127002 | | | | EmployeeTimeSheetAllowedTaskLevelByEmployeeQueryMessage 127004 |
| MessageHeader 127006 | | MessageHeader 127008 | | 1 127010 | BusinessDocumentMessageHeader 127012 |
| Selection 127014 | | EmployeeTimeSheetAllowedTaskLevelSelectionByEmployee 127016 | | 1 127018 | EmployeeTimeSheetAllowedTaskLevelSelectionByEmployee 127020 |
| | | | Employee_ID 127022 | 0..1 127024 | EmployeeID 127026 |
| | | | WorkAgreement_ID 127028 | 0..1 127030 | WorkAgreementID 127032 |

FIG. 128-1

| Package | Level 1 | Level 2 | Level 3 | Cardinality | Datatype Name |
|---|---|---|---|---|---|
| EmployeeTimeSheetAllowedTaskTypeByEmployeeResponseMessage 128000 | EmployeeTimeSheetAllowedTaskTypeByEmployeeResponseMessage 128002 | | | | EmployeeTimeSheetAllowedTaskTypeByEmployeeResponseMessage 128004 |
| MessageHeader 128006 | | MessageHeader 128008 | | 1 128010 | BusinessDocumentMessageHeader 128012 |
| EmployeeTimeSheet 128014 | | EmployeeTimeSheetAllowedTaskType 128016 | | 0..n 128018 | EmployeeTimeSheetAllowedTaskType 128020 |
| | | | WorkAgreementID 128022 | 1 128024 | WorkAgreementID 128026 |
| | | | Code 128028 | 1 128030 | EmployeeTimeItemTaskLevel 128032 |

FIG. 128-2

| Package | Level 1 | Level 2 | Level 3 | Cardinality | Datatype Name |
|---|---|---|---|---|---|
| | | | TaskType-Code 128034 | 0..1 128036 | Employ-eeTimeItem-TaskType 128038 |
| | | | Note 128040 | 0..1 128042 | Note 128044 |
| Log 128046 | | Log 128048 | | 0..1 128050 | Log 128052 |

FIG. 129

| Package | Level 1 | Level 2 | Level 3 | Cardinality | Datatype Name |
|---|---|---|---|---|---|
| EmployeeTimeSheetAllowedTaskTypeByEmployeeQueryMessage 129000 | EmployeeTimeSheetAllowedTaskTypeByEmployeeQueryMessage 129002 | | | | EmployeeTimeSheetAllowedTaskTypeByEmployeeQueryMessage 129004 |
| MessageHeader 129006 | | MessageHeader 129008 | | 1 129010 | BusinessDocumentMessageHeader 129012 |
| Selection 129014 | | EmployeeTimeSheetAllowedTaskTypeSelectionByEmployee 129016 | | 1 129018 | EmployeeTimeSheetAllowedTaskTypeSelectionByEmployee 129020 |
| | | | Employee_ID 129022 | 0..1 129024 | EmployeeID 129026 |
| | | | WorkAgreement_ID 129028 | 0..1 129030 | WorkAgreementID 129032 |

FIG. 130-1

| Package | level1 | level2 | level3 | Cardinality | Datatype Name |
|---|---|---|---|---|---|
| EmployeeTimeSheetAllowedTaskTypeByEmployeeResponseMessage 130000 | EmployeeTimeSheetAllowedTaskTypeByEmployeeResponseMessage 130002 | | | | EmployeeTimeSheetAllowedTaskTypeByEmployeeResponseMessage 130004 |
| MessageHeader 130006 | | MessageHeader 130008 | | 1 130010 | BusinessDocumentMessageHeader 130012 |
| EmployeeTimeSheet 130014 | | EmployeeTimeSheetAllowedTaskType 130016 | | 0..n 130018 | EmployeeTimeSheetAllowedTaskType 130020 |
| | | | WorkAgreementID 130022 | 1 130024 | WorkAgreementID 130026 |
| | | | Code 130028 | 1 130030 | EmployeeTimeItemTaskType 130032 |
| | | | Note 130034 | 0..1 130036 | Note 130038 |

FIG. 130-2

| Package | level1 | level2 | level3 | Cardinality | Datatype Name |
|---|---|---|---|---|---|
| Log 130040 | | Log 130042 | | 0..1 130044 | Log 130046 |

FIG. 131

| Package | level1 | level2 | level3 | Cardinality | Datatype Name |
|---|---|---|---|---|---|
| EmployeeTimeSheetAllowedWarrantyGoodwillType-ByEmployeeQueryMessage 131000 | EmployeeTimeSheetAllowedWarranty-GoodwillTypeByEm-ployeeQueryMessage 131002 | | | | EmployeeTimeSheetAllowedWarrantyGoodwillTypeByEm-ployeeQueryMessage 131004 |
| MessageHeader 131006 | | MessageHeader 131008 | | 1 131010 | BusinessDocumentMessage-Header 131012 |
| Selection 131014 | | EmployeeTimeShee-tAllowedWarranty-GoodwillTypeSelec-tionByEmployee 131016 | | 1 131018 | EmployeeTimeSheetAllowed-WarrantyGoodwillTypeSelec-tionByEmployee 131020 |
| | | | Em-ployee_ID 131022 | 0..1 131024 | EmployeeID 131026 |
| | | | WorkA-gree-ment_ID 131028 | 0..1 131030 | WorkAgreementID 131032 |

FIG. 132-1

| Package | Level 1 | Level 2 | Level 3 | Cardinality | Datatype Name |
|---|---|---|---|---|---|
| EmployeeTimeSheetAllowedWarrantyGoodwillTypeByEmployeeResponseMessage 132000 | EmployeeTimeSheetAllowedWarrantyGoodwillTypeByEmployeeResponseMessage 132002 | | | | EmployeeTimeSheetAllowedWarrantyGoodwillTypeByEmployeeResponseMessage 132004 |
| MessageHeader 132006 | | MessageHeader 132008 | | 1 132010 | BusinessDocumentMessageHeader 132012 |
| EmployeeTimeSheet 132014 | | EmployeeTimeSheetAllowedWarrantyGoodwillType 132016 | | 0..n 132018 | EmployeeTimeSheetAllowedWarrantyGoodwillType 132020 |
| | | | WorkAgreementID 132022 | 1 132024 | WorkAgreementID 132026 |
| | | | WarrantyGoodwillCode 132028 | 1 132030 | WarrantyGoodwillCode 132032 |

FIG. 132-2

| Package | Level 1 | Level 2 | Level 3 | Cardinality | Datatype Name |
|---|---|---|---|---|---|
| | | | Note 132034 | 0..1 132036 | Note 132038 |
| Log 132040 | | Log 132042 | | 0..1 132044 | Log 132046 |

FIG. 133

| Package | Level 1 | Level 2 | Level 3 | Cardinality | Datatype Name |
|---|---|---|---|---|---|
| EmployeeTimeSheetAllowedWorkBreakDownStructureElement-ByEmployeeQueryMessage 133000 | EmployeeTimeSheetAllowedWorkBreak-DownStructureEle-mentByEmploye-eQueryMessage 133002 | | | | EmployeeTimeSheetAllowedWorkBreakDown-StructureElementByEm-ployeeQueryMessage 133004 |
| MessageHeader 133006 | | MessageHeader 133008 | | 1 133010 | BusinessDocumentMes-sageHeader 133012 |
| Selection 133014 | | EmployeeTimeSheetAllowedWork-BreakDownStructu-reElementSelec-tionByEmployee 133016 | | 1 133018 | EmployeeTimeSheetAllowedWorkBreakDown-StructureElementSelec-tionByEmployee 133020 |
| | | | Employee_ID 133022 | 0..1 133024 | EmployeeID 133026 |
| | | | WorkAgree-ment_ID 133028 | 0..1 133030 | WorkAgreementID 133032 |

FIG. 134-1

| Package | Level 1 | Level 2 | Level 3 | Cardinality | Datatype Name |
|---|---|---|---|---|---|
| EmployeeTimeSheetAllowedWorkBreakDownStructureElement-ByEmployeeResponseMessage 134000 | EmployeeTimeSheetAllowedWorkBreakDownStructureElementByEmployeeResponseMessage 134002 | | | | <Message-DataType> 134004 |
| MessageHeader 134006 | | MessageHeader 134008 | | 1 134010 | BusinessDocumentMessage-Header 134012 |
| EmployeeTimeSheet 134014 | | EmployeeTime-SheetAllowed-WorkBreakDown-StructureElement 134016 | | 0..n 134018 | EmployeeTime-SheetAllowed-WorkBreakDown-StructureElement 134020 |
| | | | WorkAgreementID 134022 | 1 134024 | WorkAgreementID 134026 |
| | | | ID 134028 | 1 134030 | ProjectElementID 134032 |

FIG. 134-2

| Package | Level 1 | Level 2 | Level 3 | Cardinality | Datatype Name |
|---|---|---|---|---|---|
| | | | Description 134034 | 0..1 134036 | WorkBreakDown-StructureElement-Description 134038 |
| | | | Note 134040 | 0..1 134042 | Note 134044 |
| Log 134046 | | Log 134048 | | 0..1 134050 | Log 134052 |

FIG. 135

| Package | Level 1 | Level 2 | Level 3 | Cardinality | Datatype Name |
|---|---|---|---|---|---|
| EmployeeTimeSheetByEmployeeQueryMessage 135000 | EmployeeTimeSheetByEmployeeQueryMessage 135002 | | | | EmployeeTimeSheetByEmployeeQueryMessage 135004 |
| MessageHeader 135006 | | MessageHeader 135008 | | 1 135010 | BusinessDocumentMessageHeader 135012 |
| Selection 135014 | | EmployeeTimeSheetSelectionByEmployee 135016 | | 1 135018 | EmployeeTimeSheetSelectionByEmployee 135020 |
| | | | Employee_ID 135022 | 0..1 135024 | EmployeeID 135026 |
| | | | WorkAgreement_ID 135028 | 0..1 135030 | WorkAgreementID 135032 |
| | | | DatePeriod 135034 | 0..1 135036 | CLOSED_DatePeriod 135038 |

FIG. 136-1

| Package | Level 1 | Level 2 | Level 3 | Level 4 | | Level 5 | Cardinality | Datatype Name |
|---|---|---|---|---|---|---|---|---|
| EmployeeTimeSheetByEmployeeResponseMessage 136000 | EmployeeTimeSheetByEmployeeResponseMessage 136002 | | | | | | | EmployeeTimeSheetByEmployeeResponseMessage 136004 |
| MessageHeader 136006 | | MessageHeader 136008 | | | | | 1 136010 | BusinessDocumentMessageHeader 136012 |
| EmployeeTimeSheet 136014 | | EmployeeTimeSheet 136016 | | | | | 1 136018 | EmployeeTimeSheet 136020 |
| EmployeeTime 136022 | | | EmployeeTime 136024 | | | | 0..n 136026 | EmployeeTime 136028 |
| | | | | ID 136030 | | | 1 136032 | BusinessTransactionDocumentID 136034 |

FIG. 136-2

| Package | Level 1 | Level 2 | Level 3 | Level 4 | | Level 5 | Cardinality | Datatype Name |
|---|---|---|---|---|---|---|---|---|
| | | | | ExternalKey 136036 | | | 0..1 136038 | ExternalKey 136040 |
| | | | | | ID 136042 | | 0..1 136044 | BusinessTransactionDocumentID 136046 |
| | | | | | OriginTypeCode 136048 | | 0..1 136050 | EmployeeTimeOriginTypeCode 136052 |
| | | | | WorkAgreementID 136054 | | | 1 136056 | WorkAgreementID 136058 |
| | | | | Note 136060 | | | 0..1 136062 | Note 136064 |
| | | | | Status 136066 | | | 1 136068 | EmployeeTimeStatus 136070 |

FIG. 136-3

| Package | Level 1 | Level 2 | Level 3 | Level 4 | | Level 5 | Cardinality | Datatype Name |
|---|---|---|---|---|---|---|---|---|
| | | | | | LifeCycleStatusCode 136072 | | 1 136074 | EmployeeTimeLifeCycleStatusCode 136076 |
| | | | | | ApprovalStatusCode 136078 | | 1 136080 | ApprovalStatusCode 136082 |
| | | | | ApproverUserAccountID 136084 | | | 0..1 136086 | UserAccountID 136088 |
| | | | | ApprovalDate 136090 | | | 0..1 136092 | Date 136094 |

FIG. 136-4

| Package | Level 1 | Level 2 | Level 3 | Level 4 | | Level 5 | Cardinality | Datatype Name |
|---|---|---|---|---|---|---|---|---|
| | | | | RejectionReasonCode 136096 | | | 0..1 136098 | EmployeeTimeRejectionReasonCode 136100 |
| Item 136102 | | | | Item 136104 | | | 1..n 136106 | EmployeeTimeItem 136108 |
| | | | | | ID 136110 | | 1 136112 | EmployeeTimeItemID 136114 |
| | | | | | SystemAdministrativeData 136116 | | 1 136118 | SystemAdministrativeData 136120 |
| | | | | | CategoryCode 136122 | | 1 136124 | EmployeeTimeItemCategoryCode 136126 |

FIG. 136-5

| Package | Level 1 | Level 2 | Level 3 | Level 4 | | Level 5 | Cardinality | Datatype Name |
|---|---|---|---|---|---|---|---|---|
| | | | | | TypeCode 136128 | | 0..1 136130 | EmployeeTimeItemTypeCode 136132 |
| | | | | | EmployeeTimeValidity 136134 | | 0..1 136136 | EmployeeTimeValidity 136138 |
| | | | | | FullWorkingDayIndicator 136140 | | 0..1 136142 | FullWorkingDayIndicator 136144 |
| | | | | | Quantity 136146 | | 0..1 136148 | Quantity 136150 |
| | | | | | Amount 136152 | | 0..1 136154 | Amount 136156 |

FIG. 136-6

| Package | Level 1 | Level 2 | Level 3 | Level 4 | | Level 5 | Cardinality | Datatype Name |
|---|---|---|---|---|---|---|---|---|
| | | | | | Descrip tion 136158 | | 0..1 136160 | Employ-eeTimeItemDe-scription 136162 |
| | | | | | Task-Type-Code 136164 | | 0..1 136166 | Employ-eeTimeItem-TaskTypeCode 136168 |
| | | | | | Task-Level-Code 136170 | | 0..1 136172 | Employ-eeTimeItem-TaskLevelCode 136174 |
| | | | | | Task-Compo nent-Code 136176 | | 0..1 136178 | Employ-eeTimeItem-TaskCompo-nentCode 136180 |

FIG. 136-7

| Package | Level 1 | Level 2 | Level 3 | Level 4 | | Level 5 | Cardinality | Datatype Name |
|---|---|---|---|---|---|---|---|---|
| | | | | | Valuation-Terms 136182 | | 0..1 136184 | ValuationTerms 136186 |
| | | | | | | EmployeeTime-ValuationTerms 136188 | 0..1 136190 | EmployeeTime-ValuationTerms 136192 |
| | | | | | ActivityAllocationAndCost Assignment 136194 | | 0..1 136196 | ActivityAllocationAndCostAssignment 136198 |
| | | | | | | SendingCostCentreID 136200 | 0..1 136202 | CostCentreID 136204 |

FIG. 136-8

| Package | Level 1 | Level 2 | Level 3 | Level 4 | | Level 5 | Cardinality | Datatype Name |
|---|---|---|---|---|---|---|---|---|
| | | | | | | ResourceClassID 136206 | 0..1 136208 | ResourceClassID 136210 |
| | | | | | | SendingCostingActivityID 136212 | 0..1 136214 | CostingActivityID 136216 |
| | | | | | | SendingFundID 136218 | 0..1 136220 | FundsManagementFundID 136222 |
| | | | | | | SendingFundsManagementFunctionalAreaID 136224 | 0..1 136226 | FundsManagementFunctionalAreaID 136228 |

FIG. 136-9

| Package | Level 1 | Level 2 | Level 3 | Level 4 | | Level 5 | Cardinality | Datatype Name |
|---|---|---|---|---|---|---|---|---|
| | | | | | | SendingGrantID 136230 | 0..1 136232 | GrantID 136234 |
| | | | | | | WorkBreakDownStructureElementID 136236 | 0..1 136238 | ProjectElementID 136240 |
| | | | | | | ReceivingSalesOrderID 136242 | 0..1 136244 | BusinessTransactionDocumentID 136246 |
| | | | | | | ReceivingSalesOrderItemID 136248 | 0..1 136250 | BusinessTransactionDocumentItemID 136252 |

FIG. 136-10

| Package | Level 1 | Level 2 | Level 3 | Level 4 | | Level 5 | Cardinality | Datatype Name |
|---|---|---|---|---|---|---|---|---|
| | | | | | | ReceivingCostingActivityID 136254 | 0..1 136256 | CostingActivityID 136258 |
| | | | | | | ReceivingFundID 136260 | 0..1 136262 | FundsManagementFundID 136264 |
| | | | | | | ReceivingFundsManagementFunctionalAreaID 136266 | 0..1 136268 | FundsManagementFunctionalAreaID 136270 |
| | | | | | | ReceivingGrantID 136272 | 0..1 136274 | GrantID 136276 |

FIG. 136-11

| Package | Level 1 | Level 2 | Level 3 | Level 4 | | Level 5 | Cardinality | Datatype Name |
|---|---|---|---|---|---|---|---|---|
| | | | | | | Controll-ingKey-Figure-Code 136278 | 0..1 136280 | ControllingKey-FigureCode 136282 |
| | | | | | | Price 136284 | 0..1 136286 | Price 136288 |
| | | | | | Service Provi-sionAn dRe-sour-ceCon-sump-tion 136290 | | 0..1 136292 | ServiceProvi-sionAndResour-ceConsumption 136294 |
| | | | | | | Receiv-ingCost-CentreID 136296 | 0..1 136298 | CostCentreID 136300 |

FIG. 136-12

| Package | Level 1 | Level 2 | Level 3 | Level 4 | | Level 5 | Cardinality | Datatype Name |
|---|---|---|---|---|---|---|---|---|
| | | | | | Logis-ticCon-firma-tion 136302 | | 0..1 136304 | LogisticConfirma-tion 136306 |
| | | | | | | Resour-ceID 136308 | 0..1 136310 | ResourceID 136312 |
| | | | | | | Logistic-sAreaID 136314 | 0..1 136316 | LogisticsAreaID 136318 |
| | | | | | | OrderID 136320 | 0..1 136322 | BusinessTrans-actionDocumen-tID 136324 |
| | | | | | | OrderOp-erationID 136326 | 0..1 136328 | OperationID 136330 |

FIG. 136-13

| Package | Level 1 | Level 2 | Level 3 | Level 4 | | Level 5 | Cardinality | Datatype Name |
|---|---|---|---|---|---|---|---|---|
| | | | | | | OrderOperationActivityID 136332 | 0..1 136334 | OperationActivityID 136336 |
| | | | | | | NetworkID 136338 | 0..1 136340 | BusinessTransactionDocumentID 136342 |
| | | | | | | NetworkOperationID 136344 | 0..1 136346 | OperationID 136348 |
| | | | | | | NetworkOperationActivityID 136350 | 0..1 136352 | OperationActivityID 136354 |

FIG. 136-14

| Package | Level 1 | Level 2 | Level 3 | Level 4 | | Level 5 | Cardinality | Datatype Name |
|---|---|---|---|---|---|---|---|---|
| | | | | | | WarrantyGoodwillCode 136356 | 0..1 136358 | WarrantyGoodwillCode 136360 |
| | | | | | | CapacityCategoryCode 136362 | 0..1 136364 | CapacityCategoryCode 136366 |
| | | | | | | CapacitySplitID 136368 | 0..1 136370 | CapacitySplitID 136372 |
| | | | | | | WorkForecastQuantity 136374 | 0..1 136376 | WorkForecastQuantity 136378 |
| | | | | | | ForecastEndDate 136380 | 0..1 136382 | Date 136384 |

FIG. 136-15

| Package | Level 1 | Level 2 | Level 3 | Level 4 | | Level 5 | Cardinality | Datatype Name |
|---|---|---|---|---|---|---|---|---|
| | | | | | | Confirma-tionStatus Code 136386 | 0..1 136388 | Confirmation-StatusCode 136390 |
| | | | | | Exter-nalSer-viceAc-knowl-edge-ment 136392 | | 0..1 136394 | ExternalSer-viceAcknowl-edgement 136396 |
| | | | | | | Pur-chaseOr-derID 136398 | 0..1 136400 | BusinessTrans-actionDocumen-tID 136402 |
| | | | | | | Pur-chaseOr-derItemID 136404 | 0..1 136406 | BusinessTrans-actionDocumen-tItemID 136408 |

FIG. 136-16

| Package | Level 1 | Level 2 | Level 3 | Level 4 | | Level 5 | Cardinality | Datatype Name |
|---|---|---|---|---|---|---|---|---|
| | | | | | | Service-ProductID 136410 | 0..1 136412 | ProductID 136414 |
| | | | | | Differ-entPay-ment 136416 | | 0..1 136418 | DifferentPayment 136420 |
| | | | | | | Posi-tionID 136422 | 0..1 136424 | PositionID 136426 |
| | | | | | | Valua-tionBasi-sAmount 136428 | 0..1 136430 | Amount 136432 |
| Log 136434 | | Log 136436 | | | | | 0..1 136438 | Log 136440 |

FIG. 137-1

| Package | Level 1 | Level 2 | Level 3 | Level 4 | Level 5 | | Cardinality | Datatype Name |
|---|---|---|---|---|---|---|---|---|
| EmployeeTime-SheetChangeCheckQueryMessage 137000 | Employ-eeTime-SheetChangeCheckQue-ryMessage 137002 | | | | | | | EmployeeTime-SheetChangeCheckQueryMessage 137004 |
| MessageHeader 137006 | | Message-Header 137008 | | | | | 1 137010 | BusinessDocu-mentMessage-Header 137012 |
| EmployeeTime-Sheet 137014 | | Employ-eeTime-Sheet 137016 | | | | | 1 137018 | EmployeeTime-Sheet 137020 |
| EmployeeTime 137022 | | | Employ-eeTime 137024 | | | | 1..n 137026 | EmployeeTime 137028 |
| | | | | Action-Code 137030 | | | 1 137032 | ActionCode 137034 |

FIG. 137-2

| Package | Level 1 | Level 2 | Level 3 | Level 4 | Level 5 | | Cardinality | Datatype Name |
|---|---|---|---|---|---|---|---|---|
| | | | | ID 137036 | | | 0..1 137038 | BusinessTransac-tionDocumentID 137040 |
| | | | | Exter-nalKey 137042 | | | 0..1 137044 | ExternalKey 137046 |
| | | | | | ID 137048 | | 0..1 137050 | BusinessTransac-tionDocumentID 137052 |
| | | | | | Origin-TypeCode 137054 | | 0..1 137056 | Employ-eeTimeOrigin-TypeCode 137058 |
| | | | | WorkA-greemen-tID 137060 | | | 1 137062 | WorkAgreemen-tID 137064 |
| | | | | Note 137066 | | | 0..1 137068 | Note 137070 |

FIG. 137-3

| Package | Level 1 | Level 2 | Level 3 | Level 4 | Level 5 | | Cardinality | Datatype Name |
|---|---|---|---|---|---|---|---|---|
| Item 137072 | | | | Item 137074 | | | 1 137076 | Employ-eeTimeItem 137078 |
| | | | | | ID 137080 | | 0..1 137082 | Employ-eeTimeItemID 137084 |
| | | | | | Category-Code 137086 | | 1 137088 | Employ-eeTimeItemCate-goryCode 137090 |
| | | | | | TypeCode 137092 | | 0..1 137094 | Employ-eeTimeItem-TypeCode 137096 |
| | | | | | Employ-eeTime-Validity 137098 | | 1 137100 | EmployeeTime-Validity 137102 |
| | | | | | FullWork-ingDayIn-dicator 137104 | | 0..1 137106 | FullWorkingDay-Indicator 137108 |

FIG. 137-4

| Package | Level 1 | Level 2 | Level 3 | Level 4 | Level 5 | | Cardinality | Datatype Name |
|---|---|---|---|---|---|---|---|---|
| | | | | | Quantity 137110 | | 0..1 137112 | Quantity 137114 |
| | | | | | Amount 137116 | | 0..1 137118 | Amount 137120 |
| | | | | | Description 137122 | | 0..1 137124 | Employ-eeTimeItemDe-scription 137126 |
| | | | | | Task-TypeCode 137128 | | 0..1 137130 | Employ-eeTimeItem-TaskTypeCode 137132 |
| | | | | | Task-LevelCode 137134 | | 0..1 137136 | Employ-eeTimeItemTask-LevelCode 137138 |
| | | | | | TaskCom-ponent-Code 137140 | | 0..1 137142 | Employ-eeTimeItem-TaskCompo-nentCode 137144 |

FIG. 137-5

| Package | Level 1 | Level 2 | Level 3 | Level 4 | Level 5 | | Cardinality | Datatype Name |
|---|---|---|---|---|---|---|---|---|
| | | | | | Valuation-Terms 137146 | | 0..1 137148 | ValuationTerms 137150 |
| | | | | | | Employ-eeTime-Valuation-Terms 137152 | 0..1 137154 | EmployeeTime-ValuationTerms 137156 |
| | | | | | ActivityAl-loca-tionAnd-CostAs-signment 137158 | | 0..1 137160 | ActivityAlloca-tionAndCostAs-signment 137162 |
| | | | | | | Sending-CostCen-treID 137164 | 0..1 137166 | CostCentreID 137168 |
| | | | | | | Resource-ClassID 137170 | 0..1 137172 | ResourceClassID 137174 |

FIG. 137-6

| Package | Level 1 | Level 2 | Level 3 | Level 4 | Level 5 | | Cardinality | Datatype Name |
|---|---|---|---|---|---|---|---|---|
| | | | | | | Sending-CostingActivityID 137176 | 0..1 137178 | CostingActivityID 137180 |
| | | | | | | Sending-FundID 137182 | 0..1 137184 | FundsManagementFundID 137186 |
| | | | | | | Sending-FundsManagementFunctionalAreaID 137188 | 0..1 137190 | FundsManagementFunctionalAreaID 137192 |
| | | | | | | Sending-GrantID 137194 | 0..1 137196 | GrantID 137198 |

FIG. 137-7

| Package | Level 1 | Level 2 | Level 3 | Level 4 | Level 5 | | Cardinality | Datatype Name |
|---|---|---|---|---|---|---|---|---|
| | | | | | | WorkBreakDown-Structu-reElemen-tID 137200 | 0..1 137202 | ProjectElementID 137204 |
| | | | | | | Receiving-SalesOrde-rID 137206 | 0..1 137208 | BusinessTransac-tionDocumentID 137210 |
| | | | | | | Receiving-SalesOrde-rItemID 137212 | 0..1 137214 | BusinessTransac-tionDocumen-tItemID 137216 |
| | | | | | | Receiv-ingCostin-gActivityID 137218 | 0..1 137220 | CostingActivityID 137222 |
| | | | | | | Receiving-FundID 137224 | 0..1 137226 | FundsManage-mentFundID 137228 |

FIG. 137-8

| Package | Level 1 | Level 2 | Level 3 | Level 4 | Level 5 | | Cardinality | Datatype Name |
|---|---|---|---|---|---|---|---|---|
| | | | | | | ReceivingFundsManagementFunctionalAreaID 137230 | 0..1 137232 | FundsManagementFunctionalAreaID 137234 |
| | | | | | | ReceivingGrantID 137236 | 0..1 137238 | GrantID 137240 |
| | | | | | | ControllingKeyFigureCode 137242 | 0..1 137244 | ControllingKeyFigureCode 137246 |
| | | | | | | Price 137248 | 0..1 137250 | Price 137252 |
| | | | | | ServiceProvisionAndResourceConsumption 137254 | | 0..1 137256 | ServiceProvisionAndResourceConsumption 137258 |

FIG. 137-9

| Package | Level 1 | Level 2 | Level 3 | Level 4 | Level 5 | | Cardinality | Datatype Name |
|---|---|---|---|---|---|---|---|---|
| | | | | | | ReceivingCostCentreID 137260 | 0..1 137262 | CostCentreID 137264 |
| | | | | | LogisticConfirmation 137266 | | 0..1 137268 | LogisticConfirmation 137270 |
| | | | | | | ResourceID 137272 | 0..1 137274 | ResourceID 137276 |
| | | | | | | LogisticsAreaID 137278 | 0..1 137280 | LogisticsAreaID 137282 |
| | | | | | | OrderID 137284 | 0..1 137286 | BusinessTransactionDocumentID 137288 |
| | | | | | | OrderOperationID 137290 | 0..1 137292 | OperationID 137294 |

FIG. 137-10

| Package | Level 1 | Level 2 | Level 3 | Level 4 | Level 5 | | Cardinality | Datatype Name |
|---|---|---|---|---|---|---|---|---|
| | | | | | | OrderOperationActivityID 137296 | 0..1 137298 | OperationActivityID 137300 |
| | | | | | | NetworkID 137302 | 0..1 137304 | BusinessTransactionDocumentID 137306 |
| | | | | | | NetworkOperationID 137308 | 0..1 137310 | OperationID 137312 |
| | | | | | | NetworkOperationActivityID 137314 | 0..1 137316 | OperationActivityID 137318 |
| | | | | | | WarrantyGoodwillCode 137320 | 0..1 137322 | WarrantyGoodwillCode 137324 |

FIG. 137-11

| Package | Level 1 | Level 2 | Level 3 | Level 4 | Level 5 | | Cardinality | Datatype Name |
|---|---|---|---|---|---|---|---|---|
| | | | | | | CapacityCategoryCode 137326 | 0..1 137328 | CapacityCategoryCode 137330 |
| | | | | | | CapacitySplitID 137332 | 0..1 137334 | CapacitySplitID 137336 |
| | | | | | | WorkForecastQuantity 137338 | 0..1 137340 | WorkForecastQuantity 137342 |
| | | | | | | ForecastEndDate 137344 | 0..1 137346 | Date 137348 |
| | | | | | | ConfirmationStatusCode 137350 | 0..1 137352 | ConfirmationStatusCode 137354 |

FIG. 137-12

| Package | Level 1 | Level 2 | Level 3 | Level 4 | Level 5 | | Cardinality | Datatype Name |
|---|---|---|---|---|---|---|---|---|
| | | | | | ExternalServiceAcknowledgement 137356 | | 0..1 137358 | ExternalServiceAcknowledgement 137360 |
| | | | | | | PurchaseOrderID 137362 | 0..1 137364 | BusinessTransactionDocumentID 137366 |
| | | | | | | PurchaseOrderItemID 137368 | 0..1 137370 | BusinessTransactionDocumentItemID 137372 |
| | | | | | | ServiceProductID 137374 | 0..1 137376 | ProductID 137378 |
| | | | | | DifferentPayment 137380 | | 0..1 137382 | DifferentPayment 137384 |
| | | | | | | PositionID 137386 | 0..1 137388 | PositionID 137390 |

FIG. 137-13

| Package | Level 1 | Level 2 | Level 3 | Level 4 | Level 5 | | Cardinality | Datatype Name |
|---|---|---|---|---|---|---|---|---|
| | | | | | | Valuation-Basi-sAmount 137392 | 0..1 137394 | Amount 137396 |

FIG. 138-1

| Package | Level 1 | Level 2 | Level 3 | Level 4 | | Level 5 | Cardinality | Datatype Name |
|---|---|---|---|---|---|---|---|---|
| EmployeeTimeSheetChangeCheckResponseMessage 138000 | EmployeeTimeSheetChangeCheckResponseMessage 138002 | | | | | | | EmployeeTimeSheetChangeCheckResponseMessage 138004 |
| MessageHeader 138006 | | MessageHeader 138008 | | | | | 1 138010 | BusinessDocumentMessageHeader 138012 |
| EmployeeTimeSheet 138014 | | EmployeeTimeSheet 138016 | | | | | 1 138018 | EmployeeTimeSheet 138020 |
| EmployeeTime 138022 | | | EmployeeTime 138024 | | | | 1..n 138026 | EmployeeTime 138028 |

FIG. 138-2

| Package | Level 1 | Level 2 | Level 3 | Level 4 | | Level 5 | Cardinality | Datatype Name |
|---|---|---|---|---|---|---|---|---|
| | | | | ID 138030 | | | 0..1 138032 | BusinessTransactionDocumentID 138034 |
| | | | | ExternalKey 138036 | | | 0..1 138038 | ExternalKey 138040 |
| | | | | | ID 138042 | | 0..1 138044 | BusinessTransactionDocumentID 138046 |
| | | | | | OriginTypeCode 138048 | | 0..1 138050 | EmployeeTimeOriginTypeCode 138052 |
| | | | | WorkAgreementID 138054 | | | 1 138056 | WorkAgreementID 138058 |
| | | | | Note 138060 | | | 0..1 138062 | Note 138064 |

FIG. 138-3

| Package | Level 1 | Level 2 | Level 3 | Level 4 | | Level 5 | Cardinality | Datatype Name |
|---|---|---|---|---|---|---|---|---|
| | | | | Status 138066 | | | 1 138068 | Employ-eeTimeStatus 138070 |
| | | | | | LifeCy-cleStatus-Code 138072 | | 1 138074 | Employ-eeTimeLifeCycleS-tatusCode 138076 |
| | | | | | Approval-Status-Code 138078 | | 1 138080 | ApprovalStatus-Code 138082 |
| | | | | Approver-UserAc-countID 138084 | | | 0..1 138086 | UserAccountID 138088 |
| | | | | Approval-Date 138090 | | | 0..1 138092 | Date 138094 |

FIG. 138-4

| Package | Level 1 | Level 2 | Level 3 | Level 4 | | Level 5 | Cardinality | Datatype Name |
|---|---|---|---|---|---|---|---|---|
| | | | | RejectionReasonCode 138096 | | | 0..1 138098 | EmployeeTimeRejectionReasonCode 138100 |
| Item 138102 | | | | Item 138104 | | | 1 138106 | EmployeeTimeItem 138108 |
| | | | | | ID 138110 | | 0..1 138112 | EmployeeTimeItemID 138114 |
| | | | | | SystemAdministrativeData 138116 | | 0..1 138118 | SystemAdministrativeData 138120 |
| | | | | | CategoryCode 138122 | | 1 138124 | EmployeeTimeItemCategoryCode 138126 |

FIG. 138-5

| Package | Level 1 | Level 2 | Level 3 | Level 4 | | Level 5 | Cardinality | Datatype Name |
|---|---|---|---|---|---|---|---|---|
| | | | | | TypeCode 138128 | | 0..1 138130 | EmployeeTimeItemTypeCode 138132 |
| | | | | | EmployeeTimeValidity 138134 | | 0..1 138136 | EmployeeTimeValidity 138138 |
| | | | | | FullWorkingDayIndicator 138140 | | 0..1 138142 | FullWorkingDayIndicator 138144 |
| | | | | | Quantity 138146 | | 0..1 138148 | Quantity 138150 |
| | | | | | Amount 138152 | | 0..1 138154 | Amount 138156 |
| | | | | | Description 138158 | | 0..1 138160 | EmployeeTimeItemDescription 138162 |

FIG. 138-6

| Package | Level 1 | Level 2 | Level 3 | Level 4 | | Level 5 | Cardinality | Datatype Name |
|---|---|---|---|---|---|---|---|---|
| | | | | | Task-TypeCode 138164 | | 0..1 138166 | Employ-eeTimeItemTask-TypeCode 138168 |
| | | | | | Task-LevelCode 138170 | | 0..1 138172 | Employ-eeTimeItemTask-LevelCode 138174 |
| | | | | | TaskCom-ponent-Code 138176 | | 0..1 138178 | Employ-eeTimeItemTask-ComponentCode 138180 |
| | | | | | Valuation-Terms 138182 | | 0..1 138184 | ValuationTerms 138186 |
| | | | | | | Employ-eeTime-Valuation-Terms 138188 | 0..1 138190 | EmployeeTime-ValuationTerms 138192 |

FIG. 138-7

| Package | Level 1 | Level 2 | Level 3 | Level 4 | | Level 5 | Cardinality | Datatype Name |
|---|---|---|---|---|---|---|---|---|
| | | | | | ActivityAllocationAndCostAssignment 138194 | | 0..1 138196 | ActivityAllocationAndCostAssignment 138198 |
| | | | | | | SendingCostCentreID 138200 | 0..1 138202 | CostCentreID 138204 |
| | | | | | | ResourceClassID 138206 | 0..1 138208 | ResourceClassID 138210 |
| | | | | | | SendingCostingActivityID 138212 | 0..1 138214 | CostingActivityID 138216 |
| | | | | | | SendingFundID 138218 | 0..1 138220 | FundsManagementFundID 138222 |

FIG. 138-8

| Package | Level 1 | Level 2 | Level 3 | Level 4 | | Level 5 | Cardinality | Datatype Name |
|---|---|---|---|---|---|---|---|---|
| | | | | | | Sending-Funds-Manage-mentFunc-tionalAreal D 138224 | 0..1 138226 | FundsManage-mentFunc-tionalAreaID 138228 |
| | | | | | | Sending-GrantID 138230 | 0..1 138232 | GrantID 138234 |
| | | | | | | Work-Break-Down-Structu-reElemen-tID 138236 | 0..1 138238 | ProjectElementID 138240 |
| | | | | | | Receiv-ingSale-sOrderID 138242 | 0..1 138244 | BusinessTransac-tionDocumentID 138246 |

FIG. 138-9

| Package | Level 1 | Level 2 | Level 3 | Level 4 | | Level 5 | Cardinality | Datatype Name |
|---|---|---|---|---|---|---|---|---|
| | | | | | | ReceivingSalesOrderItemID 138248 | 0..1 138250 | BusinessTransactionDocumentItemID 138252 |
| | | | | | | ReceivingCostingActivityID 138254 | 0..1 138256 | CostingActivityID 138258 |
| | | | | | | ReceivingFundID 138260 | 0..1 138262 | FundsManagementFundID 138264 |
| | | | | | | ReceivingFundsManagementFunctionalAreaID 138266 | 0..1 138268 | FundsManagementFunctionalAreaID 138270 |

FIG. 138-10

| Package | Level 1 | Level 2 | Level 3 | Level 4 | | Level 5 | Cardinality | Datatype Name |
|---|---|---|---|---|---|---|---|---|
| | | | | | | Receiv-ingGrantID 138272 | 0..1 138274 | GrantID 138276 |
| | | | | | | Controll-ingKey-Figure-Code 138278 | 0..1 138280 | ControllingKeyFig-ureCode 138282 |
| | | | | | | Price 138284 | 0..1 138286 | Price 138288 |
| | | | | | Service-Provi-sionAn-dResour-ceCon-sumption 138290 | | 0..1 138292 | ServiceProvi-sionAndResour-ceConsumption 138294 |
| | | | | | | Receiv-ingCost-CentreID 138296 | 0..1 138298 | CostCentreID 138300 |

FIG. 138-11

| Package | Level 1 | Level 2 | Level 3 | Level 4 | | Level 5 | Cardinality | Datatype Name |
|---|---|---|---|---|---|---|---|---|
| | | | | | LogisticConfirmation 138302 | | 0..1 138304 | LogisticConfirmation 138306 |
| | | | | | | ResourceID 138308 | 0..1 138310 | ResourceID 138312 |
| | | | | | | LogisticsAreaID 138314 | 0..1 138316 | LogisticsAreaID 138318 |
| | | | | | | OrderID 138320 | 0..1 138322 | BusinessTransactionDocumentID 138324 |
| | | | | | | OrderOperationID 138326 | 0..1 138328 | OperationID 138330 |
| | | | | | | OrderOperationActivityID 138332 | 0..1 138334 | OperationActivityID 138336 |

FIG. 138-12

| Package | Level 1 | Level 2 | Level 3 | Level 4 | | Level 5 | Cardinality | Datatype Name |
|---|---|---|---|---|---|---|---|---|
| | | | | | | NetworkID 138338 | 0..1 138340 | BusinessTransactionDocumentID 138342 |
| | | | | | | NetworkOperationID 138344 | 0..1 138346 | OperationID 138348 |
| | | | | | | NetworkOperationActivityID 138350 | 0..1 138352 | OperationActivityID 138354 |
| | | | | | | Warranty-Goodwill-Code 138356 | 0..1 138358 | WarrantyGoodwillCode 138360 |
| | | | | | | Capacity-Category-Code 138362 | 0..1 138364 | CapacityCategoryCode 138366 |

FIG. 138-13

| Package | Level 1 | Level 2 | Level 3 | Level 4 | | Level 5 | Cardinality | Datatype Name |
|---|---|---|---|---|---|---|---|---|
| | | | | | | Capaci-tySplitID 138368 | 0..1 138370 | CapacitySplitID 138372 |
| | | | | | | Work-ForecastQuantity 138374 | 0..1 138376 | WorkFore-castQuantity 138378 |
| | | | | | | Forecas-tEndDate 138380 | 0..1 138382 | Date 138384 |
| | | | | | | Confirma-tion-StatusCode 138386 | 0..1 138388 | Confirmation-StatusCode 138390 |
| | | | | | Exter-nalSer-viceAc-knowl-edgement 138392 | | 0..1 138394 | ExternalSer-viceAcknowl-edgement 138396 |

FIG. 138-14

| Package | Level 1 | Level 2 | Level 3 | Level 4 | | Level 5 | Cardinality | Datatype Name |
|---|---|---|---|---|---|---|---|---|
| | | | | | | PurchaseOrderID 138398 | 0..1 138400 | BusinessTransactionDocumentID 138402 |
| | | | | | | PurchaseOrderItemID 138404 | 0..1 138406 | BusinessTransactionDocumentItemID 138408 |
| | | | | | | ServiceProductID 138410 | 0..1 138412 | ProductID 138414 |
| | | | | | DifferentPayment 138416 | | 0..1 138418 | DifferentPayment 138420 |
| | | | | | | PositionID 138422 | 0..1 138424 | PositionID 138426 |
| | | | | | | ValuationBasisAmount 138428 | 0..1 138430 | Amount 138432 |

FIG. 138-15

| Package | Level 1 | Level 2 | Level 3 | Level 4 | | Level 5 | Cardinality | Datatype Name |
|---|---|---|---|---|---|---|---|---|
| Log 138434 | | Log 138436 | | | | | 0..1 138438 | Log 138440 |

FIG. 139-1

| Package | level1 | level2 | level3 | level4 | | level5 | Cardinality | Datatype Name |
|---|---|---|---|---|---|---|---|---|
| EmployeeTime-SheetChangeCon-firmationMessage 139000 | Employ-eeTime-SheetChan geConfir-mation-Message 139002 | | | | | | | EmployeeTime-SheetChange-Confirmation-Message 139004 |
| MessageHeader 139006 | | Message-Header 139008 | | | | | 1 139010 | BusinessDocu-mentMessage-Header 139012 |
| EmployeeTime-Sheet 139014 | | Employ-eeTime-Sheet 139016 | | | | | 1 139018 | EmployeeTime-Sheet 139020 |
| EmployeeTime 139022 | | | Employ-eeTime 139024 | | | | 1..n 139026 | EmployeeTime 139028 |

FIG. 139-2

| Package | level1 | level2 | level3 | level4 | | level5 | Cardinality | Datatype Name |
|---|---|---|---|---|---|---|---|---|
| | | | | ID 139030 | | | 1 139032 | BusinessTrans-actionDocumen-tID 139034 |
| | | | | Exter-nalKey 139036 | | | 0..1 139038 | ExternalKey 139040 |
| | | | | | ID 139042 | | 0..1 139044 | BusinessTrans-actionDocumen-tID 139046 |
| | | | | | Origin-TypeCode 139048 | | 0..1 139050 | Employ-eeTimeOrigin-TypeCode 139052 |
| | | | | WorkA-greementID 139054 | | | 1 139056 | WorkAgreemen-tID 139058 |
| | | | | Note 139060 | | | 0..1 139062 | Note 139064 |

FIG. 139-3

| Package | level1 | level2 | level3 | level4 | | level5 | Cardinality | Datatype Name |
|---|---|---|---|---|---|---|---|---|
| | | | | Status 139066 | | | 1 139068 | Employ-eeTimeStatus 139070 |
| | | | | | LifeCycleS-tatusCode 139072 | | 1 139074 | Employ-eeTimeLifeCy-cleStatusCode 139076 |
| | | | | | Approval-StatusCode 139078 | | 1 139080 | ApprovalStatus-Code 139082 |
| | | | | Approver-UserAc-countID 139084 | | | 0..1 139086 | UserAccountID 139088 |
| | | | | Approval-Date 139090 | | | 0..1 139092 | Date 139094 |

FIG. 139-4

| Package | level1 | level2 | level3 | level4 | | level5 | Cardinality | Datatype Name |
|---|---|---|---|---|---|---|---|---|
| | | | | Rejection-Reason-Code 139096 | | | 0..1 139098 | Employ-eeTimeRejec-tionReasonCode 139100 |
| Item 139102 | | | | Item 139104 | | | 1 139106 | Employ-eeTimeItem 139108 |
| | | | | | ID 139110 | | 1 139112 | Employ-eeTimeItemID 139114 |
| | | | | | Syste-mAdminis-trativeData 139116 | | 1 139118 | SystemAdminis-trativeData 139120 |
| | | | | | Category-Code 139122 | | 1 139124 | Employ-eeTimeItem-CategoryCode 139126 |

FIG. 139-5

| Package | level1 | level2 | level3 | level4 | | level5 | Cardinality | Datatype Name |
|---|---|---|---|---|---|---|---|---|
| | | | | | TypeCode 139128 | | 0..1 139130 | Employ-eeTimeItem-TypeCode 139132 |
| | | | | | Employ-eeTime-Validity 139134 | | 0..1 139136 | EmployeeTime-Validity 139138 |
| | | | | | FullWork-ingDayIndi-cator 139140 | | 0..1 139142 | FullWorkingDay-Indicator 139144 |
| | | | | | Quantity 139146 | | 0..1 139148 | Quantity 139150 |
| | | | | | Amount 139152 | | 0..1 139154 | Amount 139156 |
| | | | | | Description 139158 | | 0..1 139160 | Employ-eeTimeItemDe-scription 139162 |

FIG. 139-6

| Package | level1 | level2 | level3 | level4 | | level5 | Cardinality | Datatype Name |
|---|---|---|---|---|---|---|---|---|
| | | | | | TaskType-Code 139164 | | 0..1 139166 | Employ-eeTimeItem-TaskTypeCode 139168 |
| | | | | | TaskLevel-Code 139170 | | 0..1 139172 | Employ-eeTimeItem-TaskLevelCode 139174 |
| | | | | | TaskCom-ponent-Code 139176 | | 0..1 139178 | Employ-eeTimeItem-TaskCompo-nentCode 139180 |
| | | | | | Valuation-Terms 139182 | | 0..1 139184 | ValuationTerms 139186 |
| | | | | | | Employ-eeTime-Valuation-Terms 139188 | 0..1 139190 | EmployeeTime-ValuationTerms 139192 |

FIG. 139-7

| Package | level1 | level2 | level3 | level4 | | level5 | Cardinality | Datatype Name |
|---|---|---|---|---|---|---|---|---|
| | | | | | ActivityAllocationAndCostAssignment 139194 | | 0..1 139196 | ActivityAllocationAndCostAssignment 139198 |
| | | | | | | SendingCostCentreID 139200 | 0..1 139202 | CostCentreID 139204 |
| | | | | | | ResourceClassID 139206 | 0..1 139208 | ResourceClassID 139210 |
| | | | | | | SendingCostingActivityID 139212 | 0..1 139214 | CostingActivityID 139216 |
| | | | | | | SendingFundID 139218 | 0..1 139220 | FundsManagementFundID 139222 |

FIG. 139-8

| Package | level1 | level2 | level3 | level4 | | level5 | Cardinality | Datatype Name |
|---|---|---|---|---|---|---|---|---|
| | | | | | | Sending-FundsMan-agement-Func-tionalArealD 139224 | 0..1 139226 | FundsManage-mentFunc-tionalAreaID 139228 |
| | | | | | | Sending-GrantID 139230 | 0..1 139232 | GrantID 139234 |
| | | | | | | WorkBreak-DownStruc-tureEle-mentID 139236 | 0..1 139238 | ProjectElemen-tID 139240 |
| | | | | | | Receiving-SalesOrde-rID 139242 | 0..1 139244 | BusinessTrans-actionDocumen-tID 139246 |

FIG. 139-9

| Package | level1 | level2 | level3 | level4 | | level5 | Cardinality | Datatype Name |
|---|---|---|---|---|---|---|---|---|
| | | | | | | Receiving-SalesOrderItemID 139248 | 0..1 139250 | BusinessTransactionDocumentItemID 139252 |
| | | | | | | Receiving-CostingActivityID 139254 | 0..1 139256 | CostingActivityID 139258 |
| | | | | | | Receiving-FundID 139260 | 0..1 139262 | FundsManagementFundID 139264 |
| | | | | | | Receiving-FundsManagement-FunctionalAreaID 139266 | 0..1 139268 | FundsManagementFunctionalAreaID 139270 |
| | | | | | | Receiving-GrantID 139272 | 0..1 139274 | GrantID 139276 |

FIG. 139-10

| Package | level1 | level2 | level3 | level4 | | level5 | Cardinality | Datatype Name |
|---|---|---|---|---|---|---|---|---|
| | | | | | | Controll-ingKeyFig-ureCode 139278 | 0..1 139280 | ControllingKey-FigureCode 139282 |
| | | | | | | Price 139284 | 0..1 139286 | Price 139288 |
| | | | | | Service-ProvisionAndResour-ceCon-sumption 139290 | | 0..1 139292 | ServiceProvi-sionAndResour-ceConsumption 139294 |
| | | | | | | Receiving-CostCen-treID 139296 | 0..1 139298 | CostCentreID 139300 |
| | | | | | Logistic-Confirma-tion 139302 | | 0..1 139304 | LogisticConfir-mation 139306 |

FIG. 139-11

| Package | level1 | level2 | level3 | level4 | | level5 | Cardinality | Datatype Name |
|---|---|---|---|---|---|---|---|---|
| | | | | | | ResourceID 139308 | 0..1 139310 | ResourceID 139312 |
| | | | | | | Logistic-sAreaID 139314 | 0..1 139316 | LogisticsAreaID 139318 |
| | | | | | | OrderID 139320 | 0..1 139322 | BusinessTrans-actionDocumen-tID 139324 |
| | | | | | | OrderOp-erationID 139326 | 0..1 139328 | OperationID 139330 |
| | | | | | | OrderOp-erationAc-tivityID 139332 | 0..1 139334 | OperationActiv-ityID 139336 |
| | | | | | | NetworkID 139338 | 0..1 139340 | BusinessTrans-actionDocumen-tID 139342 |

FIG. 139-12

| Package | level1 | level2 | level3 | level4 | | level5 | Cardinality | Datatype Name |
|---|---|---|---|---|---|---|---|---|
| | | | | | | Net-workOpera-tionID 139344 | 0..1 139346 | OperationID 139348 |
| | | | | | | Net-workOpera-tionActiv-ityID 139350 | 0..1 139352 | OperationActiv-ityID 139354 |
| | | | | | | Warranty-Goodwill-Code 139356 | 0..1 139358 | WarrantyGood-willCode 139360 |
| | | | | | | Capacity-Category-Code 139362 | 0..1 139364 | CapacityCate-goryCode 139366 |
| | | | | | | CapacityS-plitID 139368 | 0..1 139370 | CapacitySplitID 139372 |

FIG. 139-13

| Package | level1 | level2 | level3 | level4 | | level5 | Cardinality | Datatype Name |
|---|---|---|---|---|---|---|---|---|
| | | | | | | WorkForecastQuantity 139374 | 0..1 139376 | WorkForecastQuantity 139378 |
| | | | | | | ForecastEndDate 139380 | 0..1 139382 | Date 139384 |
| | | | | | | ConfirmationStatusCode 139386 | 0..1 139388 | ConfirmationStatusCode 139390 |
| | | | | | ExternalServiceAcknowledgement 139392 | | 0..1 139394 | ExternalServiceAcknowledgement 139396 |
| | | | | | | PurchaseOrderID 139398 | 0..1 139400 | BusinessTransactionDocumentID 139402 |

FIG. 139-14

| Package | level1 | level2 | level3 | level4 | | level5 | Cardinality | Datatype Name |
|---|---|---|---|---|---|---|---|---|
| | | | | | | Pur-chaseOrde-rItemID 139404 | 0..1 139406 | BusinessTrans-actionDocumen-tItemID 139408 |
| | | | | | | Service-ProductID 139410 | 0..1 139412 | ProductID 139414 |
| | | | | | Different-Payment 139416 | | 0..1 139418 | DifferentPay-ment 139420 |
| | | | | | | PositionID 139422 | 0..1 139424 | PositionID 139426 |
| | | | | | | Valuation-Basi-sAmount 139428 | 0..1 139430 | Amount 139432 |
| Log 139434 | | Log 139436 | | | | | 0..1 139438 | Log 139440 |

FIG. 140-1

| Package | level1 | level2 | level3 | level4 | level5 | | Cardinality | Datatype Name |
|---|---|---|---|---|---|---|---|---|
| EmployeeTime-SheetChangeRequestMessage 140000 | EmployeeTime-SheetChangeRequest-Message 140002 | | | | | | | EmployeeTime-SheetChangeRequestMessage 140004 |
| MessageHeader 140006 | | MessageHeader 140008 | | | | | 1 140010 | BusinessDocumentMessageHeader 140012 |
| EmployeeTime-Sheet 140014 | | EmployeeTime-Sheet 140016 | | | | | 1 140018 | EmployeeTime-Sheet 140020 |
| EmployeeTime 140022 | | | EmployeeTime 140024 | | | | 1..n 140026 | EmployeeTime 140028 |
| | | | | ActionCode 140030 | | | 1 140032 | ActionCode 140034 |

FIG. 140-2

| Package | level1 | level2 | level3 | level4 | level5 | | Cardinality | Datatype Name |
|---|---|---|---|---|---|---|---|---|
| | | | | ID 140036 | | | 0..1 140038 | BusinessTransactionDocumentID 140040 |
| | | | | ExternalKey 140042 | | | 0..1 140044 | ExternalKey 140046 |
| | | | | | ID 140048 | | 0..1 140050 | BusinessTransactionDocumentID 140052 |
| | | | | | OriginTypeCode 140054 | | 0..1 140056 | EmployeeTimeOriginTypeCode 140058 |
| | | | | WorkAgreementID 140060 | | | 1 140062 | WorkAgreementID 140064 |
| | | | | Note 140066 | | | 0..1 140068 | Note 140070 |

FIG. 140-3

| Package | level1 | level2 | level3 | level4 | level5 | | Cardinality | Datatype Name |
|---|---|---|---|---|---|---|---|---|
| Item 140072 | | | | Item 140074 | | | 1 140076 | Employ-eeTimeItem 140078 |
| | | | | | ID 140080 | | 0..1 140082 | Employ-eeTimeItemID 140084 |
| | | | | | Category-Code 140086 | | 1 140088 | Employ-eeTimeItemCate-goryCode 140090 |
| | | | | | TypeCode 140092 | | 0..1 140094 | Employ-eeTimeItem-TypeCode 140096 |
| | | | | | Employ-eeTime-Validity 140098 | | 1 140100 | EmployeeTime-Validity 140102 |

FIG. 140-4

| Package | level1 | level2 | level3 | level4 | level5 | | Cardinality | Datatype Name |
|---|---|---|---|---|---|---|---|---|
| | | | | | FullWorkingDayIndicator 140104 | | 0..1 140106 | FullWorkingDayIndicator 140108 |
| | | | | | Quantity 140110 | | 0..1 140112 | Quantity 140114 |
| | | | | | Amount 140116 | | 0..1 140118 | Amount 140120 |
| | | | | | Description 140122 | | 0..1 140124 | EmployeeTimeItemDescription 140126 |
| | | | | | TaskTypeCode 140128 | | 0..1 140130 | EmployeeTimeItemTaskTypeCode 140132 |
| | | | | | TaskLevelCode 140134 | | 0..1 140136 | EmployeeTimeItemTaskLevelCode 140138 |

FIG. 140-5

| Package | level1 | level2 | level3 | level4 | level5 | | Cardinality | Datatype Name |
|---|---|---|---|---|---|---|---|---|
| | | | | | TaskComponentCode 140140 | | 0..1 140142 | EmployeeTimeItemTaskComponentCode 140144 |
| | | | | | ValuationTerms 140146 | | 0..1 140148 | ValuationTerms 140150 |
| | | | | | | EmployeeTimeValuationTerms 140152 | 0..1 140154 | EmployeeTimeValuationTerms 140156 |
| | | | | | ActivityAllocationAndCostAssignment 140158 | | 0..1 140160 | ActivityAllocationAndCostAssignment 140162 |

FIG. 140-6

| Package | level1 | level2 | level3 | level4 | level5 | | Cardinality | Datatype Name |
|---|---|---|---|---|---|---|---|---|
| | | | | | | Sending-CostCentreID 140164 | 0..1 140166 | CostCentreID 140168 |
| | | | | | | ResourceClassID 140170 | 0..1 140172 | ResourceClassID 140174 |
| | | | | | | Sending-CostingActivityID 140176 | 0..1 140178 | CostingActivityID 140180 |
| | | | | | | Sending-FundID 140182 | 0..1 140184 | FundsManagementFundID 140186 |
| | | | | | | Sending-FundsManagement-FunctionalAreaID 140188 | 0..1 140190 | FundsManagementFunctionalAreaID 140192 |

FIG. 140-7

| Package | level1 | level2 | level3 | level4 | level5 | | Cardinality | Datatype Name |
|---|---|---|---|---|---|---|---|---|
| | | | | | | Sending-GrantID 140194 | 0..1 140196 | GrantID 140198 |
| | | | | | | Work-BreakDown Struc-tureElemen-tID 140200 | 0..1 140202 | ProjectElementID 140204 |
| | | | | | | Receiving-SalesOrde-rID 140206 | 0..1 140208 | BusinessTransac-tionDocumentID 140210 |
| | | | | | | Receiving-SalesOrde-rItemID 140212 | 0..1 140214 | BusinessTransac-tionDocumen-tItemID 140216 |
| | | | | | | Receiving-CostingAc-tivityID 140218 | 0..1 140220 | CostingActivityID 140222 |

FIG. 140-8

| Package | level1 | level2 | level3 | level4 | level5 | | Cardinality | Datatype Name |
|---|---|---|---|---|---|---|---|---|
| | | | | | | Receiving-FundID 140224 | 0..1 140226 | FundsManagementFundID 140228 |
| | | | | | | Receiving-FundsManagement-FunctionalAreaID 140230 | 0..1 140232 | FundsManagementFunctionalAreaID 140234 |
| | | | | | | Receiving-GrantID 140236 | 0..1 140238 | GrantID 140240 |
| | | | | | | Controlling-KeyFigure-Code 140242 | 0..1 140244 | ControllingKeyFigureCode 140246 |
| | | | | | | Price 140248 | 0..1 140250 | Price 140252 |

FIG. 140-9

| Package | level1 | level2 | level3 | level4 | level5 | | Cardinality | Datatype Name |
|---|---|---|---|---|---|---|---|---|
| | | | | | ServiceProvisionAndResourceConsumption 140254 | | 0..1 140256 | ServiceProvisionAndResourceConsumption 140258 |
| | | | | | | ReceivingCostCentreID 140260 | 0..1 140262 | CostCentreID 140264 |
| | | | | | LogisticConfirmation 140266 | | 0..1 140268 | LogisticConfirmation 140270 |
| | | | | | | ResourceID 140272 | 0..1 140274 | ResourceID 140276 |
| | | | | | | LogisticsAreaID 140278 | 0..1 140280 | LogisticsAreaID 140282 |

FIG. 140-10

| Package | level1 | level2 | level3 | level4 | level5 | | Cardinality | Datatype Name |
|---|---|---|---|---|---|---|---|---|
| | | | | | | OrderID 140284 | 0..1 140286 | BusinessTransactionDocumentID 140288 |
| | | | | | | OrderOperationID 140290 | 0..1 140292 | OperationID 140294 |
| | | | | | | OrderOperationActivityID 140296 | 0..1 140298 | OperationActivityID 140300 |
| | | | | | | NetworkID 140302 | 0..1 140304 | BusinessTransactionDocumentID 140306 |
| | | | | | | NetworkOperationID 140308 | 0..1 140310 | OperationID 140312 |

FIG. 140-11

| Package | level1 | level2 | level3 | level4 | level5 | | Cardinality | Datatype Name |
|---|---|---|---|---|---|---|---|---|
| | | | | | | NetworkOperationActivityID 140314 | 0..1 140316 | OperationActivityID 140318 |
| | | | | | | WarrantyGoodwillCode 140320 | 0..1 140322 | WarrantyGoodwillCode 140324 |
| | | | | | | CapacityCategoryCode 140326 | 0..1 140328 | CapacityCategoryCode 140330 |
| | | | | | | CapacitySplitID 140332 | 0..1 140334 | CapacitySplitID 140336 |
| | | | | | | WorkForecastQuantity 140338 | 0..1 140340 | WorkForecastQuantity 140342 |

FIG. 140-12

| Package | level1 | level2 | level3 | level4 | level5 | | Cardinality | Datatype Name |
|---|---|---|---|---|---|---|---|---|
| | | | | | | Forecas-tEndDate 140344 | 0..1 140346 | Date 140348 |
| | | | | | | Confirma-tionStatus-Code 140350 | 0..1 140352 | Confirmation-StatusCode 140354 |
| | | | | | Exter-nalServiceA cknowl-edgement 140356 | | 0..1 140358 | ExternalSer-viceAcknowl-edgement 140360 |
| | | | | | | Pur-chaseOrde-rID 140362 | 0..1 140364 | BusinessTransac-tionDocumentID 140366 |
| | | | | | | Pur-chaseOrde-rItemID 140368 | 0..1 140370 | BusinessTransac-tionDocumen-tItemID 140372 |

FIG. 140-13

| Package | level1 | level2 | level3 | level4 | level5 | | Cardinality | Datatype Name |
|---|---|---|---|---|---|---|---|---|
| | | | | | | ServiceProductID 140374 | 0..1 140376 | ProductID 140378 |
| | | | | | Different-Payment 140380 | | 0..1 140382 | DifferentPayment 140384 |
| | | | | | | PositionID 140386 | 0..1 140388 | PositionID 140390 |
| | | | | | | Valuation-BasisAmount 140392 | 0..1 140394 | Amount 140396 |

FIG. 141-1

| Package | Level 1 | Level 2 | Level 3 | Level 4 | | Level 5 | Cardinality | Datatype Name |
|---|---|---|---|---|---|---|---|---|
| EmployeeTimeSheetCompleteConfirmationMessage 141000 | EmployeeTimeSheetCompleteConfirmationMessage 141002 | | | | | | | EmployeeTimeSheetCompleteConfirmationMessage 141004 |
| MessageHeader 141006 | | MessageHeader 141008 | | | | | 1 141010 | BusinessDocumentMessageHeader 141012 |
| EmployeeTimeSheet 141014 | | EmployeeTimeSheet 141016 | | | | | 1 141018 | EmployeeTimeSheet 141020 |
| EmployeeTime 141022 | | | EmployeeTime 141024 | | | | 0..n 141026 | EmployeeTime 141028 |
| | | | | ID 141030 | | | 1 141032 | BusinessTransactionDocumentID 141034 |

FIG. 141-2

| Package | Level 1 | Level 2 | Level 3 | Level 4 | | Level 5 | Cardinality | Datatype Name |
|---|---|---|---|---|---|---|---|---|
| | | | | ExternalKey 141036 | | | 0..1 141038 | ExternalKey 141040 |
| | | | | | ID 141042 | | 0..1 141044 | BusinessTransactionDocumentID 141046 |
| | | | | | OriginTypeCode 141048 | | 0..1 141050 | EmployeeTimeOriginTypeCode 141052 |
| | | | | WorkAgreementID 141054 | | | 1 141056 | WorkAgreementID 141058 |
| | | | | Note 141060 | | | 0..1 141062 | Note 141064 |
| | | | | Status 141066 | | | 1 141068 | EmployeeTimeStatus 141070 |

FIG. 141-3

| Package | Level 1 | Level 2 | Level 3 | Level 4 | | Level 5 | Cardinality | Datatype Name |
|---|---|---|---|---|---|---|---|---|
| | | | | | LifeCycleStatus-Code 141072 | | 1 141074 | EmployeeTimeLifeCycleStatusCode 141076 |
| | | | | | Approval Status-Code 141078 | | 1 141080 | ApprovalStatusCode 141082 |
| | | | | Approver-UserAccountID 141084 | | | 0..1 141086 | UserAccountID 141088 |
| | | | | Approval Date 141090 | | | 0..1 141092 | Date 141094 |

FIG. 141-4

| Package | Level 1 | Level 2 | Level 3 | Level 4 | | Level 5 | Cardinality | Datatype Name |
|---|---|---|---|---|---|---|---|---|
| | | | | RejectionReasonCode 141096 | | | 0..1 141098 | EmployeeTimeRejectionReasonCode 141100 |
| Item 141102 | | | | Item 141104 | | | 1 141106 | EmployeeTimeItem 141108 |
| | | | | | ID 141110 | | 1 141112 | EmployeeTimeItemID 141114 |
| | | | | | SystemAdministrativeData 141116 | | 1 141118 | SystemAdministrativeData 141120 |
| | | | | | CategoryCode 141122 | | 1 141124 | EmployeeTimeItemCategoryCode 141126 |
| | | | | | TypeCode 141128 | | 0..1 141130 | EmployeeTimeItemTypeCode 141132 |

FIG. 141-5

| Package | Level 1 | Level 2 | Level 3 | Level 4 | | Level 5 | Cardinality | Datatype Name |
|---|---|---|---|---|---|---|---|---|
| | | | | | Employ-eeTime-Validity 141134 | | 1 141136 | EmployeeTimeValidity 141138 |
| | | | | | FullWorkingDay-Indicator 141140 | | 0..1 141142 | FullWorkingDayIndicator 141144 |
| | | | | | Quantity 141146 | | 0..1 141148 | Quantity 141150 |
| | | | | | Amount 141152 | | 0..1 141154 | Amount 141156 |
| | | | | | Descrip-tion 141158 | | 0..1 141160 | EmployeeTimeItemDe-scription 141162 |
| | | | | | Task-Type-Code 141164 | | 0..1 141166 | EmployeeTimeItemTask-TypeCode 141168 |

FIG. 141-6

| Package | Level 1 | Level 2 | Level 3 | Level 4 | | Level 5 | Cardinality | Datatype Name |
|---|---|---|---|---|---|---|---|---|
| | | | | | TaskLevelCode 141170 | | 0..1 141172 | EmployeeTimeItemTaskLevelCode 141174 |
| | | | | | TaskComponentCode 141176 | | 0..1 141178 | EmployeeTimeItemTaskComponentCode 141180 |
| | | | | | ValuationTerms 141182 | | 0..1 141184 | ValuationTerms 141186 |
| | | | | | | EmployeeTimeValuationTerms 141188 | 0..1 141190 | EmployeeTimeValuationTerms 141192 |

FIG. 141-7

| Package | Level 1 | Level 2 | Level 3 | Level 4 | | Level 5 | Cardinality | Datatype Name |
|---|---|---|---|---|---|---|---|---|
| | | | | | ActivityAllocationAndCostAssignment 141194 | | 0..1 141196 | ActivityAllocationAndCostAssignment 141198 |
| | | | | | | SendingCostCentreID 141200 | 0..1 141202 | CostCentreID 141204 |
| | | | | | | ResourceClassID 141206 | 0..1 141208 | ResourceClassID 141210 |
| | | | | | | SendingCostingActivityID 141212 | 0..1 141214 | CostingActivityID 141216 |

FIG. 141-8

| Package | Level 1 | Level 2 | Level 3 | Level 4 | | Level 5 | Cardinality | Datatype Name |
|---|---|---|---|---|---|---|---|---|
| | | | | | | SendingFundID 141218 | 0..1 141220 | FundsManagementFundID 141222 |
| | | | | | | SendingFundsManagementFunctionalAreaID 141224 | 0..1 141226 | FundsManagementFunctionalAreaID 141228 |
| | | | | | | SendingGrantID 141230 | 0..1 141232 | GrantID 141234 |
| | | | | | | WorkBreakDownStructureElementID 141236 | 0..1 141238 | ProjectElementID 141240 |

FIG. 141-9

| Package | Level 1 | Level 2 | Level 3 | Level 4 | | Level 5 | Cardinality | Datatype Name |
|---|---|---|---|---|---|---|---|---|
| | | | | | | ReceivingSalesOrderID 141242 | 0..1 141244 | BusinessTransactionDocumentID 141246 |
| | | | | | | ReceivingSalesOrderItemID 141248 | 0..1 141250 | BusinessTransactionDocumentItemID 141252 |
| | | | | | | ReceivingCostingActivityID 141254 | 0..1 141256 | CostingActivityID 141258 |
| | | | | | | ReceivingFundID 141260 | 0..1 141262 | FundsManagementFundID 141264 |

FIG. 141-10

| Package | Level 1 | Level 2 | Level 3 | Level 4 | | Level 5 | Cardinality | Datatype Name |
|---|---|---|---|---|---|---|---|---|
| | | | | | | ReceivingFundsManagementFunctionalAreaID 141266 | 0..1 141268 | FundsManagementFunctionalAreaID 141270 |
| | | | | | | ReceivingGrantID 141272 | 0..1 141274 | GrantID 141276 |
| | | | | | | ControllingKeyFigureCode 141278 | 0..1 141280 | ControllingKeyFigureCode 141282 |
| | | | | | | Price 141284 | 0..1 141286 | Price 141288 |

FIG. 141-11

| Package | Level 1 | Level 2 | Level 3 | Level 4 | | Level 5 | Cardinality | Datatype Name |
|---|---|---|---|---|---|---|---|---|
| | | | | | Service-Provi-sionAn-dRe-source-Con-sump-tion 141290 | | 0..1 141292 | ServiceProvisionAndRe-sourceConsumption 141294 |
| | | | | | | Receiv-ingCost-CentreID 141296 | 0..1 141298 | CostCentreID 141300 |
| | | | | | Logis-ticCon-firmation 141302 | | 0..1 141304 | LogisticConfirmation 141306 |
| | | | | | | Resour-ceID 141308 | 0..1 141310 | ResourceID 141312 |

FIG. 141-12

| Package | Level 1 | Level 2 | Level 3 | Level 4 | | Level 5 | Cardinality | Datatype Name |
|---|---|---|---|---|---|---|---|---|
| | | | | | | Logistic-sAreaID 141314 | 0..1 141316 | LogisticsAreaID 141318 |
| | | | | | | OrderID 141320 | 0..1 141322 | BusinessTransaction-DocumentID 141324 |
| | | | | | | OrderOp-erationID 141326 | 0..1 141328 | OperationID 141330 |
| | | | | | | OrderOp-erationAc-tivityID 141332 | 0..1 141334 | OperationActivityID 141336 |
| | | | | | | Net-workID 141338 | 0..1 141340 | BusinessTransaction-DocumentID 141342 |
| | | | | | | Net-workOper ationID 141344 | 0..1 141346 | OperationID 141348 |

FIG. 141-13

| Package | Level 1 | Level 2 | Level 3 | Level 4 | | Level 5 | Cardinality | Datatype Name |
|---|---|---|---|---|---|---|---|---|
| | | | | | | Net-workOperationAc-tivityID 141350 | 0..1 141352 | OperationActivityID 141354 |
| | | | | | | Warran-tyGood-willCode 141356 | 0..1 141358 | WarrantyGoodwillCode 141360 |
| | | | | | | Capac-ityCate-goryCode 141362 | 0..1 141364 | CapacityCategoryCode 141366 |
| | | | | | | Capaci-tySplitID 141368 | 0..1 141370 | CapacitySplitID 141372 |
| | | | | | | WorkForecastQuantity 141374 | 0..1 141376 | WorkForecastQuantity 141378 |

FIG. 141-14

| Package | Level 1 | Level 2 | Level 3 | Level 4 | | Level 5 | Cardinality | Datatype Name |
|---|---|---|---|---|---|---|---|---|
| | | | | | | Forecas-tEndDate 141380 | 0..1 141382 | Date 141384 |
| | | | | | | Confirma-tionStatus Code 141386 | 0..1 141388 | ConfirmationStatusCode 141390 |
| | | | | | Exter-nalSer-viceAc-knowl-edge-ment 141392 | | 0..1 141394 | ExternalServiceAcknowl-edgement 141396 |
| | | | | | | Pur-chaseOr-derID 141398 | 0..1 141400 | BusinessTransaction-DocumentID 141402 |

FIG. 141-15

| Package | Level 1 | Level 2 | Level 3 | Level 4 | | Level 5 | Cardinality | Datatype Name |
|---|---|---|---|---|---|---|---|---|
| | | | | | | Pur-chaseOr-derItemID 141404 | 0..1 141406 | BusinessTransaction-DocumentItemID 141408 |
| | | | | | | Service-ProductID 141410 | 0..1 141412 | ProductID 141414 |
| | | | | | Differ-entPay-ment 141416 | | 0..1 141418 | DifferentPayment 141420 |
| | | | | | | PositionID 141422 | 0..1 141424 | PositionID 141426 |
| | | | | | | Valua-tionBasi-sAmount 141428 | 0..1 141430 | Amount 141432 |
| Log 141434 | | Log 141436 | | | | | 0..1 141438 | Log 141440 |

FIG. 142

| Package | Level 1 | Level 2 | Level 3 | Cardinality | Datatype Name |
|---|---|---|---|---|---|
| EmployeeTimeSheetCompleteRequestMessage 142000 | EmployeeTimeSheetCompleteRequestMessage 142002 | | | | EmployeeTimeSheetCompleteRequestMessage 142004 |
| MessageHeader 142006 | | MessageHeader 142008 | | 1 142010 | BusinessDocumentMessageHeader 142012 |
| EmployeeTimeSheet 142014 | | EmployeeTimeSheet 142016 | | 1 142018 | EmployeeTimeSheet 142020 |
| | | | EmployeeID 142022 | 0..1 142024 | EmployeeID 142026 |
| | | | WorkAgreementID 142028 | 0..1 142030 | WorkAgreementID 142032 |
| | | | DatePeriod 142034 | 0..1 142036 | CLOSED_DatePeriod 142038 |

MANAGING CONSISTENT INTERFACES FOR HUMAN RESOURCES BUSINESS OBJECTS ACROSS HETEROGENEOUS SYSTEMS

RELATED APPLICATION

This application claims the benefit of U.S. Provisional Application No. 60/848,497 filed Sep. 28, 2006, and fully incorporating the contents therein.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

Methods and systems consistent with the subject matter described herein facilitate e-commerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjointed, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax. Semantically related business objects may be grouped into process components that realize a certain business process. The process component exposes its functionality via enterprise services. Process components are part of the business process platform. Defined groups of process components can be deployed individually, where each of these groups is often termed a deployment unit.

Methods and systems consistent with the subject matter described herein generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Example methods and systems described herein provide an object model and, as such, derive two or more interfaces that are consistent from this object model. Further, the subject matter described herein can provide a consistent set of interfaces that are suitable for use with more than one industry. This consistency is reflected at a structural level as well as through the semantic meaning of the elements in the interfaces. Additionally, the techniques and components described herein provide a consistent set of interfaces suitable for use with different businesses. Methods and systems consistent with the subject matter described herein provide a consistent set of interfaces suitable for use with a business scenario that spans across the components within a company. These components, or business entities, may be heterogeneous.

For example, a user or a business application of any number of modules, including one may execute or otherwise implement methods that utilize consistent interfaces that, for example, query business objects, respond to the query, create/change/delete/cancel business objects, and/or confirm the particular processing, often across applications, systems, businesses, or even industries. The foregoing example computer implementable methods—as well as other disclosed processes—may also be executed or implemented by or within software. Moreover, some or all of these aspects may be further included in respective systems or other devices for identifying and utilizing consistence interfaces. For example, one system implementing consistent interfaces derived from a business object model may include memory storing a plurality of global data types and at least a subset of various deployment units Each of these deployment units include one or more business objects. These business objects include, for example, AccountingViewOfProject and EmployeeTimeSheet. Moreover, these business objects may be involved in a message choreography that depicts one or more messages between applications that can reside in heterogeneous systems. In some cases, the messages may include data from or based on such processes represented by the business object.

In another example, the business objects may include a root node, with a plurality of data elements located directly at the root node, and one or more subordinate nodes of varying cardinality. This cardinality may be 1:1, 1:n, 1:c, 1:cn, and so forth. Each of these subordinate nodes may include it own data elements and may further include other subordinate nodes. Moreover, each node may reference any number of appropriate dependent objects.

The foregoing example computer implementable methods—as well as other disclosed processes—may also be executed or implemented by or within software. Moreover, some or all of these aspects may be further included in respective systems or other devices for creating and utilizing consistent services or interfaces. The details of these and other aspects and embodiments of the disclosure are set forth in the accompanying drawings and the description below. Other features, objects, and advantages of the various embodiments will be apparent from the description and drawings, as well as from the claims. It should be understood that the foregoing business objects in each deployment unit are for illustration purposes only and other complementary or replacement business objects may be implemented.

BRIEF DESCRIPTION OF THE DRAWINGS

FIGS. 27A-E depict a hierarchization process in accordance with methods and systems consistent with the subject matter described herein;

FIG. 39 shows an exemplary FinancialAccountingViewOfProjectByIDQuery Element Structure;

FIGS. 40-1 through 40-8 show an exemplary FinancialAccountingViewOfProjectByIDReponse Element Structure;

FIGS. 41-1 through 41-8 show an exemplary FinancialAccountingViewOfProjectServices Element Structure;

FIG. 42 shows an exemplary FinancialAccountingViewOfProjectSimpleByProjectIDQuery Element Structure;

FIG. 43 shows an exemplary FinancialAccountingViewOfProjectSimpleByProjectIDResponse Element Structure;

FIG. 44 shows an exemplary FinancialAccountingViewOfProjectStructureByIDQuery Element Structure;

FIGS. 45-1 through 45-7 show an exemplary FinancialAccountingViewOfProjectStructureByIDResponse Element Structure;

FIG. 95 shows an exemplary EmployeeTimeSheetAllowedControllingKeyFigureByEmployeeQueryMessage Element Structure;

FIGS. 96-1 through 96-2 show an exemplary EmployeeTimeSheetAllowedControllingKeyFigureByEmployeeResponseMessage Element Structure;

FIG. 97 shows an exemplary EmployeeTimeSheetAllowedCurrencyByEmployeeQueryMessage Element Structure;

FIGS. 98-1 through 98-2 show an exemplary EmployeeTimeSheetAllowedCurrencyByEmployeeResponseMessage Element Structure;

FIG. 99 shows an exemplary EmployeeTimeSheetAllowedEmployeeTimeItemTypeByEmployeeQueryMessage Element Structure;

FIGS. 100-1 through 100-2 show an exemplary EmployeeTimeSheetAllowedEmployeeTimeItemTypeByEmployeeResponseMessage Element Structure;

FIGS. 101-1 through 101-2 show an exemplary EmployeeTimeSheetAllowedReceivingFundsManagementFunctionalAreaByEmployeeQueryMessage Element Structure;

FIGS. 102-1 through 102-2 show an exemplary EmployeeTimeSheetAllowedReceivingFundsManagementFunctionalAreaByEmployeeResponseMessage Element Structure;

FIG. 103 shows an exemplary EmployeeTimeSheetAllowedMeasureUnitByEmployeeQueryMessage Element Structure;

FIGS. 104-1 through 104-2 show an exemplary EmployeeTimeSheetAllowedMeasureUnitByEmployeeResponseMessage Element Structure;

FIG. 105 shows an exemplary EmployeeTimeSheetAllowedNetworkByEmployeeQueryMessage Element Structure;

FIGS. 106-1 through 106-2 show an exemplary EmployeeTimeSheetAllowedNetworkByEmployeeResponseMessage Element Structure;

FIG. 107 shows an exemplary EmployeeTimeSheetAllowedOrderByEmployeeQueryMessage Element Structure;

FIGS. 108-1 through 108-2 show an exemplary EmployeeTimeSheetAllowedOrderByEmployeeResponseMessage Element Structure;

FIG. 109 shows an exemplary EmployeeTimeSheetAllowedPurchaseOrderByEmployeeQueryMessage Element Structure;

FIGS. 110-1 through 110-2 show an exemplary EmployeeTimeSheetAllowedPurchaseOrderByEmployeeResponseMessage Element Structure;

FIG. 111 shows an exemplary EmployeeTimeSheetAllowedReceivingCostCentreByEmployeeQueryMessage Element Structure;

FIGS. 112-1 through 112-2 show an exemplary EmployeeTimeSheetAllowedReceivingCostCentreByEmployeeResponseMessage Element Structure;

FIG. 113 shows an exemplary EmployeeTimeSheetAllowedReceivingCostingActivityByEmployeeQueryMessage Element Structure;

FIGS. 114-1 through 114-2 show an exemplary EmployeeTimeSheetAllowedReceivingCostingActivityByEmployeeResponseMessage Element Structure;

FIG. 115 shows an exemplary EmployeeTimeSheetAllowedReceivingFundByEmployeeQueryMessage Element Structure;

FIGS. 116-1 through 116-2 show an exemplary EmployeeTimeSheetAllowedReceivingFundByEmployeeResponseMessage Element Structure;

FIG. 117 shows an exemplary EmployeeTimeSheetAllowedReceivingGrantByEmployeeQueryMessage Element Structure;

FIGS. 118-1 through 118-2 show an exemplary EmployeeTimeSheetAllowedReceivingGrantByEmployeeResponseMessage Element Structure;

FIG. 119 shows an exemplary EmployeeTimeSheetAllowedReceivingSalesOrderByEmployeeQueryMessage Element Structure;

FIGS. 120-1 through 120-2 show an exemplary EmployeeTimeSheetAllowedReceivingSalesOrderByEmployeeResponseMessage Element Structure;

FIG. 121 shows an exemplary EmployeeTimeSheetAllowedResourceClassByEmployeeQueryMessage Element Structure;

FIGS. 122-1 through 122-2 show an exemplary EmployeeTimeSheetAllowedResourceClassByEmployeeResponseMessage Element Structure;

FIG. 123 shows an exemplary EmployeeTimeSheetAllowedServiceProductByEmployeeQueryMessage Element Structure;

FIGS. 124-1 through 124-2 show an exemplary EmployeeTimeSheetAllowedServiceProductByEmployeeResponseMessage Element Structure;

FIG. 125 shows an exemplary EmployeeTimeSheetAllowedTaskComponentByEmployeeQueryMessage Element Structure;

FIGS. 126-1 through 126-2 show an exemplary EmployeeTimeSheetAllowedTaskComponentByEmployeeResponseMessage Element Structure;

FIG. 127 shows an exemplary EmployeeTimeSheetAllowedTaskLevelByEmployeeQueryMessage Element Structure;

FIGS. 128-1 through 128-2 show an exemplary EmployeeTimeSheetAllowedTaskLevelByEmployeeResponseMessage Element Structure;

FIG. 129 shows an exemplary EmployeeTimeSheetAllowedTaskTypeByEmployeeQueryMessage Element Structure;

Figure 1:
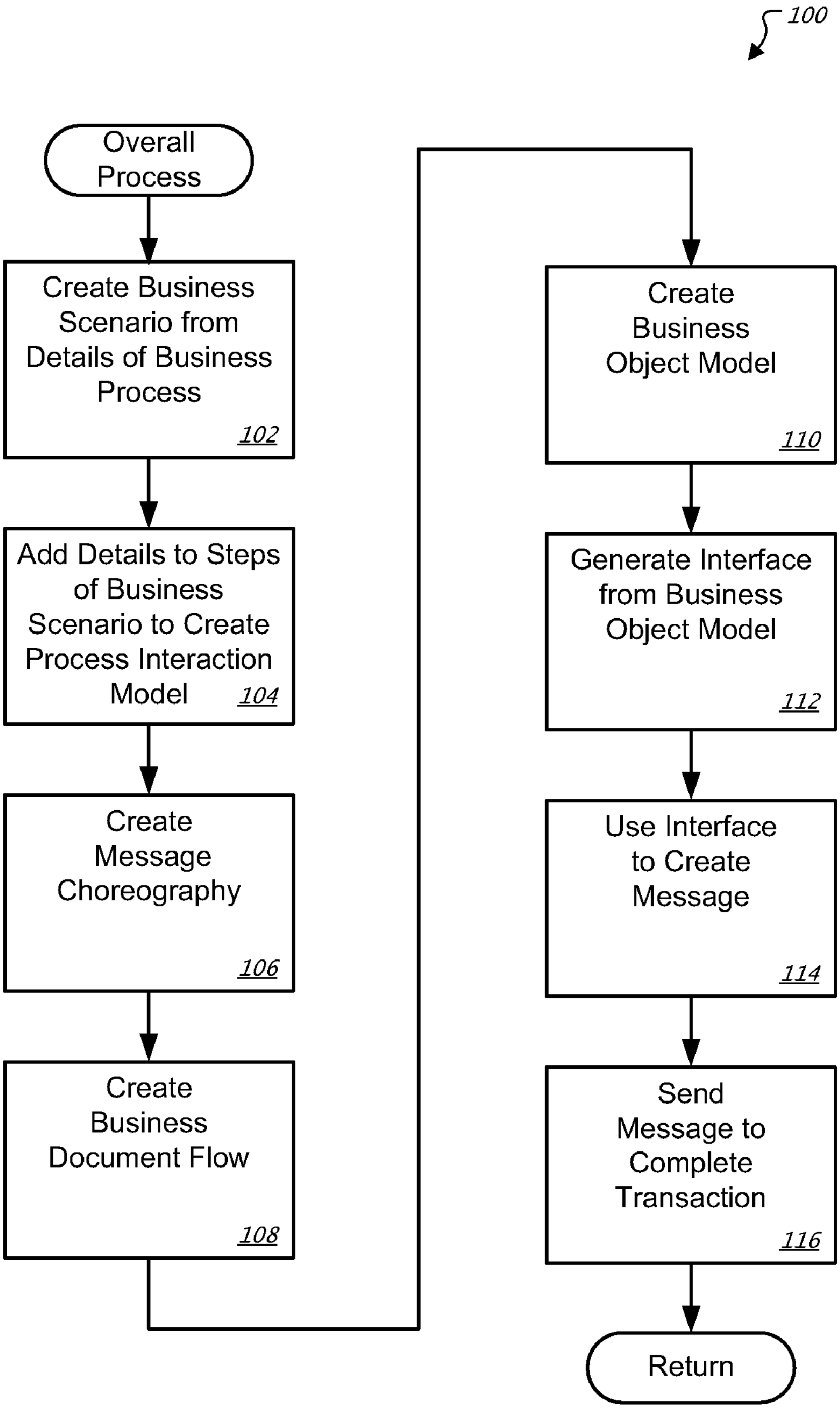
FIG. 1 depicts a flow diagram of the overall steps performed by methods and systems consistent with the subject matter described herein.
Figure 2:
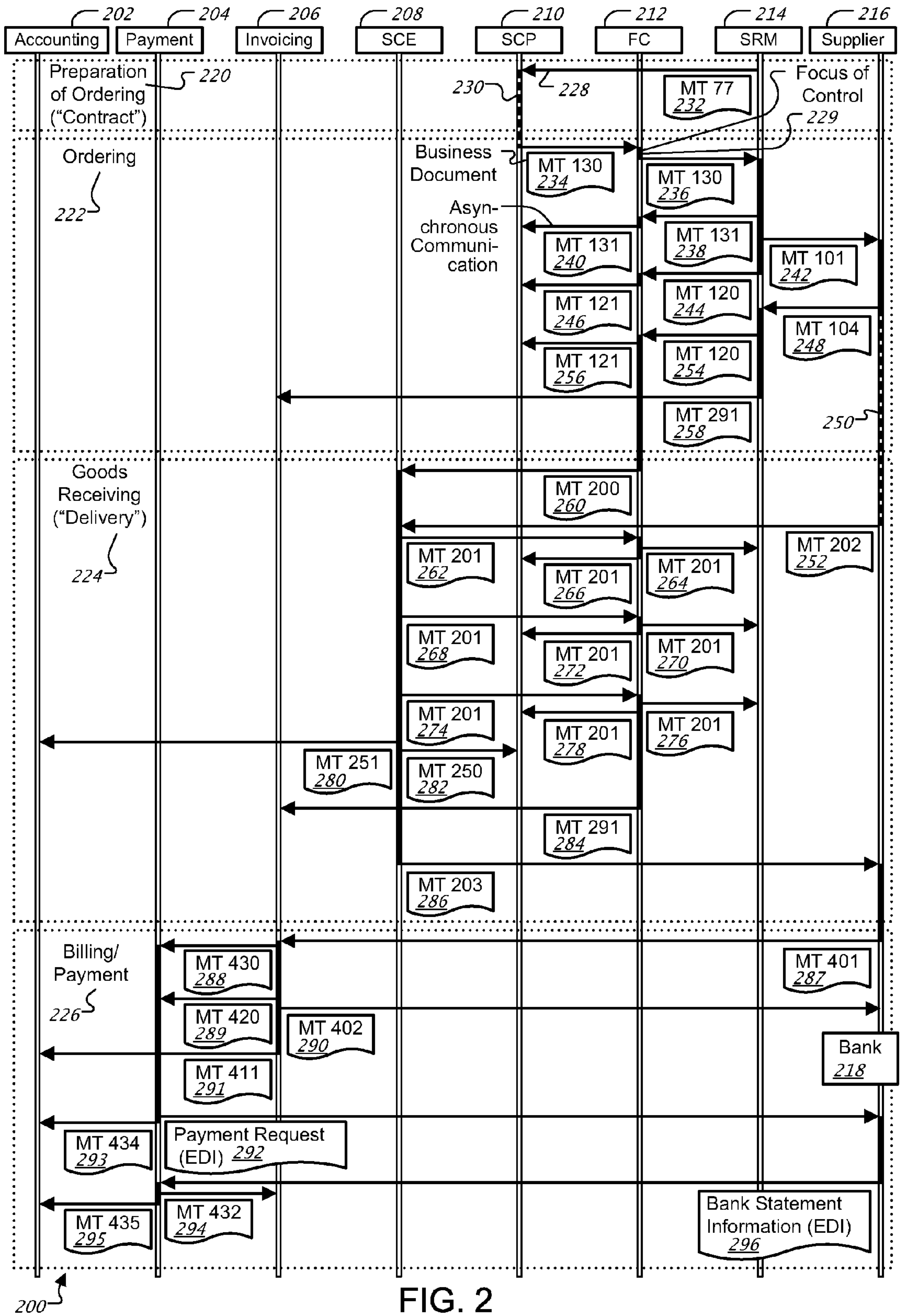
FIG. 2 depicts a business document flow for an invoice request in accordance with methods and systems consistent with the subject matter described herein.
Figure 13:
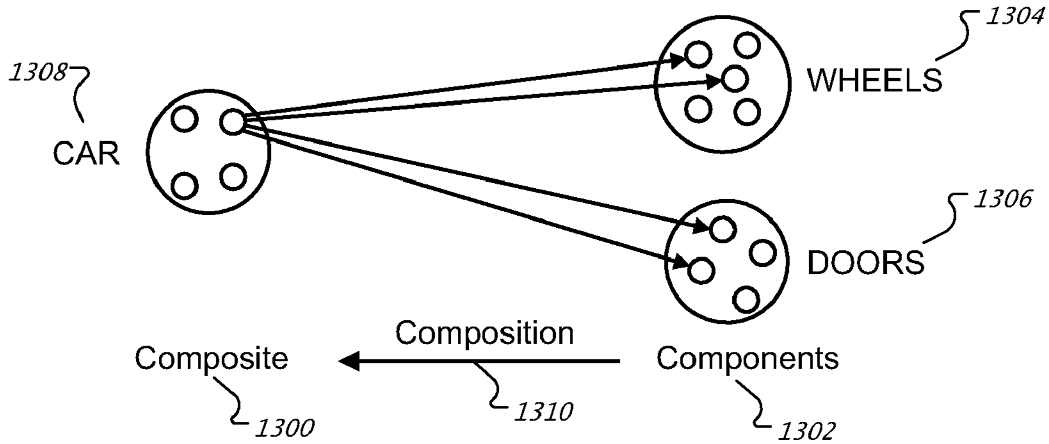
FIG. 13 depicts an example of a composition in accordance with methods and systems consistent with the subject matter described herein.
Figure 14:
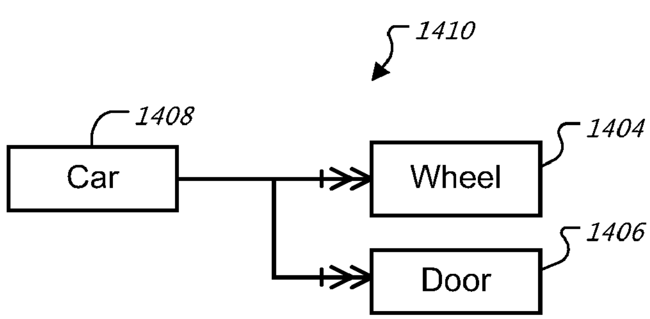
FIG. 14 depicts an example of a hierarchical relationship in accordance with methods and systems consistent with the subject matter described herein.
Figure 15:
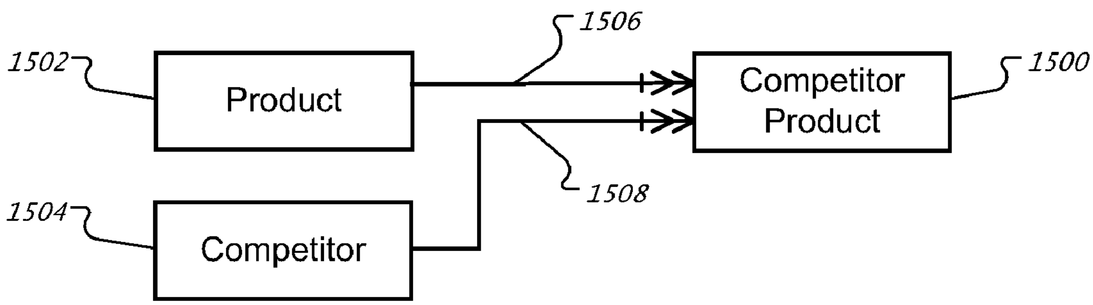
FIG. 15 depicts an example of an aggregating relationship in accordance with methods and systems consistent with the subject matter described herein.
Figure 16:
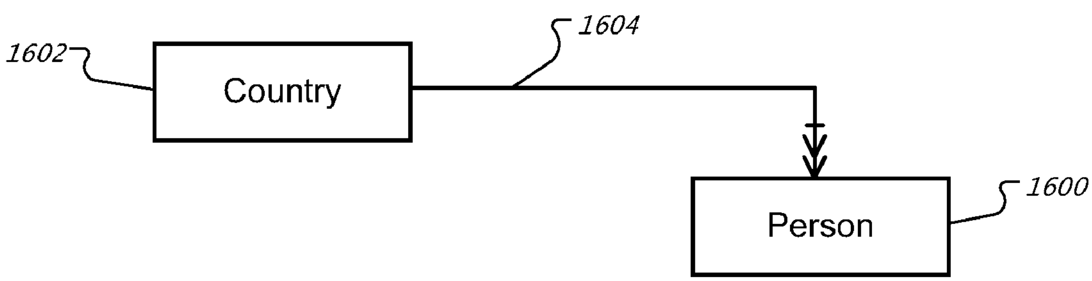
FIG. 16 depicts an example of an association in accordance with methods and systems consistent with the subject matter described herein.

FIGS. 130-1 through 130-2 show an exemplary EmployeeTimeSheetAllowedTaskTypeByEmployeeResponseMessage Element Structure;

FIG. 131 shows an exemplary EmployeeTimeSheetAllowedWarrantyGoodwillTypeByEmployeeQueryMessage Element Structure;

FIGS. 132-1 through 132-2 show an exemplary EmployeeTimeSheetAllowedWarrantyGoodwillTypeByEmployeeResponseMessage Element Structure;

FIG. 133 shows an exemplary EmployeeTimeSheetAllowedWorkBreakDownStructureElementByEmployeeQueryMessage Element Structure;

FIGS. 134-1 through 134-2 show an exemplary EmployeeTimeSheetAllowedWorkBreakDownStructureElementByEmployeeResponseMessa ge Element Structure;

FIG. 135 shows an exemplary EmployeeTimeSheetByEmployeeQueryMessage Element Structure;

FIGS. 136-1 through 136-16 show an exemplary EmployeeTimeSheetByEmployeeResponseMessage Element Structure;

FIGS. 137-1 through 137-13 show an exemplary EmployeeTimeSheetChangeCheckQueryMessage Element Structure;

FIGS. 138-1 through 138-15 show an exemplary EmployeeTimeSheetChangeCheckResponseMessage Element Structure;

FIGS. 139-1 through 139-14 show an exemplary EmployeeTimeSheetChangeConfirmationMessage Element Structure;

FIGS. 140-1 through 140-13 show an exemplary EmployeeTimeSheetChangeRequestMessage Element Structure;

FIGS. 141-1 through 141-15 show an exemplary EmployeeTimeSheetCompleteConfirmationMessage Element Structure; and FIG. 142 shows an exemplary EmployeeTimeSheetCompleteRequestMessage Element Structure.

DETAILED DESCRIPTION

A. Overview

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or a synchronous, corresponding to synchronous or a synchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and a synchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or a synchronous. A synchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service a synchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206. During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
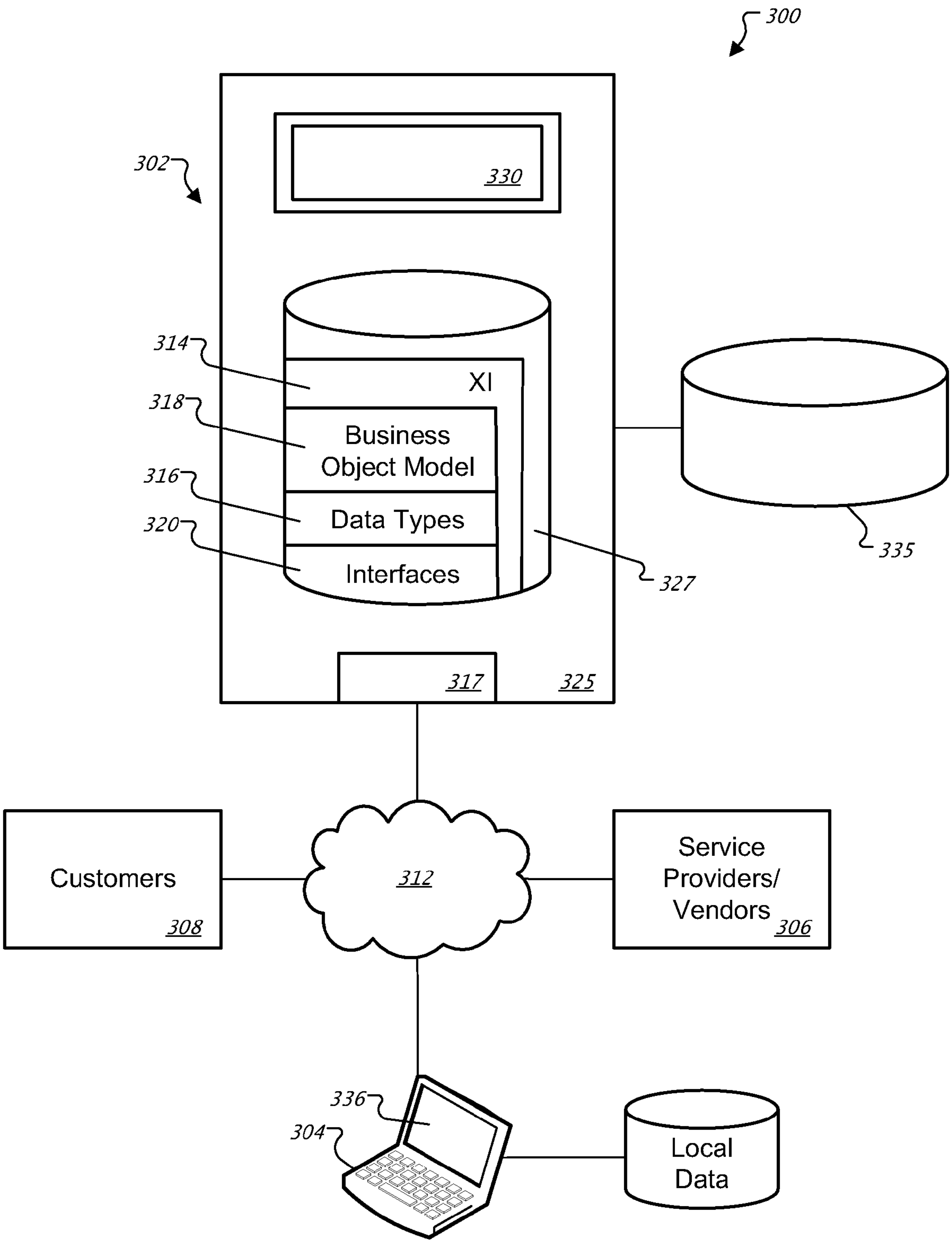
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3 provides merely one example of computers that may be used with the disclosure. Each computer is generally intended to encompass any suitable processing device. For example, although FIG. 3 illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and JavA environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3 illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
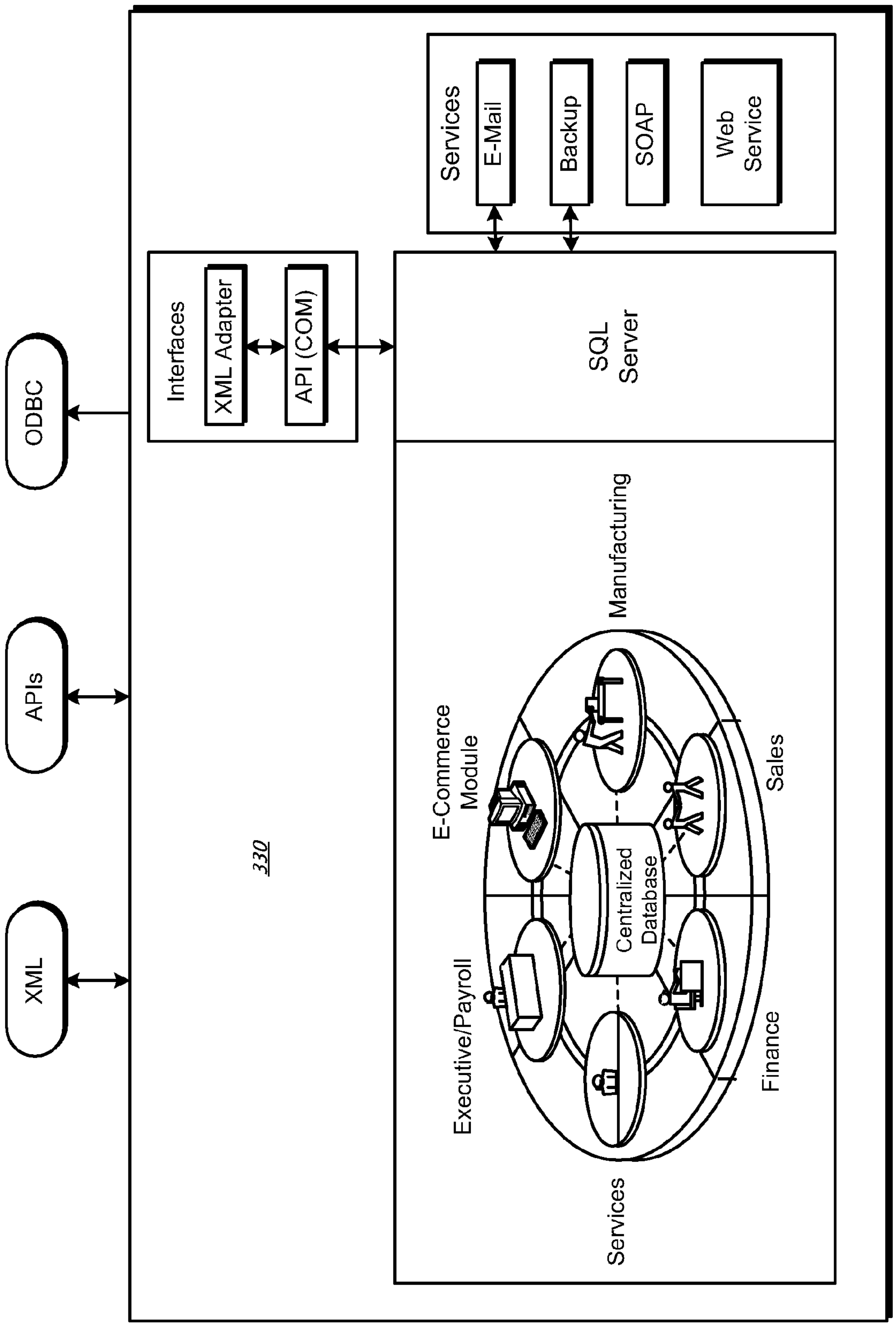
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 130 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, A synchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
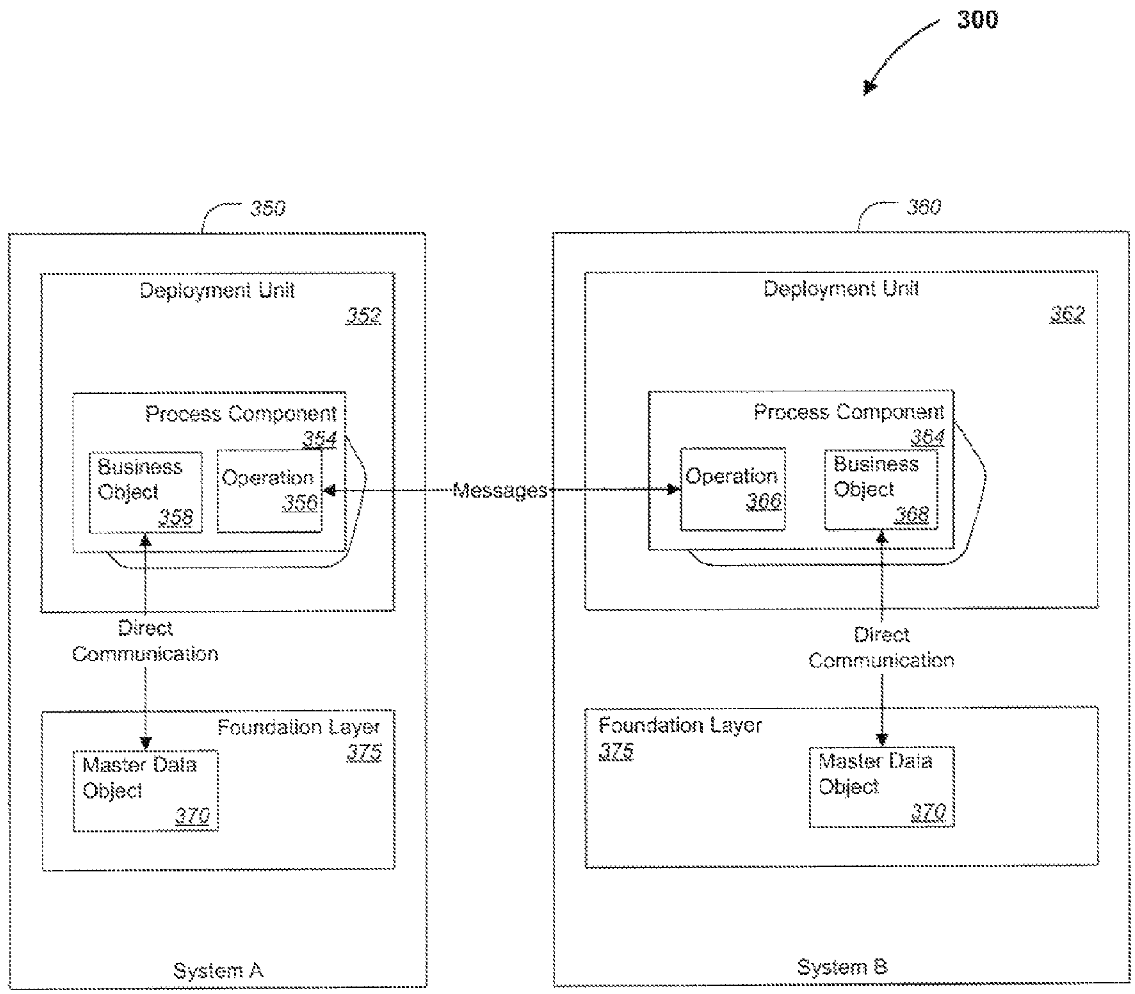

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Figure 5A:
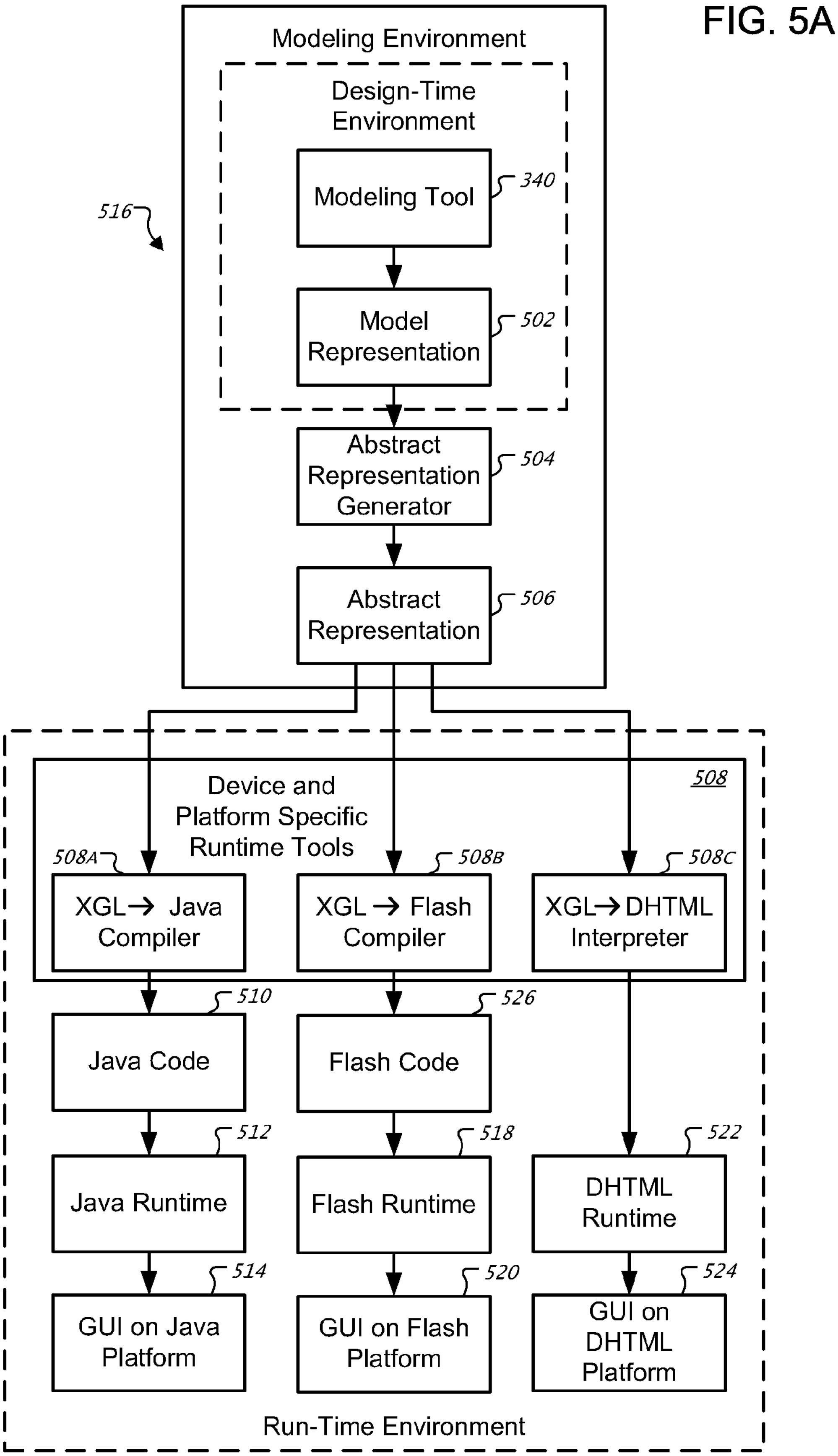
FIG. 5A depicts an example development environment in accordance with one embodiment of FIG. 1.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding. FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508*a* may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508*b* may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508*c* may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
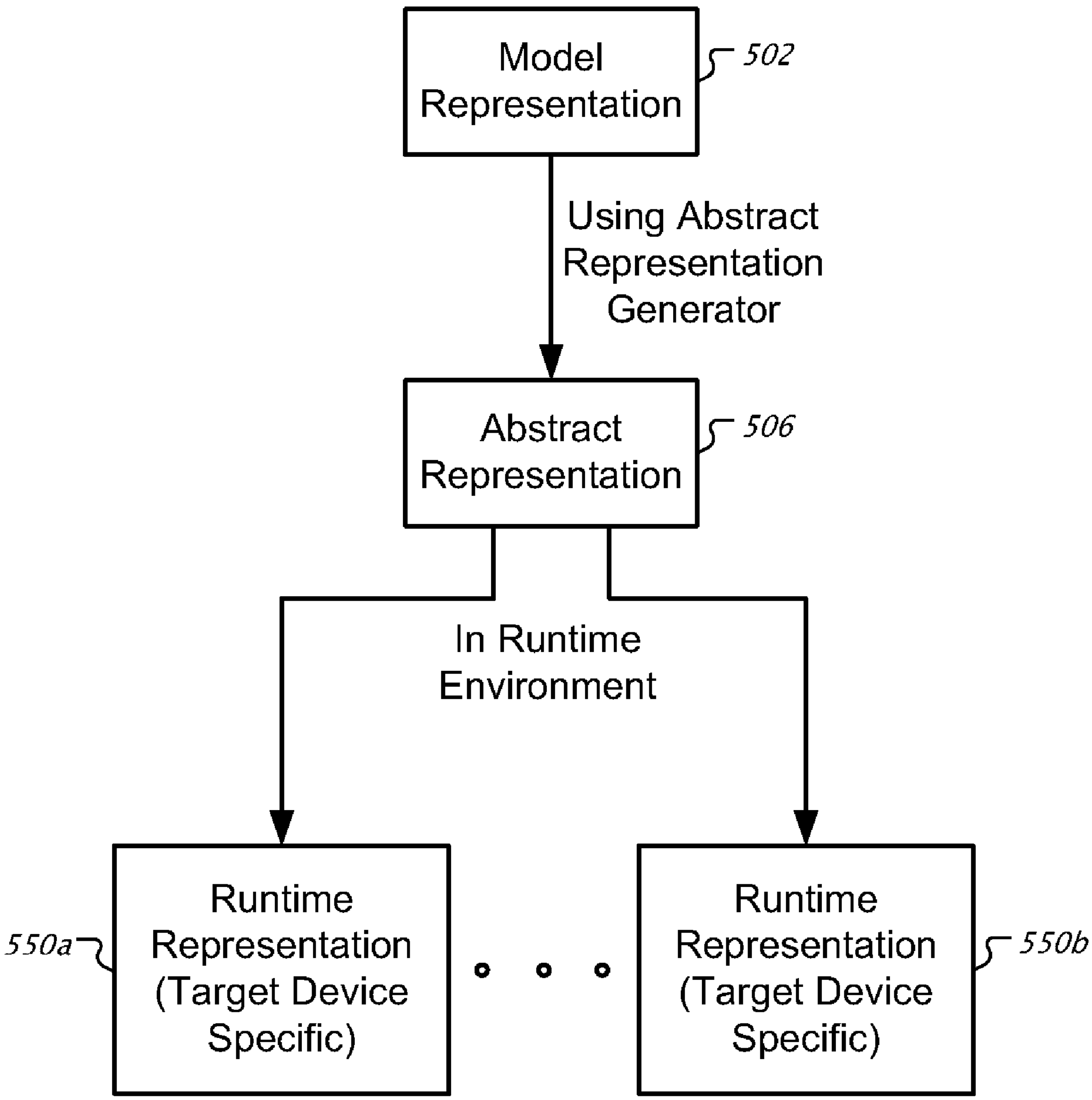
FIG. 5B depicts a simplified process for mapping a model representation to a runtime representation using the example development environment of FIG. 4A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
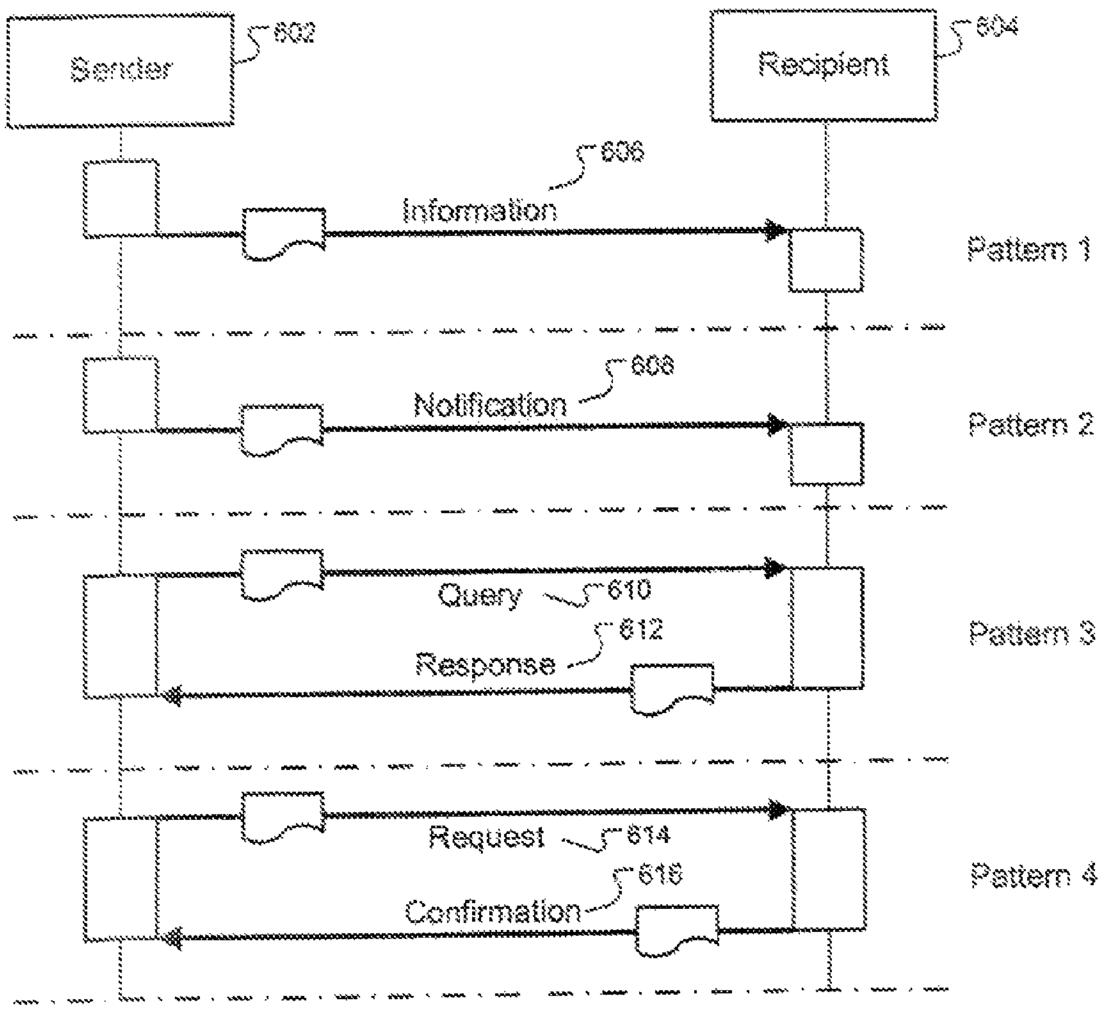
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
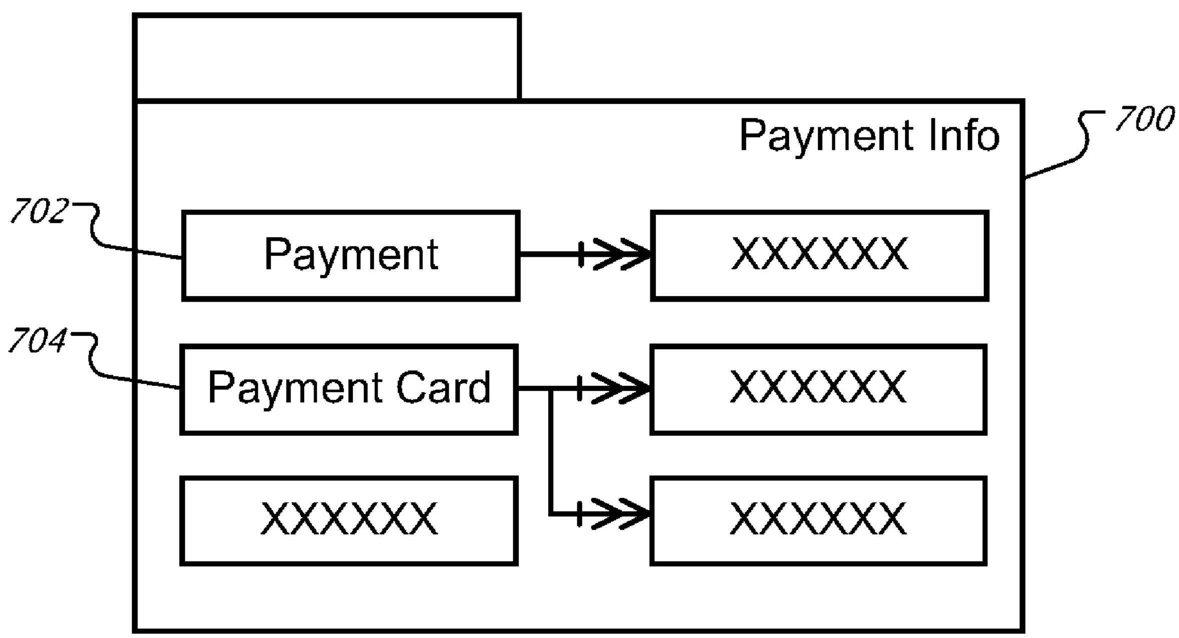
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
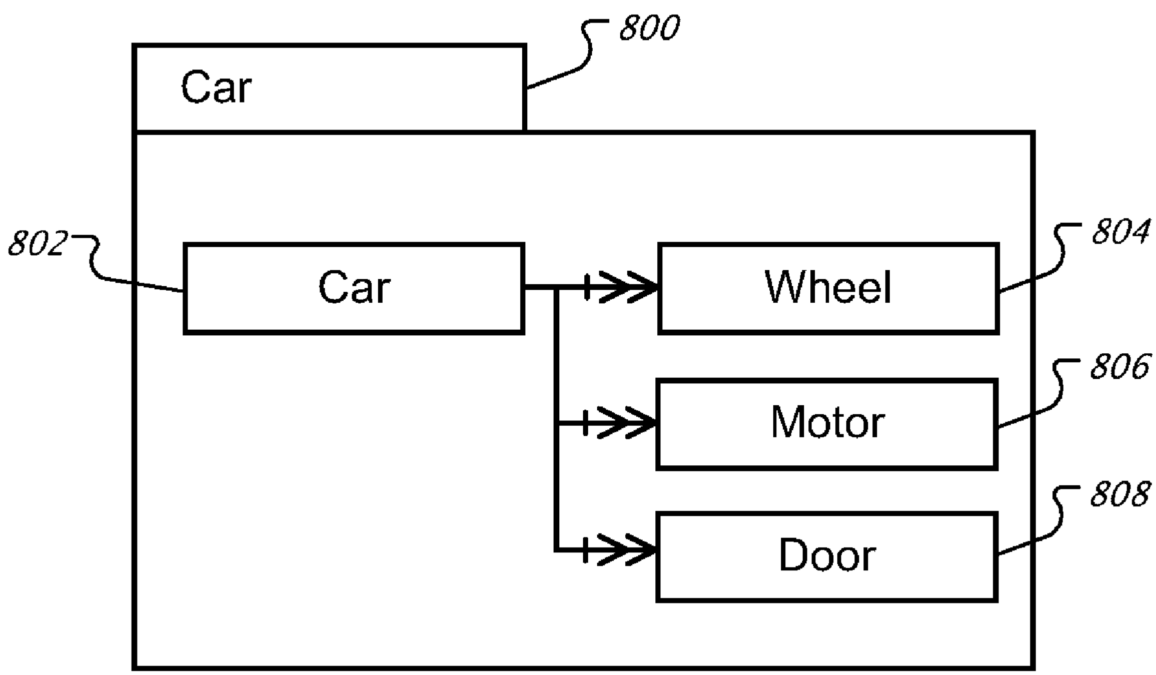
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
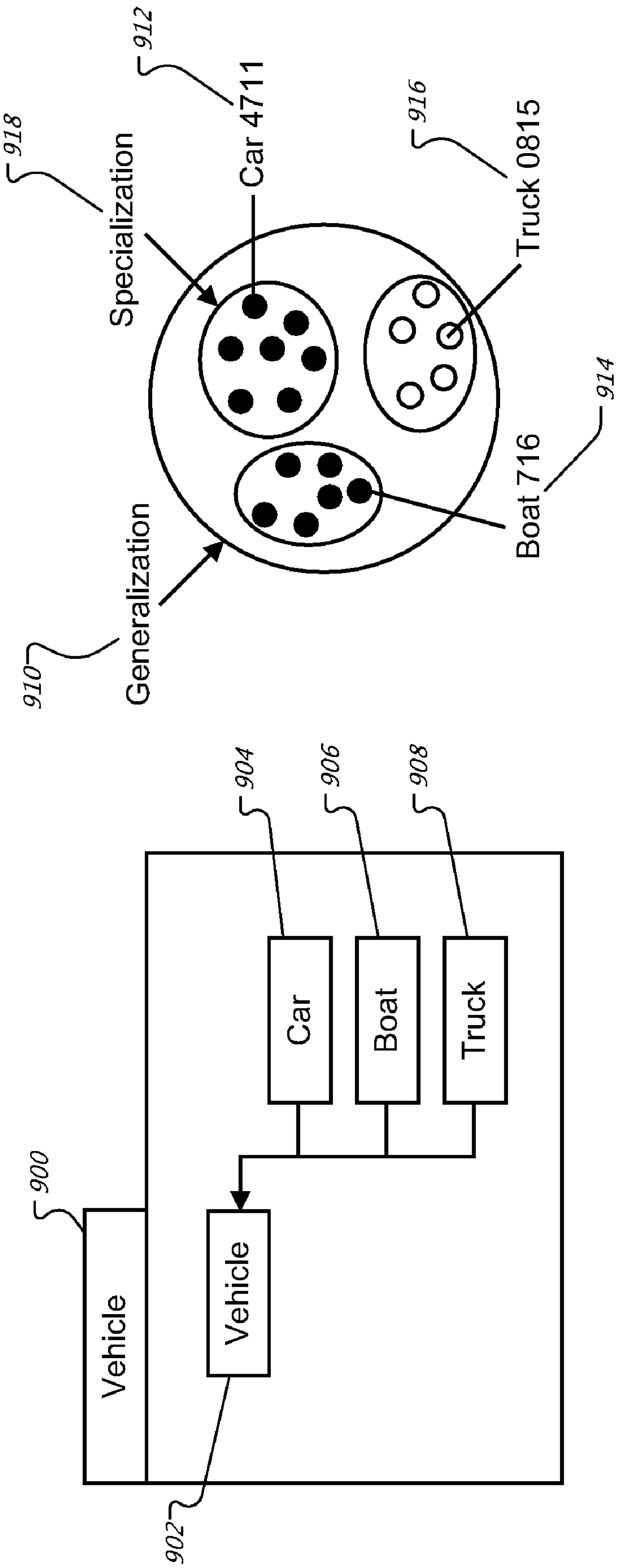
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
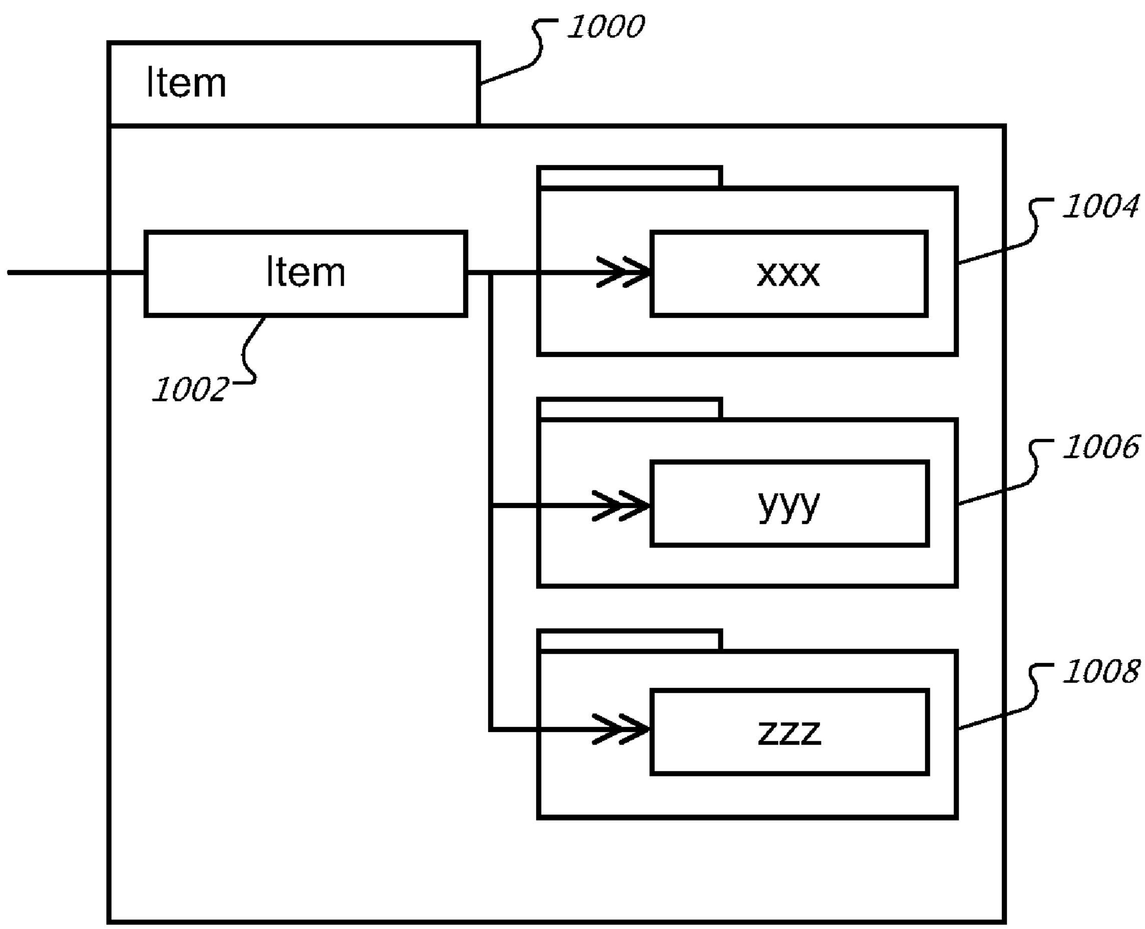
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
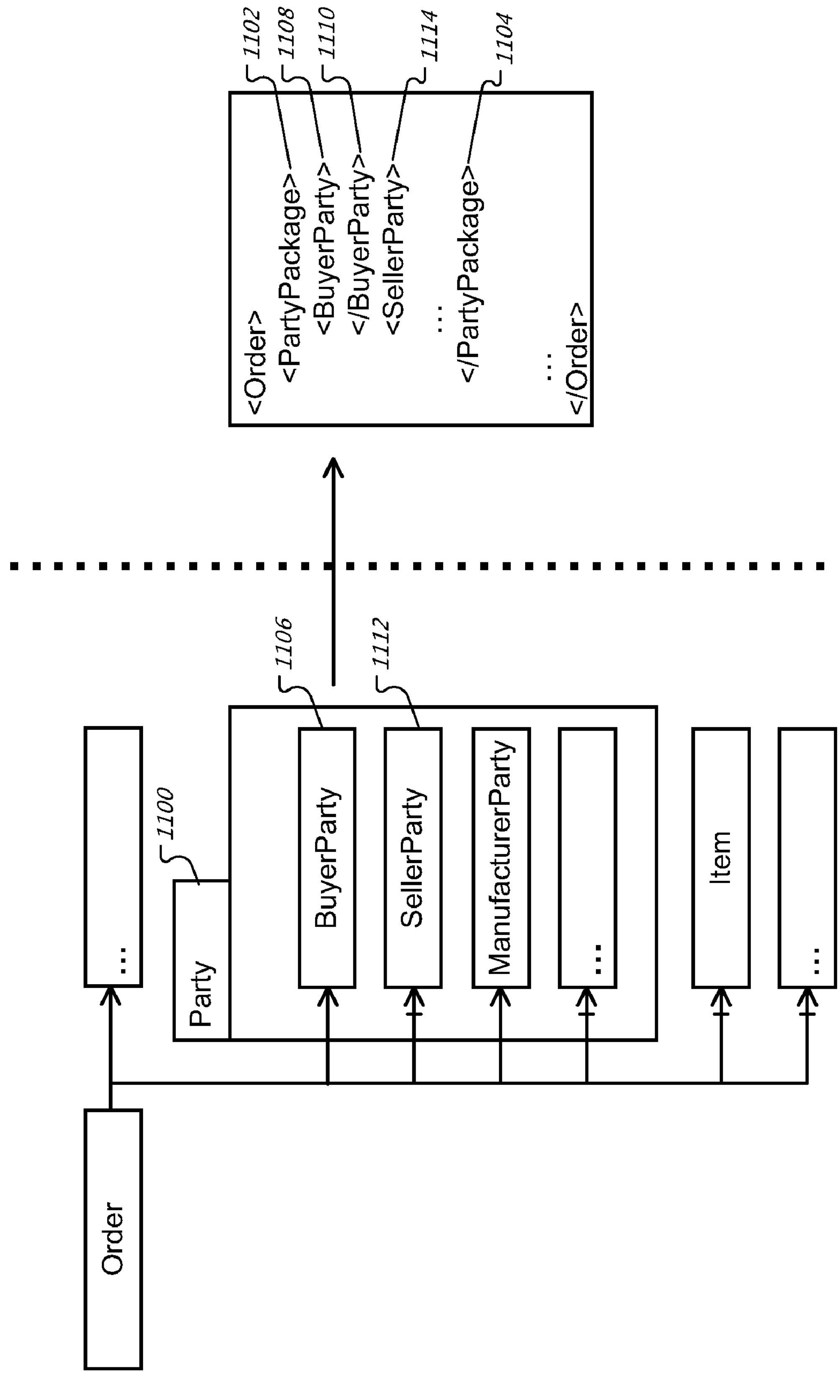
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
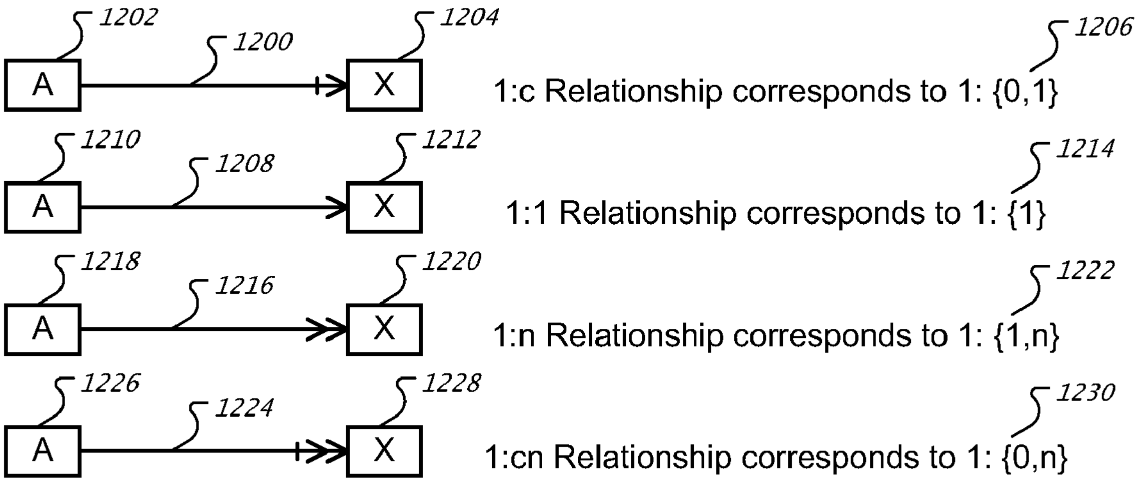
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
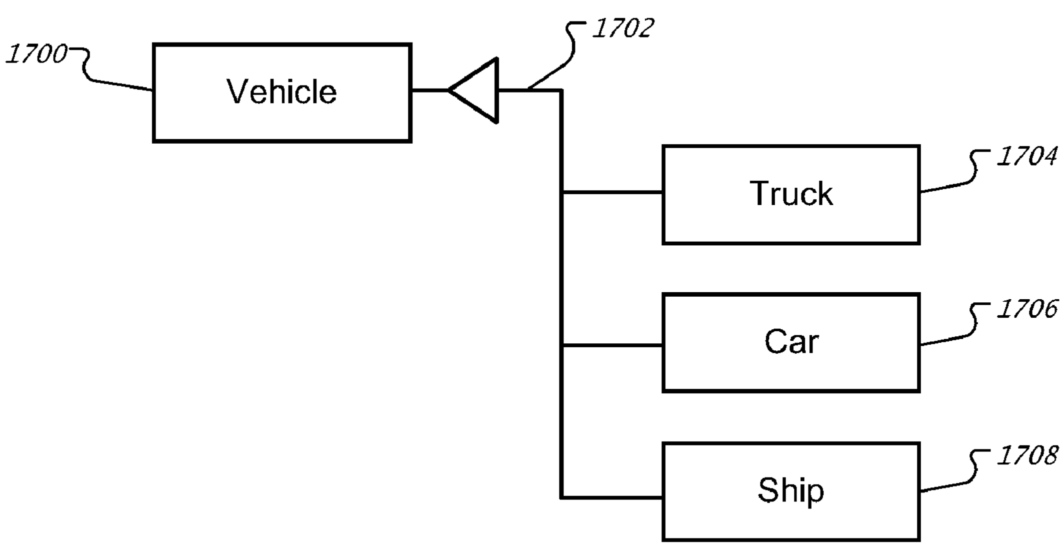
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
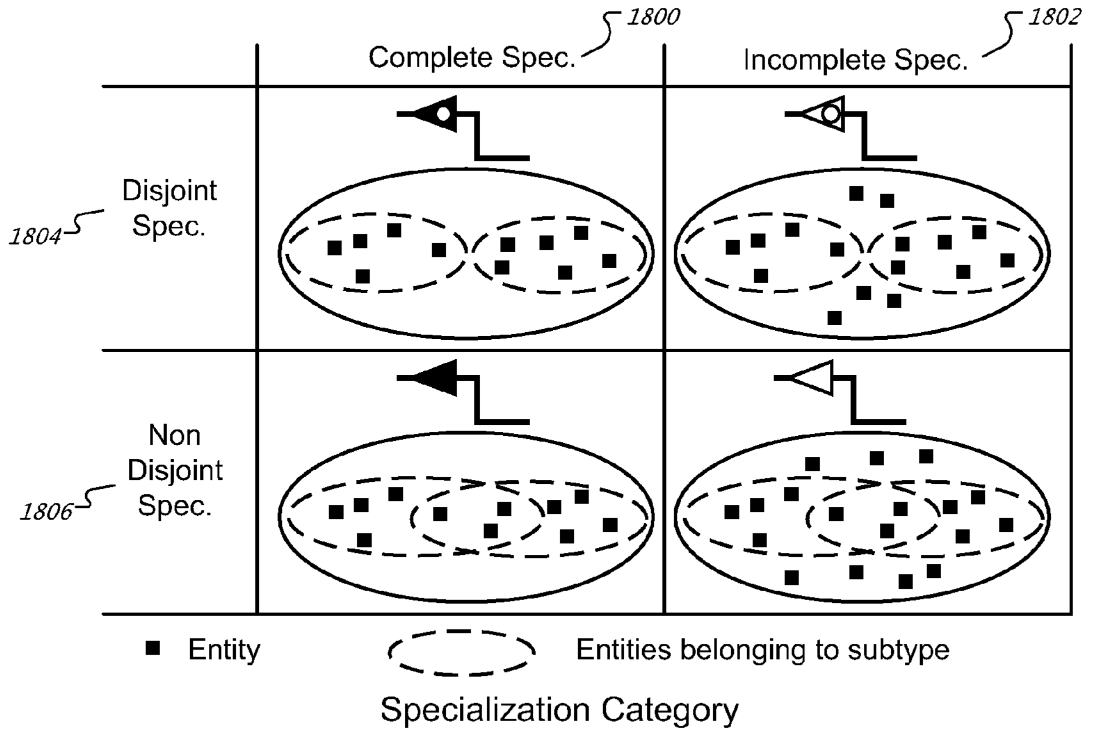
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
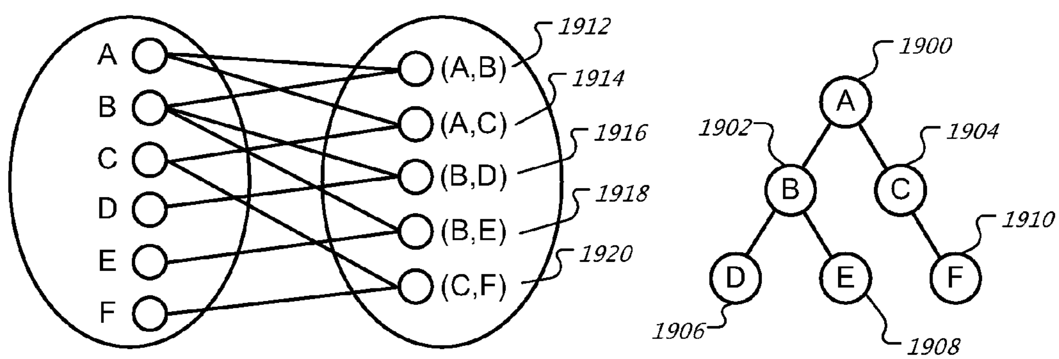
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
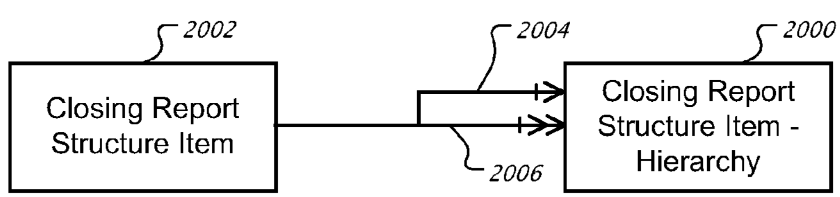
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
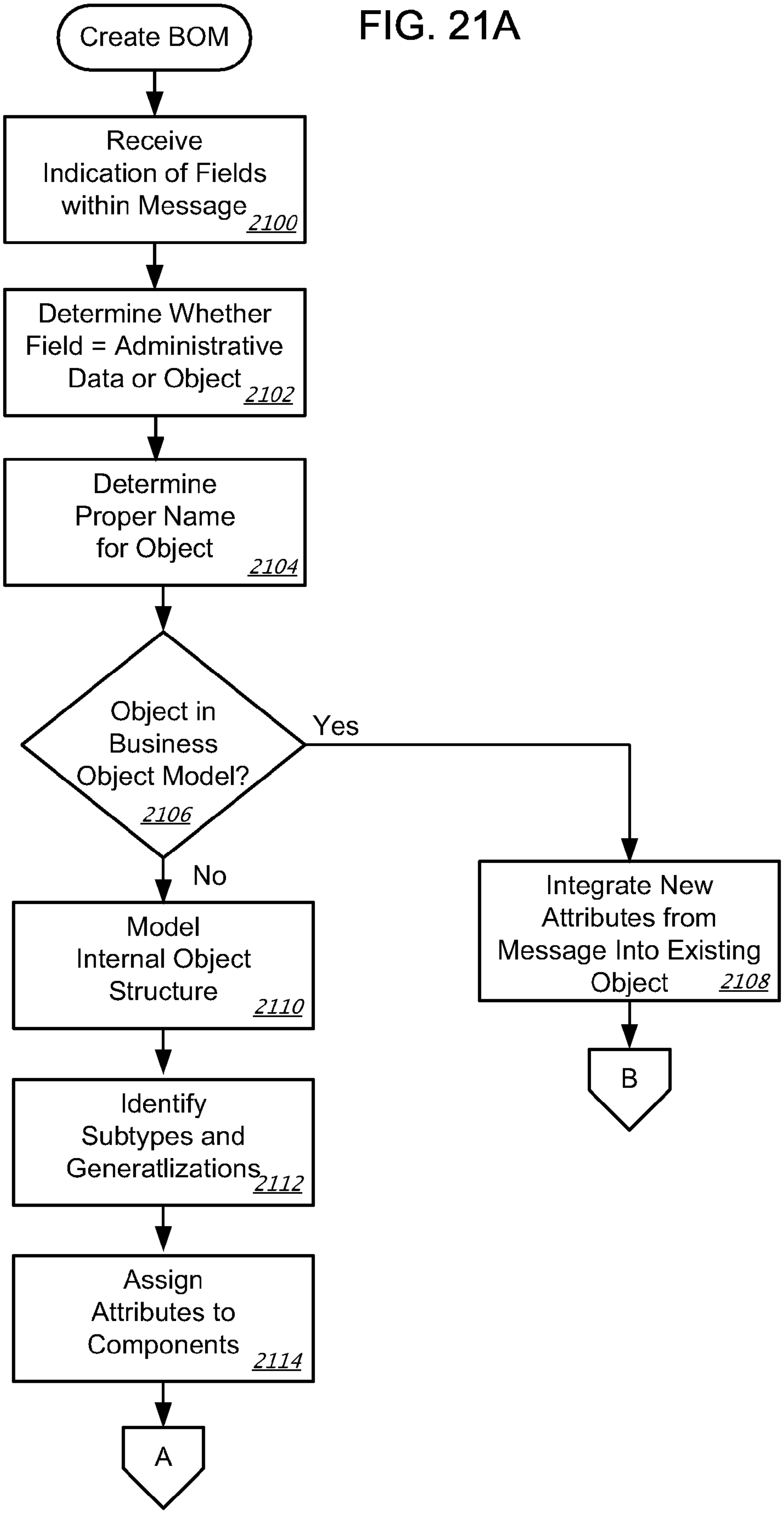
FIGS. 21A-B depict a flow diagram of the steps performed to create a business object model in accordance with methods and systems consistent with the subject matter described herein.
Figure 21B:
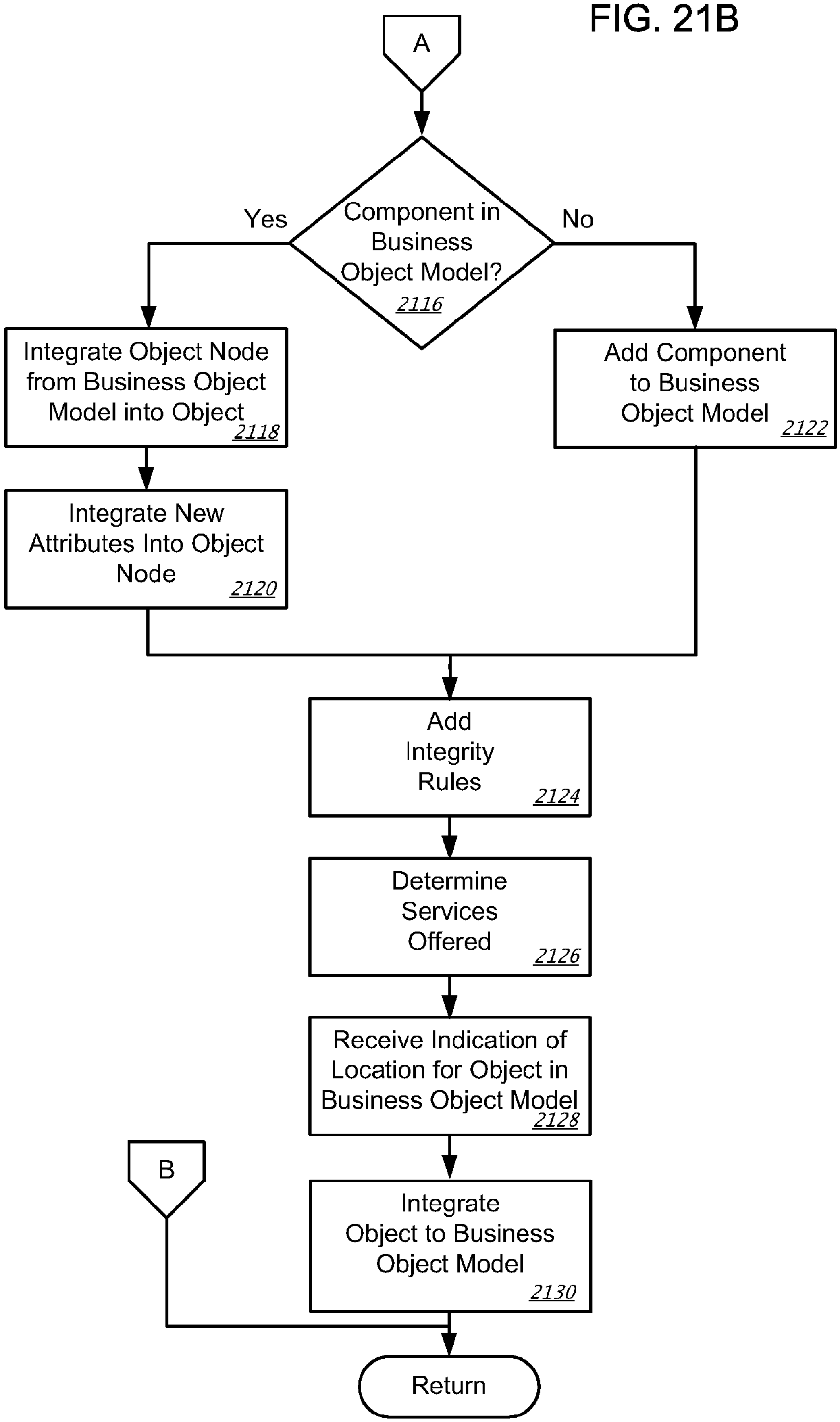

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |

-continued

| | |
|---|---|
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | |
| ItemSellerAddress | |
| ItemLocation | |
| ItemLocationType | |
| ItemDeliveryItemGroupID | |
| ItemDeliveryPriority | |

-continued

| |
|---|
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase Order | |
| AdditionalID | | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobilNumber | | |
| Facsimile | | |
| Email | | |
| ItemSeller | | Seller |
| ItemSellerAddress | | |
| ItemLocation | | Location |
| ItemLocationType | | |
| ItemDeliveryItemGroupID | | |
| ItemDeliveryPriority | | |
| ItemDeliveryCondition | | |

-continued

| | | |
|---|---|---|
| ItemTransferLocation | | |
| ItemNumberofPartial Delivery | | |
| ItemQuantityTolerance | | |
| ItemMaximumLeadTime | | |
| ItemTransportServiceLevel | | |
| ItemTranportCondition | | |
| ItemTransportDescription | | |
| ContractReference | | Contract |
| QuoteReference | | Quote |
| CatalogueReference | | Catalogue |
| ItemAttachmentID | | |
| ItemAttachmentFilename | | |

-continued

| |
|---|
| ItemDescription |
| ScheduleLineID |
| DeliveryPeriod |
| Quantity |
| ConfirmedScheduleLineID |
| ConfirmedDeliveryPeriod |
| ConfirmedQuantity |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscountTerms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation | | | 0 . . . 1 |
| | Description | | | |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |
| | | ScheduleLine | | | 0 . . . n |
| | | | Delivery Period | | 1 |
| | | ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. Communication between components takes place via messages that contain business documents. The business document ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 27A:
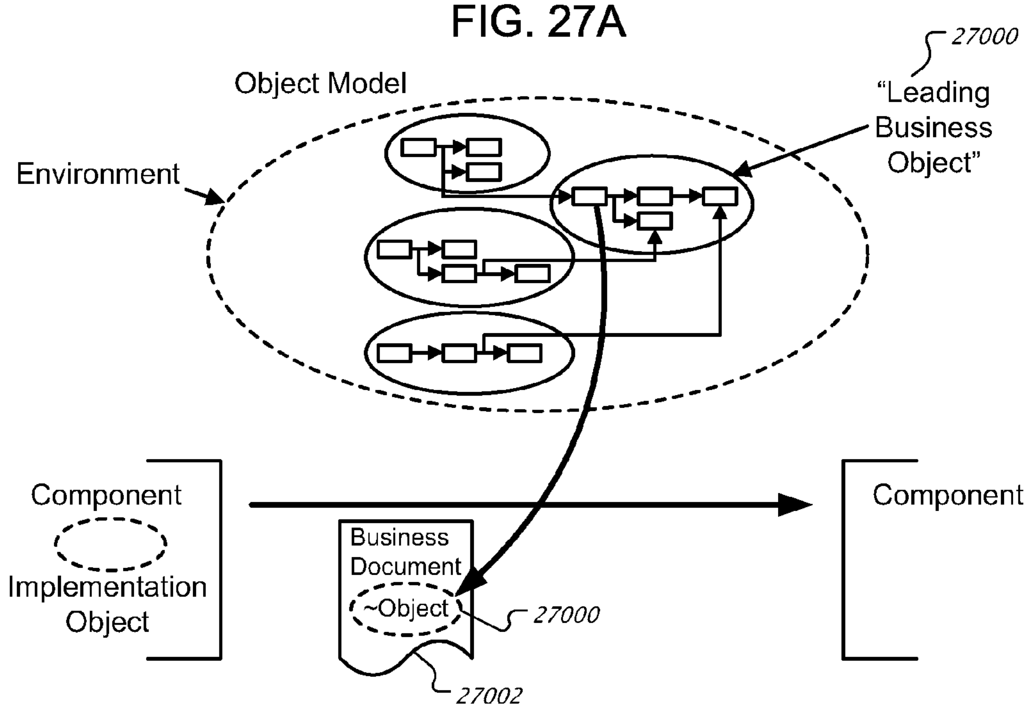
Figure 27B:
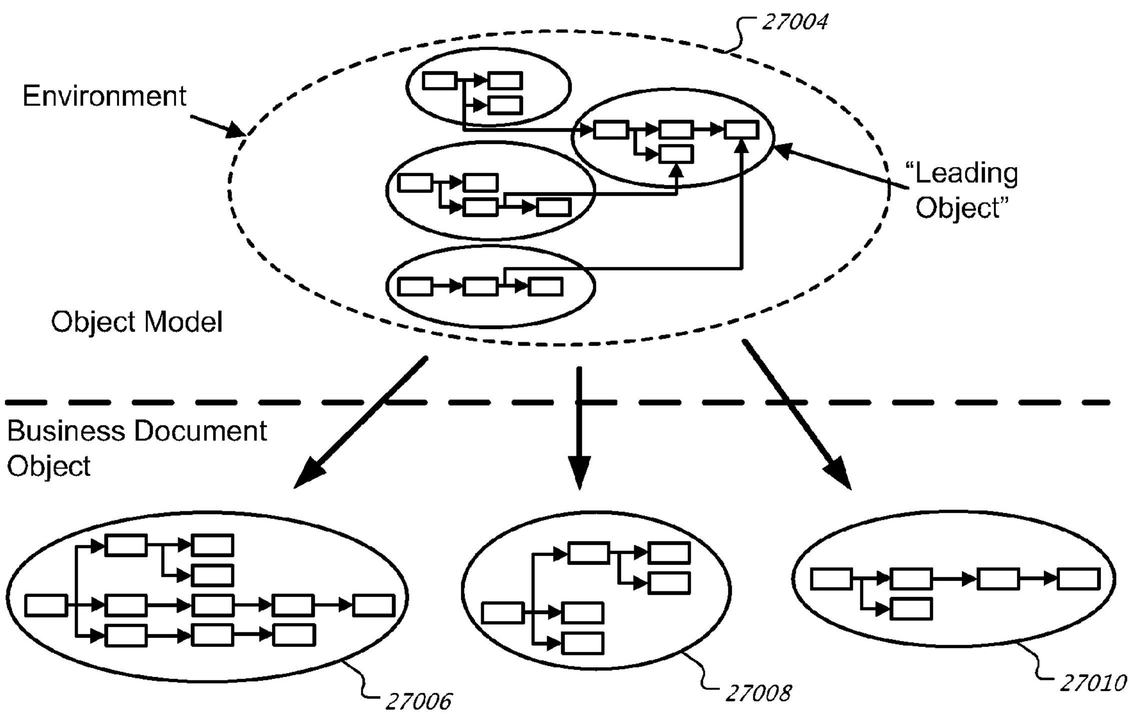

As illustrated in FIG. 27B, several business document objects 27006, 27008, and 27010 as overlapping views may be derived for a given leading object 27004. Each business document object results from the object model by hierarchization.

Figure 27C:
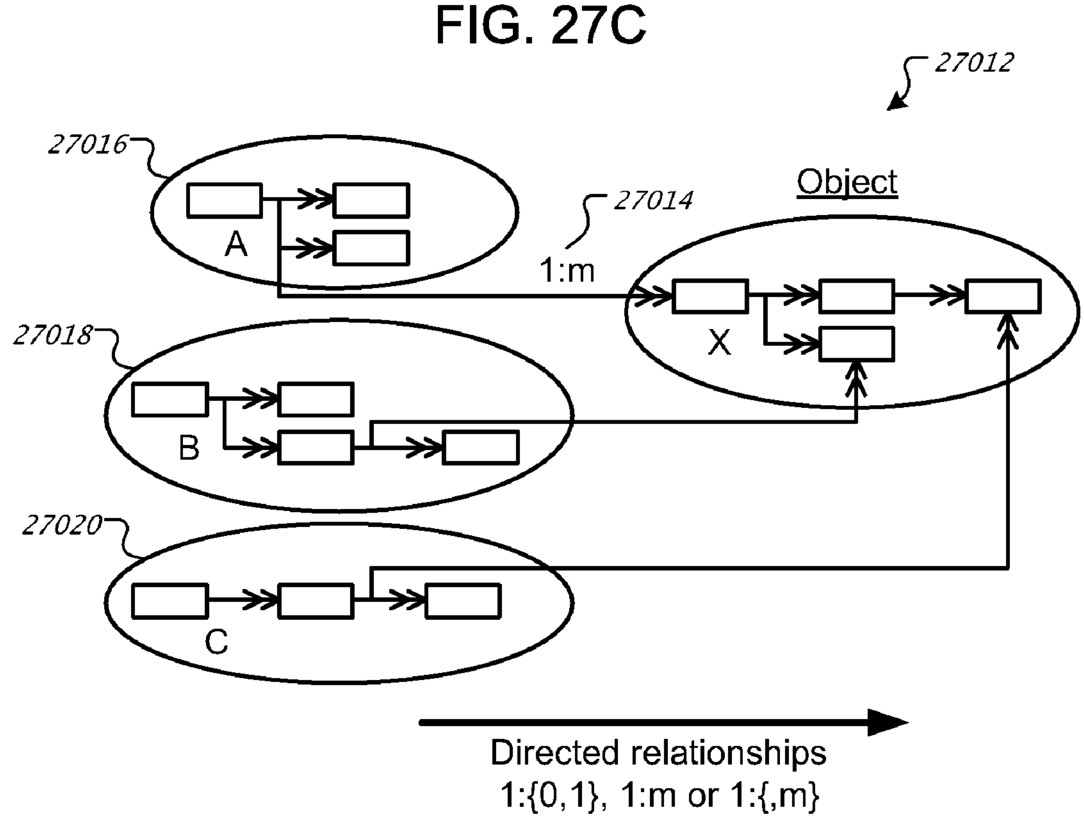

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
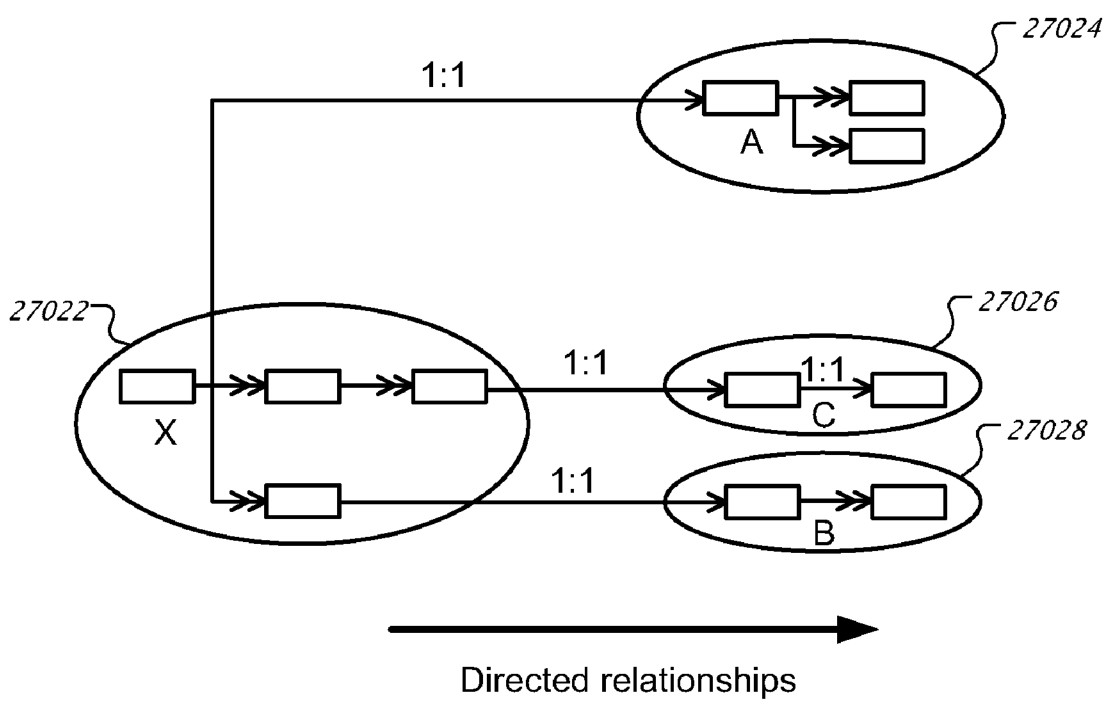

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.

The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process.

Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
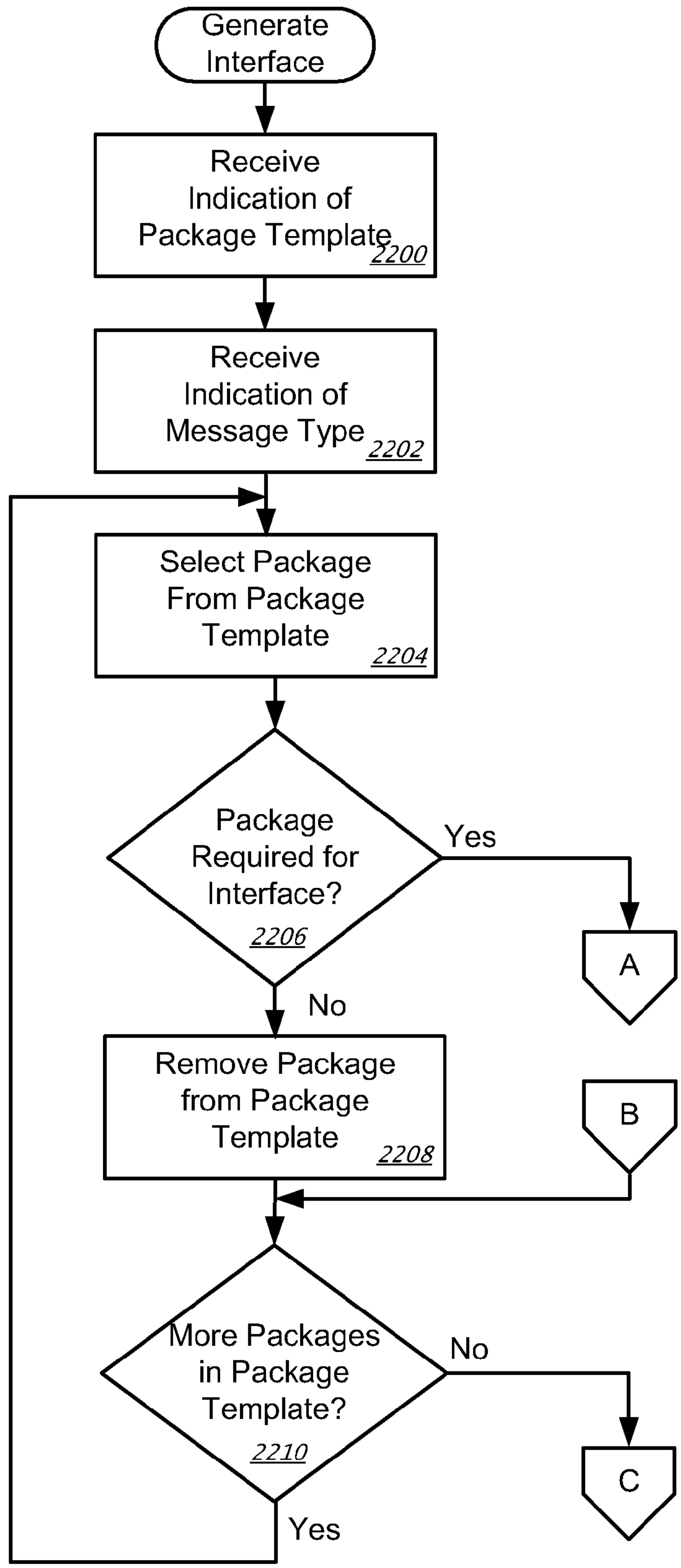
FIGS. 22A-F depict a flow diagram of the steps performed to generate an interface from the business object model in accordance with methods and systems consistent with the subject matter described herein.
Figure 22B:
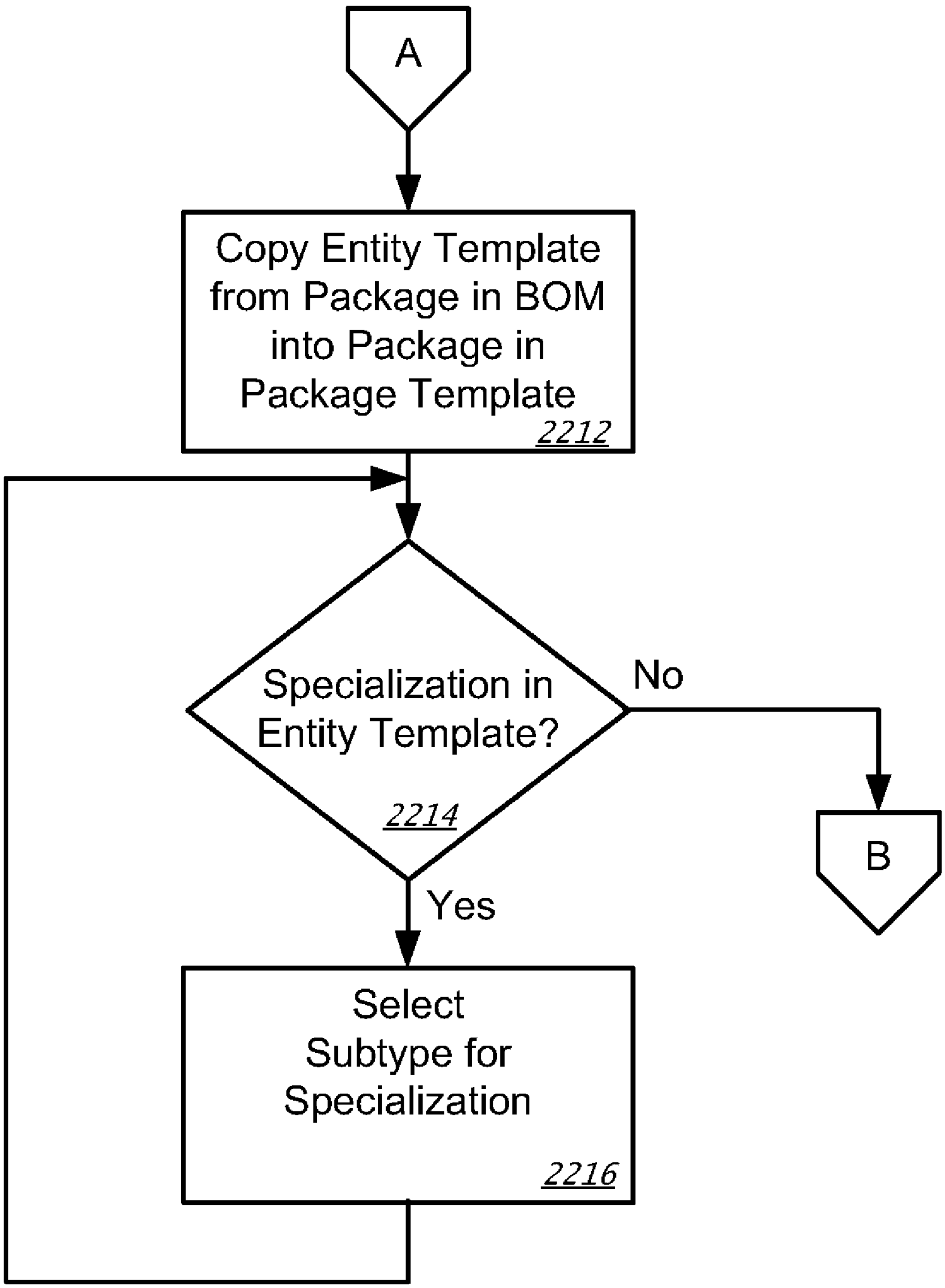
Figure 22C:
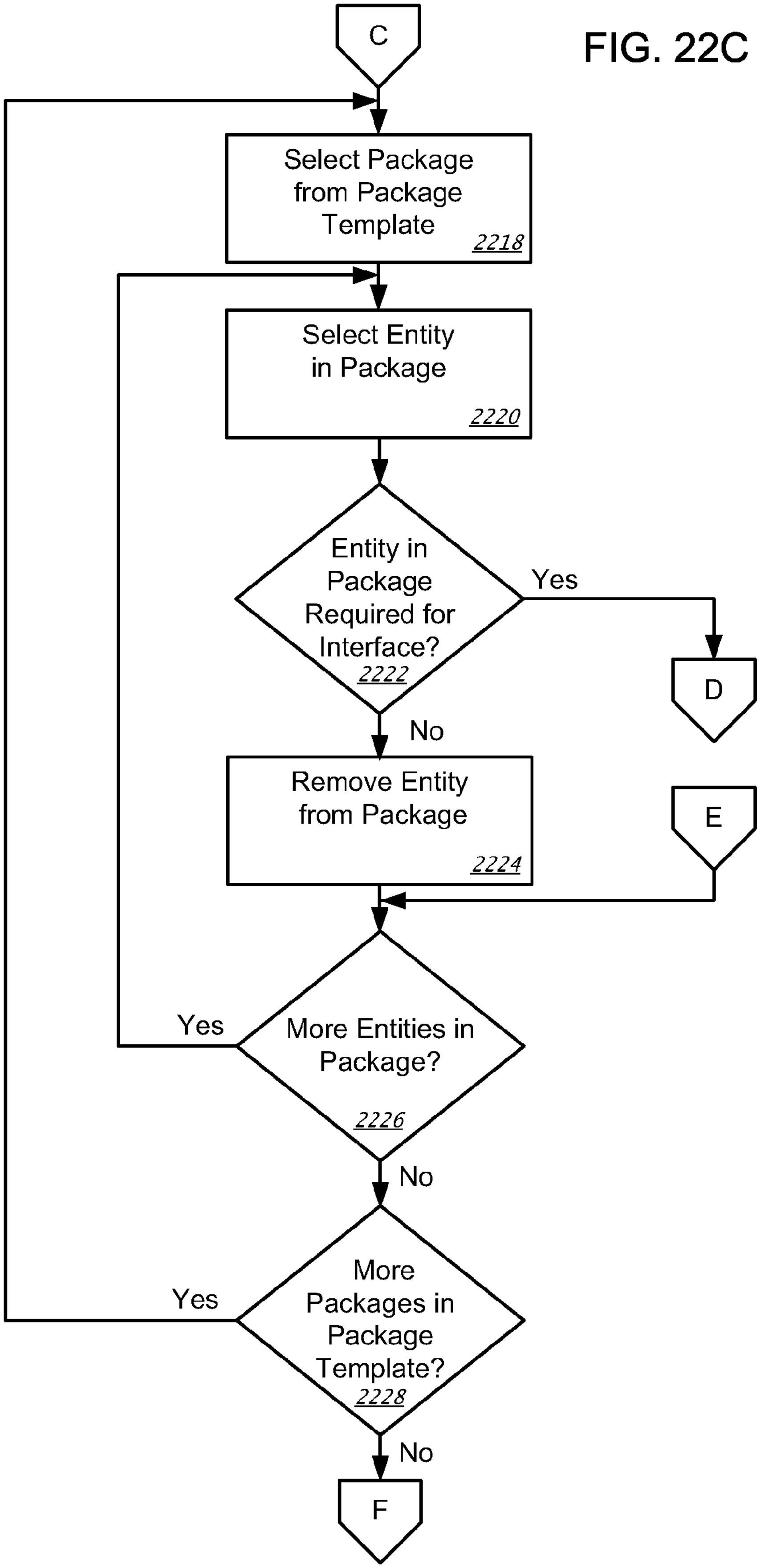

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
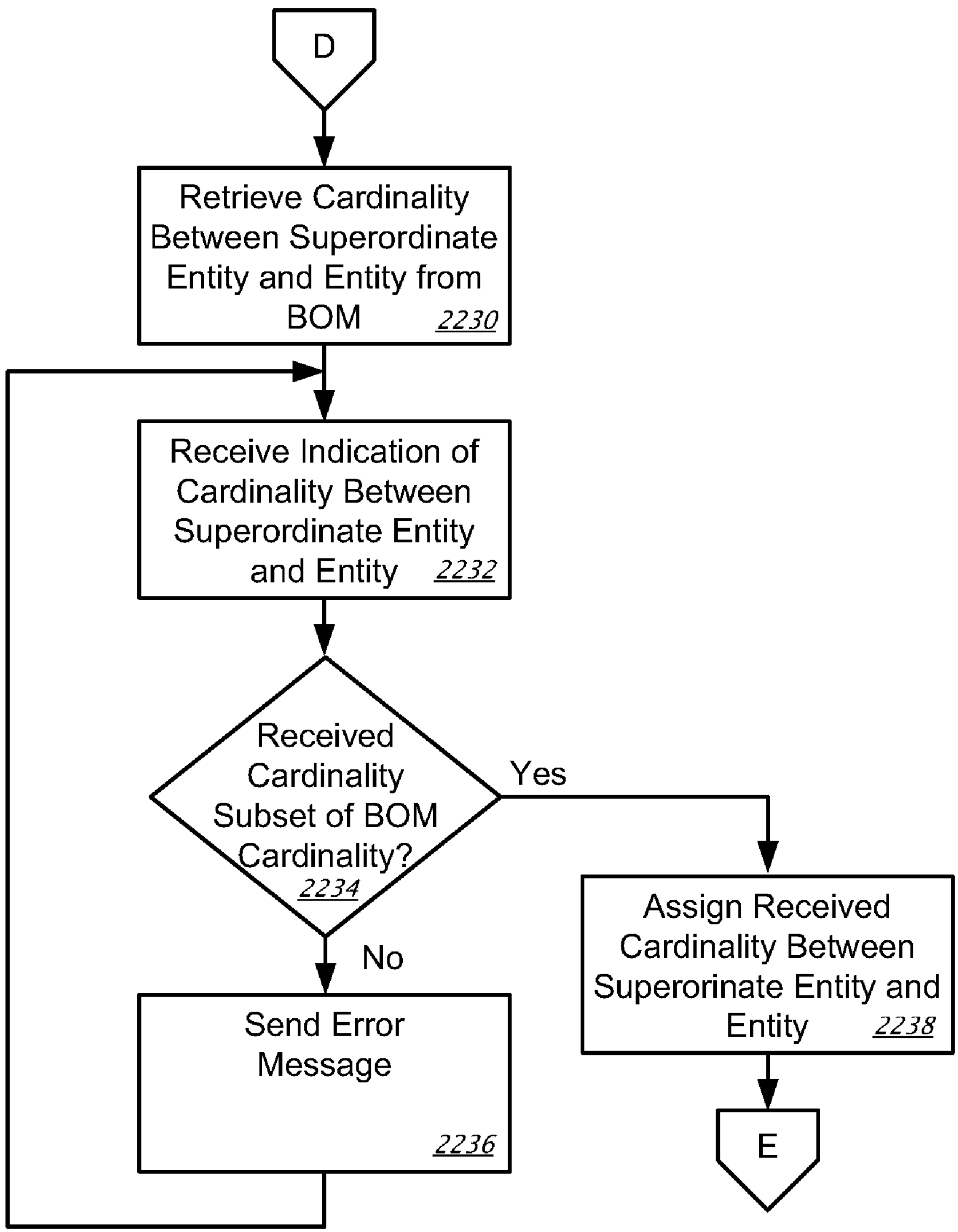

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
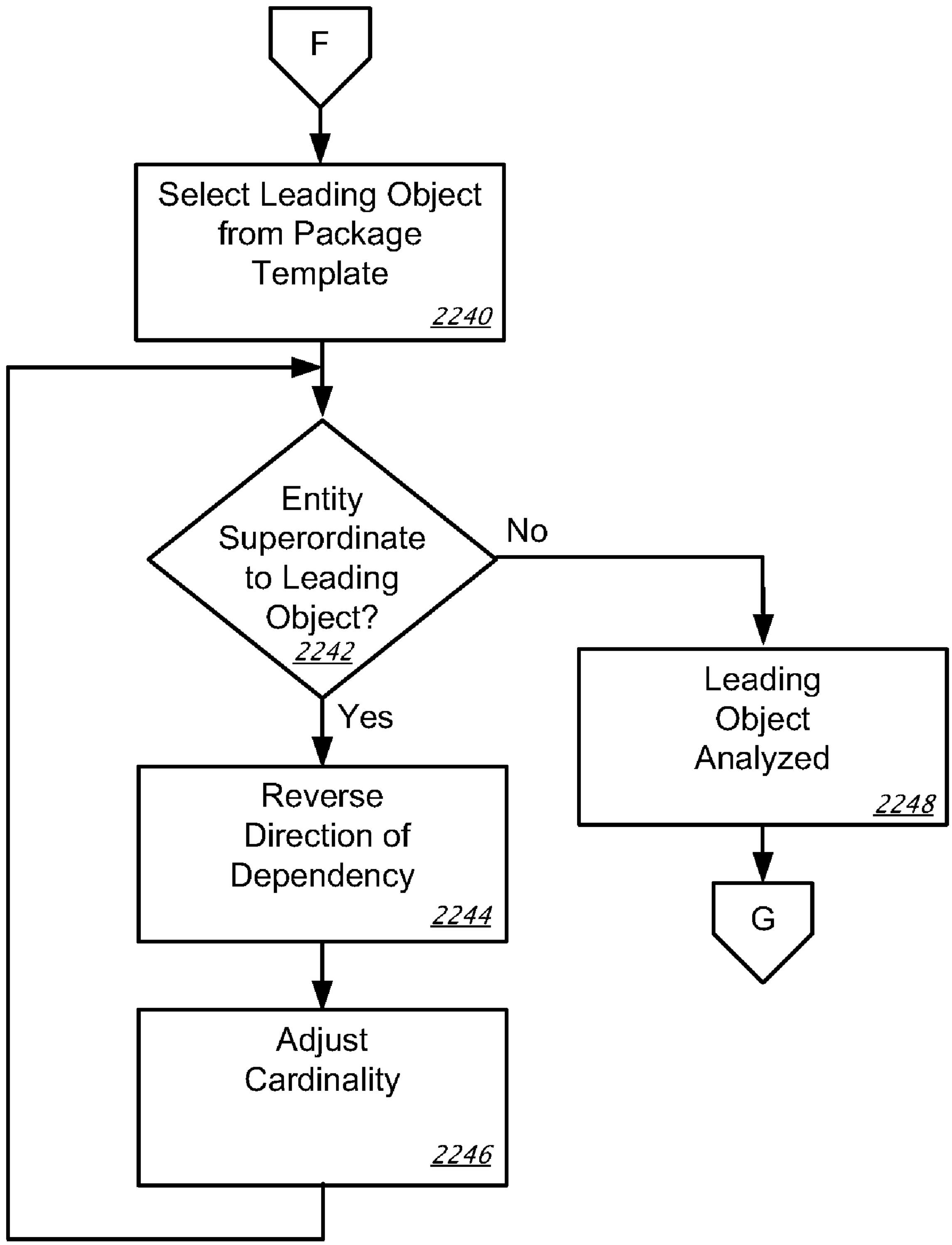

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
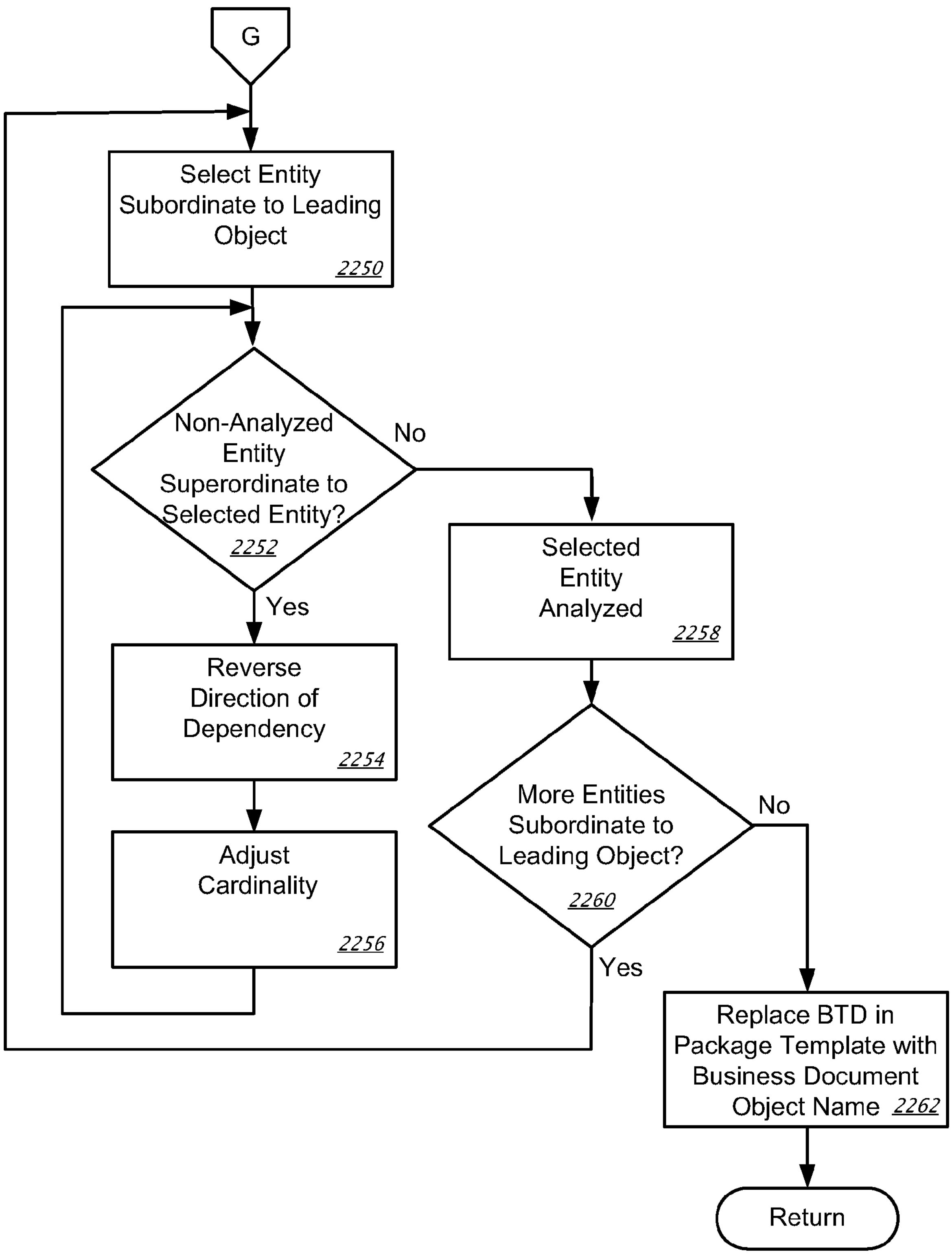

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
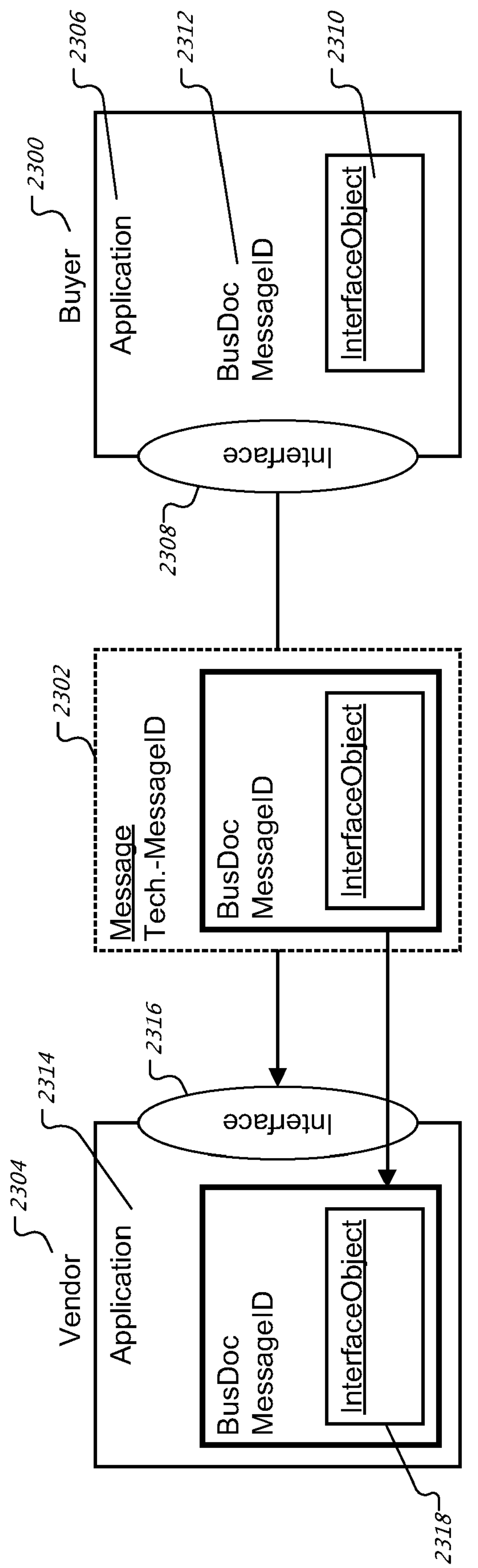
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
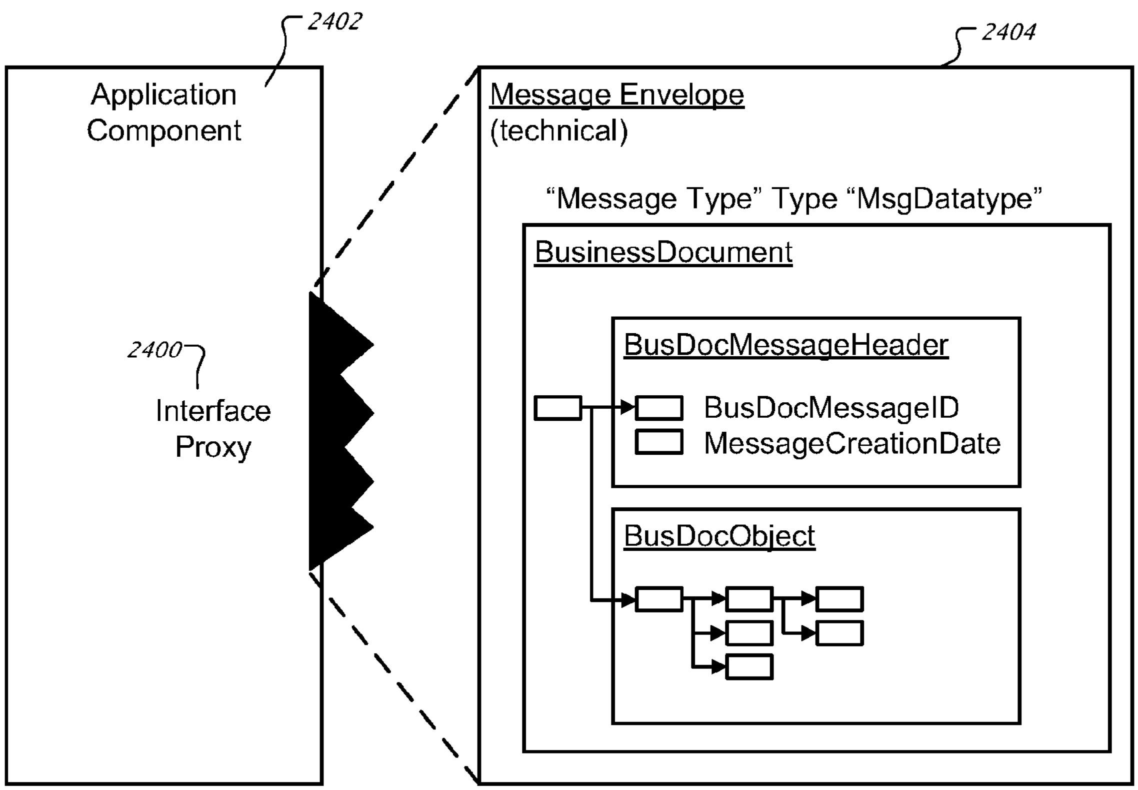
FIG. 24 depicts an interface proxy in accordance with methods and systems consistent with the subject matter described herein.
Figure 25:
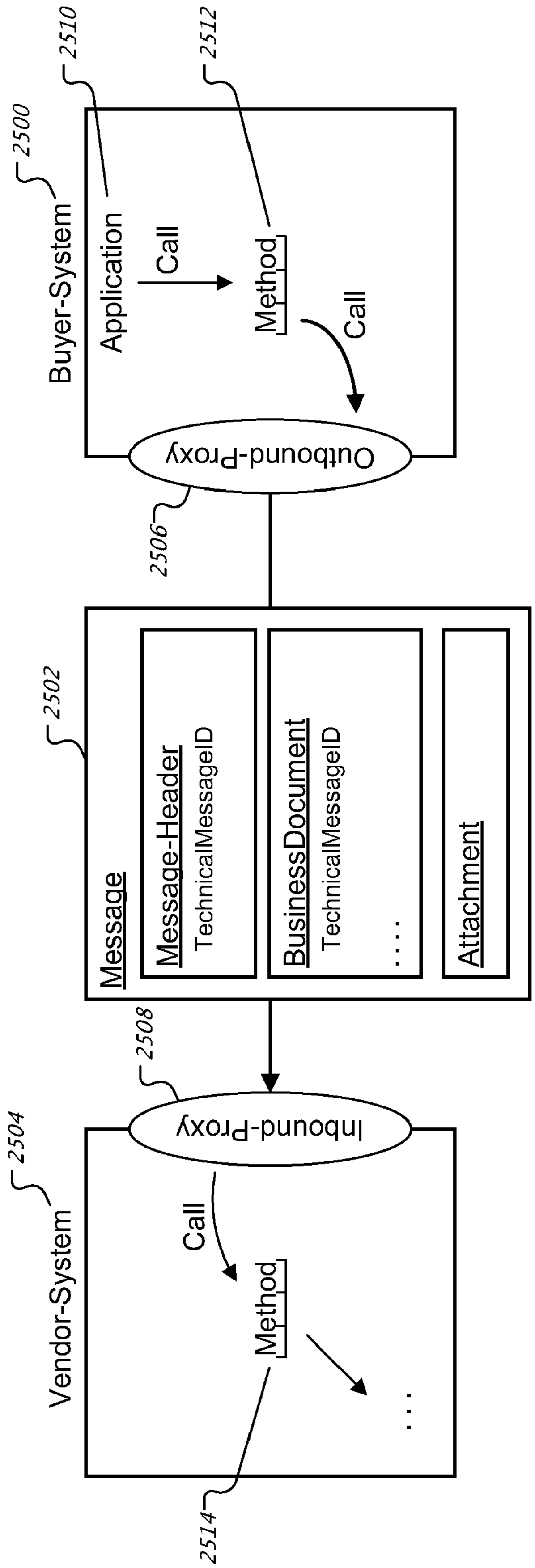
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
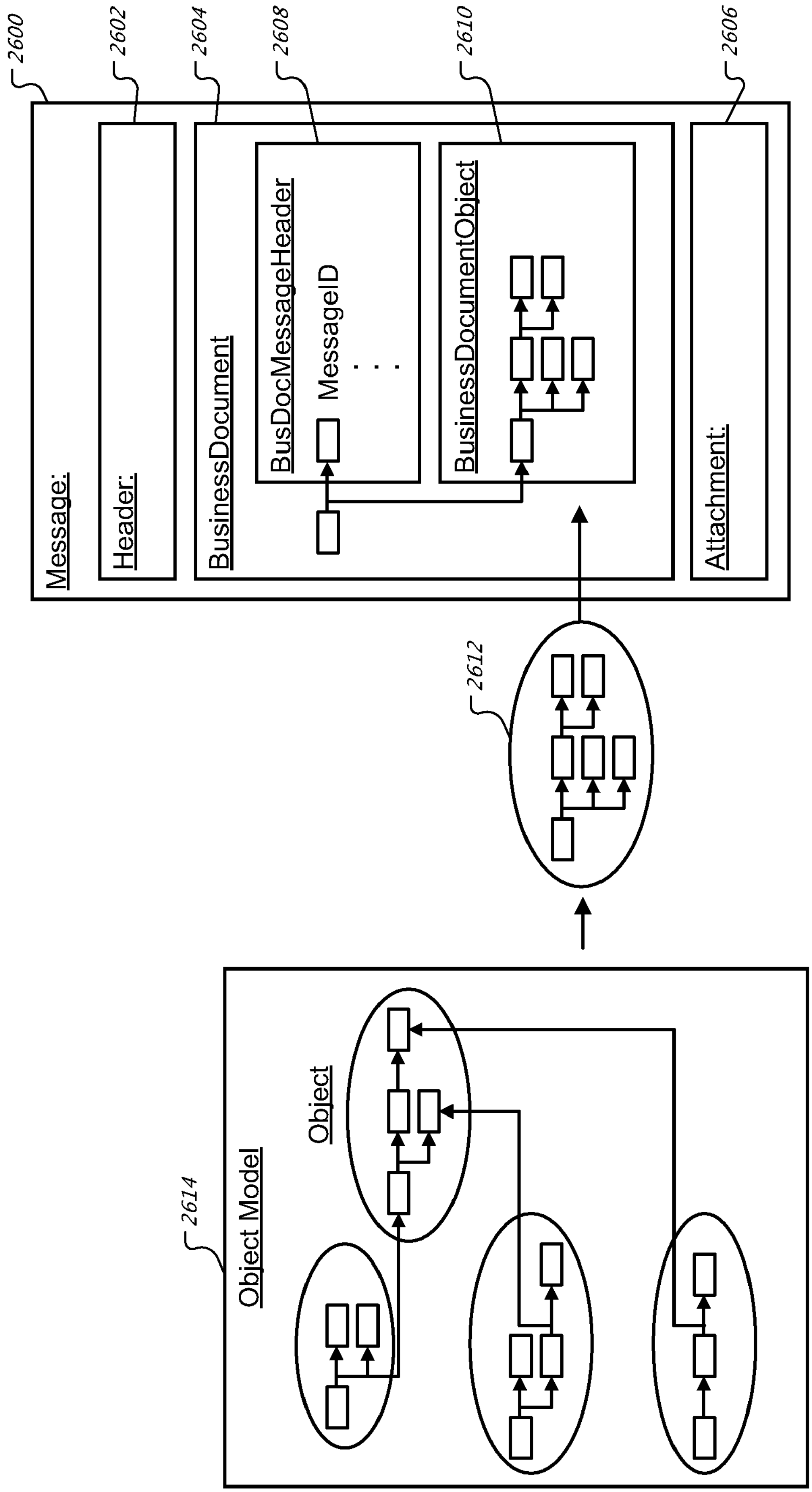
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
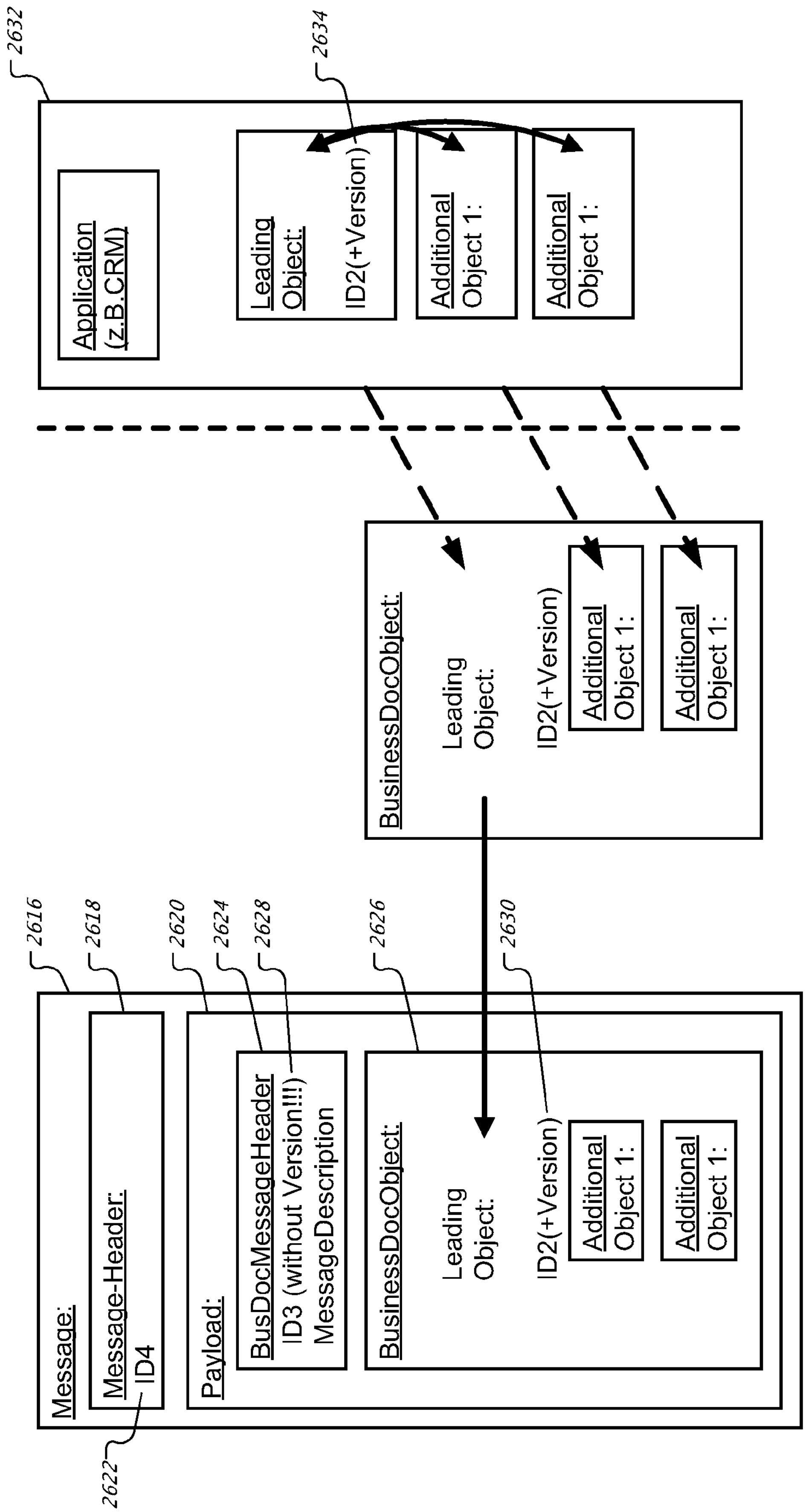
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
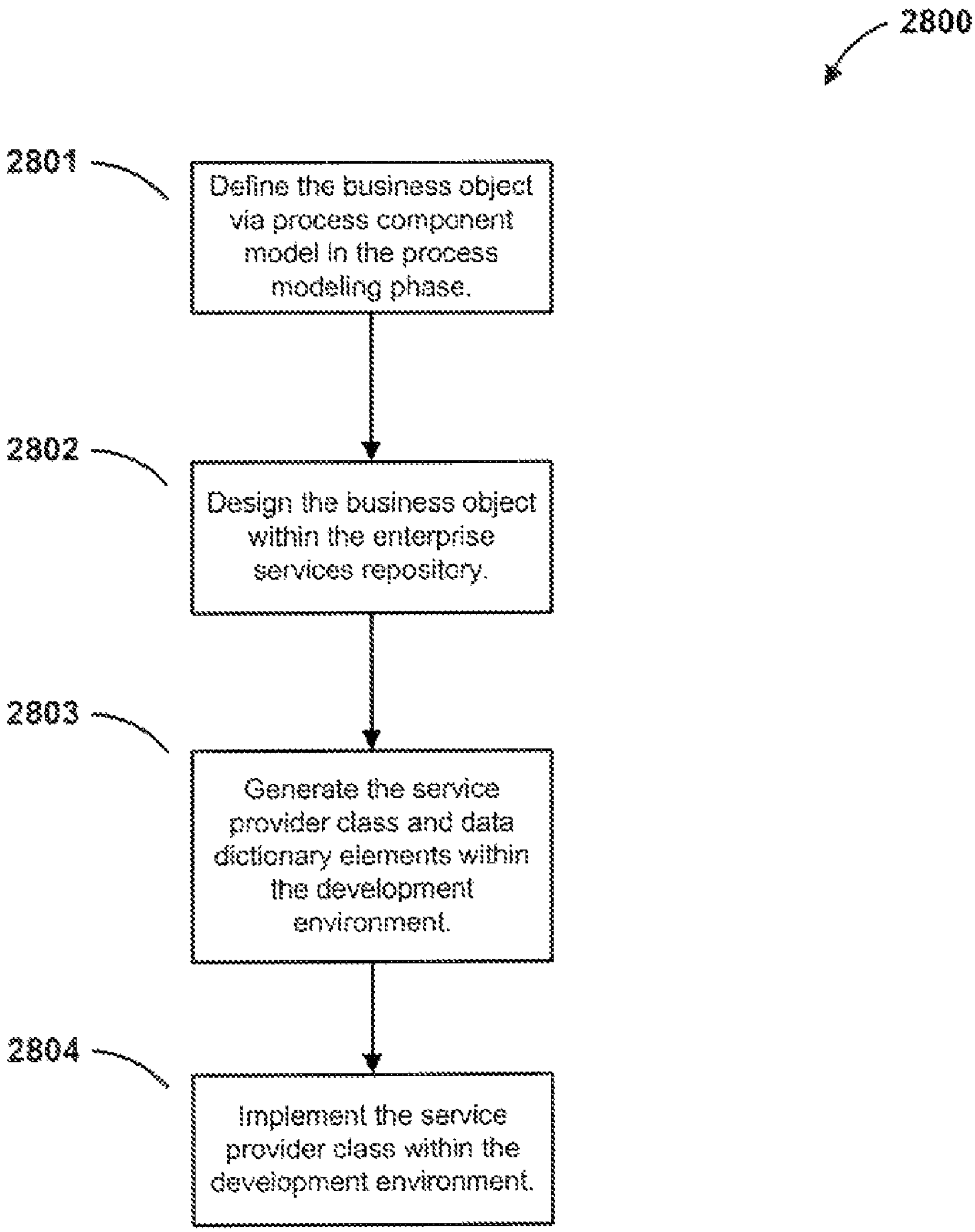
FIG. 28 illustrates an example method for service enabling in accordance with one embodiment of the present disclosure.
Figure 29:
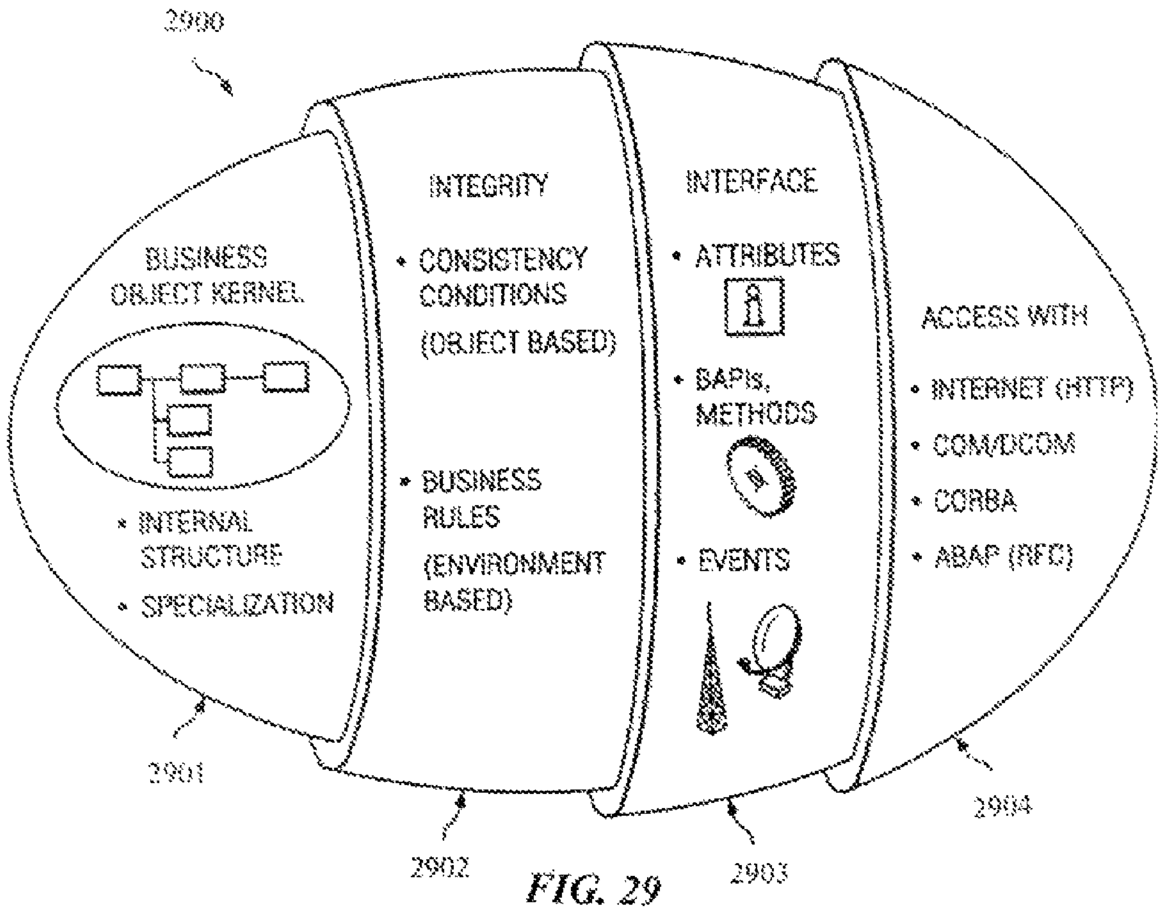
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
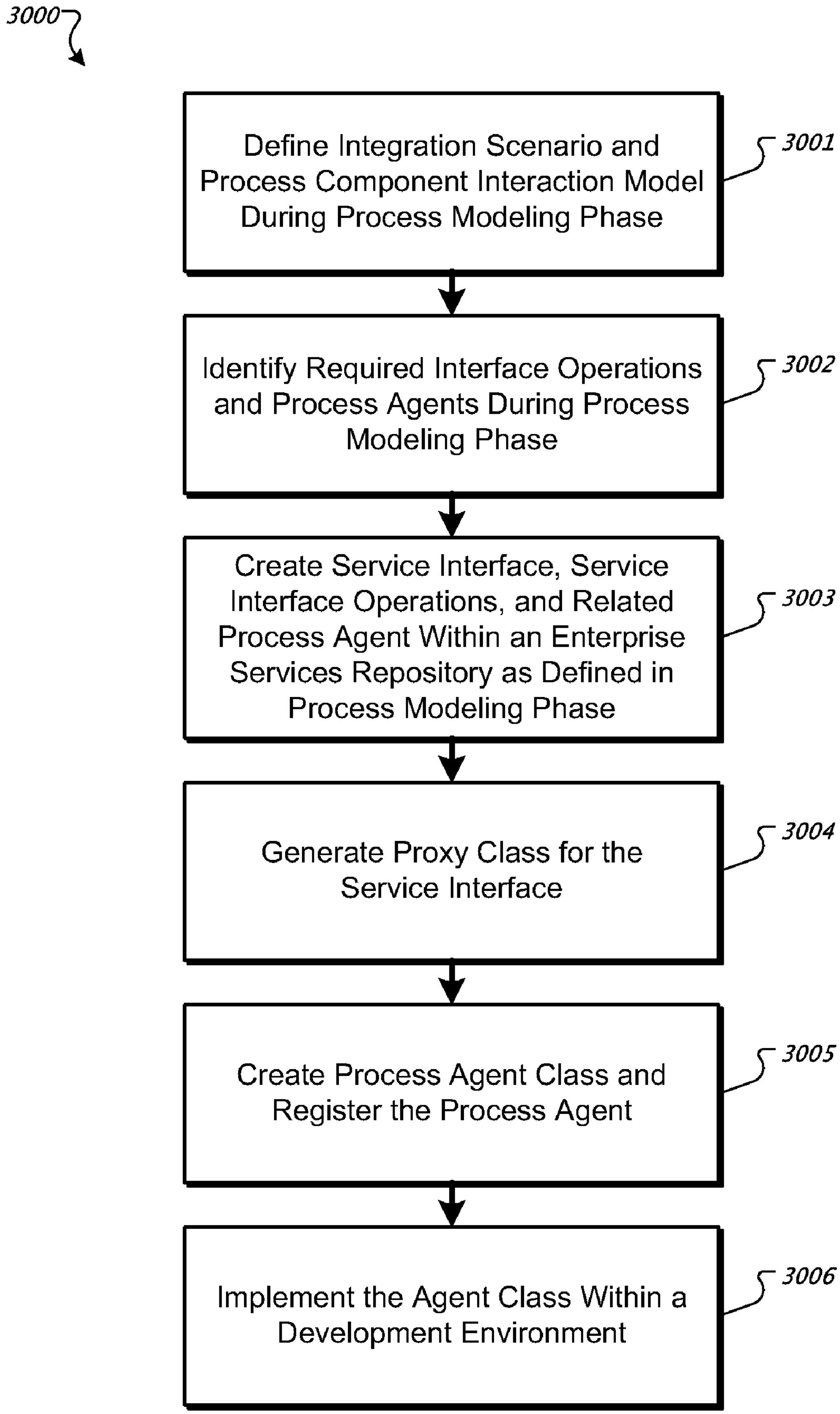
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
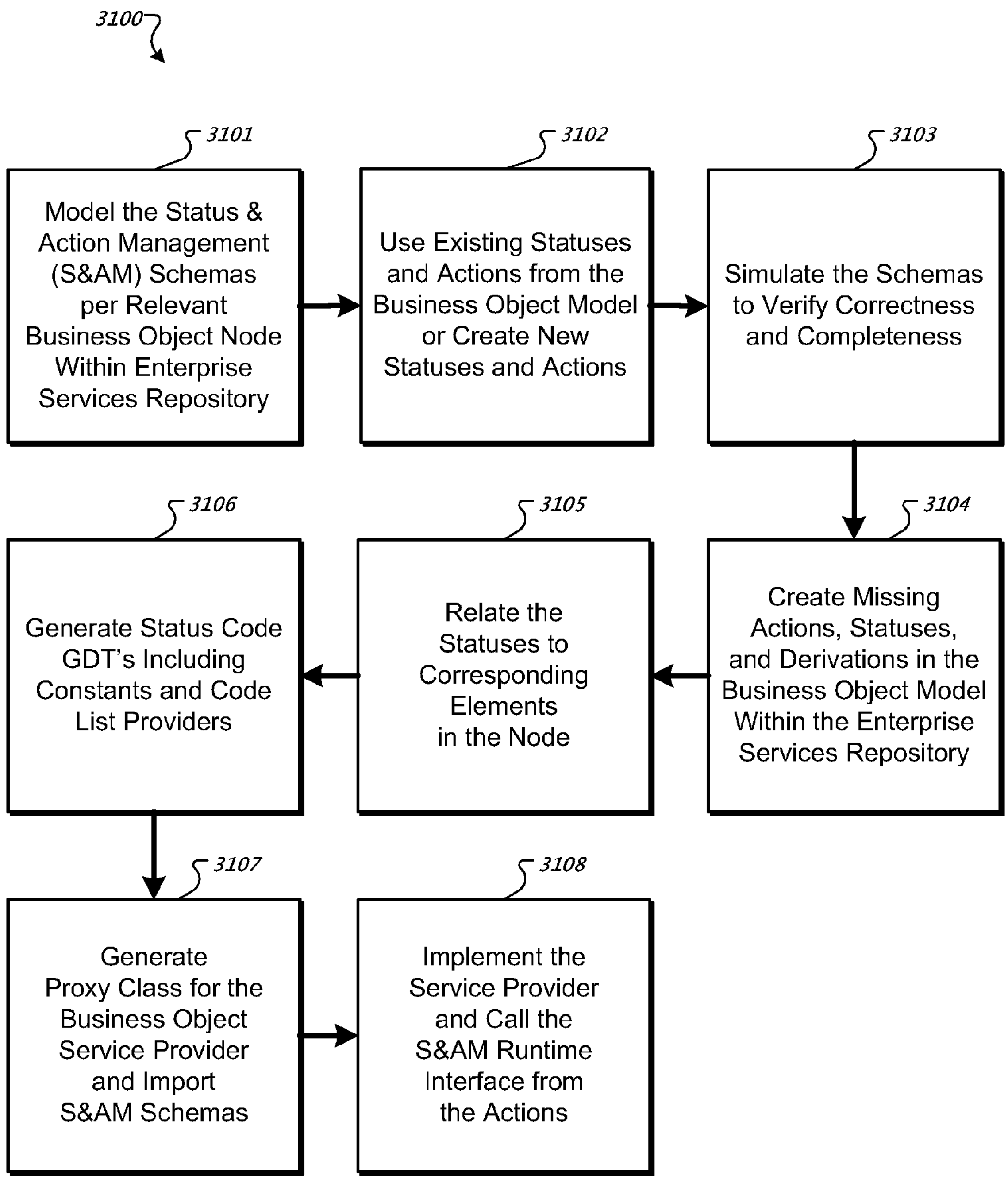
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Figure 32:
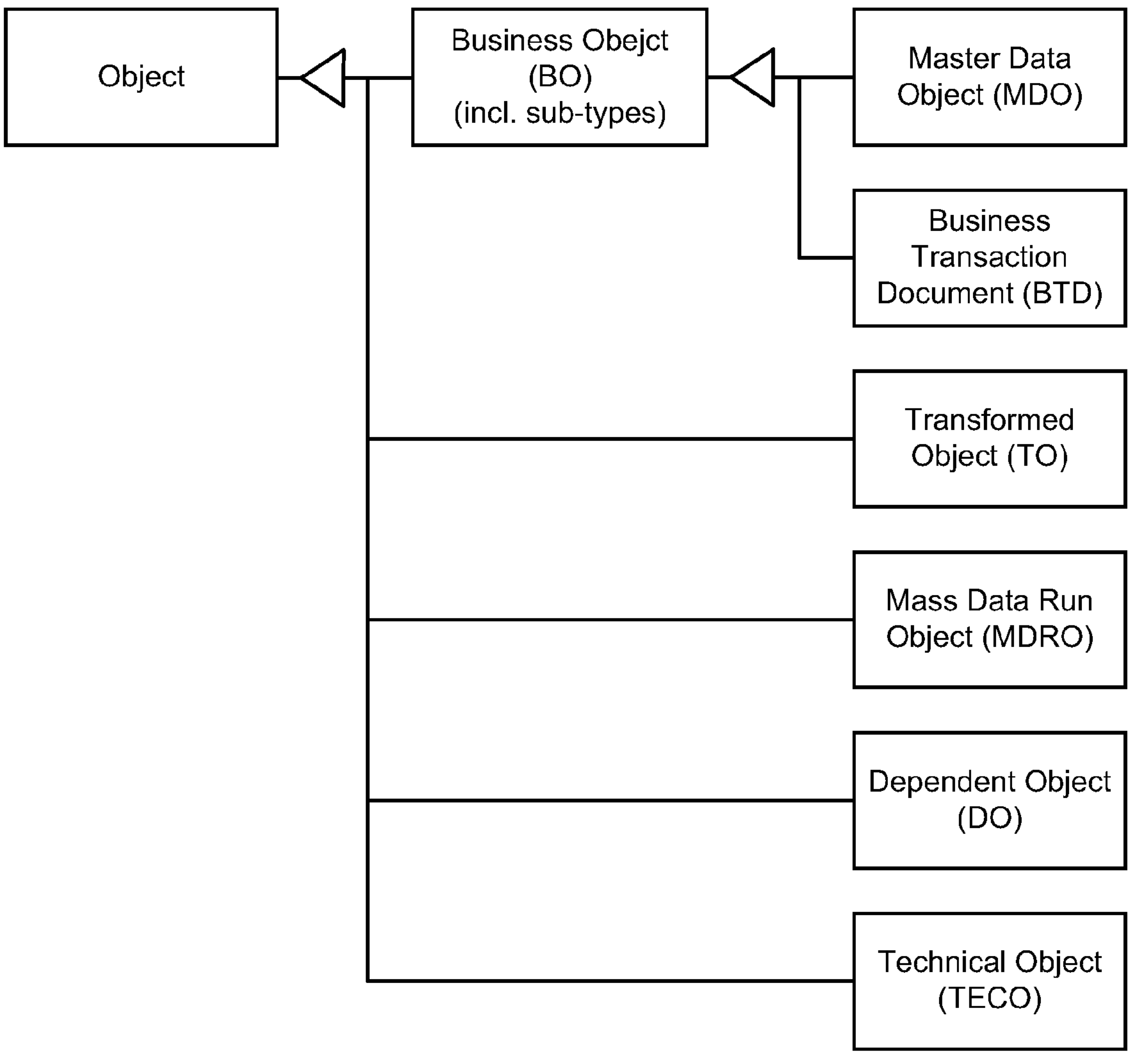
FIG. 32 illustrates various categories of an example object.

FIG. 32 illustrates various categories of an object. The following codelist may be used: Code 1 (i.e., Business Object. A Business Object (BO) may represent a view on a well defined & outlined business content, and may be well known in the business world (for example, in an international standard or industry best practice), and is a self-contained (i.e., capsule), independent business concept), Code 2 (i.e., Master Data Object. A Master Data Object may be considered a business document, which business content is stable over time), Code 3 (i.e., Business Transaction Document. A Business Transaction Document may be considered a document that occurs in business transactions), Code 4 (i.e., Transformed Object. A Transformed Object (TO) may be considered a transformation of multiple Business Objects for a well defined business purpose. It may transform the structure of these BOs with respect to this purpose and contains nodes/attributes derived from the given BOs. It may allow new attributes only for derived information, e.g., summarization, and can implement new Business Logic. It can also contain transformation nodes, but it is not necessary. It may not define UI logic (e.g., the same applies to transformation nodes; UI logic covered by Controller Object)), Code 5 (i.e., Mass Data Run Object. A Mass Data Run Object may be considered a conceptual description of algorithms and their parameters, which modifies/manages/processes a huge amount of data in multiple transactions), Code 6 (i.e., Dependent Object. A Dependent Object ("DO") may be considered a Business Object used as a reuse part in another business object and represents a concept that cannot stand by itself from a business point of view. Instances of dependent objects can only occur in the context of a business objects), Code 7 (i.e., Technical Object. A Technical Object (i.e., TecO) may be considered an object supporting the technical infrastructure or IT Service and Application Management (ITSAM) of application platform. An example of objects for technical infrastructure (i.e., Netweaver) may include:Task, Incident Context). FinancialAccountingViewOfProject Interface In the context of the Composite Project Change Request, the FinancialAccountingViewOfProject can provide the accounting master data and budget information related to a project.

Figure 33:
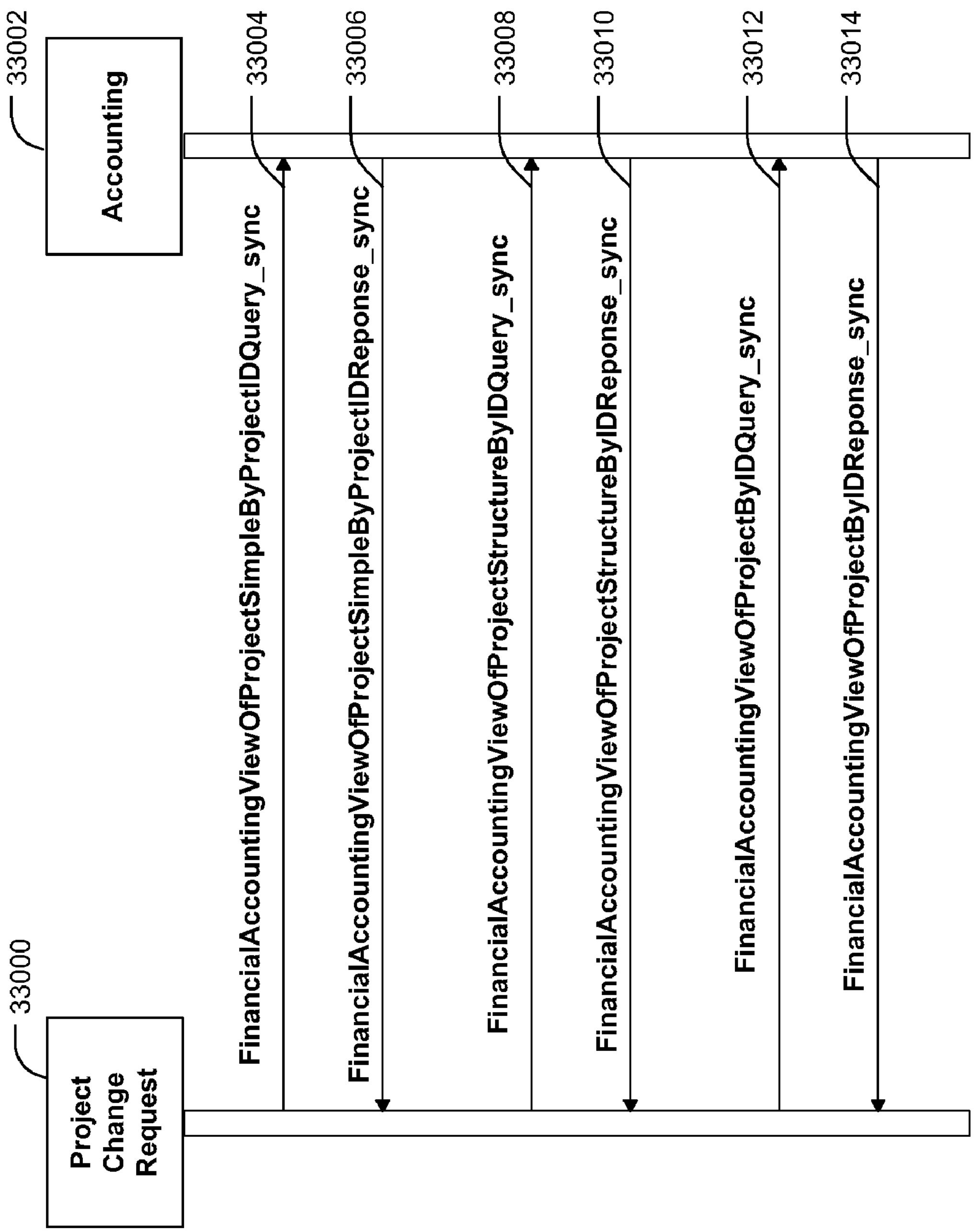
FIG. 33 shows an exemplary AccountingViewOfProject Message Choreography.

The message choreography of FIG. 33 describes a possible logical sequence of messages that can be used to realize an AccountingViewOfProject business scenario. A "ProjectChangeRequest" system 33000 can query financial accounting view of project simple ID using a FinancialAccountingViewOfProjectSimpleByProjectIDQuery_sync message 33004 as shown, for example, in FIG. 33. An "Accounting" system 33002 can respond to the query using a FinancialAccountingViewOfProjectSimpleByProjectIDReponse_sync message 33006 as shown, for example, in FIG. 33. The "ProjectChangeRequest" system 33000 can query financial accounting view of project structure using a FinancialAccountingViewOfProjectStructureByIDQuery_sync message 33008 as shown, for example, in FIG. 33. The "Accounting" system 33002 can respond to the query using a FinancialAccountingViewOfProjectStructureByIDReponse_sync message 33010 as shown, for example, in FIG. 33. The "ProjectChangeRequest" system 33000 can query financial accounting view of project by ID using a FinancialAccountingViewOfProjectByIDQuery_sync message 33012 as shown, for example, in FIG. 33. The "Accounting" system 33002 can respond to the query using a FinancialAccountingViewOfProjectByIDReponse_sync message 33014 as shown, for example, in FIG. 33.

In some implementations, a FinancialAccountingViewOfProjectByIDQuery_sync is a request to return the elements of a specific FinancialAccountingViewOfProject including elements related to budget information. The structure of the message type Financial Accounting ViewOfProjectByIDQuery_sync can be specified by the message data type Financial Accounting ViewOfProjectByIDQueryMessage_sync, which is derived from the message data type Financial Accounting ViewOfProjectMessage_sync.

In some implementations, a Financial AccountingViewOfProjectByIDResponse_sync is the response to a FinancialAccountingViewOfProjectByIDQuery_sync. The structure of the message type Financial AccountingViewOfProjectByIDResponse_sync can be specified by the message data type FinancialAccountingViewOfProjectByID ResponseMessage_sync, which is derived from the message data type Financial AccountingViewOfProjectMessage_sync.

In some implementations, a FinancialAccountingViewOfProjectStructureByIDQuery_sync is a request to return the elements describing the structure of a specific FinancialAccountingViewOfProject. The structure of the message type FinancialAccountingViewOfProjectStructureByIDQuery_sync can be specified by the message data type FinancialAccountingViewOfProjectStructureByIDQueryMessage_sync, which is derived from the message data type FinancialAccountingViewOfProjectMessage_sync.

In some implementations, a FinancialAccountingViewOfProjectStructureByIDResponse_sync is the response to a FinancialAccountingViewOfProjectByIDStructureQuery_sync. The structure of the message type Financial AccountingViewOfProjectStructureByIDResponse_sync can be specified by the message data type Financial AccountingViewOfProjectStructureByIDResponseMessage_sync, which is derived from the message data type FinancialAccounting-ViewOfProjectMessage_sync.

In some implementations, a FinancialAccountingViewOf-ProjectSimpleByProjectIDQuery_sync is a query to find all accounting views on project to which a specific project in cProjects is assigned. A Financial AccountingViewOf-ProjectSimpleByProjectIDResponse_sync can be the response to a Financial AccountingViewOfProjectSimpleBy ProjectIDQuery_sync.

Interfaces can include Financial AccountingViewOf-ProjectStructureBy IDQueryResponse_In, FinancialAc-countingViewOfProjectByID QueryResponse_In and Finan-cialAccountingView OfProject SimpleByProjectID QueryResponse_In.

Figure 34:
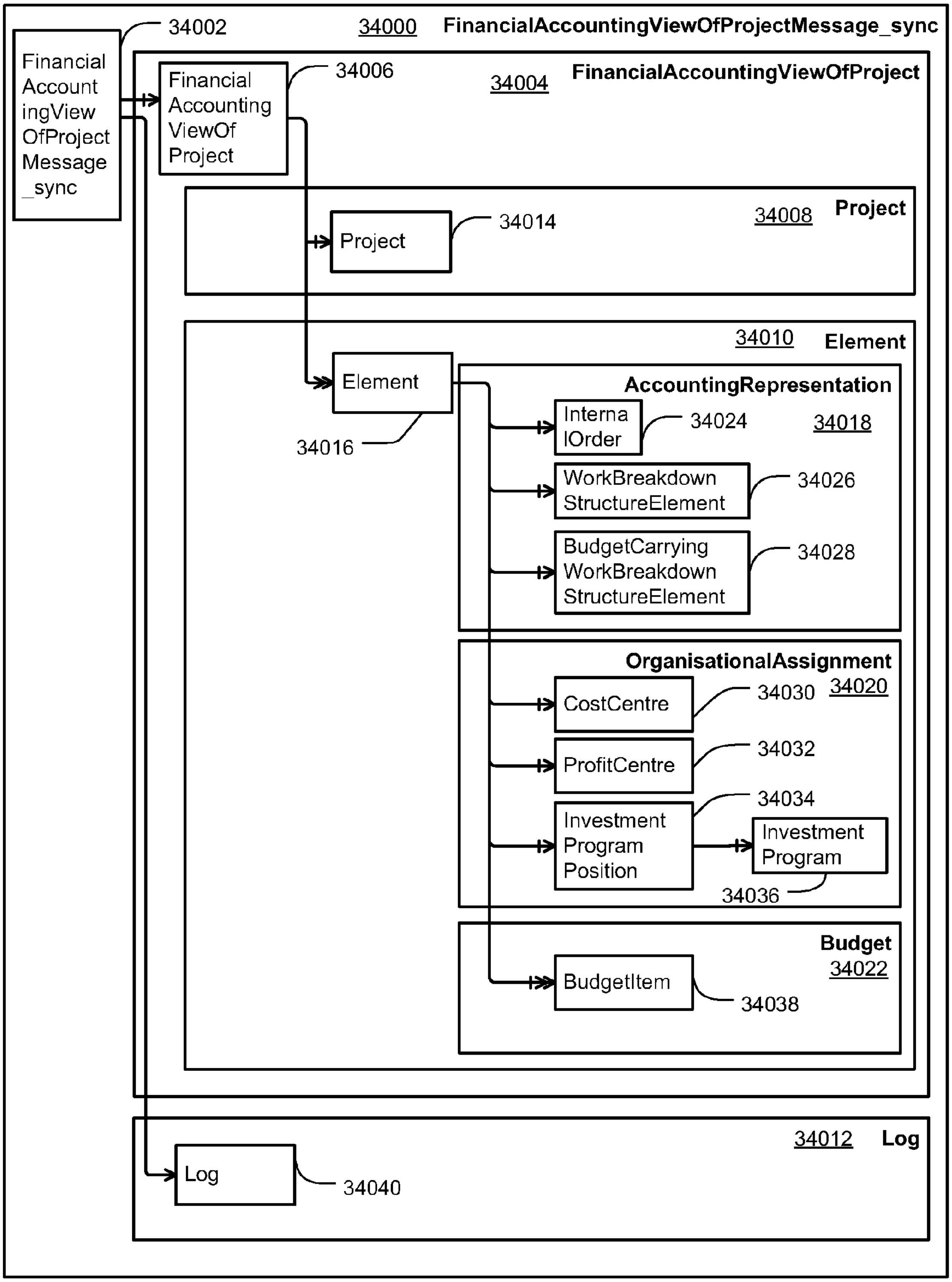
FIG. 34 shows an exemplary FinancialAccountingViewOfProjectMessage Message Data Type.

FIG. 34 illustrates one example logical configuration of FinancialAccountingViewOfProjectMessage_sync message 34000. Specifically, this figure depicts the arrangement and hierarchy of various components such as one or more levels of packages, entities, and datatypes, shown here as 34000 to 34040. As described above, packages may be used to represent hierarchy levels. Entities are discrete business elements that are used during a business transaction. Data types are used to type object entities and interfaces with a structure. For example, FinancialAccountingViewOfProjectMessage_sync message 34000 includes, among other things, FinancialAc-countingViewOfProject 34004. Accordingly, heterogeneous applications may communicate using this consistent message configured as such.

Figure 35:
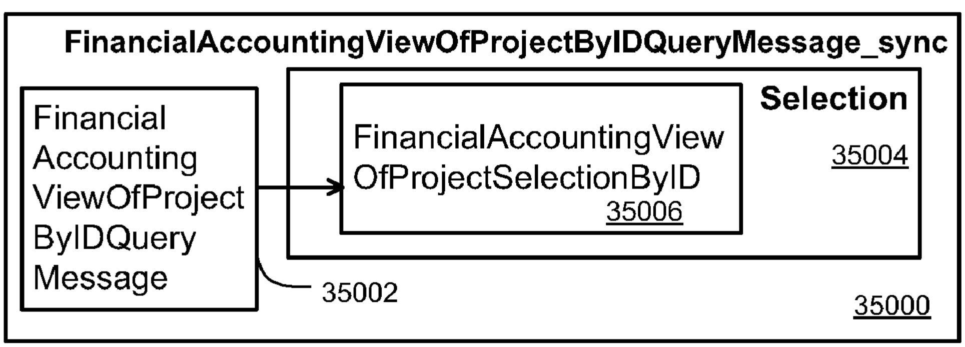
FIG. 35 shows an exemplary FinancialAccountingViewOfProjectByIDQueryMessage Message Data Type.

Additionally, FIG. 35 illustrates one example logical configuration of Financial AccountingViewOfProjectBy-IDQueryMessage_sync message 35000. Specifically, this figure depicts the arrangement and hierarchy of various components such as one or more levels of packages, entities, and datatypes, shown here as 35000 to 35006. As described above, packages may be used to represent hierarchy levels. Entities are discrete business elements that are used during a business transaction. Data types are used to type object entities and interfaces with a structure. For example, Financial-AccountingViewOfProjectByIDQueryMessage_sync message 35000 includes, among other things, Selection 35004. Accordingly, heterogeneous applications may communicate using this consistent message configured as such.

Figure 36:
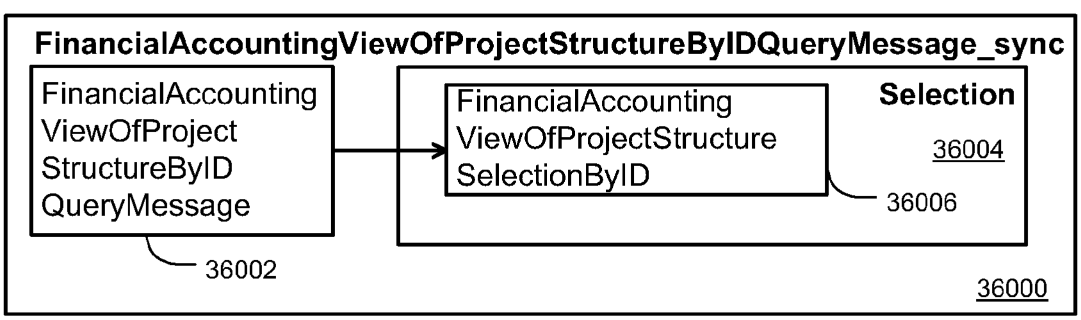
FIG. 36 shows an exemplary FinancialAccountingViewOfProjectStructureByIDQueryMessage Message Data Type.

Additionally, FIG. 36 illustrates one example logical configuration of Financial AccountingViewOfProjectStruc-tureByIDQueryMessage_sync message 36000. Specifically, this figure depicts the arrangement and hierarchy of various components such as one or more levels of packages, entities, and datatypes, shown here as 36000 to 36006. As described above, packages may be used to represent hierarchy levels. Entities are discrete business elements that are used during a business transaction. Data types are used to type object entities and interfaces with a structure. For example, Financial-AccountingViewOfProjectStruc-tureByIDQueryMessage_sync message 36000 includes, among other things, Selection 36004. Accordingly, heterogeneous applications may communicate using this consistent message configured as such.

Figure 37:
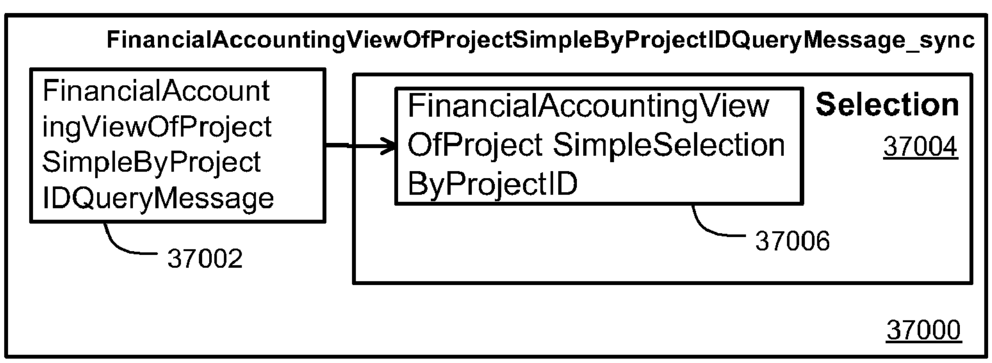
FIG. 37 shows an exemplary FinancialAccountingViewOfProjectSimpleByProjectIDQueryMessage Message Data Type.

Additionally, FIG. 37 illustrates one example logical configuration of Financial AccountingViewOf-ProjectSimpleByProjectIDQueryMessage_sync message 37000. Specifically, this figure depicts the arrangement and hierarchy of various components such as one or more levels of packages, entities, and datatypes, shown here as 37000 to 37006. As described above, packages may be used to represent hierarchy levels. Entities are discrete business elements that are used during a business transaction. Data types are used to type object entities and interfaces with a structure. For example, Financial AccountingViewOf-ProjectSimpleByProjectID QueryMessage_sync message 37000 includes, among other things, Selection 37004. Accordingly, heterogeneous applications may communicate using this consistent message configured as such.

Figure 38:
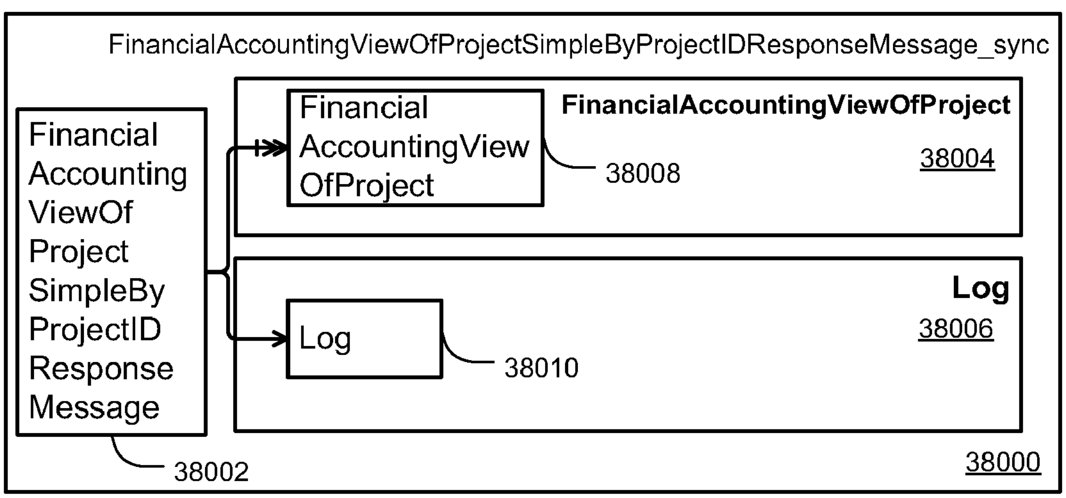
FIG. 38 shows an exemplary FinancialAccountingViewOfProjectSimpleByProjectIDResponseMessage Message Data Type.

Additionally, FIG. 38 illustrates one example logical configuration of Financial AccountingViewOf-ProjectSimpleByProjectID ResponseMessage_sync message 38000. Specifically, this figure depicts the arrangement and hierarchy of various components such as one or more levels of packages, entities, and datatypes, shown here as 38000 to 38010. As described above, packages may be used to represent hierarchy levels. Entities are discrete business elements that are used during a business transaction. Data types are used to type object entities and interfaces with a structure. For example, Financial AccountingViewOf-ProjectSimpleByProjectID ResponseMessage_sync message 38000 includes, among other things, Log 38006. Accordingly, heterogeneous applications may communicate using this consistent message configured as such.

Additionally, FIG. 39 illustrates one example logical configuration of FinancialAccountingViewOfProjectMessage message 39000. Specifically, this figure depicts the arrangement and hierarchy of various components such as one or more levels of packages, entities, and datatypes, shown here as 39000 to 39030. As described above, packages may be used to represent hierarchy levels. Entities are discrete business elements that are used during a business transaction. Data types are used to type object entities and interfaces with a structure. For example, FinancialAccountingViewOf-ProjectMessage message 39000 includes, among other things, FinancialAccountingViewOfProjectMessage 39002. Accordingly, heterogeneous applications may communicate using this consistent message configured as such.

Additionally, FIGS. 40-1 through 40-8 illustrate one example logical configuration of FinancialAccounting-ViewOfProjectMessage message 40000. Specifically, this figure depicts the arrangement and hierarchy of various components such as one or more levels of packages, entities, and datatypes, shown here as 40000 to 40220. As described above, packages may be used to represent hierarchy levels. Entities are discrete business elements that are used during a business transaction. Data types are used to type object entities and interfaces with a structure. For example, Financial-AccountingViewOfProjectMessage message 40000 includes, among other things, FinancialAccountingViewOf-ProjectMessage 40002. Accordingly, heterogeneous applications may communicate using this consistent message configured as such.

Additionally, FIGS. 41-1 through 41-8 illustrate one example logical configuration of FinancialAccounting-ViewOfProjectMessage message 41000. Specifically, this figure depicts the arrangement and hierarchy of various components such as one or more levels of packages, entities, and datatypes, shown here as 41000 to 41210. As described above, packages may be used to represent hierarchy levels. Entities are discrete business elements that are used during a business transaction. Data types are used to type object entities and interfaces with a structure. For example, Financial-AccountingViewOfProjectMessage message 41000 includes, among other things, FinancialAccountingViewOf-ProjectMessage 41002. Accordingly, heterogeneous applications may communicate using this consistent message configured as such.

Additionally, FIG. 42 illustrates one example logical configuration of FinancialAccountingViewOfProjectMessage message 42000. Specifically, this figure depicts the arrangement and hierarchy of various components such as one or more levels of packages, entities, and datatypes, shown here as 42000 to 42016. As described above, packages may be used to represent hierarchy levels. Entities are discrete business elements that are used during a business transaction. Data types are used to type object entities and interfaces with a structure. For example, FinancialAccountingViewOfProjectMessage message 42000 includes, among other things, FinancialAccountingViewOfProjectMessage 42002. Accordingly, heterogeneous applications may communicate using this consistent message configured as such.

Additionally, FIG. 43 illustrates one example logical configuration of FinancialAccountingViewOfProjectMessage message 43000. Specifically, this figure depicts the arrangement and hierarchy of various components such as one or more levels of packages, entities, and datatypes, shown here as 43000 to 43030. As described above, packages may be used to represent hierarchy levels. Entities are discrete business elements that are used during a business transaction. Data types are used to type object entities and interfaces with a structure. For example, FinancialAccountingViewOfProjectMessage message 43000 includes, among other things, FinancialAccountingViewOfProjectMessage 43002. Accordingly, heterogeneous applications may communicate using this consistent message configured as such.

Additionally, FIG. 44 illustrates one example logical configuration of FinancialAccountingViewOfProjectMessage message 44000. Specifically, this figure depicts the arrangement and hierarchy of various components such as one or more levels of packages, entities, and datatypes, shown here as 44000 to 44022. As described above, packages may be used to represent hierarchy levels. Entities are discrete business elements that are used during a business transaction. Data types are used to type object entities and interfaces with a structure. For example, FinancialAccountingViewOfProjectMessage message 44000 includes, among other things, FinancialAccountingViewOfProjectMessage 44002. Accordingly, heterogeneous applications may communicate using this consistent message configured as such.

Additionally, FIGS. 45-1 through 45-7 illustrate one example logical configuration of FinancialAccountingViewOfProjectMessage message 45000. Specifically, this figure depicts the arrangement and hierarchy of various components such as one or more levels of packages, entities, and datatypes, shown here as 45000 to 45248. As described above, packages may be used to represent hierarchy levels. Entities are discrete business elements that are used during a business transaction. Data types are used to type object entities and interfaces with a structure. For example, FinancialAccountingViewOfProjectMessage message 45000 includes, among other things, FinancialAccountingViewOfProjectMessage 45002. Accordingly, heterogeneous applications may communicate using this consistent message configured as such.

Message Data Type Financial AccountingViewOfProjectMessage_sync

The message data type Financial AccountingViewOfProjectMessage_sync can contain the accounting view on project included in the business document, and the business information that is relevant for sending a business document in a message. The message data type FinancialAccountingViewOfProjectMessage_sync can contain can contain the package FinancialAccountingViewOfProject package. The following table shows which packages and entities of the abstract message data type FinancialAccountingViewOfProjectMessage_sync can be used in the above mentioned message data types.

| | Message Data Type | |
|---|---|---|
| Package/Entity | Financial Accounting-ViewOfProject-StructureByID-Response_sync | Financial-Accounting-ViewOf ProjectByID-Response_sync |
| FinancialAccountingViewOfProject | c | c |
| Project | 1 | 1 |
| Element | n | n |
| AccountingRepresentation | c | c |
| InternalOrder | c | c |
| WorkBreakdownStructureElement | c | c |
| OrganisationalAssignment | c | c |
| CostCentre | c | c |
| ProfitCentre | c | c |
| InvestmentProgramPosition | c | c |
| Budget | | c |
| BudgetItem | | n |
| Log | 1 | 1 |

The message data type FinancialAccountingViewOfProjectMessage_sync, can provide the structure for the message types Financial Accounting ViewOfProjectByID-Response_sync, and FinancialAccountingViewOfProject StructureByID Response_sync and the interfaces that are based on them.

In some implementations, a FinancialAccountingViewOfProject package groups the FinancialAccountingViewOfProject with its packages. The FinancialAccountingViewOfProject can contain the packages Project, and Element.

In some implementations, the FinancialAccountingViewOfProject is a representation of a project and its structure in Accounting. A FinancialAccountingViewOfProject can provide information on the relation between a Project and its elements in cProjects to the corresponding accounting objects.

The elements located directly at this node can include ID, FiscalYearID, SystemAdministrativeData, MappingCode, MappingName, ControllingTypeCode, ControllingTypeName, and ControllingLevelNumberValue. ID can be an identifier for a FinancialAccountingViewOfProject, and may be based on a GDT of type FinancialAccountingViewOfProjectID. FiscalYearID can be a unique Identifier for a fiscal year, and may be based on a GDT of type FiscalYearID. SystemAdministrativeData can be optional. SystemAdministrativeData can be administrative data that is stored in a system. In some implementations, this data includes system users and change dates/times. SystemAdministrativeData can be based on a GDT of type SystemAdministrativeData. MappingCode can be optional. MappingCode can be a coded representation of the mapping of a FinancialAccountingViewOfProject. MappingCode can be based on a GDT of type FinancialAccountingViewOfProjectMappingCode. MappingName can be optional. MappingName can be the name of the mapping of a FinancialAccountingViewOfProject. MappingName can be based on a GDT of type FinancialAccountingViewOfProjectMappingName. ControllingTypeCode can be optional. ControllingTypeCode can be a coded representation of the controlling type of a FinancialAccountingViewOfProject. ControllingTypeCode can be based on a GDT of type Financial AccountingViewOfProjectControllingTypeCode. ControllingTypeName can be optional. ControllingTypeName can be the name of a controlling type of a FinancialAccountingViewOfProject. ControllingTypeName can be based on a GDT of type FinancialAccountingViewOfProjectControllingTypeName.

ControllingLevelNumberValue can be optional. ControllingLevelNumberValue can specify the number of controlling levels, i.e. levels in the project hierarchy for which individual accounting objects are assigned. ControllingLevelNumberValue can be based on a GDT of type NumberValue and have a Qualifier of Level.

In some implementations, a project package groups information related to the project that is represented by the FinancialAccountingViewOfProject. The project package can contain the entity Project. A Project can specify the project that is represented by the FinancialAccountingViewOfProject. The element located at the Project node can be ID. ID can be a unique identifier of a project. ID can have a GDT of type ProjectID.

The Element package can contain the entity Element. The Element package can contain the packages AccountingRepresentation, OrganisationalAssignment, and Budget. In some implementations, an Element represents an element of the FinancialAccountingViewOfProject. An element can be related to an element of a project in cProjects. The elements located at the Element node can be ProjectElementID, TypeCode, and TypeName.

ProjectElementID can be a unique identifier for an element in a project. ProjectElementID can have a GDT of type ProjectElementID. TypeCode can be optional. TypeCode can be a coded representation of the type of a FinancialAccountingViewOfProject element. TypeCode can have a GDT of type FinancialAccountingViewOfProjectElementTypeCode.

TypeName can be optional. TypeName can be the name of a type of a FinancialAccountingViewOfProject element. TypeName can have a GDT of type FinancialAcountingViewOfProjectElementTypeName.

In some implementations, an AccountingRepresentation package groups the accounting representation of an element of an accounting view. The AccountingRepresentation can contain the entities InternalOrder, WorkBreakdownStructureElement, and Budget CarryingWorkBreakdownStructureElement.

In some implementations, an InternalOrder specifies the internal order that is assigned to the Projects entity represented by the FinancialAccountingViewOfProjectElement. The element located at the InternalOrder node can be ID. ID can be an identifier for an InternalOrder. ID can have a GDT of type InternalOrderID.

In some implementations, a WorkBreakdownStructureElement specifies the work break down structure element that is assigned to the cProjects entity represented by the FinancialAccountingViewOfProjectElement. The element located directly at the WorkBreakdownStructureElement node can be ID. ID can be an identifier for a Project Work Breakdown Structure Element. ID can have a GDT of type WorkBreakdownStructureID.

In some implementations, a BudgetCarryingWorkBreakdownStructureElement specifies the first budget carrying work break down structure element above the WorkBreakdownStructureElement, if the latter carries no budget itself. The element located at the BudgetCarryingWorkBreakdownStructureElement node can be ID. ID can be an identifier for a Project Work Breakdown Structure Element. ID can have a GDT of type WorkBreakdownStructureID.

In some implementations, an OrganisationalAssignment package groups the accounting representation of an element of an accounting view. An OrganisationalAssignment can contain the entities CostCentre, ProfitCentre, and InvestmentProgram.

In some implementations, CostCentre specifies the cost centre related to the FinancialAccountingViewOfProjectElement. The elements located at the CostCentre node can be CostCentreID, and ControllingAreaID. A CostCentreID can be an identifier for a cost center. CostCentreID can have a GDT of type CostCentreID. A ControllingAreaID can be an identifier for a controlling area. ControllingAreaID can have a GDT of type ControllingAreaID.

In some implementations, ProfitCentre specifies the profit centre related to the FinancialAccountingViewOfProjectElement. The element located at the ProfitCentre node can be ID. ID can be the identifier of a profit centre related to the FinancialAccountingViewOfProjectElement. ID can have a GDT of type ProfitCentreID.

In some implementations, Programme is an organizational center for administrating a group of projects or subprograms. Programme can represent a complex, time restricted endeavor for reaching higher-level goals within a far-reaching strategy. The elements located at the Programme node can be ID, ProgrammeDefinitionID, and ProgrammeApprovalFiscalYearID.

ID can be the identifier of a Programme. ID can have a GDT of type ProgrammeID. ProgrammeDefinitionID can be a unique identifier for a ProgrammeDefinition. ProgrammeDefinition can have a GDT of type ProgrammeDefinitionID. ProgrammeApprovalFiscalYearID can be a unique identifier for the fiscal year for which a programme is approved. ProgrammeApprovalFiscalYearID can have a GDT of type FiscalYearID and a Qualifier of Approval.

In some implementations, Budget package groups information on the budget of an element of an accounting view. Budge can contain the entity BudgetItem. A BudgetItem can specify a budget item of the FinancialAccountingViewOfProjectElementBudget. The elements located at the BudgetItem node can be ControllingValuationViewTypeCode, ControllingValuationViewTypeName, OverallBudgetAmount, FiscalYearBudgetAmount, OverallReleasedBudgetAmount, and FiscalYearReleasedBudgetAmount. ControllingValuationViewTypeCode can be the coded representation of a controlling valuation view type. ControllingValuationViewTypeCode can have a GDT of type ControllingValuationViewTypeCode. ControllingValuationViewTypeName can be optional. ControllingValuationViewTypeName can be the name of a controlling valuation view type. ControllingValuationViewTypeName can have a GDT of type ControllingValuationViewTypeName. OverallBudgetAmount can be optional. OverallBudgetAmount can be the amount of budget amount related to the entire validity period a project entity. OverallBudgetAmount can have a CDT of type Amount and a Qualifier of Budget. FiscalYearBudgetAmount can be optional. FiscalYearBudgetAmount can be the amount of budget related to the fiscal year specified by the FiscalYearID. FiscalYearBudgetAmount can have a CDT of type Amount and a Qualifier of Budget. OverallReleasedBudgetAmount can be optional. OverallReleasedBudgetAmount can be the amount of budget related to the entire validity period of a project entity. OverallReleasedBudgetAmount can have a CDT of type Amount and a Qualifier of Budget. FiscalYearReleasedBudgetAmount can be optional. FiscalYearReleasedBudgetAmount can be the amount of budget related to the fiscal year specified by the FiscalYearID. FiscalYearReleasedBudgetAmount can have a CDT of type Amount and a Qualifier of Budget. In some implementations, a Log is a sequence of messages that result when an application executes a task. The entity Log can have a GDT of type Log.

FinancialAccountingViewOfProjectByIDQueryMessage_sync

In some implementations, message data type FinancialAccountingViewOfProjectByIDQueryMessage_sync contains the Selection included in the business document and the business information that is relevant for sending a business document in a message. FinancialAccountingViewOfProjectByIDQueryMessage_sync can contain the package Selection.

In some implementations, the Selection package collects all the selection criteria for the FinancialAccountingViewOfProject for this within this message data type. Selection can contain the entity FinancialAccountingViewOfProjectSelectionByID.

In some implementations, FinancialAccountingViewOfProjectSelection ByID contains the identifier to select a FinancialAccountingViewOfProject. The selection criteria elements located at FinancialAccountingViewOfProjectSelectionByID can be FinancialAccountingViewOfProjectID, and FiscalYearID.

FinancialAccountingViewOfProjectID can be the identifier of a FinancialAccountingViewOfProject. FinancialAccountingViewOfProjectID can have a GDT of type FinancialAccountingViewOfProjectID. FiscalYearID can be optional. FiscalYearID can be a unique Identifier for a fiscal year. FiscalYearID can have a GDT of type FiscalYearID.

FinancialAccountingViewOfProjectStructureByID QueryMessage_sync

In some implementations, message data type FinancialAccountingViewOfProjectStructureByIDQueryMessage_sync contains the Selection included in the business document and the business information that is relevant for sending a business document in a message. FinancialAccountingViewOfProjectStructureByIDQueryMessage_sync can contain the package Selection.

In some implementations, Selection package collects all the selection criteria for the FinancialAccountingViewOfProject for this within this message data type. Selection can contain the entity FinancialAccountingViewOfProjectSelectionByID.

In some implementations, FinancialAccountingViewOfProjectStructureSelectionByID contains the identifier to select a FinancialAccountingViewOfProject. The selection criteria element located at FinancialAccountingViewOfProjectSelectionByID can be FinancialAccountingViewOfProjectID. FinancialAccountingView OfProjectID can be the identifier of a FinancialAccounting ViewOfProject. FinancialAccountingViewOfProjectID can have a GDT of type FinancialAccountingViewOfProjectID.

FinancialAccountingViewOfProjectSimpleBy ProjectIDQueryMessage_sync

In some implementations, the message data type FinancialAccountingViewOf ProjectSimpleByProjectIDQueryMessage_sync contains the Selection included in the business document and the business information that is relevant for sending a business document in a message. FinancialAccountingViewOfProjectSimpleByProjectIDQueryMessage_sync can contain the package Selection package.

The message data type FinancialAccountingViewOfProjectSimpleByProjectIDQueryMessage_sync can provide the structure for the message types FinancialAccountingViewOfProjectSimpleByProjectIDQuery_sync and the interfaces that are based on them.

In some implementations, Selection package collects all the selection criteria for the FinancialAccountingViewOfProject for this within this message data type. Selection can contain the entity FinancialAccountingViewOfProjectSimpleSelectionByProjectID.

In some implementations, FinancialAccountingViewOfProjectSimpleSelectionByProjectID contains the project identifier to select a FinancialAccountingViewOfProject. The selection criteria element located at FinancialAccountingViewOfProjectSimpleSelectionByProjectID can be ProjectID. ProjectID can be the identifier of a project in cProjects represented by the FinancialAccountingViewOfProject. ProjectID can have a GDT of type ProjectID.

FinancialAccountingViewOfProjectSimpleByProjectIDResponseMessage_sync

In some implementations, the message data type FinancialAccountingViewOfProjectSimpleByProjectIDQueryMessage_sync contains the FinancialAccountingViewOfProject included in the business document and the business information that is relevant for sending a business document in a message. FinancialAccountingViewOfProjectSimpleByProjectIDResponseMessage_sync can contain the packages FinancialAccountingViewOfProject package, and Log Package. The message data type F inancialAccountingViewOfProjectSimpleByProjectIDResponseMessage_sync can provide the structure for the message types FinancialAccountingViewOfProjectSimpleByProjectIDResponse_sync and the interfaces that are based on them.

In some implementations, FinancialAccountingViewOfProject package contains the fields to identify a FinancialAccountingViewOfProject. FinancialAccountingViewOfProject can contain the entity FinancialAccountingViewOfProject. A FinancialAccountingViewOfProject can be a representation of a project and its structure in Accounting. The elements located at the FinancialAccountingViewOfProject node can be ID, and SystemAdministrativeData.

ID can be the identifier of a FinancialAccountingViewOfProject. ID can have a GDT of type FinancialAccountingViewOfProjectID. SystemAdministrativeData can be optional. SystemAdministrativeData can be the information on creation and last change of a FinancialAccountingViewOfProject as recorded by the system. SystemAdministrativeData can have a GDT of type SystemAdministrativeData.

In some implementations, a Log is a sequence of messages that result when an application executes a task. The entity Log can have a GDT of type Log.

EmployeeTimeSheet Interface(s)

All business processes concerning employees' tasks, from paying the employees, through monitoring the progress of a project, to creating invoices, need information about working times of employees. In the EmployeeTimeSheet an employee can enter his or her working times. The data that employees record in their EmployeeTimeSheet does not merely consist of working times and tasks, but also working time attributes. For such working time attributes the EmployeeTimeSheet provides allowed values to support the employee in recording his or her working times.

Figure 46:
FIG. 46 shows an exemplary EmployeeTimeSheet Message Choreography.

The message choreography of FIG. 46 describes a possible logical sequence of messages that can be used to realize a EmployeeTimeSheet business scenario. A "Consumer" system 46000 can query employee time sheet by employee using a EmployeeTimeSheetByEmployeeQuery message 46004 as shown, for example, in FIG. 46. A "TimeAndLabourManagement" system 46002 can respond to the query using a EmployeeTimeSheetByEmployeeResponse message 46006 as shown, for example, in FIG. 46. The "Consumer" system 46000 can query employee time sheet balance by elements using a EmployeeTimeSheetBalanceByElementsQuery message 46008 as shown, for example, in FIG. 46. The "TimeAndLabourManagement" system 46002 can respond to the query using a EmployeeTimeSheetBalanceByElementsResponse message 46010 as shown, for example, in FIG. 46. The "Consumer" system 46000 can query employee time sheet allowed network by employee using a EmployeeTimeSheetAllowedNetworkByEmployeeQuery message 46012 as shown, for example, in FIG. 46. The "TimeAndLabourManagement" system 46002 can respond to the query using a EmployeeTimeSheetAllowedNetworkByEmployeeResponse message 46014 as shown, for example, in FIG. 46. The "Consumer" system 46000 can query employee time sheet change check using a EmployeeTimeSheetChangeCheckQuery message 46016 as shown, for example, in FIG. 46. The "TimeAndLabourManagement" system 46002 can respond to the query using a EmployeeTimeSheetChangeCheckResponse message 46018 as shown, for example, in FIG. 46. The "Consumer" system 46000 can request employee time sheet change using a EmployeeTimeSheetChangeRequest message 46020 as shown, for example, in FIG. 46. The "TimeAndLabourManagement" system 46002 can respond to the request using a EmployeeTimeSheetChangeConfirmation message 46022 as shown, for example, in FIG. 46. The "Consumer" system 46000 can request employee time sheet complete using a EmployeeTimeSheetCompleteRequest message 46024 as shown, for example, in FIG. 46. The "TimeAndLabourManagement" system 46002 can respond to the request using a EmployeeTimeSheetCompleteConfirmation message 46026 as shown, for example, in FIG. 46.

An EmployeeTimeSheetChangeRequest is the order to the Time and Labour Management to change an EmployeeTimeSheet. That means in this context that EmployeeTimes belonging to WorkAgreements of an Employee are inserted, changed or deleted. The structure of the message type EmployeeTimeSheetChangeRequest is specified by the message data type EmployeeTimeSheetChangeRequestMessage.

An EmployeeTimeSheetChangeConfirmation is the confirmation to an EmployeeTimeSheetChangeRequest and includes the changed EmployeeTimes which belong to WorkAgreements of an Employee. The structure of the message type EmployeeTimeSheetChangeConfirmation is specified by the message data type EmployeeTimeSheetChangeConfirmationMessage.

An EmployeeTimeSheetChangeCheckQuery is the inquiry to the EmployeeTimeSheet to check the processing of an EmployeeTimeSheetChangeRequestMessage. The structure of the message type EmployeeTimeSheetChangeCheckQuery is specified by the message data type EmployeeTimeSheetChangeCheckQueryMessage.

An EmployeeTimeSheetChangeCheckResponse is the response to an EmployeeTimeSheetChangeCheckQuery and includes the checked EmployeeTimes as result of the processing of an EmployeeTimeSheetChangeRequestMessage. The Time and Labour Management may run the same checks as the message EmployeeTimeSheetChangeRequest but without processing any updates. The structure of the message type EmployeeTimeSheetChangeCheckResponse is specified by the message data type EmployeeTimeSheetChangeCheckResponseMessage.

An EmployeeTimeSheetCompleteRequest is the order to the EmployeeTimeSheet to auto complete it with EmployeeTimes for the specified date period. The EmployeeTimeSheet can be completed by using the EmployeeTimeAgreementItemTimeRecordingCompletionRule. The structure of the message type EmployeeTimeSheetCompleteRequest is specified by the message data type EmployeeTimeSheetCompleteRequestMessage.

An EmployeeTimeSheetCompleteConfirmation is the confirmation to an EmployeeTimeSheetCompleteRequest and includes the created EmployeeTimes. The EmployeeTimes can be created by using the EmployeeTimeAgreementItemTimeRecordingCompletionRule. The structure of the message type EmployeeTimeSheetCompleteConfirmation is specified by the message data type EmployeeTimeSheetCompleteConfirmationMessage.

An EmployeeTimeSheetByEmployeeQuery is the inquiry to the EmployeeTimeSheet to provide the EmployeeTimes for an Employee and time period. The structure of the message type EmployeeTimeSheetByEmployeeQuery is specified by the message data type EmployeeTimeSheetByEmployeeQueryMessage.

An EmployeeTimeSheetByEmployeeResponse is the response to an EmployeeTimeSheetByEmployeeQuery and includes the EmployeeTimes for an Employee and date period. The structure of the message type EmployeeTimeSheetByEmployeeResponse is specified by the message data type EmployeeTimeSheetByEmployeeResponseMessage.

An EmployeeTimeSheetAllowedReceivingCostCentreBy EmployeeQuery is the inquiry to the EmployeeTimeSheet to provide the AllowedReceivingCostCentres for an Employee. The structure of the message type EmployeeTimeSheetAllowedReceivingCostCentreByEmployeeQuery is specified by the message data type EmployeeTimeSheetAllowedReceivingCostCentreByEmployeeQueryMessage.

An EmployeeTimeSheetAllowedReceivingCostCentreBy EmployeeResponse is the response to an EmployeeTimeSheetAllowedReceivingCostCentreByEmployeeQuery and includes the AllowedReceivingCostCentres for an Employee. The structure of the message type EmployeeTimeSheetAllowedReceivingCost-CentresByEmployeeResponse is specified by the message data type EmployeeTimeSheetAllowedReceivingCostCentresBy EmployeeResponseMessage.

An EmployeeTimeSheetAllowedNetworkByEmployee Query is the inquiry to the EmployeeTimeSheet to provide the AllowedNetworks for an Employee. The structure of the message type Employee TimeSheetAllowedNetworkByEmployeeQuery is specified by the message data type EmployeeTime SheetAllowedNetworkByEmployee QueryMessage.

An Employee TimeSheetAllowedNetworkByEmployeeResponse is the response to an EmployeeTimeSheetAllowedNetwork ByEmployeeQuery and includes the AllowedNetworks for an Employee. The structure of the message type EmployeeTimeSheetAllowedNetworkByEmployeeResponse is specified by the message data type Employee TimeSheetAllowedNetworkByEmployeeResponseMessage.

An EmployeeTimeSheetAllowedOrderByEmployee Query is the inquiry to the EmployeeTimeSheet to provide the AllowedOrders for an Employee. The structure of the message type Employee TimeSheetAllowedOrderByEmployeeQuery is specified by the message data type EmployeeTimeSheetAllowedOrderByEmployeeQueryMessage.

An Employee TimeSheetAllowedOrderByEmployeeResponse is the response to an EmployeeTimeSheetAllowedOrderByEmployeeQuery and includes the AllowedOrder for an Employee. The structure of the message type Employee TimeSheetAllowedOrderByEmployeeResponse is specified by the message data type Employee TimeSheet AllowedOrderByEmployeeResponseMessage.

An Employee TimeSheetAllowedReceivingSalesOrderByEmployeeQuery is the inquiry to the EmployeeTimeSheet to provide the ReceivingSalesOrders for an Employee. The structure of the message type EmployeeTimeSheetAllowedReceivingSalesOrderByEmployeeQuery is specified by the message data type EmployeeTimeSheetAllowedReceivingSalesOrderByEmployeeQueryMessage.

An Employee TimeSheetAllowedReceivingSalesOrderByEmployeeResponse is the response to an EmployeeTimeSheetAllowedReceivingSalesOrderBy EmployeeQuery and includes the AllowedReceivingSalesOrder for an Employee. The structure of the message type EmployeeTimeSheetAllowedReceivingSalesOrderByEmployeeResponse is specified by the message data type EmployeeTimeSheetAllowedReceivingSalesOrderByEmployeeResponseMessage.

An Employee TimeSheetAllowedWorkBreakDownStructureElementByEmployeeQuery is the inquiry to the EmployeeTimeSheet to provide the AllowedWorkBreakDownStructureElements for an Employee. The structure of the message type Employee TimeSheetAllowedWorkBreakDownStructureElementByEmployeeQuery is specified by the message data type EmployeeTimeSheetAllowedWorkBreakDownStructureElementByEmployee QueryMessage.

An Employee TimeSheetAllowedWorkBreakDownStructureElementByEmployeeResponse is the response to an Employee TimeSheetAllowedWorkBreakDownStructureElementByEmployeeQuery and includes the AllowedWorkBreakDownStructureElements for an Employee. The structure of the message type EmployeeTimeSheetAllowedWorkBreakDownStructureElementByEmployeeResponse is specified by the message data type EmployeeTimeSheetAllowedWorkBreakDownStructureElementByEmployeeResponseMessage.

An Employee TimeSheetAllowedMeasureUnitByEmployee Query is the inquiry to the EmployeeTimeSheet to provide the AllowedMeasureUnits for an Employee. The structure of the message type EmployeeTimeSheetAllowedMeasureUnitByEmployeeQuery is specified by the message data type Employee TimeSheetAllowedMeasureUnitByEmployeeQueryMessage.

An Employee TimeSheetAllowedMeasureUnitByEmployeeResponse is the response to an EmployeeTimeSheetAllowedMeasure UnitByEmployeeQuery and includes the AllowedMeasureUnits for an Employee. The structure of the message type EmployeeTimeSheetAllowedMeasureUnitByEmployeeResponse is specified by the message data type Employee TimeSheetAllowedMeasureUnitByEmployeeResponseMessage.

An EmployeeTimeSheetAllowedEmployeeTimeItemTypeBy EmployeeQuery is the inquiry to the EmployeeTimeSheet to provide the AllowedEmployeeTimeItemTypes for an Employee. The structure of the message type EmployeeTimeSheetAllowedEmployeeTimeItemType ByEmployeeQuery is specified by the message data type EmployeeTimeSheetAllowedEmployeeTimeItemTypeByEmployee QueryMessage.

An EmployeeTime SheetAllowedEmployeeTimeItemType ByEmployee Response is the response to an EmployeeTimeSheetAllowedEmployeeTimeItemTypeByEmployeeQuery and includes the AllowedEmployeeTimeItemTypes for an Employee. The structure of the message type EmployeeTimeSheetAllowedEmployeeTimeItemTypeByEmployeeResponse is specified by the message data type EmployeeTimeSheetAllowedEmployeeTimeItemTypeByEmployeeResponseMessage.

An EmployeeTimeSheetAllowedResourceClassByEmployee Query is the inquiry to the EmployeeTime Sheet to provide the AllowedResourceClasses for an Employee. The structure of the message type EmployeeTimeSheetAllowedResourceClassByEmployeeQuery is specified by the message data type Employee TimeSheetAllowedResourceClassByEmployeeQueryMessage.

An Employee Time SheetAllowedResourceClassByEmployee Response is the response to an EmployeeTimeSheetAllowedResourceClassBy Employee Query and includes the AllowedResourceClasses for an Employee. The structure of the message type EmployeeTimeSheetAllowedResourceClassBy EmployeeResponse is specified by the message data type EmployeeTimeSheetAllowedResourceClassByEmployeeResponseMessage.

An Employee TimeSheetAllowedPurchaseOrderByEmployee Query is the inquiry to the EmployeeTimeSheet to provide the AllowedPurchaseOrders for an Employee. The structure of the message type EmployeeTimeSheetAllowedPurchaseOrderByEmployeeQuery is specified by the message data type EmployeeTimeSheetAllowedPurchaseOrderByEmployeeQueryMessage.

An Employee TimeSheetAllowedPurchaseOrderByEmployee Response is the response to an EmployeeTimeSheetAllowedPurchaseOrderByEmployee Query and includes the AllowedPurchaseOrders for an Employee. The structure of the message type EmployeeTimeSheetAllowedPurchaseOrderByEmployee Response is specified by the message data type EmployeeTimeSheetAllowedPurchaseOrderByEmployeeResponseMessage.

An EmployeeTime SheetAllowedControllingKeyFigureBy EmployeeQuery is the inquiry to the EmployeeTimeSheet to provide the AllowedControllingKeyFigures for an Employee. The structure of the message type EmployeeTimeSheetAllowedControllingKeyFigureByEmployeeQuery is specified by the message data type EmployeeTimeSheetAllowedControllingKeyFigureByEmployeeQueryMessage.

An EmployeeTimeSheetAllowedControllingKeyFigureByEmployeeResponse is the response to an EmployeeTimeSheetAllowedControllingKeyFigureBy EmployeeQuery and includes the AllowedControllingKeyFigures for an Employee. The structure of the message type EmployeeTimeSheetAllowedControllingKeyFigureByEmployeeResponse is specified by the message data type EmployeeTimeSheetAllowedControllingKeyFigureByEmployeeResponseMessage.

An EmployeeTimeSheetAllowedServiceProductBy EmployeeQuery is the inquiry to the EmployeeTimeSheet to provide the AllowedServiceProducts for an Employee. The structure of the message type EmployeeTimeSheetAllowedServiceProductByEmployeeQuery is specified by the message data type EmployeeTimeSheetAllowedServiceProductByEmployee QueryMessage.

An Employee TimeSheetAllowedServiceProductByEmployeeResponse is the response to an EmployeeTimeSheetAllowedServiceProductByEmployeeQuery and includes the AllowedServiceProducts for an Employee. The structure of the message type EmployeeTimeSheetAllowedServiceProductByEmployeeResponse is specified by the message data type EmployeeTimeSheetAllowedServiceProductByEmployeeResponseMessage.

An EmployeeTimeSheetAllowedWarrantyGoodwillTypeByEmployeeQuery is the inquiry to the EmployeeTimeSheet to provide the AllowedWarrantyGoodwillTypes for an Employee. The structure of the message type EmployeeTimeSheetAllowedWarrantyGoodwillTypeByEmployeeQuery is specified by the message data type EmployeeTimeSheetAllowedWarrantyGoodwillTypeByEmployeeQueryMessage.

An EmployeeTimeSheetAllowedWarrantyGoodwillTypeByEmployeeResponse is the response to an EmployeeTimeSheetAllowedWarrantyGoodwillTypeByEmployeeQuery and includes the AllowedWarrantyGoodwillTypes for an Employee. The structure of the message type EmployeeTimeSheetAllowedWarrantyGoodwillTypeByEmployeeResponse is specified by the message data type EmployeeTimeSheetAllowedWarrantyGoodwillTypeByEmployeeResponseMessage.

An EmployeeTimeSheetAllowedReceivingFundsManagementFunctionalAreaByEmployee Query is the inquiry to the EmployeeTimeSheet to provide the AllowedReceivingFundsManagement FunctionalAreas for an Employee. The structure of the message type EmployeeTimeSheetAllowedReceivingFundsManagementFunctionalAreaByEmployeeQuery is specified by the message data type EmployeeTimeSheetAllowedReceivingFundsManagementFunctionalAreaByEmployeeQueryMessage.

An Employee TimeSheetAllowedReceivingFundsManagementFunctionalAreaByEmployeeResponse is the response to an EmployeeTimeSheetAllowedReceivingFundsManagementFunctionalAreaByEmployeeQuery and includes the AllowedReceivingFundsManagementFunctionalAreas for an Employee.

The structure of the message type EmployeeTimeSheetAllowedReceivingFundsManagementFunctionalAreaByEmployeeResponse is specified by the message data type EmployeeTimeSheetAllowedReceivingFundsManagementFunctionalAreaByEmployeeResponseMessage.

An EmployeeTimeSheetAllowedReceivingFundByEmployee Query is the inquiry to the EmployeeTimeSheet to provide the Allowed ReceivingFunds for an Employee. The structure of the message type EmployeeTimeSheetAllowedReceivingFundByEmployeeQuery is specified by the message data type EmployeeTimeSheetAllowedReceivingFundByEmployeeQueryMessage.

An EmployeeTimeSheetAllowedReceivingFundByEmployee Response is the response to an EmployeeTimeSheetAllowedReceivingFundByEmployeeQuery and includes the AllowedReceivingFunds for an Employee. The structure of the message type Employee TimeSheetAllowedReceivingFundByEmployeeResponse is specified by the message data type Employee TimeSheetAllowedReceivingFundByEmployeeResponseMessage.

An EmployeeTimeSheet AllowedReceivingGrantByEmployeeQuery is the inquiry to the EmployeeTimeSheet to provide the AllowedReceivingGrants for an Employee. The structure of the message type EmployeeTimeSheetAllowedReceivingGrantByEmployeeQuery is specified by the message data type EmployeeTimeSheetAllowedReceivingGrantByEmployeeQueryMessage.

An EmployeeTimeSheetAllowedReceivingGrantByEmployeeResponse is the response to an EmployeeTimeSheetAllowedReceivingGrantByEmployeeQuery and includes the AllowedReceivingGrants for an Employee. The structure of the message type EmployeeTime SheetAllowedReceivingGrantByEmployeeResponse is specified by the message data type EmployeeTimeSheetAllowedReceivingGrantByEmployeeResponseMessage.

An EmployeeTimeSheetAllowedReceivingCostingActivityByEmployeeQuery is the inquiry to the EmployeeTimeSheet to provide the Allowed ReceivingCostingActivities for an Employee. The structure of the message type Employee TimeSheetAllowedReceivingCostingActivityByEmployeeQuery is specified by the message data type Employee TimeSheetAllowedReceivingCostingActivityByEmployeeQueryMessage.

An Employee TimeSheetAllowedReceivingCostingActivityByEmployeeResponse is the response to an EmployeeTimeSheetAllowedReceivingCostingActivityByEmployeeQuery and includes the AllowedReceivingCostingActivities for an Employee. The structure of the message type EmployeeTimeSheetAllowedReceivingCostingActivityByEmployeeResponse is specified by the message data type EmployeeTimeSheetAllowedReceivingCostingActivityByEmployeeResponseMessage.

An Employee TimeSheetAllowedCurrencyByEmployeeQuery is the inquiry to the EmployeeTimeSheet to provide the AllowedCurrencies for an Employee. The structure of the message type EmployeeTimeSheetAllowedCurrencyByEmployeeQuery is specified by the message data type EmployeeTimeSheetAllowedCurrencyByEmployeeQueryMessage.

An Employee TimeSheetAllowedCurrencyByEmployeeResponse is the response to an EmployeeTimeSheetAllowedCurrencyByEmployeeQuery and includes the AllowedCurrencies for an Employee. The structure of the message type EmployeeTimeSheetAllowedCurrencyByEmployeeResponse is specified by the message data type Employee TimeSheetAllowedCurrencyByEmployeeResponseMessage.

An EmployeeTimeSheetAllowedTaskTypeByEmployeeQuery is the inquiry to the EmployeeTimeSheet to provide the Allowed TaskTypes for an Employee. The structure of the message type EmployeeTimeSheetAllowedTaskTypeByEmployeeQuery is specified by the message data type EmployeeTimeSheetAllowedTaskTypeByEmployeeQueryMessage.

An Employee TimeSheetAllowedTaskTypeByEmployeeResponse is the response to an EmployeeTimeSheetAllowedTaskTypeBy EmployeeQuery and includes the AllowedTaskTypes for an Employee. The structure of the message type EmployeeTimeSheetAllowedTaskTypeByEmployeeResponse is specified by the message data type Employee TimeSheetAllowedTaskTypeByEmployeeResponseMessage.

An Employee TimeSheetAllowedTaskLevelByEmployeeQuery is the inquiry to the EmployeeTimeSheet to provide the AllowedTaskLevels for an Employee. The structure of the message type EmployeeTimeSheetAllowedTaskLevelByEmployeeQuery is specified by the message data type EmployeeTimeSheetAllowed-TaskLevelByEmployeeQueryMessage.

An EmployeeTimeSheetAllowed-TaskLevelByEmployeeResponse is the response to an EmployeeTimeSheetAllowedTaskLevelByEmployeeQuery and includes the AllowedTaskLevels for an Employee. The structure of the message type EmployeeTimeSheetAllowed-TaskLevelByEmployeeResponse is specified by the message data type EmployeeTimeSheetAllowed-TaskLevelByEmployeeResponseMessage.

An EmployeeTimeSheetAllowed-TaskComponentByEmployeeQuery is the inquiry to the EmployeeTimeSheet to provide the AllowedTaskComponents for an Employee. The structure of the message type EmployeeTimeSheetAllowed-TaskComponentByEmployeeQuery is specified by the message data type EmployeeTimeSheetAllowed-TaskComponentByEmployeeQueryMessage.

An EmployeeTimeSheetAllowed-TaskComponentByEmployeeResponse is the response to an EmployeeTimeSheetAllowed-TaskComponentByEmployeeQuery and includes the AllowedTaskComponents for an Employee. The structure of the message type EmployeeTimeSheetAllowed-TaskComponentByEmployeeResponse is specified by the message data type EmployeeTimeSheetAllowed-TaskComponentByEmployeeResponseMessage.

Figure 47:
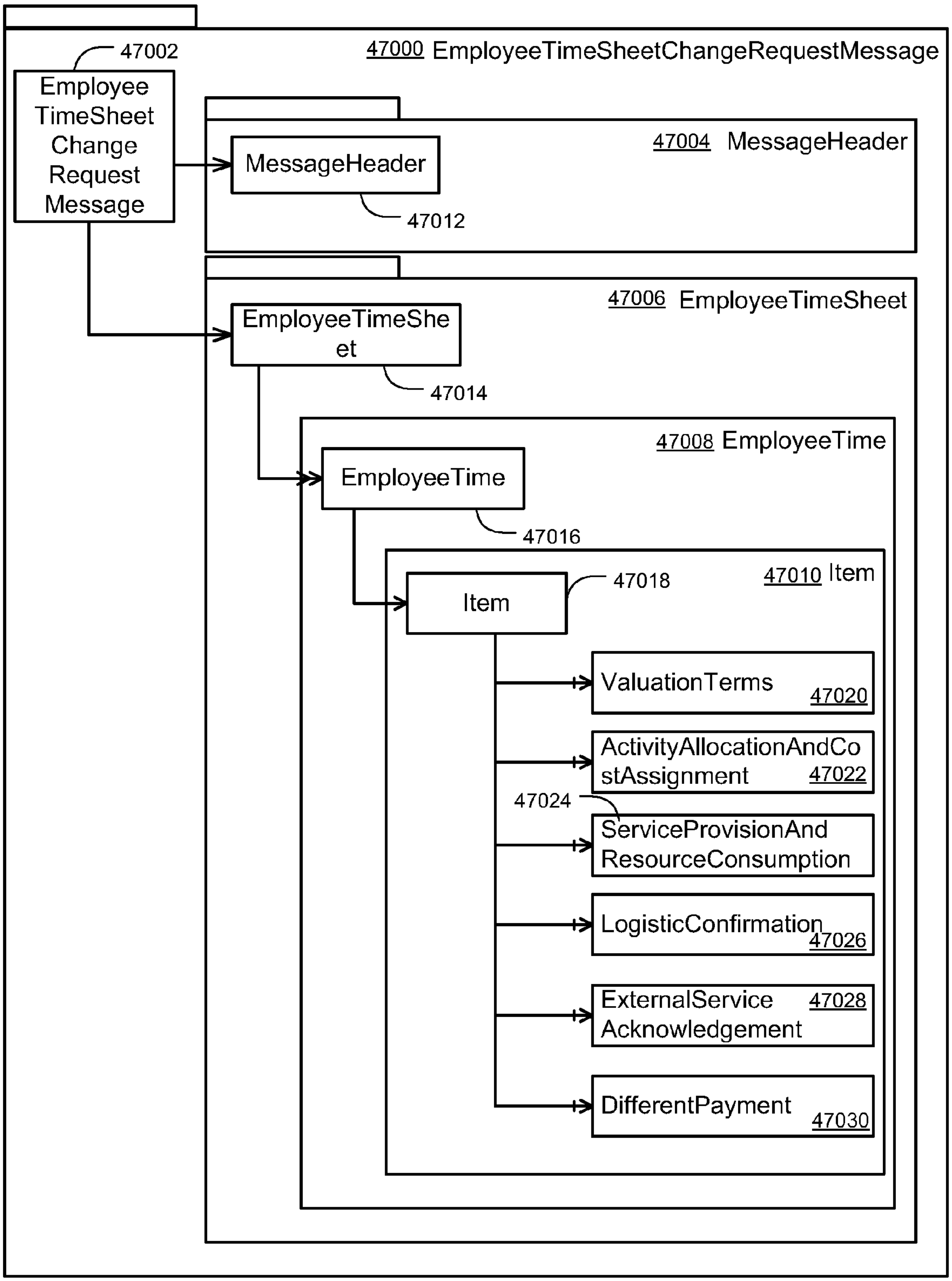
FIG. 47 shows an exemplary EmployeeTimeSheetChangeRequestMessage Message Data Type.

Interfaces can include EmployeeTimeSheetChangeRequestConfirmation_In, EmployeeTimeSheetChange Check-QueryRespons_In, EmployeeTimeSheetComplete Request-Confirmation_In, EmployeeTimeSheet ByEmployeeQueryResponse_In, EmployeeTimeSheet AllowedReceivingCostCentre-ByEmployeeQueryResponse_In, EmployeeTimeSheetAllowedNetworkBy EmployeeQueryResponse_In, Employee-TimeSheetAllowedOrderByEmployeeQueryResponse_In, EmployeeTimeSheetAllowedReceivingSalesOrderBy EmployeeQueryResponse_In, EmployeeTimeSheetAllowedWorkBreakDownStructu-reElementByEmployeeQueryResponse_In, EmployeeTimeSheetAllowedMeasureUnitByEmployeeQuery Response_In, EmployeeTimeSheetAllowedEmployeeTimeItemTypeByEmployeeQueryResponse_In, EmployeeTimeSheetAllowedResourceClassByEmployeeQueryResponse_In, EmployeeTimeSheetAllowedPurchaseOrderByEmployeeQueryResponse_In, EmployeeTimeSheetAllowedControllingKeyFigureByEmployeeQueryResponse_In, EmployeeTimeSheetAllowedServiceProductByEmployeeQueryResponse_In, EmployeeTimeSheetAllowedWarrantyGoodwillTypeByEmployeeQueryResponse_In, EmployeeTimeSheetAllowedReceivingFundsManagementFunctionalAreaByEmployeeQueryResponse_In, EmployeeTimeSheetAllowedReceivingFundByEmployee QueryResponse_In, EmployeeTimeSheetAllowedReceivingGrantBy EmployeeQueryResponse_In, EmployeeTimeSheetAllowedReceivingCostingActivityByEmployee QueryResponse_In, EmployeeTimeSheetAllowedCurrencyByEmployeeQueryResponse_In, EmployeeTimeSheetAllowedTaskTypeByEmployeeQueryResponse_In, EmployeeTimeSheetAllowed-TaskLevelByEmployeeQueryResponse_In, and EmployeeTimeSheetAllowedTaskComponent-ByEmployeeQueryResponse_In FIG. 47 illustrates one example logical configuration of EmployeeTimeSheetChangeRequestMessage message 47000. Specifically, this figure depicts the arrangement and hierarchy of various components such as one or more levels of packages, entities, and datatypes, shown here as 47000 through 47030. As described above, packages may be used to represent hierarchy levels. Entities are discrete business elements that are used during a business transaction. Data types are used to type object entities and interfaces with a structure. For example, EmployeeTimeSheetChangeRequestMessage message 47000 includes, among other things, EmployeeTimeSheet 47006. Accordingly, heterogeneous applications may communicate using this consistent message configured as such.

Figure 48:
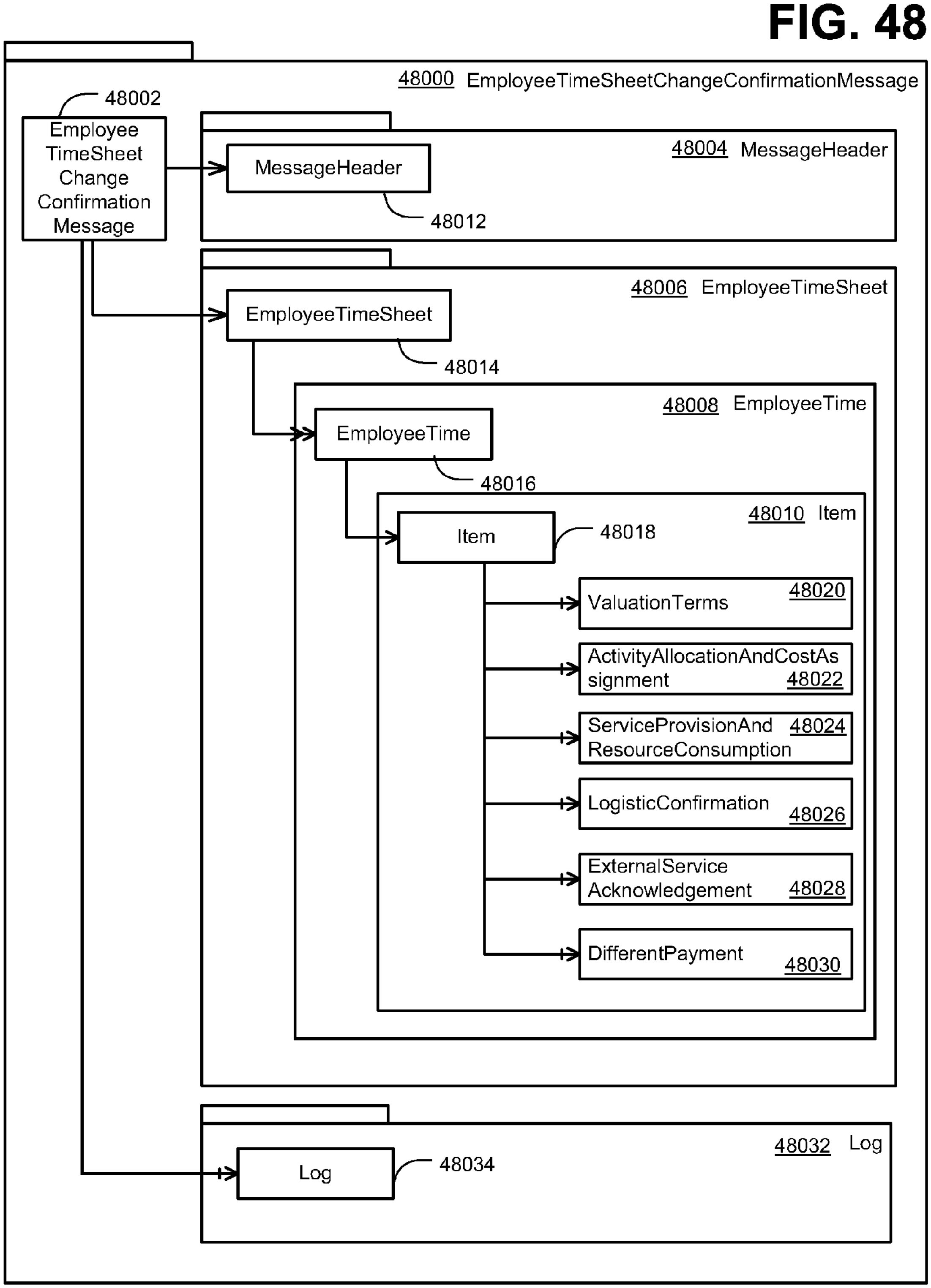
FIG. 48 shows an exemplary EmployeeTimeSheetChangeConfirmationMessage Message Data Type.

Additionally, FIG. 48 illustrates one example logical configuration of EmployeeTimeSheetChangeConfirmationMessage message 48000. Specifically, this figure depicts the arrangement and hierarchy of various components such as one or more levels of packages, entities, and datatypes, shown here as 48000 through 48034. As described above, packages may be used to represent hierarchy levels. Entities are discrete business elements that are used during a business transaction. Data types are used to type object entities and interfaces with a structure. For example, Employee-TimeSheetChangeConfirmationMessage message 48000 includes, among other things, EmployeeTimeSheet 48006. Accordingly, heterogeneous applications may communicate using this consistent message configured as such.

Figure 49:
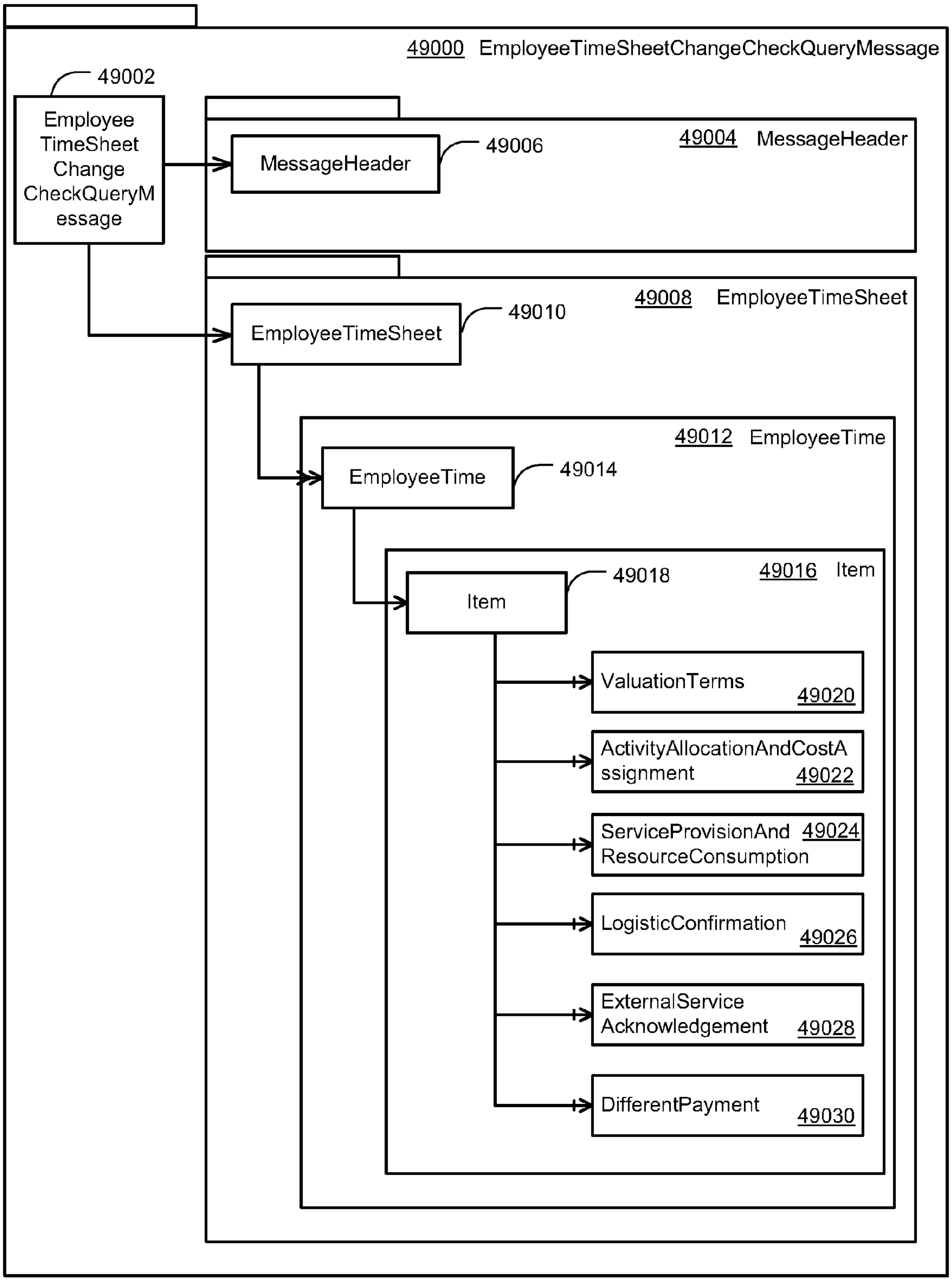
FIG. 49 shows an exemplary EmployeeTimeSheetChangeCheckRequestMessage Message Data Type.

Additionally, FIG. 49 illustrates one example logical configuration of EmployeeTimeSheetChangeCheckQuery Message message 49000. Specifically, this figure depicts the arrangement and hierarchy of various components such as one or more levels of packages, entities, and datatypes, shown here as 49000 through 49030. As described above, packages may be used to represent hierarchy levels. Entities are discrete business elements that are used during a business transaction. Data types are used to type object entities and interfaces with a structure. For example, EmployeeTimeSheetChangeCheckQuery Message message 49000 includes, among other things, EmployeeTimeSheet 49006. Accordingly, heterogeneous applications may communicate using this consistent message configured as such.

Figure 50:
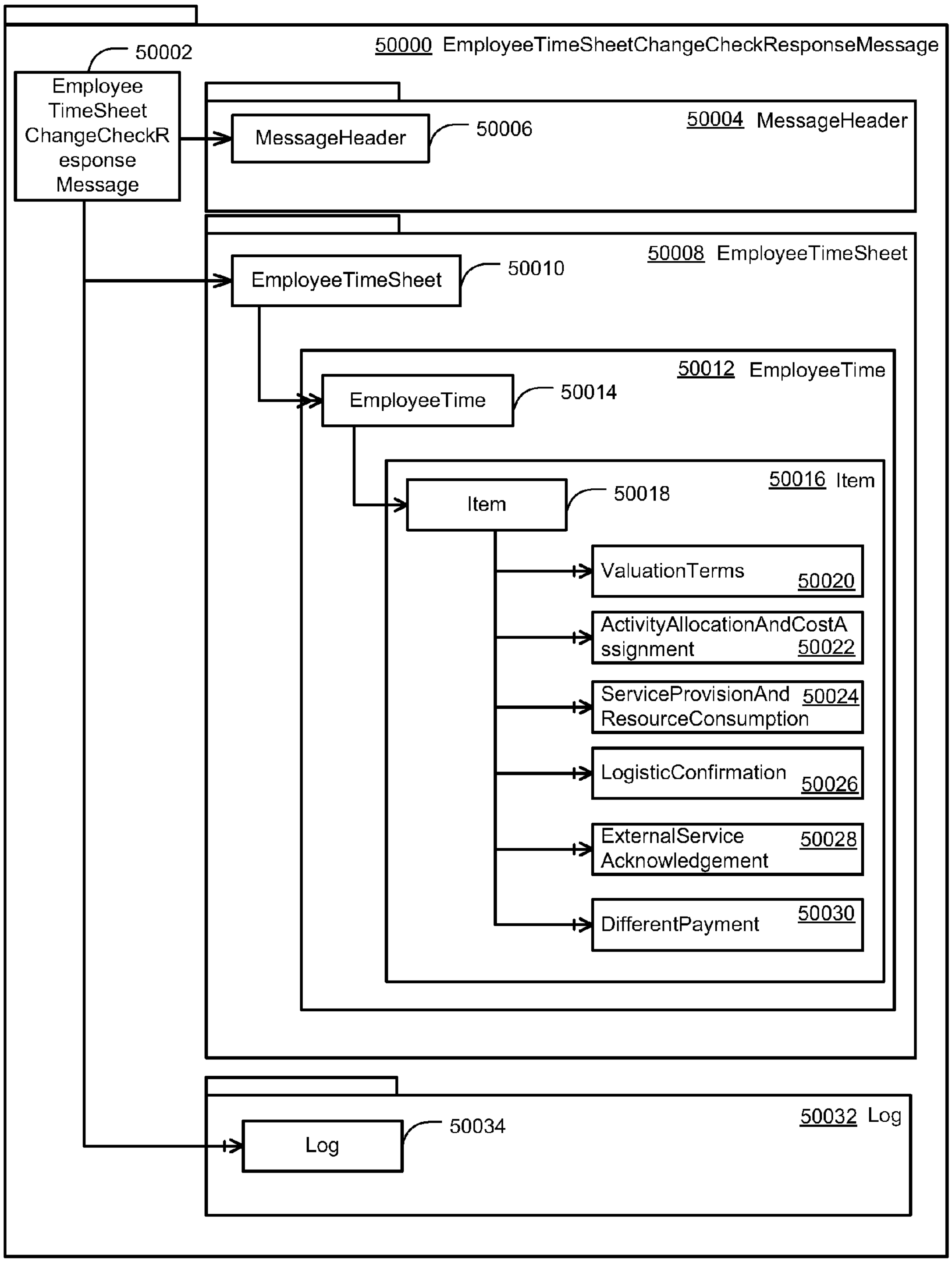
FIG. 50 shows an exemplary EmployeeTimeSheetChangeCheckConfirmationMessage Message Data Type.

Additionally, FIG. 50 illustrates one example logical configuration of EmployeeTimeSheetChangeCheckResponse Message message 50000. Specifically, this figure depicts the arrangement and hierarchy of various components such as one or more levels of packages, entities, and datatypes, shown here as 50000 through 50034. As described above, packages may be used to represent hierarchy levels. Entities are discrete business elements that are used during a business transaction. Data types are used to type object entities and interfaces with a structure. For example, EmployeeTimeSheetChangeCheckResponse Message message 50000 includes, among other things, EmployeeTimeSheet 50008. Accordingly, heterogeneous applications may communicate using this consistent message configured as such.

Figure 51:
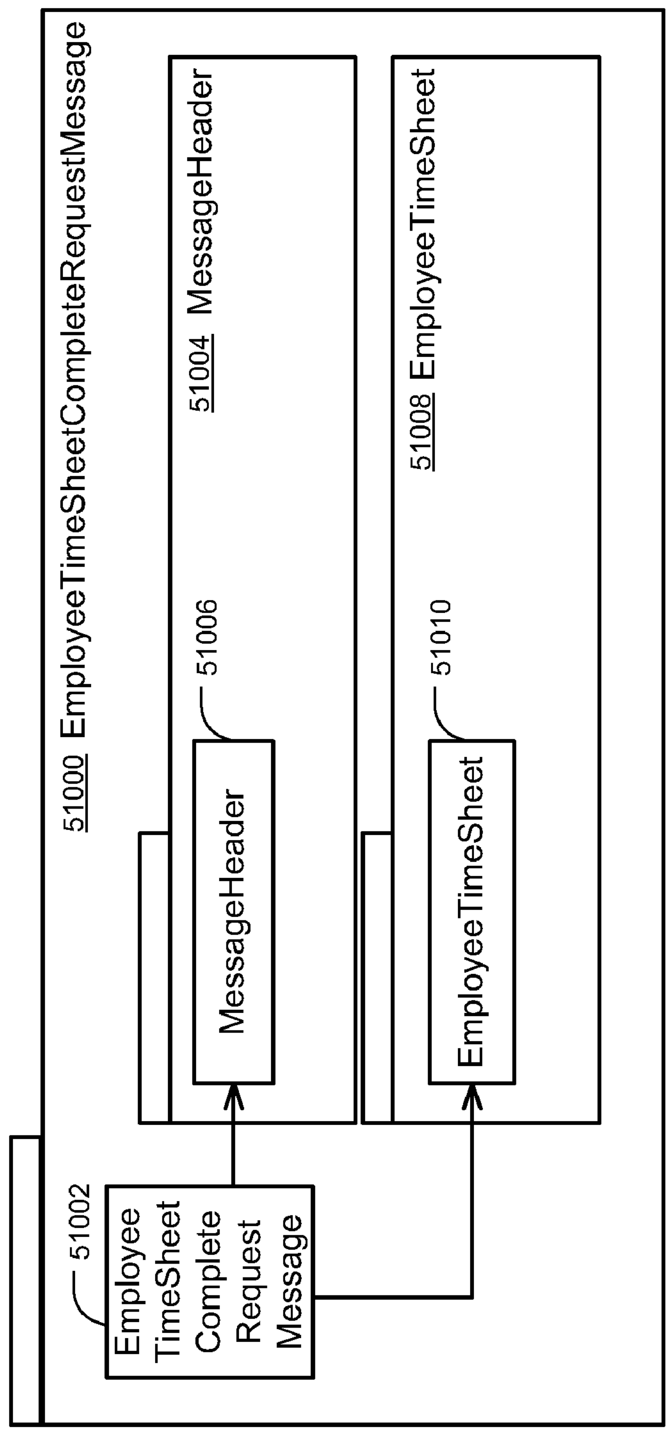
FIG. 51 shows an exemplary EmployeeTimeSheetCompleteRequestMessage Message Data Type.

Additionally, FIG. 51 illustrates one example logical configuration of EmployeeTimeSheetCompleteRequestMessage message 51000. Specifically, this figure depicts the arrangement and hierarchy of various components such as one or more levels of packages, entities, and datatypes, shown here as 51000 through 51010. As described above, packages may be used to represent hierarchy levels. Entities are discrete business elements that are used during a business transaction. Data types are used to type object entities and interfaces with a structure. For example, EmployeeTimeSheetCompleteRequestMessage message 51000 includes, among other things, EmployeeTimeSheet 51006. Accordingly, heterogeneous applications may communicate using this consistent message configured as such.

Figure 52:
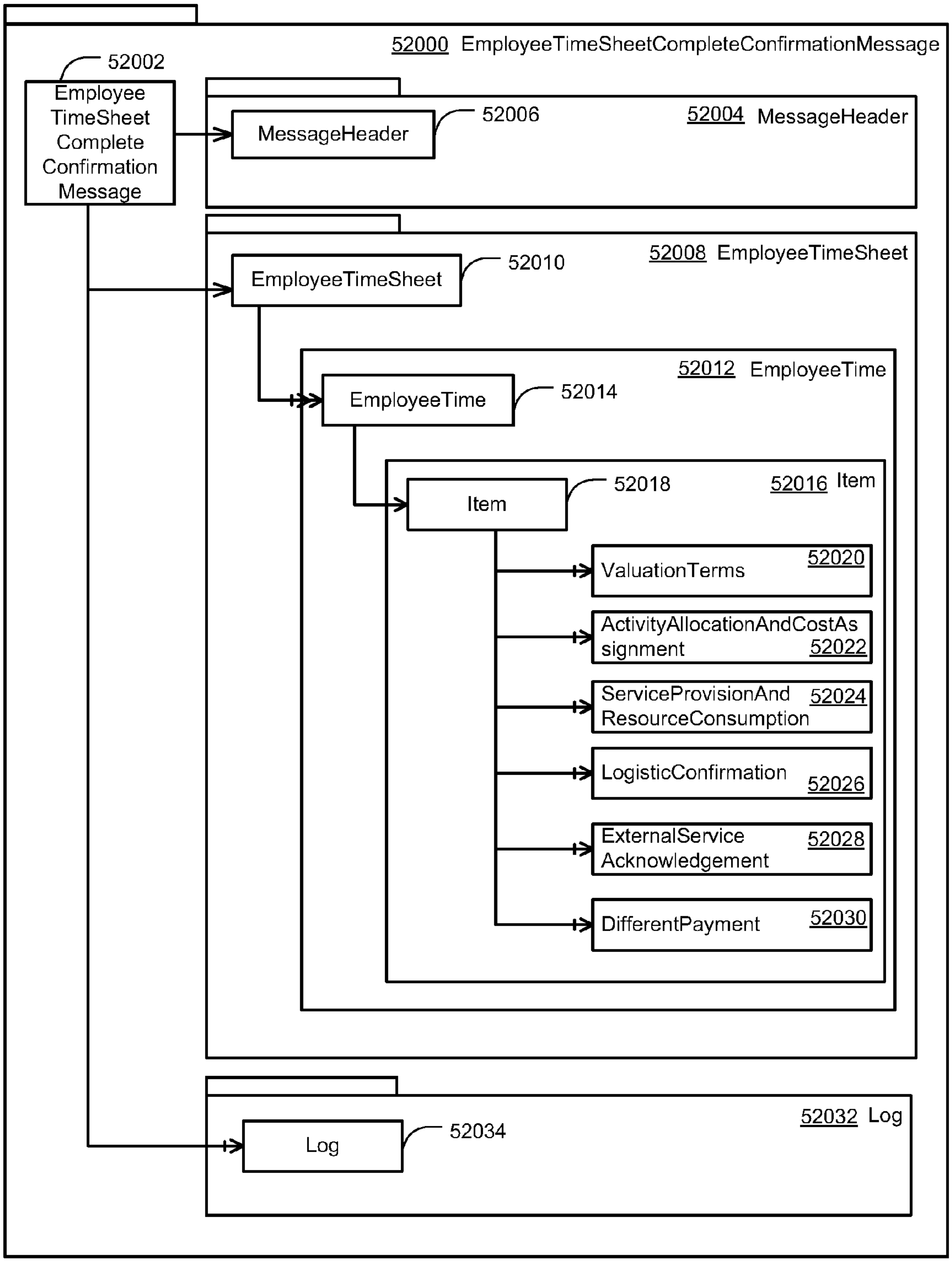
FIG. 52 shows an exemplary EmployeeTimeSheetCompleteConfirmationMessage Message Data Type.

Additionally, FIG. 52 illustrates one example logical configuration of EmployeeTimeSheetCompleteConfirmationMessage message 52000. Specifically, this figure depicts the arrangement and hierarchy of various components such as one or more levels of packages, entities, and datatypes, shown here as 52000 through 52034. As described above, packages may be used to represent hierarchy levels. Entities are discrete business elements that are used during a business transaction. Data types are used to type object entities and interfaces with a structure. For example, EmployeeTimeSheetCompleteConfirmationMessage message 52000 includes, among other things, EmployeeTimeSheet 52008. Accordingly, heterogeneous applications may communicate using this consistent message configured as such.

Figure 53:
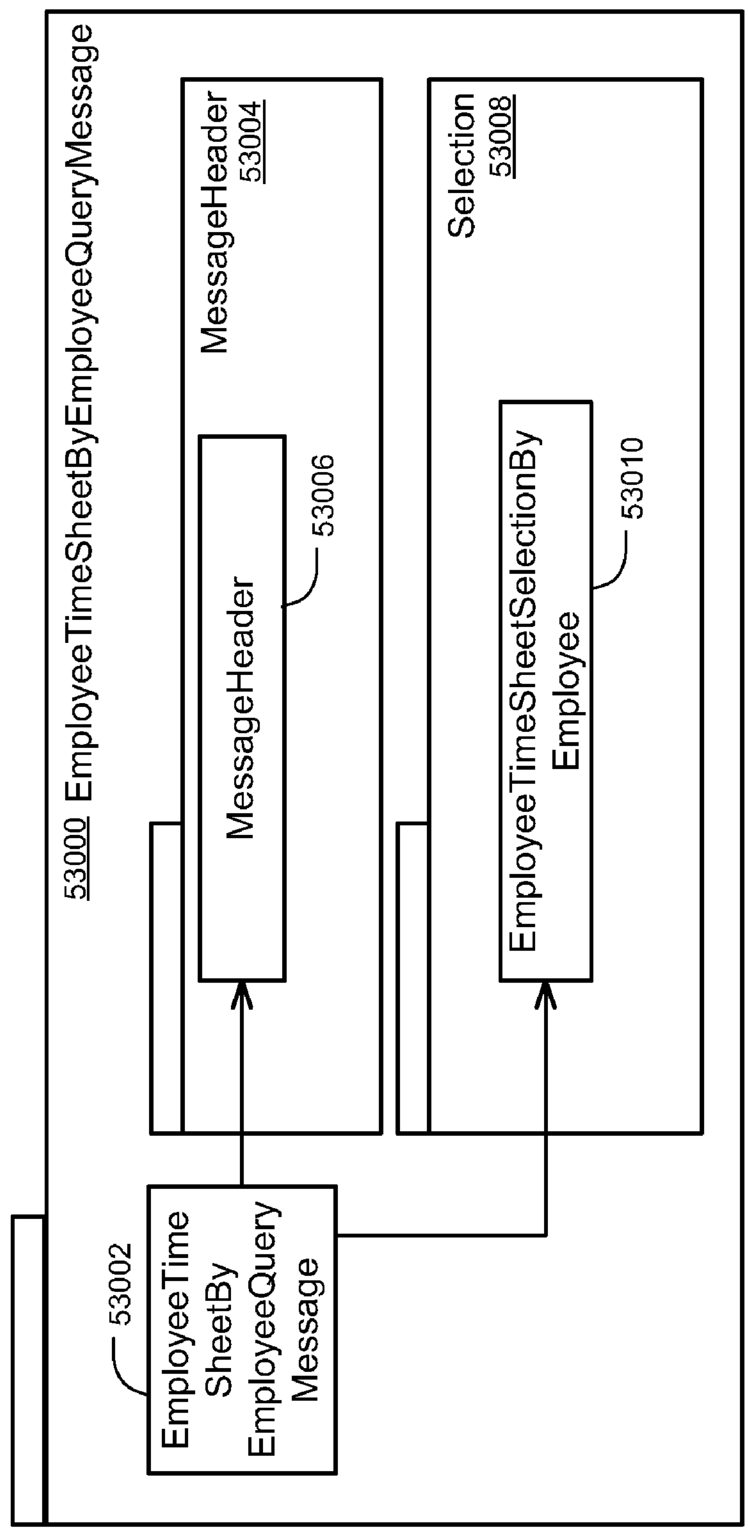
FIG. 53 shows an exemplary EmployeeTimeSheetByEmployeeResponseMessage Message Data Type.
Figure 54:
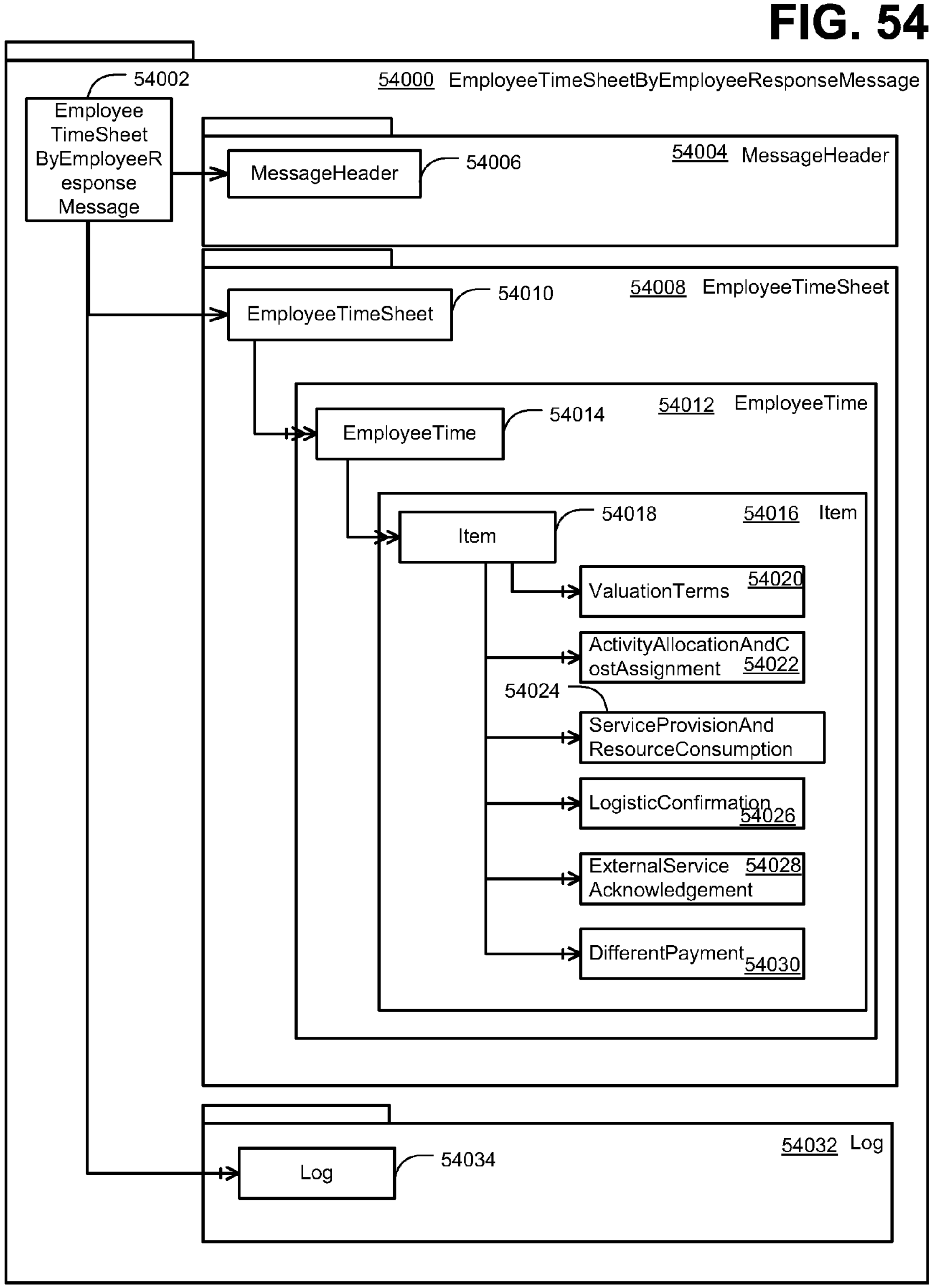
FIG. 54 shows an exemplary EmployeeTimeSheetByEmployeeQueryMessage Message Data Type.

Additionally, FIG. 53 illustrates one example logical configuration of EmployeeTimeSheetByEmployeeQueryMessage message 53000. Specifically, this figure depicts the arrangement and hierarchy of various components such as one or more levels of packages, entities, and datatypes, shown here as 53000 through 53010. As described above, packages may be used to represent hierarchy levels. Entities are discrete business elements that are used during a business transaction. Data types are used to type object entities and interfaces with a structure. For example, EmployeeTimeSheetByEmployeeQuerytMessage message 53000 includes, among other things, Selection 53008. Accordingly, heterogeneous applications may communicate using this consistent message configured as such. Additionally, FIG. 54 illustrates one example logical configuration of EmployeeTimeSheetByEmployeeResponseMessage message 54000. Specifically, this figure depicts the arrangement and hierarchy of various components such as one or more levels of packages, entities, and datatypes, shown here as 54000 through 54034. As described above, packages may be used to represent hierarchy levels. Entities are discrete business elements that are used during a business transaction. Data types are used to type object entities and interfaces with a structure. For example, EmployeeTimeSheetByEmployeeResponseMessage message 54000 includes, among other things, EmployeeTimeSheet 54008. Accordingly, heterogeneous applications may communicate using this consistent message configured as such.

Figure 55:
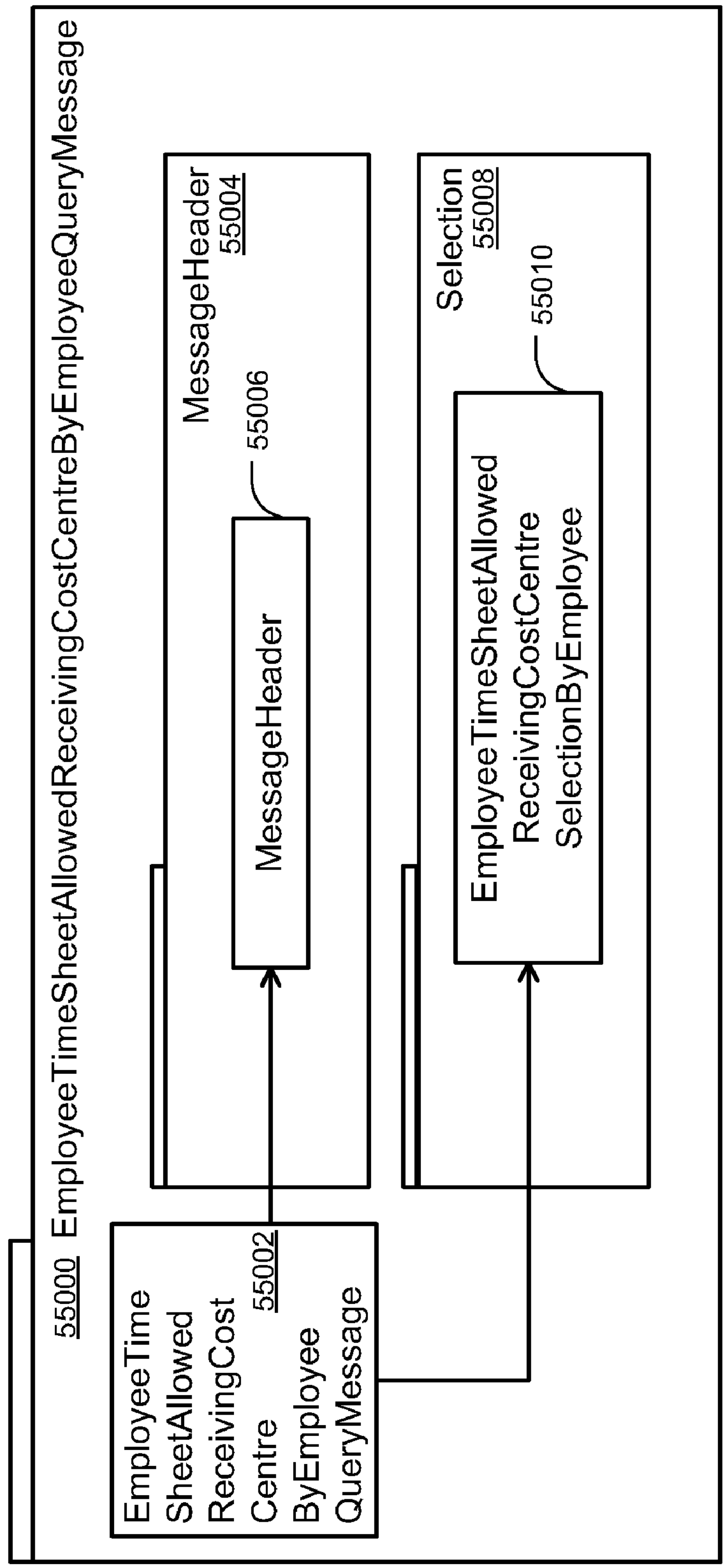
FIG. 55 shows an exemplary EmployeeTimeSheetAllowedReceivingCostCentreByEmployeeQueryMessage Message Data Type.

Additionally, FIG. 55 illustrates one example logical configuration of EmployeeTimeSheetAllowedReceivingCostCentreByEmployeeQueryMessage message 55000. Specifically, this figure depicts the arrangement and hierarchy of various components such as one or more levels of packages, entities, and datatypes, shown here as 55000 through 55010. As described above, packages may be used to represent hierarchy levels. Entities are discrete business elements that are used during a business transaction. Data types are used to type object entities and interfaces with a structure. For example, EmployeeTimeSheetAllowedReceivingCostCentreByEmployeeQueryMessage message 55000 includes, among other things, Selection 55008. Accordingly, heterogeneous applications may communicate using this consistent message configured as such.

Figure 56:
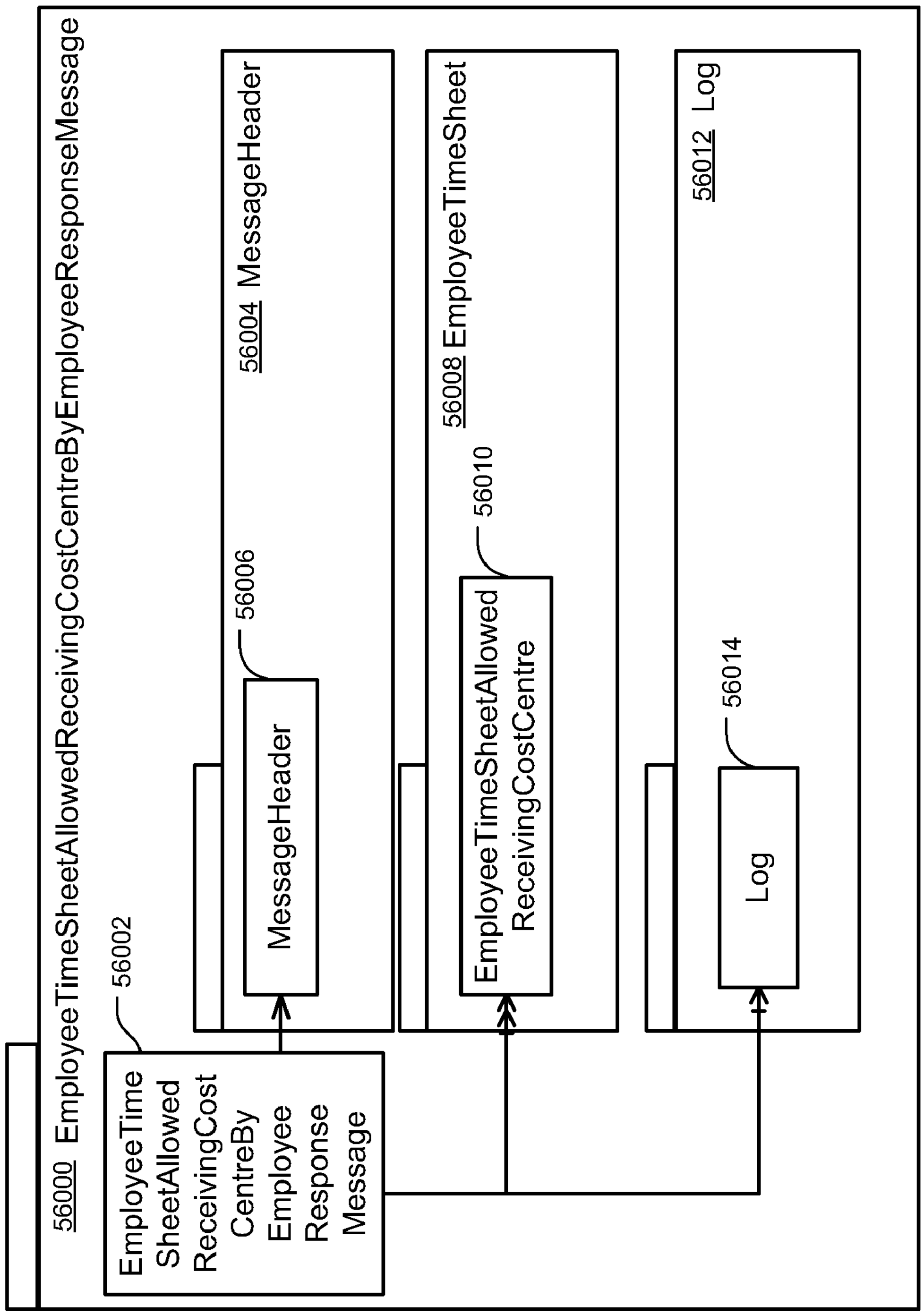
FIG. 56 shows an exemplary EmployeeTimeSheetAllowedReceivingCostCentreByEmployeeResponseMessage Message Data Type.

Additionally, FIG. 56 illustrates one example logical configuration of EmployeeTimeSheetAllowedReceivingCostCentreByEmployeeResponseMessage message 56000. Specifically, this figure depicts the arrangement and hierarchy of various components such as one or more levels of packages, entities, and datatypes, shown here as 56000 through 56014. As described above, packages may be used to represent hierarchy levels. Entities are discrete business elements that are used during a business transaction. Data types are used to type object entities and interfaces with a structure. For example, EmployeeTimeSheetAllowedReceivingCostCentreByEmployeeResponseMessage message 56000 includes, among other things, EmployeeTimeSheet 56008. Accordingly, heterogeneous applications may communicate using this consistent message configured as such.

Figure 57:
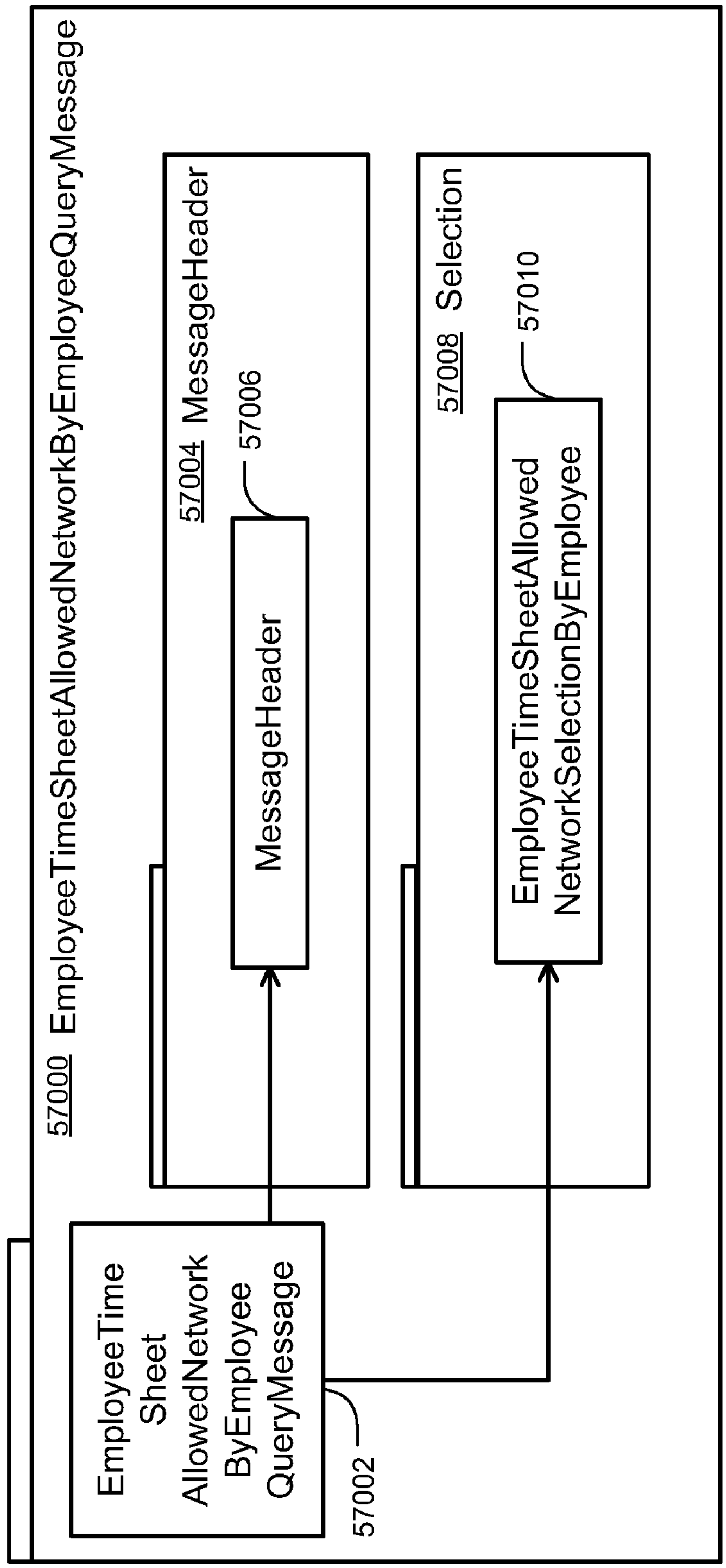
FIG. 57 shows an exemplary EmployeeTimeSheetAllowedNetworkByEmployeeQueryMessage Message Data Type.

Additionally, FIG. 57 illustrates one example logical configuration of EmployeeTimeSheetAllowedNetworkByEmployeeQueryMessage message 57000. Specifically, this figure depicts the arrangement and hierarchy of various components such as one or more levels of packages, entities, and datatypes, shown here as 57000 through 57010. As described above, packages may be used to represent hierarchy levels. Entities are discrete business elements that are used during a business transaction. Data types are used to type object entities and interfaces with a structure. For example, EmployeeTimeSheetAllowedNetworkByEmployeeQueryMessage message 57000 includes, among other things, Selection 57008. Accordingly, heterogeneous applications may communicate using this consistent message configured as such.

Figure 58:
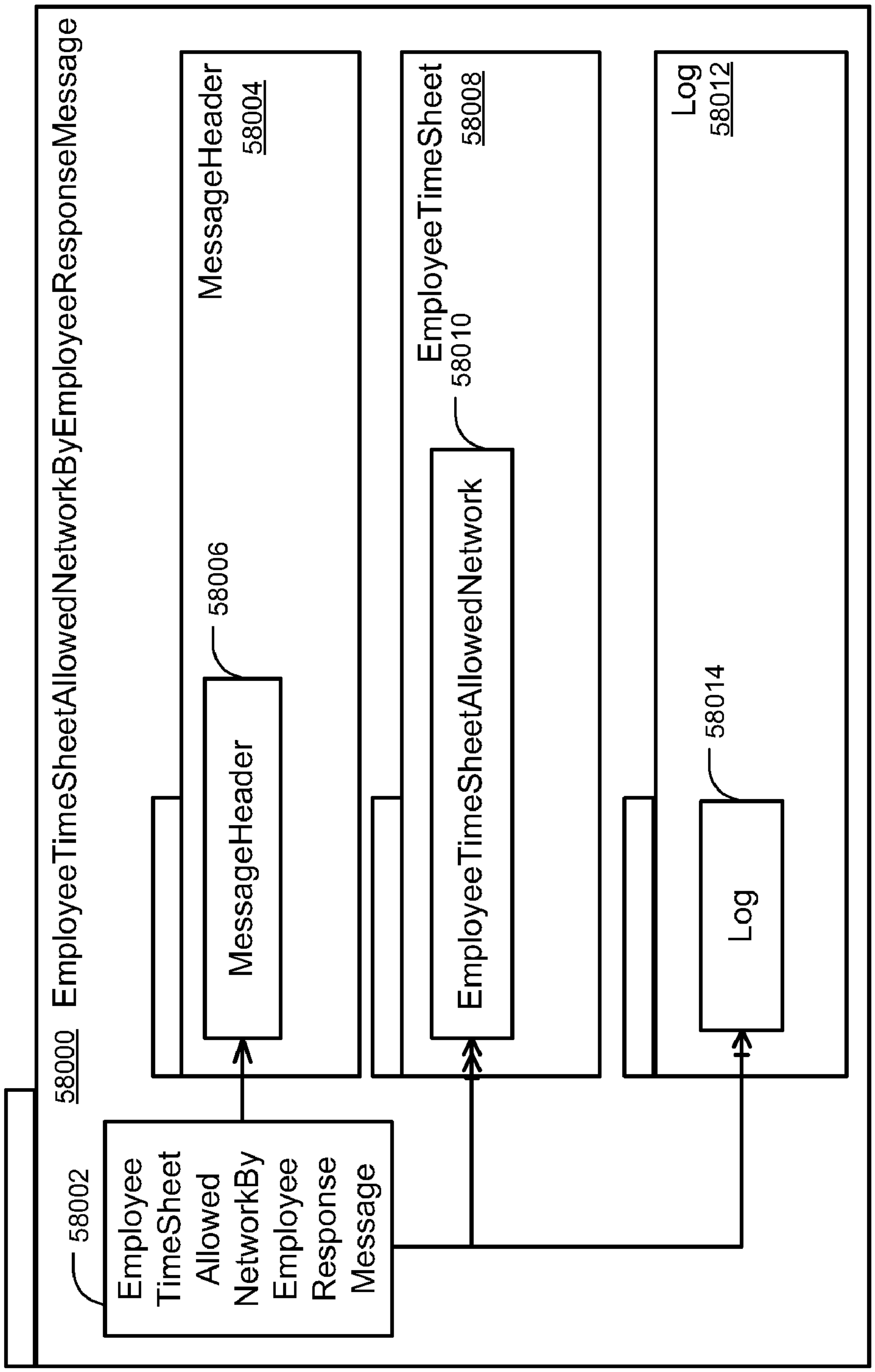
FIG. 58 shows an exemplary EmployeeTimeSheetAllowedNetworkByEmployeeResponseMessage Message Data Type.

Additionally, FIG. 58 illustrates one example logical configuration of EmployeeTimeSheetAllowedNetworkByEmployeeResponseMessage message 58000. Specifically, this figure depicts the arrangement and hierarchy of various components such as one or more levels of packages, entities, and datatypes, shown here as 58000 through 58014. As described above, packages may be used to represent hierarchy levels. Entities are discrete business elements that are used during a business transaction. Data types are used to type object entities and interfaces with a structure. For example, EmployeeTimeSheetAllowedNetworkByEmployeeResponseMessage message 58000 includes, among other things, EmployeeTimeSheet 58008. Accordingly, heterogeneous applications may communicate using this consistent message configured as such.

Figure 59:
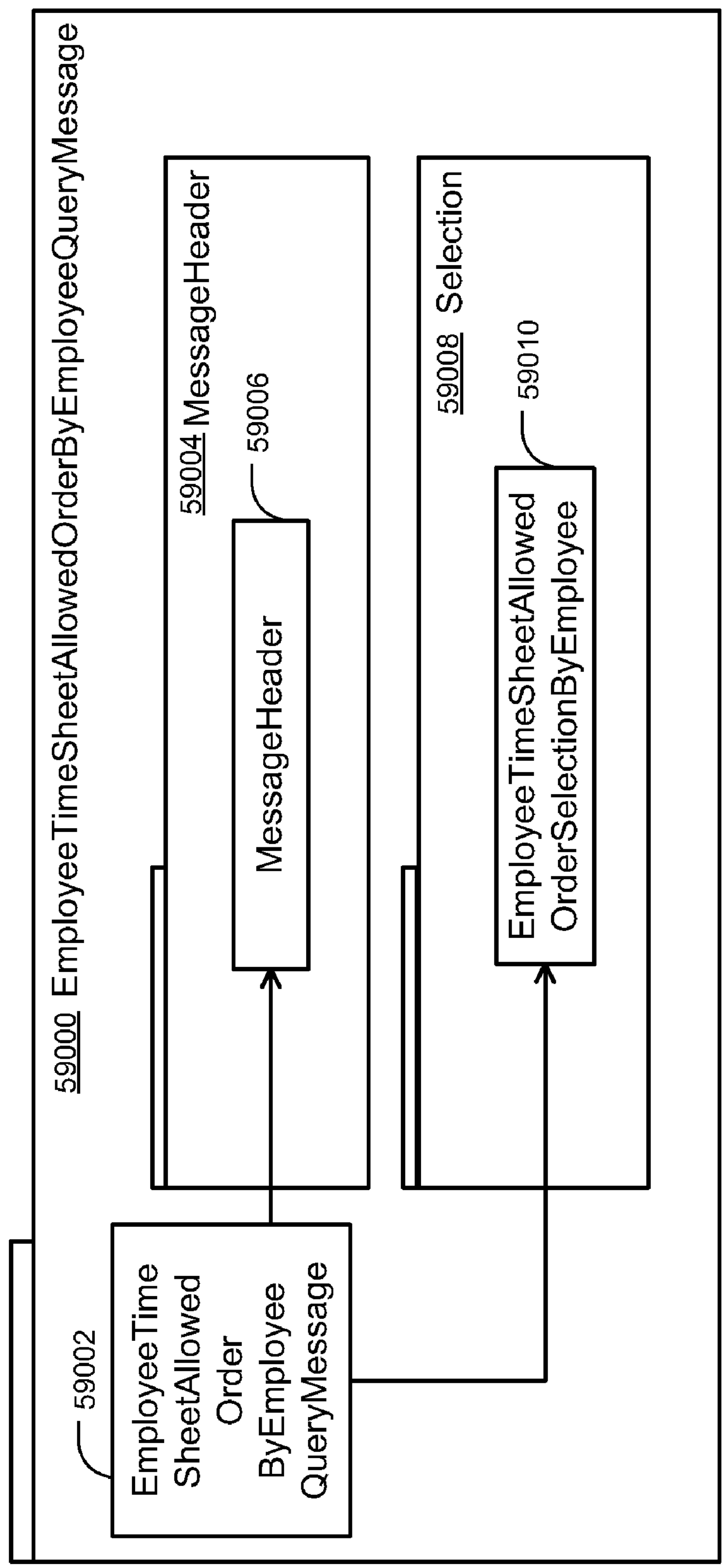
FIG. 59 shows an exemplary EmployeeTimeSheetAllowedOrderByEmployeeQueryMessage Message Data Type.

Additionally, FIG. 59 illustrates one example logical configuration of Employee TimeSheetAllowedOrderByEmployeeQueryMessage message 59000. Specifically, this figure depicts the arrangement and hierarchy of various components such as one or more levels of packages, entities, and datatypes, shown here as 59000 through 59010. As described above, packages may be used to represent hierarchy levels. Entities are discrete business elements that are used during a business transaction. Data types are used to type object entities and interfaces with a structure. For example, EmployeeTimeSheetAllowedOrderByEmployeeQueryMessage message 59000 includes, among other things, Selection 59008. Accordingly, heterogeneous applications may communicate using this consistent message configured as such.

Figure 60:
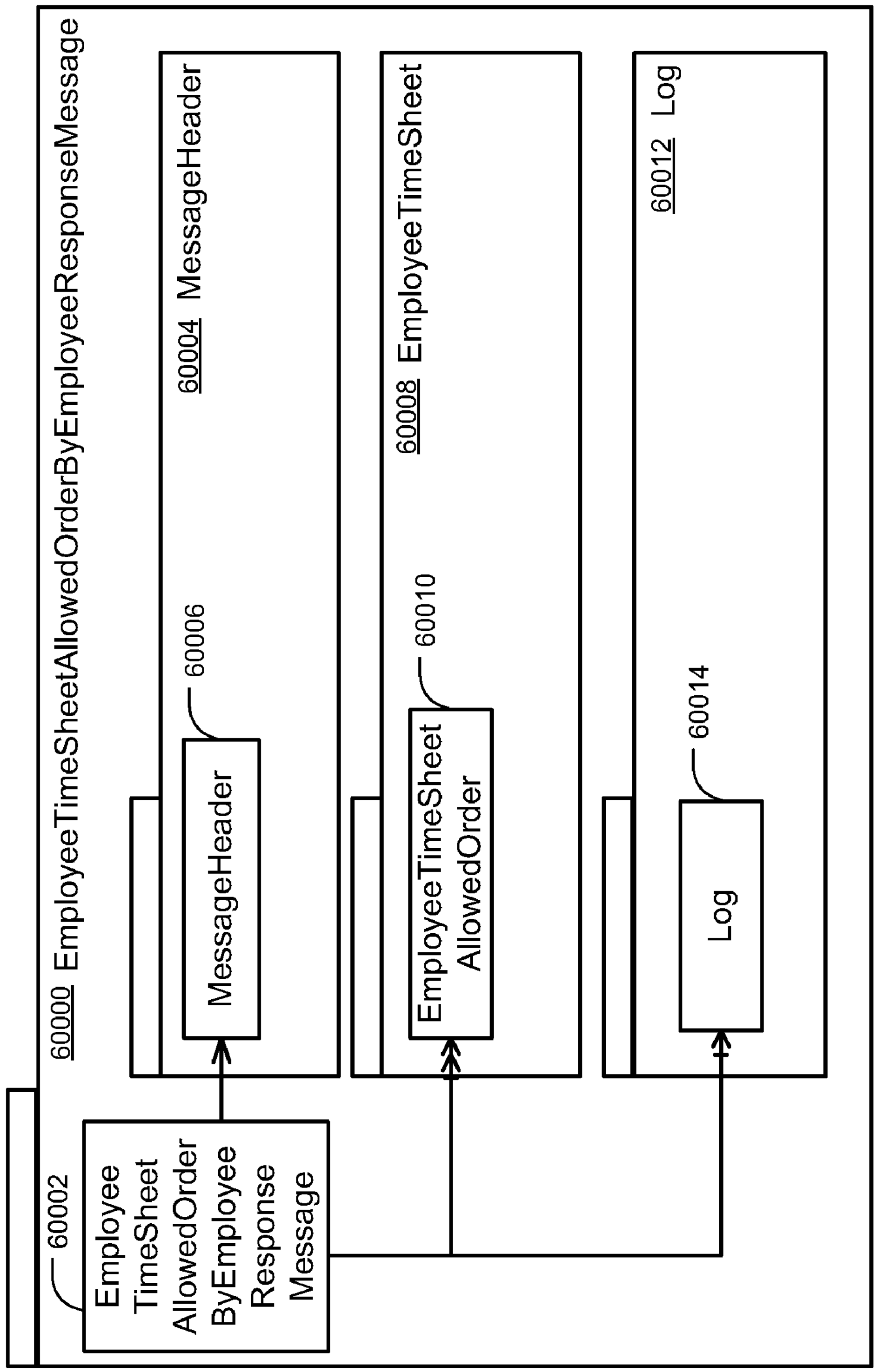
FIG. 60 shows an exemplary EmployeeTimeSheetAllowedOrderByEmployeeResponseMessage Message Data Type.

Additionally, FIG. 60 illustrates one example logical configuration of Employee TimeSheetAllowedOrderByEmployeeResponseMessage message 60000. Specifically, this figure depicts the arrangement and hierarchy of various components such as one or more levels of packages, entities, and datatypes, shown here as 60000 through 60014. As described above, packages may be used to represent hierarchy levels. Entities are discrete business elements that are used during a business transaction. Data types are used to type object entities and interfaces with a structure. For example, EmployeeTimeSheetAllowedOrderByEmployeeResponseMessage message 60000 includes, among other things, EmployeeTimeSheet 60008. Accordingly, heterogeneous applications may communicate using this consistent message configured as such.

Figure 61:
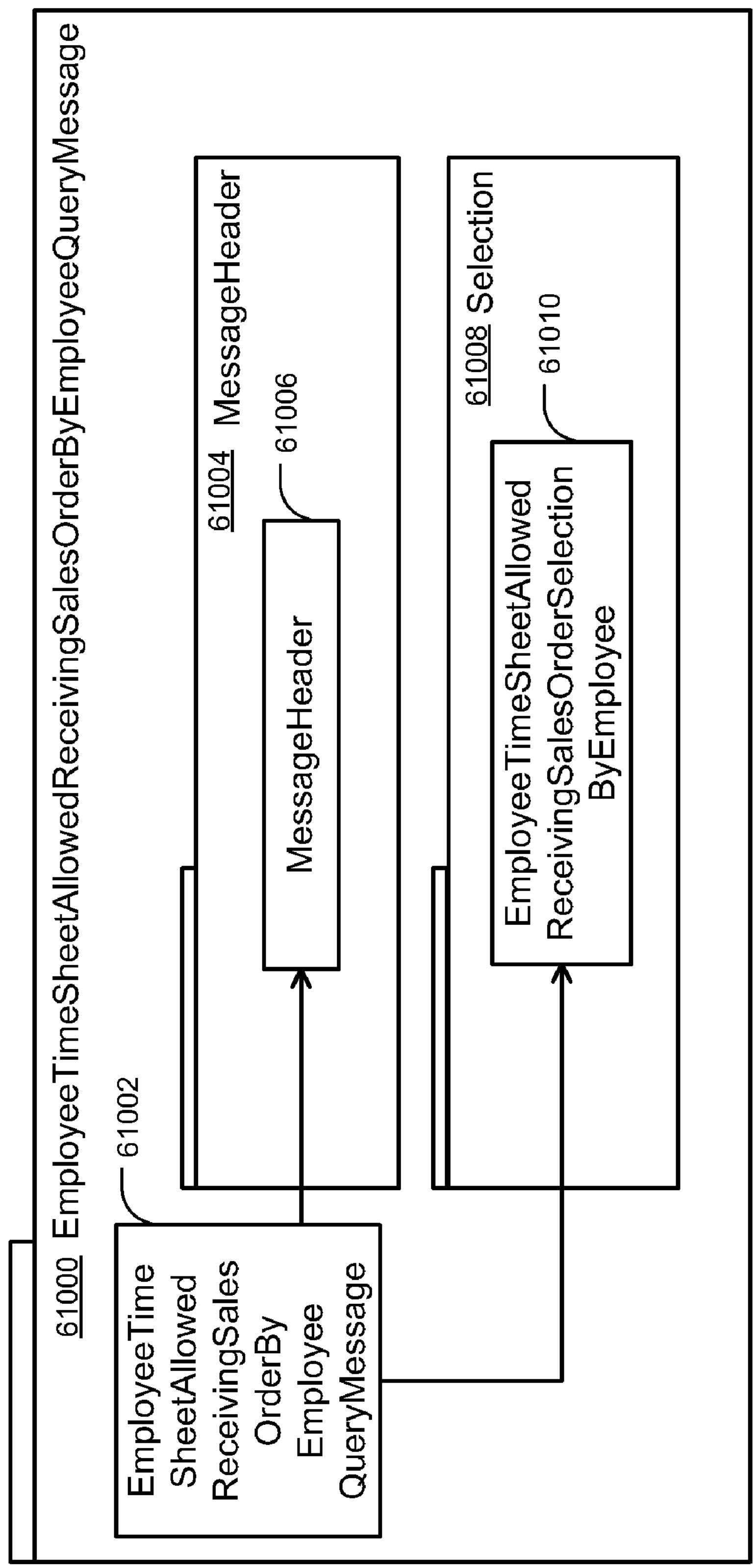
FIG. 61 shows an exemplary EmployeeTimeSheetAllowedReceivingSalesOrderByEmployeeQueryMessage Message Data Type.

Additionally, FIG. 61 illustrates one example logical configuration of EmployeeTimeSheetAllowedReceivingSalesOrderByEmployeeQueryMessage message 61000. Specifically, this figure depicts the arrangement and hierarchy of various components such as one or more levels of packages, entities, and datatypes, shown here as 61000 through 61010. As described above, packages may be used to represent hierarchy levels. Entities are discrete business elements that are used during a business transaction. Data types are used to type object entities and interfaces with a structure. For example, EmployeeTimeSheetAllowedReceivingSalesOrderByEmployeeQueryMessage message 61000 includes, among other things, Selection 61008. Accordingly, heterogeneous applications may communicate using this consistent message configured as such.

Figure 62:
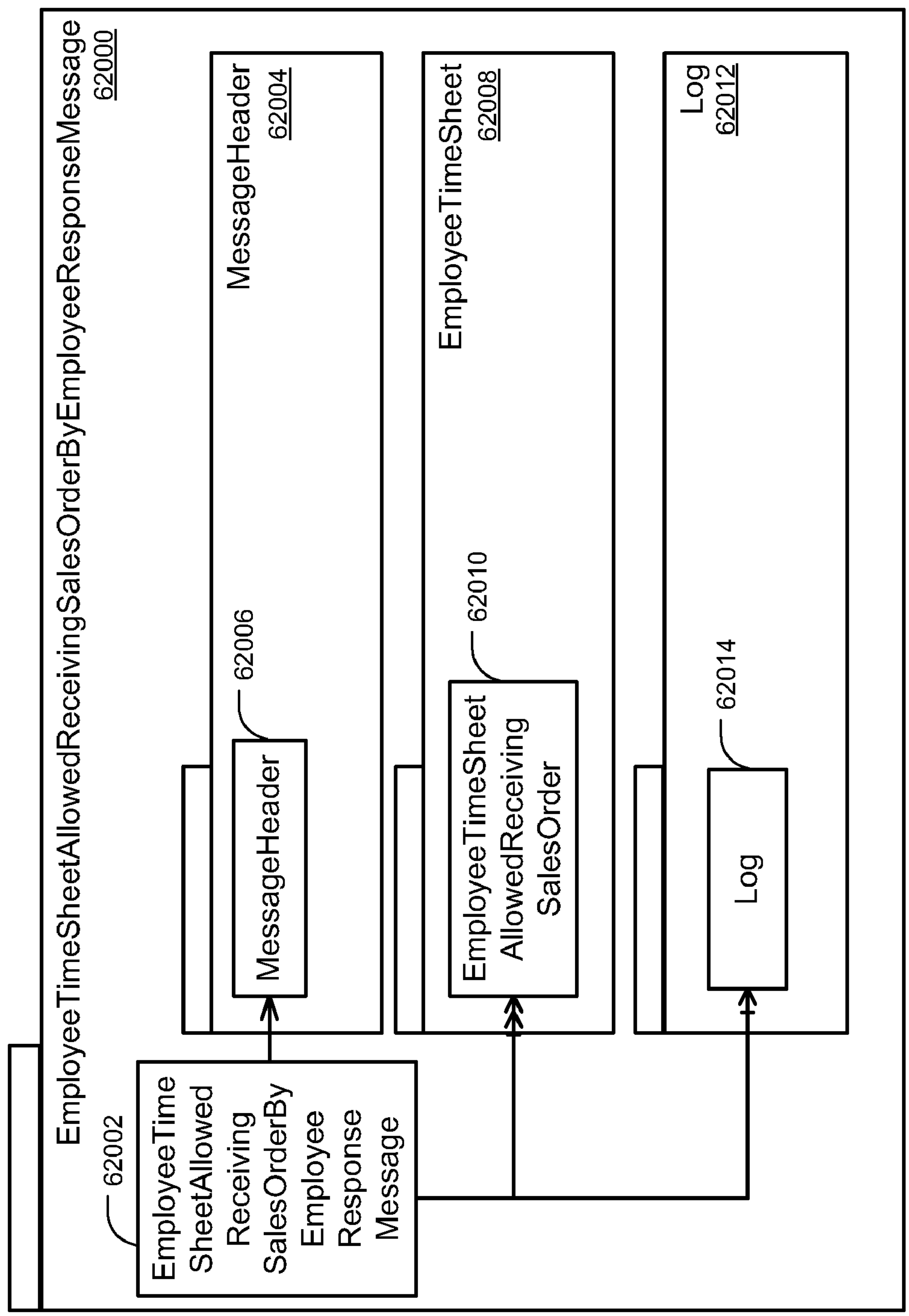
FIG. 62 shows an exemplary EmployeeTimeSheetAllowedReceivingSalesOrderByEmployeeResponseMessage Message Data Type.

Additionally, FIG. 62 illustrates one example logical configuration of EmployeeTimeSheetAllowedReceivingSalesOrderByEmployeeResponseMessage message 62000. Specifically, this figure depicts the arrangement and hierarchy of various components such as one or more levels of packages, entities, and datatypes, shown here as 62000 through 62014. As described above, packages may be used to represent hierarchy levels. Entities are discrete business elements that are used during a business transaction. Data types are used to type object entities and interfaces with a structure. For example, EmployeeTimeSheetAllowedReceivingSalesOrderByEmployeeResponseMessage message 62000 includes, among other things, EmployeeTimeSheet 62008. Accordingly, heterogeneous applications may communicate using this consistent message configured as such.

Figure 63:
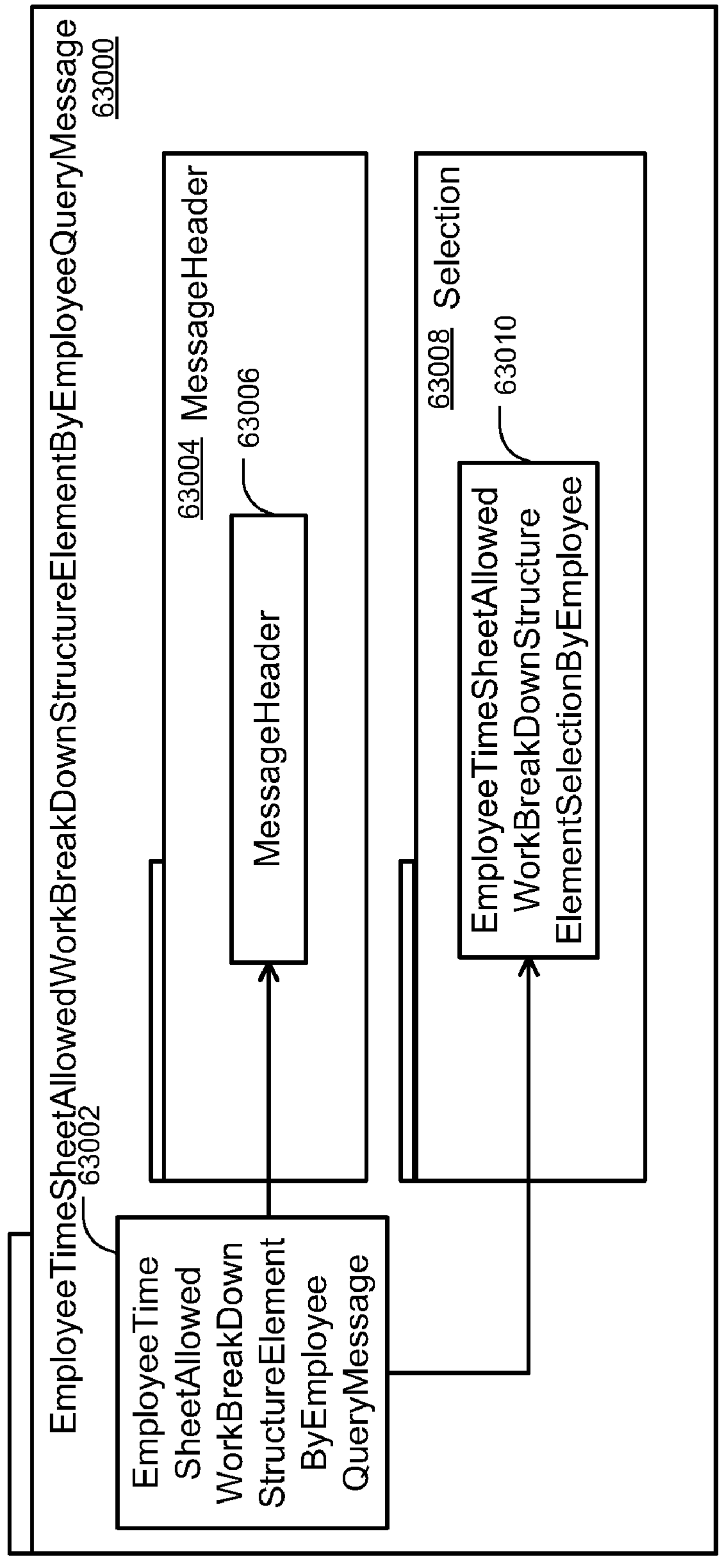
FIG. 63 shows an exemplary EmployeeTimeSheetAllowedWorkBreakDownStructureElementByEmployeeQueryMessage Message Data Type.

Additionally, FIG. 63 illustrates one example logical configuration of EmployeeTimeSheetAllowedWorkBreakDownStructureElementByEmployeeQueryMessage message 63000. Specifically, this figure depicts the arrangement and hierarchy of various components such as one or more levels of packages, entities, and datatypes, shown here as 63000 through 63010. As described above, packages may be used to represent hierarchy levels. Entities are discrete business elements that are used during a business transaction. Data types are used to type object entities and interfaces with a structure. For example, EmployeeTimeSheetAllowedWorkBreakDownStructureElementByEmployeeQueryMessage message 63000 includes, among other things, Selection 63008. Accordingly, heterogeneous applications may communicate using this consistent message configured as such.

Figure 64:
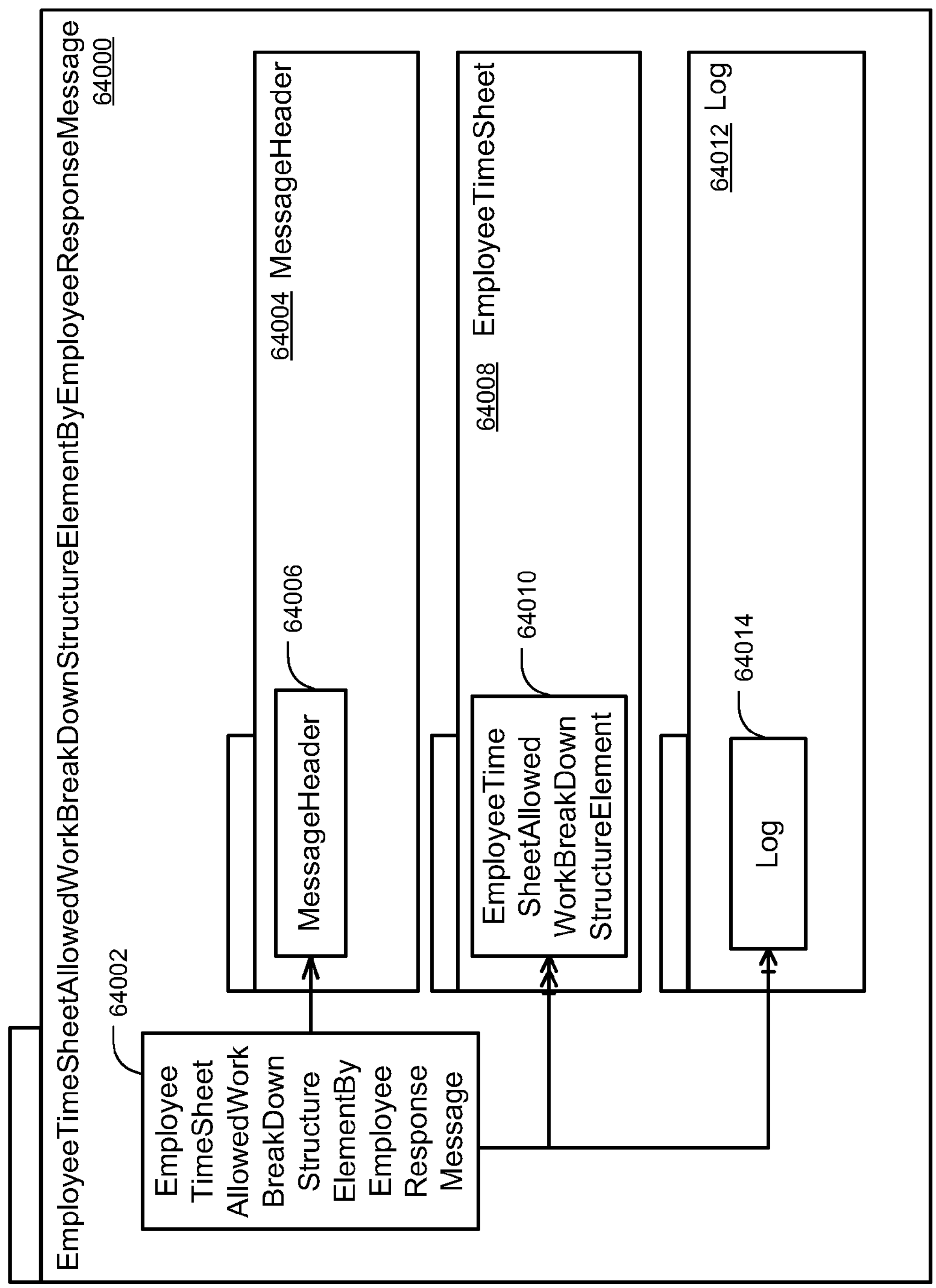
FIG. 64 shows an exemplary EmployeeTimeSheetAllowedWorkBreakDownStructureElementByEmployeeResponseMessage Message Data Type.

Additionally, FIG. 64 illustrates one example logical configuration of EmployeeTimeSheetAllowedWorkBreakDownStructureElementByEmployeeResponseMessage message 64000. Specifically, this figure depicts the arrangement and hierarchy of various components such as one or more levels of packages, entities, and datatypes, shown here as 64000 through 64014. As described above, packages may be used to represent hierarchy levels. Entities are discrete business elements that are used during a business transaction. Data types are used to type object entities and interfaces with a structure. For example, EmployeeTimeSheetAllowedWorkBreakDownStructureElementByEmployeeResponseMessage message 64000 includes, among other things, EmployeeTimeSheet 64008. Accordingly, heterogeneous applications may communicate using this consistent message configured as such.

Figure 65:
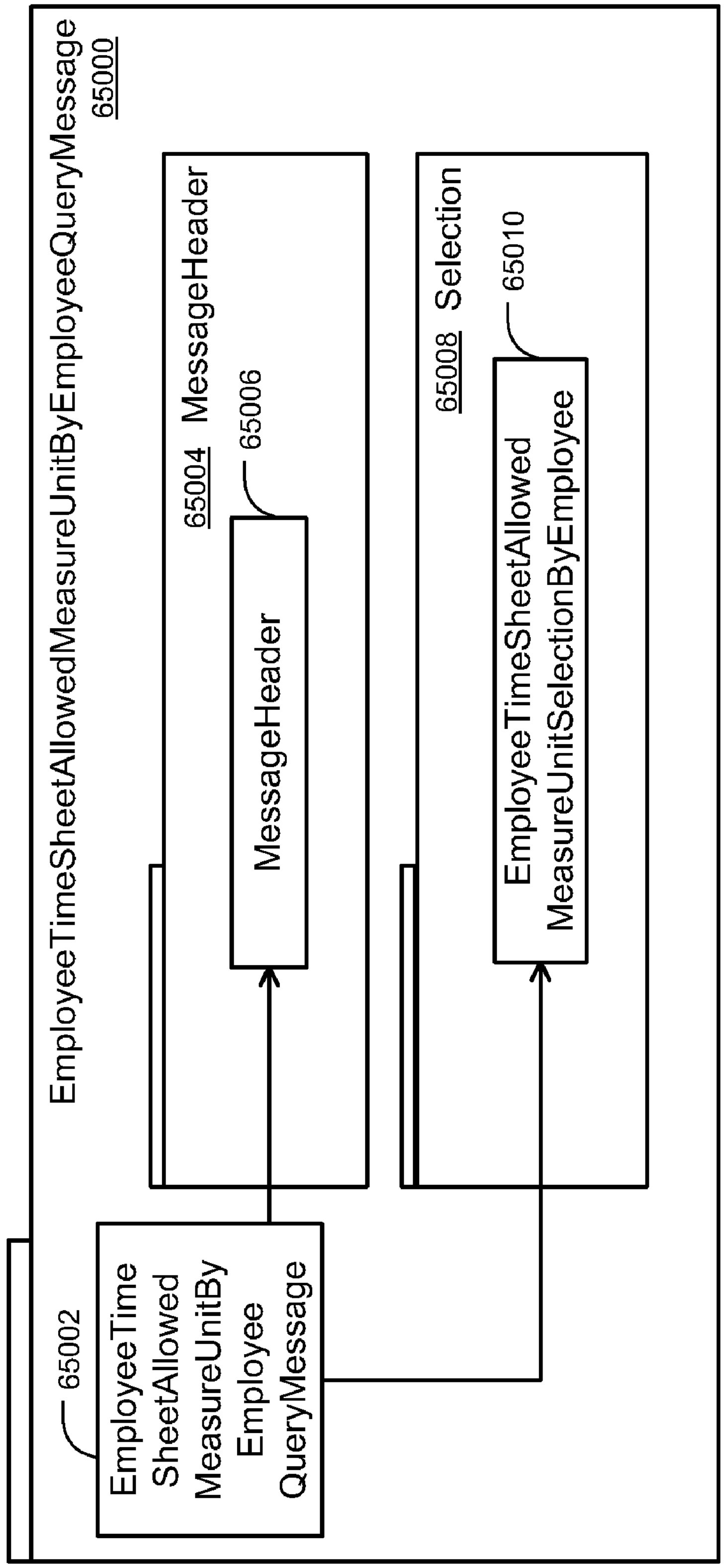
FIG. 65 shows an exemplary EmployeeTimeSheetAllowedMeasureUnitByEmployeeQueryMessage Message Data Type.

Additionally, FIG. 65 illustrates one example logical configuration of EmployeeTimeSheetAllowedMeasureUnitByEmployeeQueryMessage message 65000. Specifically, this figure depicts the arrangement and hierarchy of various components such as one or more levels of packages, entities, and datatypes, shown here as 65000 through 65010. As described above, packages may be used to represent hierarchy levels. Entities are discrete business elements that are used during a business transaction. Data types are used to type object entities and interfaces with a structure. For example, EmployeeTimeSheetAllowedMeasureUnitByEmployeeQueryMessage message 65000 includes, among other things, Selection 65008. Accordingly, heterogeneous applications may communicate using this consistent message configured as such.

Figure 66:
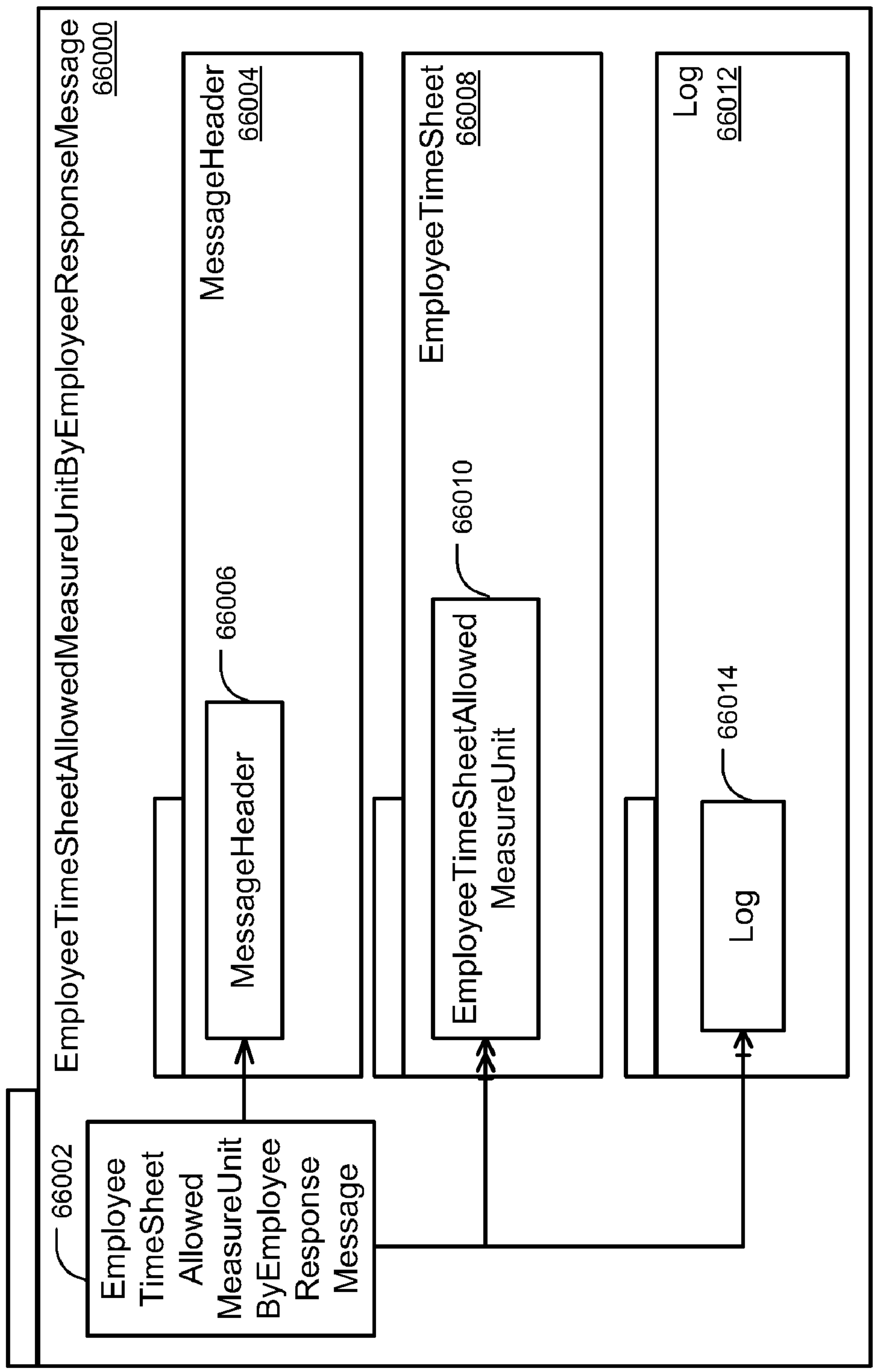
FIG. 66 shows an exemplary EmployeeTimeSheetAllowedMeasureUnitByEmployeeResponseMessage Message Data Type.

Additionally, FIG. 66 illustrates one example logical configuration of EmployeeTimeSheetAllowedMeasureUnitByEmployeeResponseMessage message 66000. Specifically, this figure depicts the arrangement and hierarchy of various components such as one or more levels of packages, entities, and datatypes, shown here as 66000 through 66014. As described above, packages may be used to represent hierarchy levels. Entities are discrete business elements that are used during a business transaction. Data types are used to type object entities and interfaces with a structure. For example, EmployeeTimeSheetAllowedMeasureUnitByEmployeeResponseMessage message 66000 includes, among other things, EmployeeTimeSheet 66008. Accordingly, heterogeneous applications may communicate using this consistent message configured as such.

Figure 67:
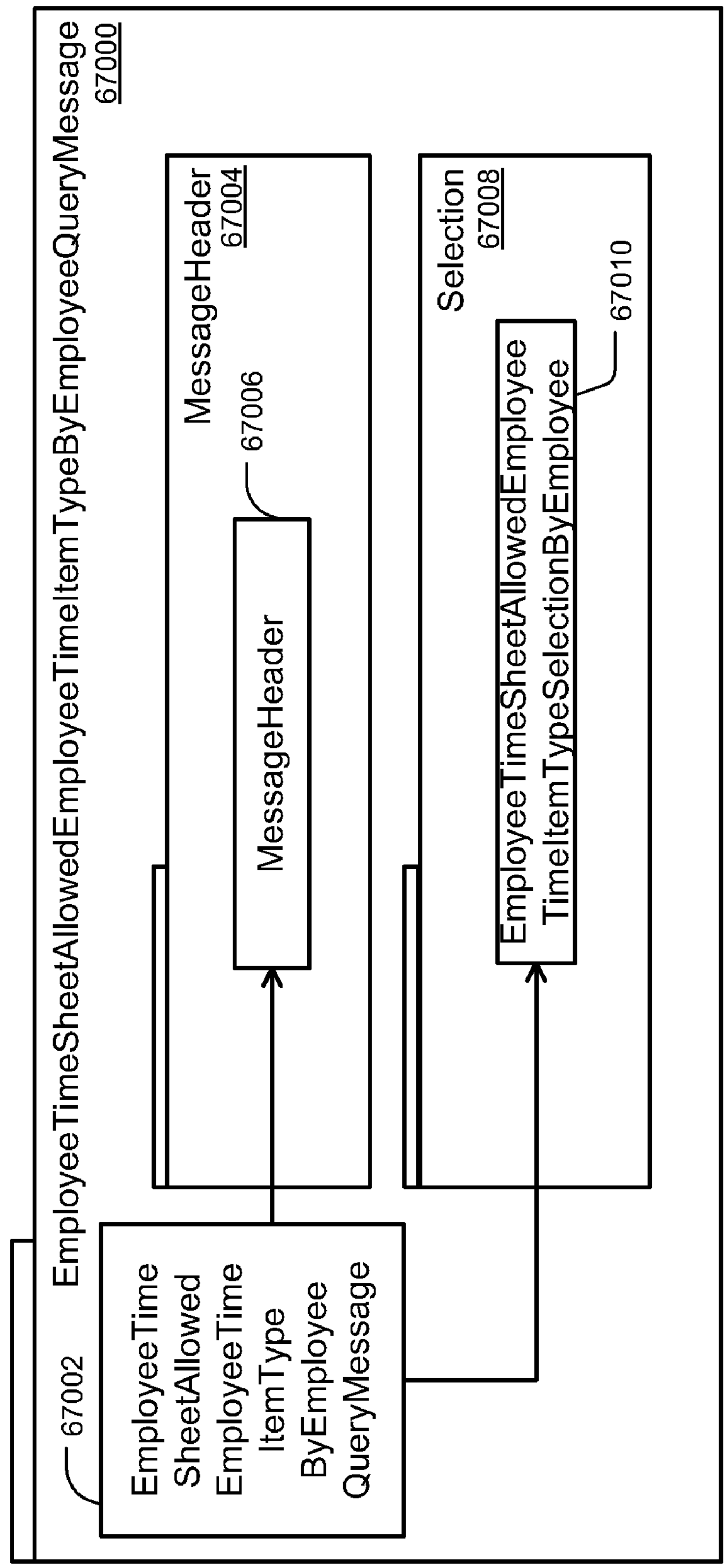
FIG. 67 shows an exemplary EmployeeTimeSheetAllowedEmployeeTimeItemTypeByEmployeeQueryMessage Message Data Type.

Additionally, FIG. 67 illustrates one example logical configuration of EmployeeTimeSheetAllowedEmployeeTimeItemTypeByEmployeeQueryMessage message 67000. Specifically, this figure depicts the arrangement and hierarchy of various components such as one or more levels of packages, entities, and datatypes, shown here as 67000 through 67010. As described above, packages may be used to represent hierarchy levels. Entities are discrete business elements that are used during a business transaction. Data types are used to type object entities and interfaces with a structure. For example, EmployeeTimeSheetAllowedEmployeeTimeItemTypeByEmployeeQueryMessage message 67000 includes, among other things, Selection 67008. Accordingly, heterogeneous applications may communicate using this consistent message configured as such.

Figure 68:
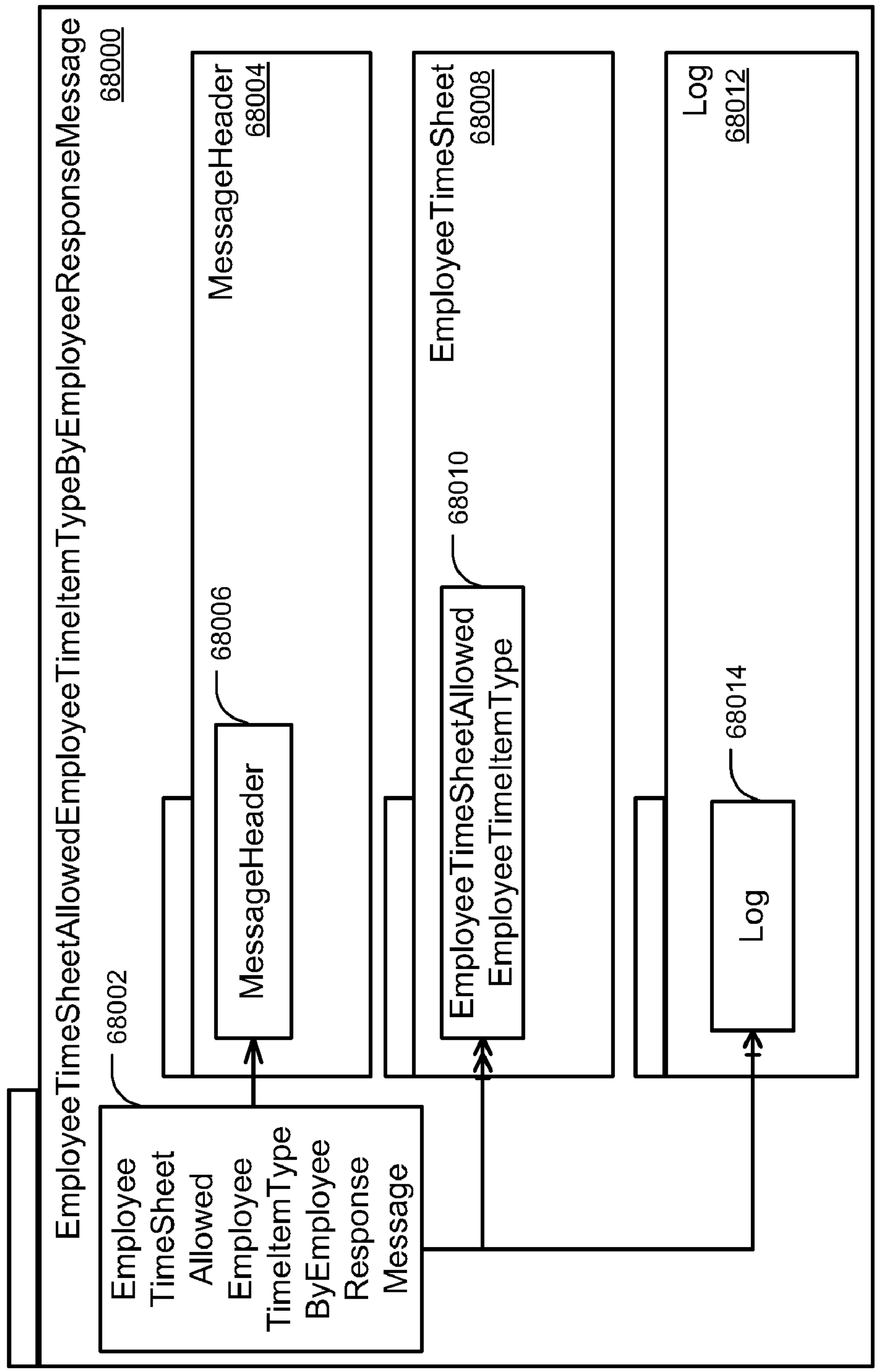
FIG. 68 shows an exemplary EmployeeTimeSheetAllowedEmployeeTimeItemTypeByEmployeeResponseMessage Message Data Type.

Additionally, FIG. 68 illustrates one example logical configuration of EmployeeTimeSheetAllowedEmployeeTimeItemTypeByEmployeeResponseMessage message 68000. Specifically, this figure depicts the arrangement and hierarchy of various components such as one or more levels of packages, entities, and datatypes, shown here as 68000 through 68014. As described above, packages may be used to represent hierarchy levels. Entities are discrete business elements that are used during a business transaction. Data types are used to type object entities and interfaces with a structure. For example, EmployeeTimeSheetAllowedEmployeeTimeItemTypeByEmployeeQueryMessage message 68000 includes, among other things, EmployeeTimeSheet 68008. Accordingly, heterogeneous applications may communicate using this consistent message configured as such.

Figure 69:
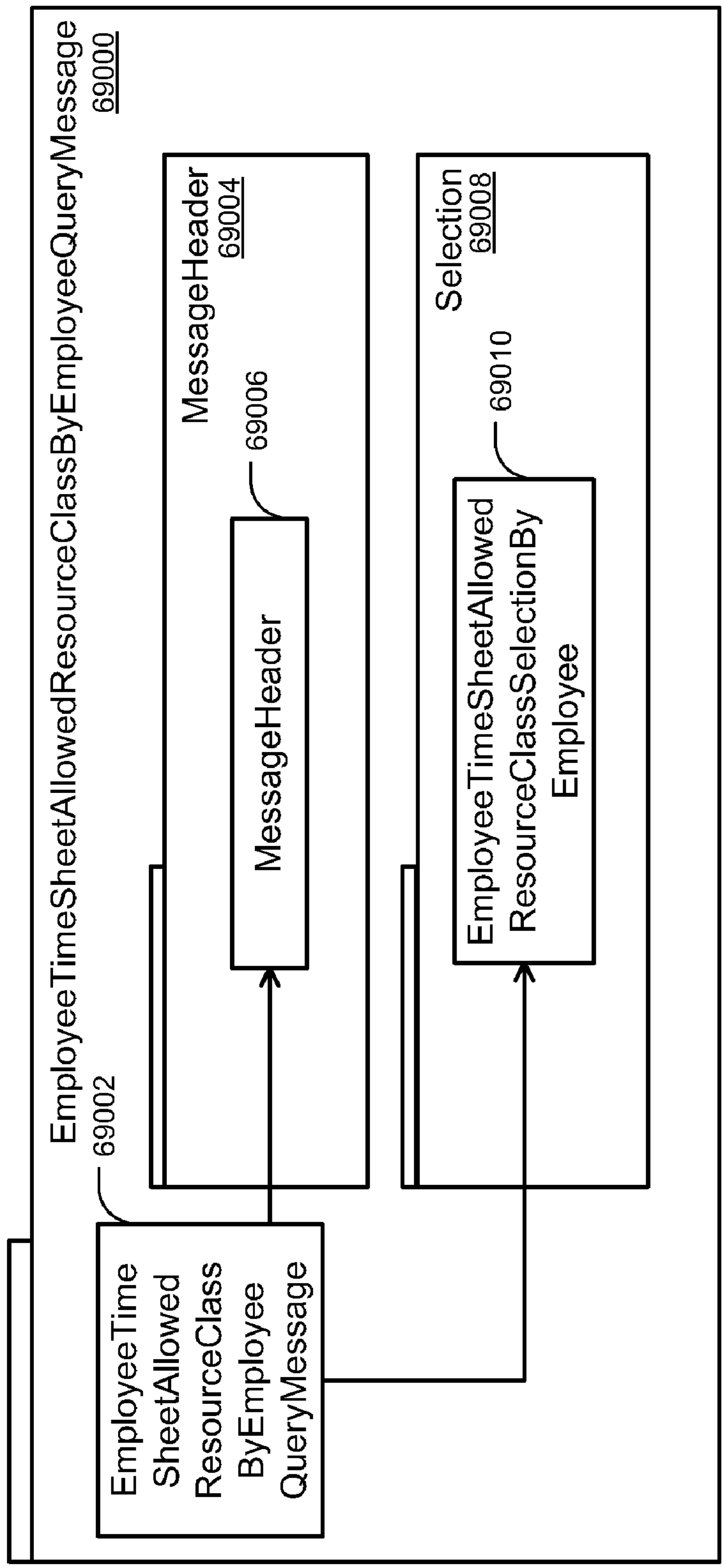
FIG. 69 shows an exemplary EmployeeTimeSheetAllowedResourceClassByEmployeeQueryMessage Message Data Type.

Additionally, FIG. 69 illustrates one example logical configuration of EmployeeTimeSheetAllowedResourceClassByEmployeeQueryMessage message 69000. Specifically, this figure depicts the arrangement and hierarchy of various components such as one or more levels of packages, entities, and datatypes, shown here as 69000 through 69010. As described above, packages may be used to represent hierarchy levels. Entities are discrete business elements that are used during a business transaction. Data types are used to type object entities and interfaces with a structure. For example, EmployeeTimeSheetAllowedResourceClassByEmployeeQueryMessage message 69000 includes, among other things, Selection 69008. Accordingly, heterogeneous applications may communicate using this consistent message configured as such.

Figure 70:
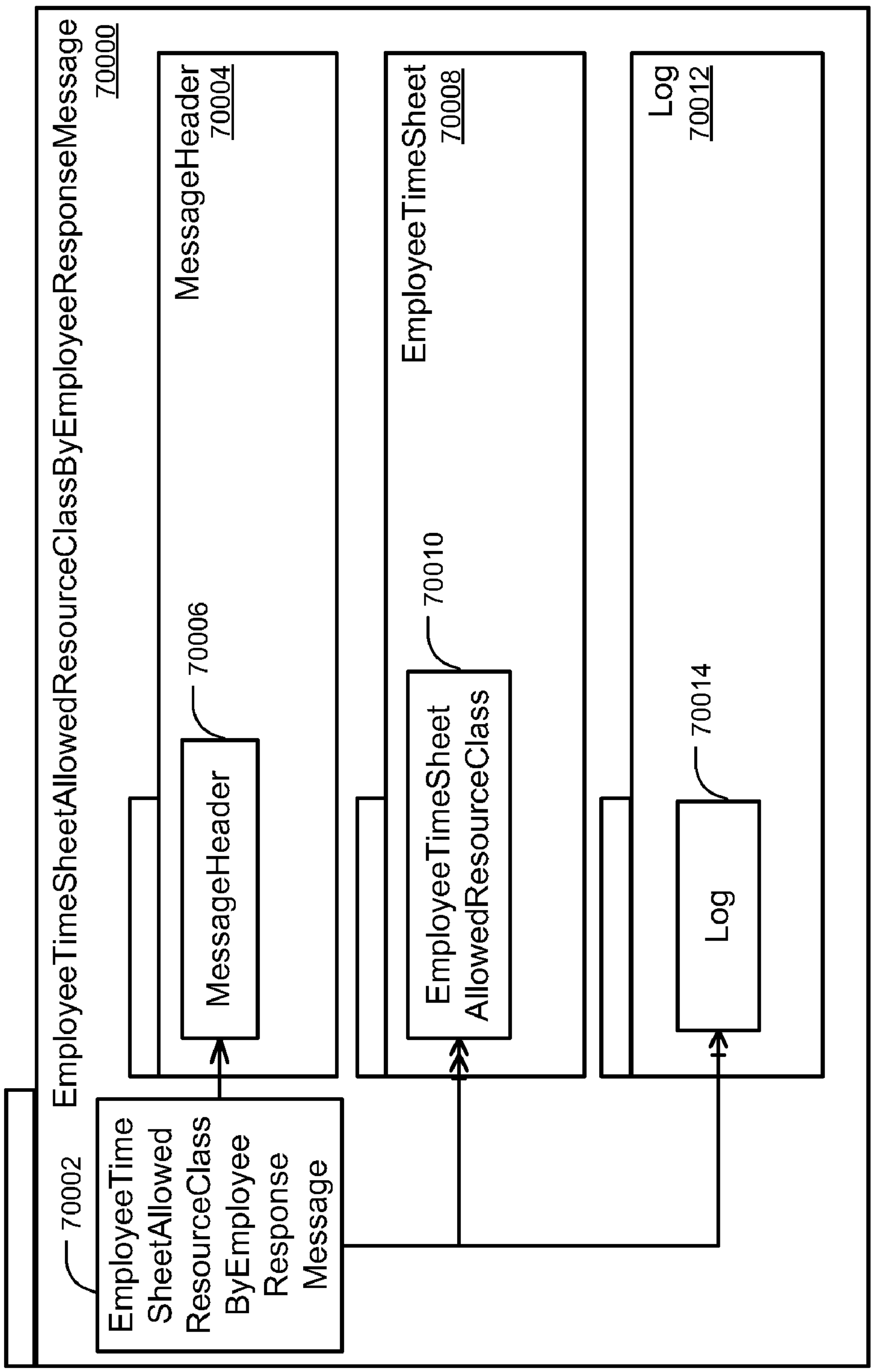
FIG. 70 shows an exemplary EmployeeTimeSheetAllowedResourceClassByEmployeeResponseMessage Message Data Type.

Additionally, FIG. 70 illustrates one example logical configuration of EmployeeTimeSheetAllowedResourceClassByEmployeeResponseMessage message 70000. Specifically, this figure depicts the arrangement and hierarchy of various components such as one or more levels of packages, entities, and datatypes, shown here as 70000 through 70014. As described above, packages may be used to represent hierarchy levels. Entities are discrete business elements that are used during a business transaction. Data types are used to type object entities and interfaces with a structure. For example, EmployeeTimeSheetAllowedResourceClassByEmployeeResponseMessage message 70000 includes, among other things, EmployeeTimeSheet 70008. Accordingly, heterogeneous applications may communicate using this consistent message configured as such.

Figure 71:
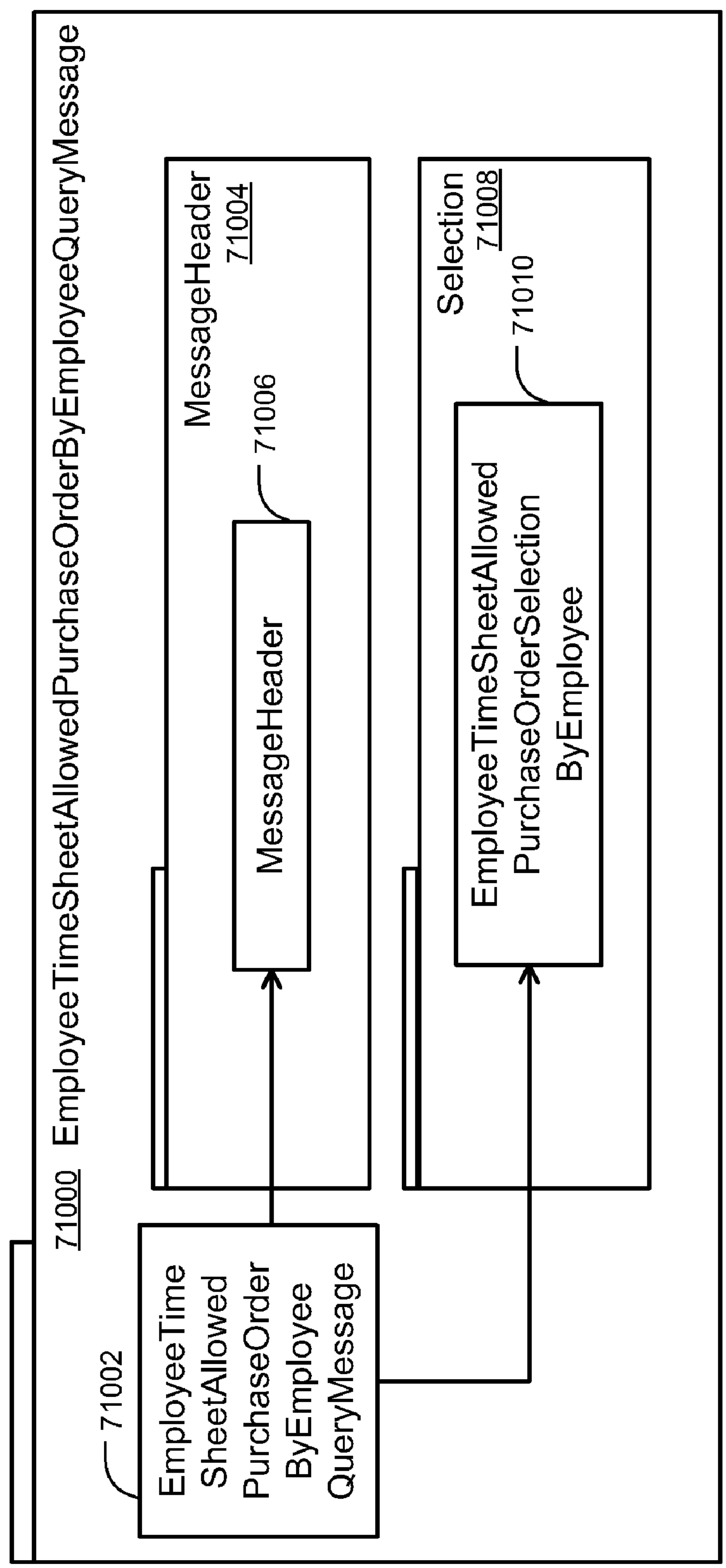
FIG. 71 shows an exemplary EmployeeTimeSheetAllowedPurchaseOrderByEmployeeQueryMessage Message Data Type.

Additionally, FIG. 71 illustrates one example logical configuration of EmployeeTimeSheetAllowedPurchaseOrderByEmployeeQueryMessage message 71000. Specifically, this figure depicts the arrangement and hierarchy of various components such as one or more levels of packages, entities, and datatypes, shown here as 71000 through 71010. As described above, packages may be used to represent hierarchy levels. Entities are discrete business elements that are used during a business transaction. Data types are used to type object entities and interfaces with a structure. For example, EmployeeTimeSheetAllowedPurchaseOrderByEmployeeQueryMessage message 71000 includes, among other things, Selection 71008. Accordingly, heterogeneous applications may communicate using this consistent message configured as such.

Figure 72:
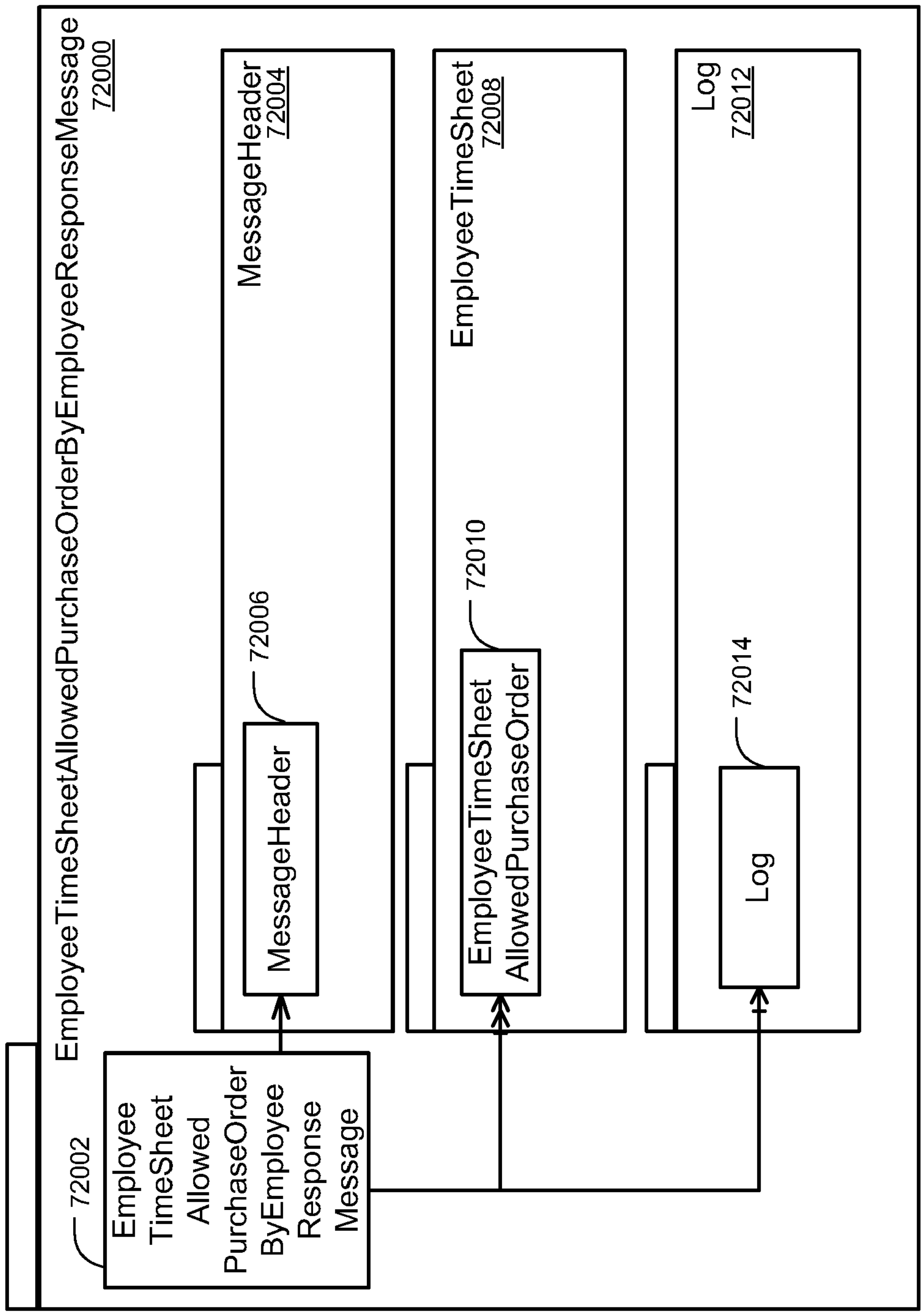
FIG. 72 shows an exemplary EmployeeTimeSheetAllowedPurchaseOrderByEmployeeResponseMessage Message Data Type.

Additionally, FIG. 72 illustrates one example logical configuration of EmployeeTimeSheetAllowedPurchaseOrderByEmployeeResponseMessage message 72000. Specifically, this figure depicts the arrangement and hierarchy of various components such as one or more levels of packages, entities, and datatypes, shown here as 72000 through 72014. As described above, packages may be used to represent hierarchy levels. Entities are discrete business elements that are used during a business transaction. Data types are used to type object entities and interfaces with a structure. For example, EmployeeTime SheetAllowedPurchaseOrderByEmployeeResponseMessage message 72000 includes, among other things, EmployeeTimeSheet 72008. Accordingly, heterogeneous applications may communicate using this consistent message configured as such.

Figure 73:
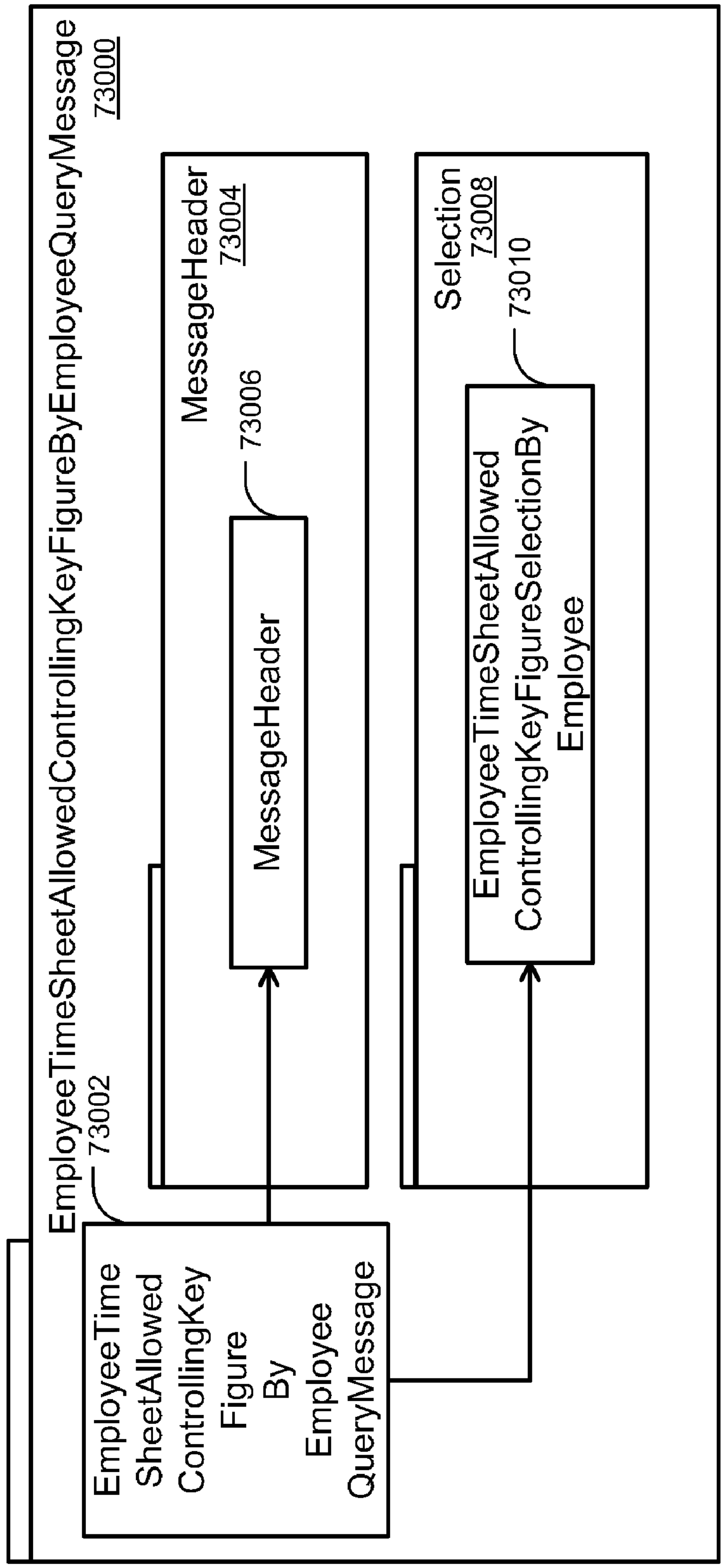
FIG. 73 shows an exemplary EmployeeTimeSheetAllowedControllingKeyFigureByEmployeeQueryMessage Message Data Type.

Additionally, FIG. 73 illustrates one example logical configuration of EmployeeTimeSheetAllowedControllingKeyFigureByEmployeeQueryMessage message 73000. Specifically, this figure depicts the arrangement and hierarchy of various components such as one or more levels of packages, entities, and datatypes, shown here as 73000 through 73010. As described above, packages may be used to represent hierarchy levels. Entities are discrete business elements that are used during a business transaction. Data types are used to type object entities and interfaces with a structure. For example, EmployeeTimeSheetAllowedControllingKeyFigureByEmployeeQueryMessage message 73000 includes, among other things, Selection 73008. Accordingly, heterogeneous applications may communicate using this consistent message configured as such.

Figure 74:
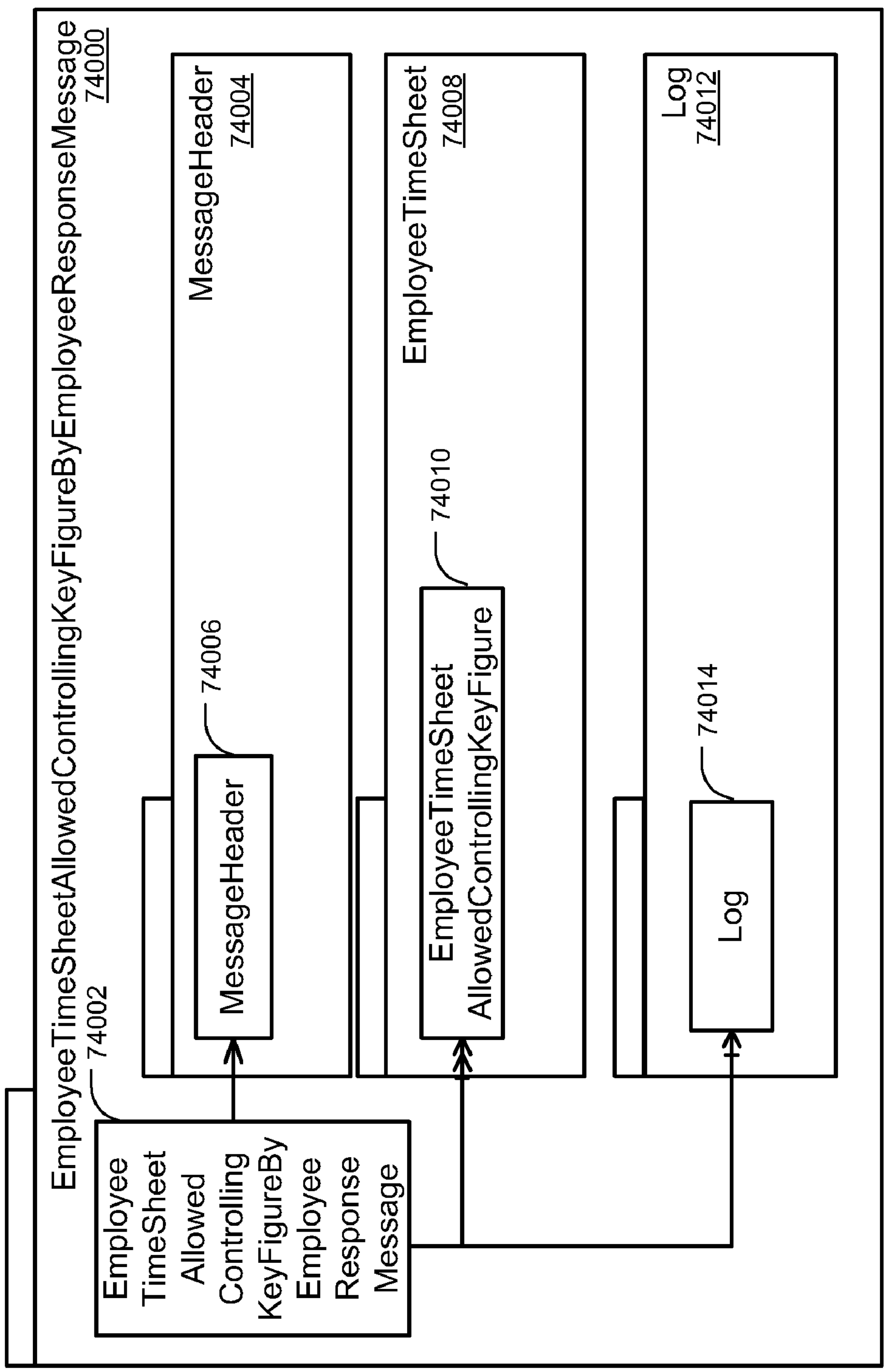
FIG. 74 shows an exemplary EmployeeTimeSheetAllowedControllingKeyFigureByEmployeeResponseMessage Message Data Type.

Additionally, FIG. 74 illustrates one example logical configuration of EmployeeTimeSheetAllowedControllingKeyFigureByEmployeeResponseMessage message 74000. Specifically, this figure depicts the arrangement and hierarchy of various components such as one or more levels of packages, entities, and datatypes, shown here as 74000 through 74014. As described above, packages may be used to represent hierarchy levels. Entities are discrete business elements that are used during a business transaction. Data types are used to type object entities and interfaces with a structure. For example, EmployeeTimeSheetAllowedControllingKeyFigureByEmployeeResponseMessage message 74000 includes, among other things, EmployeeTimeSheet 74008. Accordingly, heterogeneous applications may communicate using this consistent message configured as such.

Figure 75:
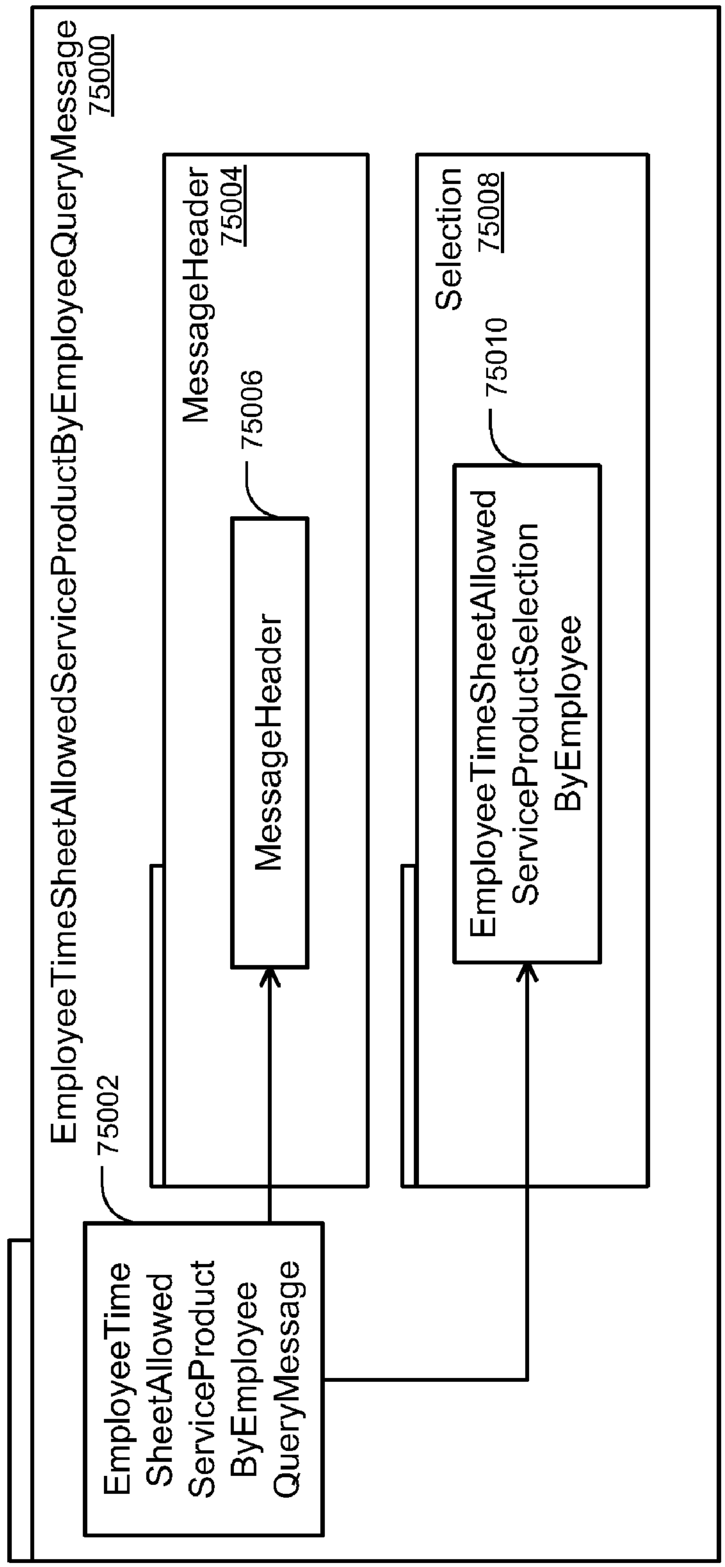
FIG. 75 shows an exemplary EmployeeTimeSheetAllowedServiceProductByEmployeeQueryMessage Message Data Type.

Additionally, FIG. 75 illustrates one example logical configuration of EmployeeTimeSheetAllowedServiceProductByEmployeeQueryMessage message 75000. Specifically, this figure depicts the arrangement and hierarchy of various components such as one or more levels of packages, entities, and datatypes, shown here as 75000 through 75010. As described above, packages may be used to represent hierarchy levels. Entities are discrete business elements that are used during a business transaction. Data types are used to type object entities and interfaces with a structure. For example, EmployeeTimeSheetAllowedServiceProductByEmployeeQueryMessage message 75000 includes, among other things, Selection 75008. Accordingly, heterogeneous applications may communicate using this consistent message configured as such.

Figure 76:
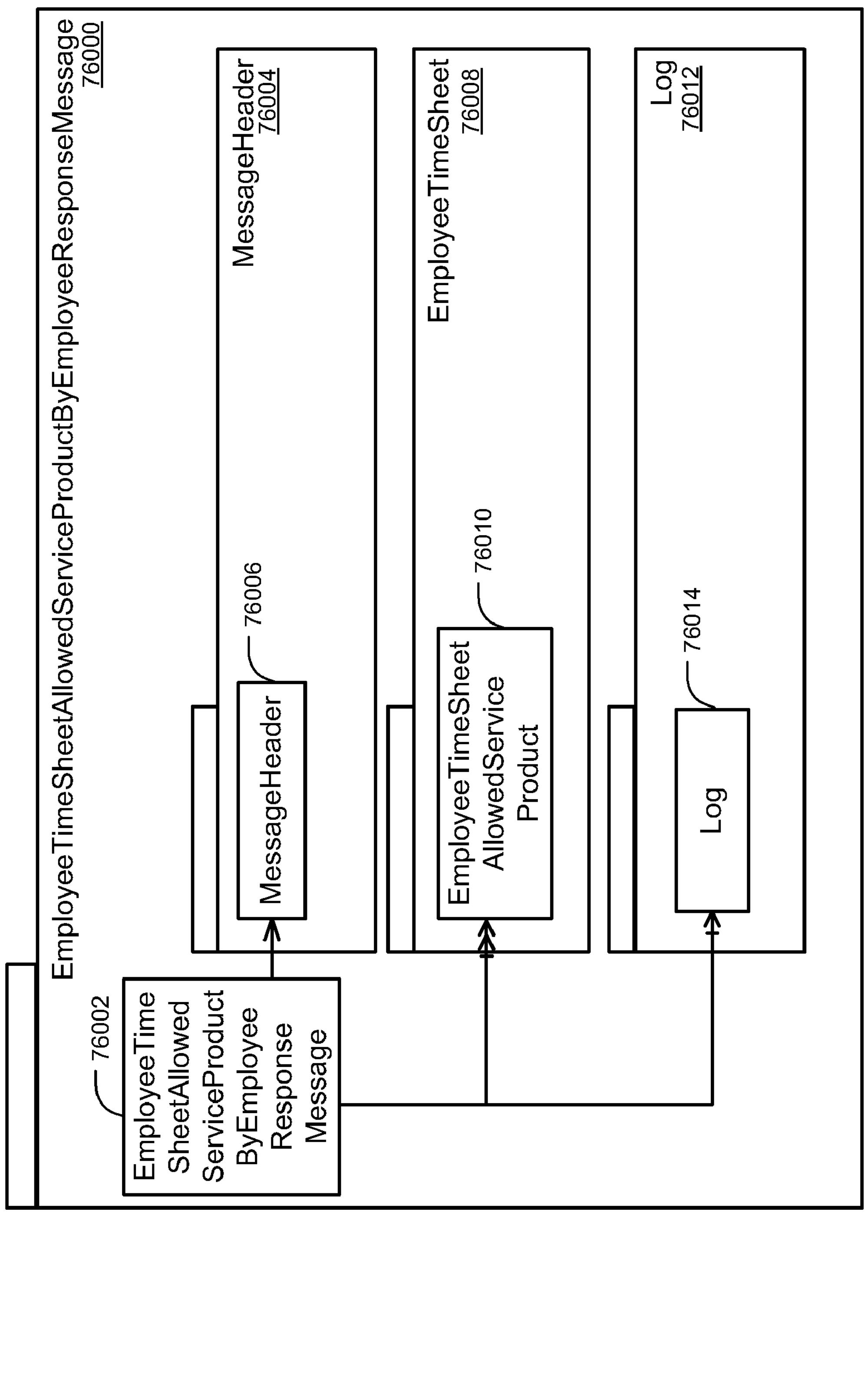
FIG. 76 shows an exemplary EmployeeTimeSheetAllowedServiceProductByEmployeeResponseMessage Message Data Type.

Additionally, FIG. 76 illustrates one example logical configuration of EmployeeTimeSheetAllowedServiceProductByEmployeeResponseMessage message 76000. Specifically, this figure depicts the arrangement and hierarchy of various components such as one or more levels of packages, entities, and datatypes, shown here as 76000 through 76014. As described above, packages may be used to represent hierarchy levels. Entities are discrete business elements that are used during a business transaction. Data types are used to type object entities and interfaces with a structure. For example, EmployeeTimeSheetAllowedServiceProductByEmployeeResponseMessage message 76000 includes, among other things, EmployeeTimeSheet 76008. Accordingly, heterogeneous applications may communicate using this consistent message configured as such.

Figure 77:
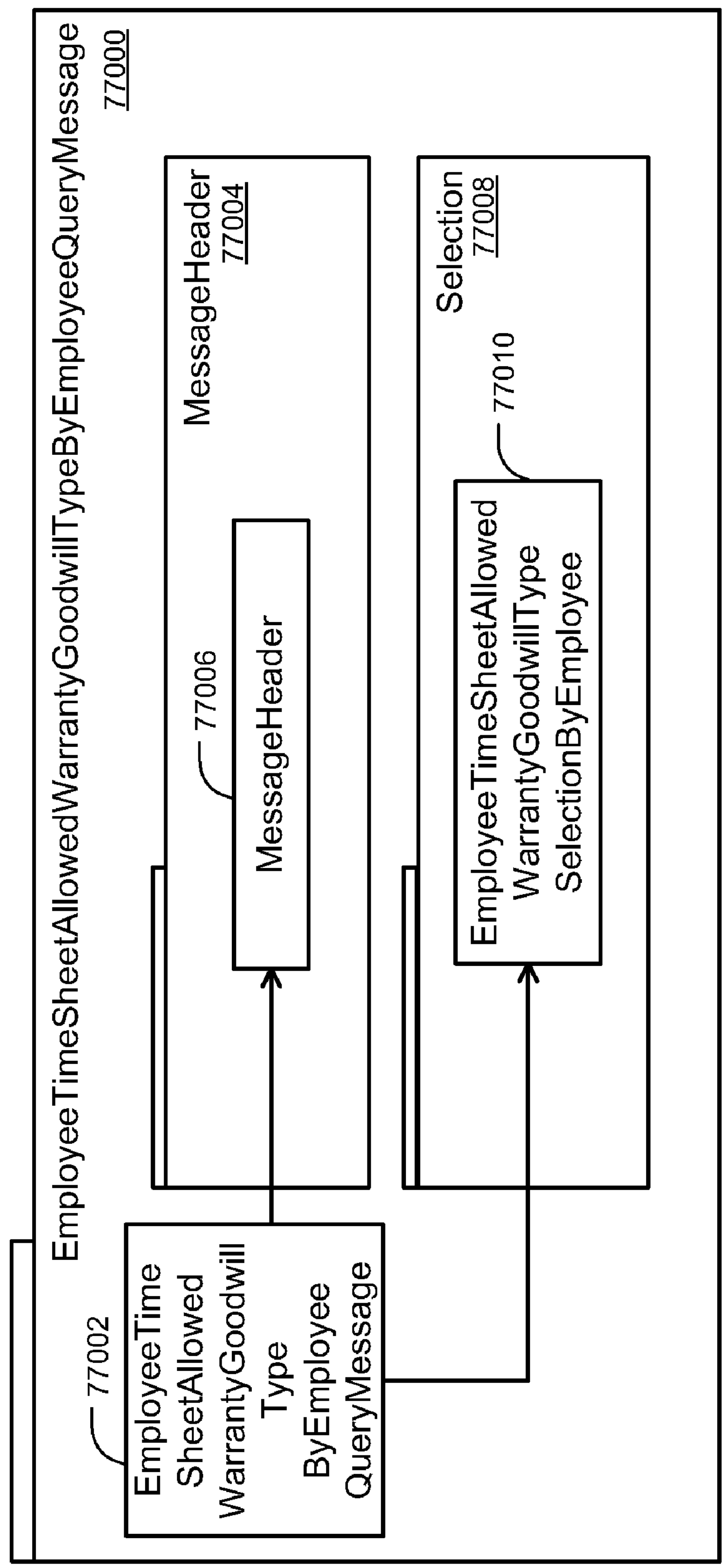
FIG. 77 shows an exemplary EmployeeTimeSheetAllowedWarrantyGoodwillTypeByEmployeeQueryMessage Message Data Type.

Additionally, FIG. 77 illustrates one example logical configuration of EmployeeTimeSheetAllowedWarrantyGoodwillTypeByEmployeeQueryMessage message 77000. Specifically, this figure depicts the arrangement and hierarchy of various components such as one or more levels of packages, entities, and datatypes, shown here as 77000 through 77010. As described above, packages may be used to represent hierarchy levels. Entities are discrete business elements that are used during a business transaction. Data types are used to type object entities and interfaces with a structure. For example, EmployeeTimeSheetAllowedWarrantyGoodwillTypeByEmployeeQueryMessage message 77000 includes, among other things, Selection 77008.

Accordingly, heterogeneous applications may communicate using this consistent message configured as such.

Figure 78:
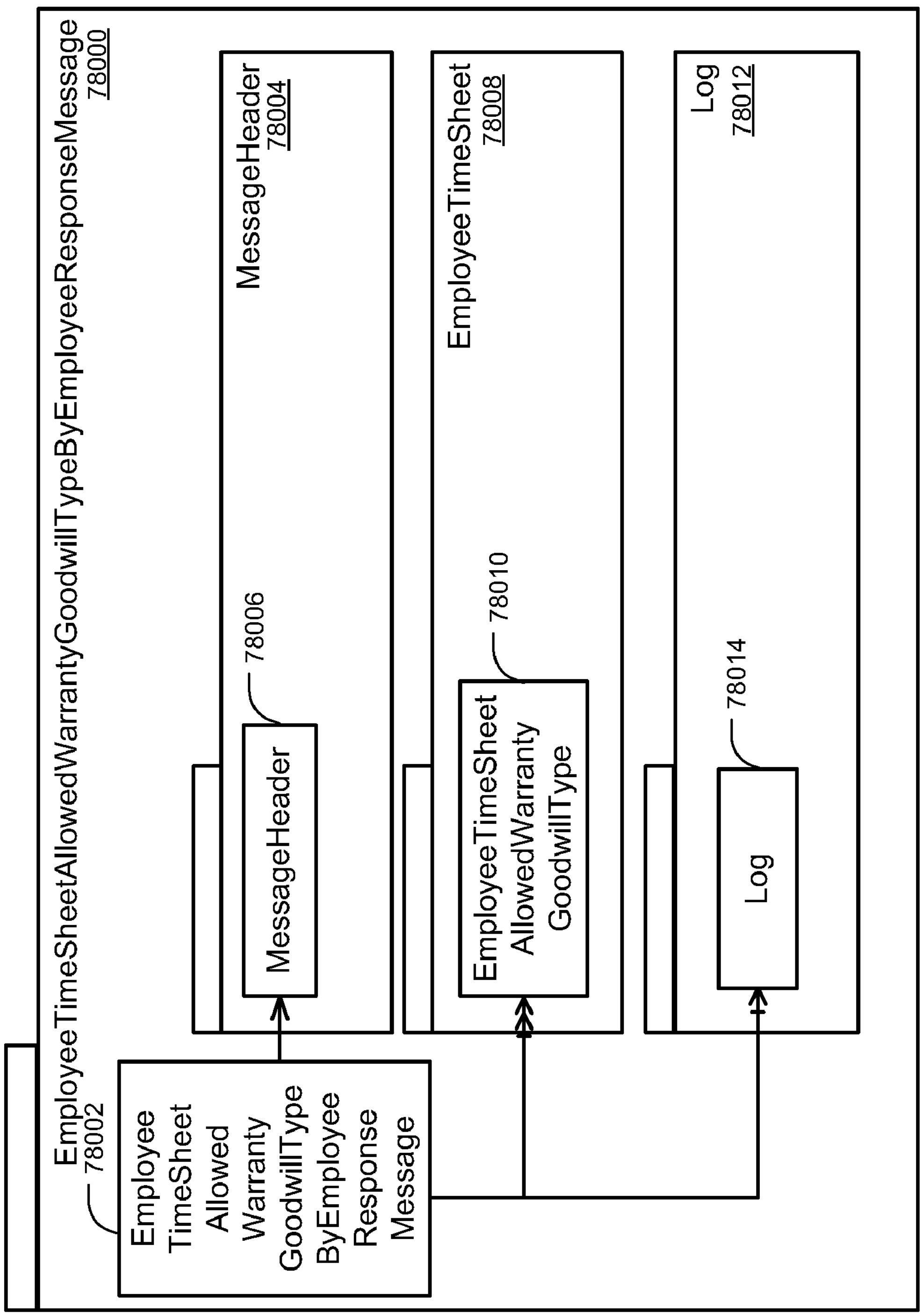
FIG. 78 shows an exemplary EmployeeTimeSheetAllowedWarrantyGoodwillType-ByEmployeeResponseMessage Message Data Type.

Additionally, FIG. 78 illustrates one example logical configuration of EmployeeTimeSheetAllowedWarrantyGoodwillTypeByEmployeeResponseMessage message 78000. Specifically, this figure depicts the arrangement and hierarchy of various components such as one or more levels of packages, entities, and datatypes, shown here as 78000 through 78014. As described above, packages may be used to represent hierarchy levels. Entities are discrete business elements that are used during a business transaction. Data types are used to type object entities and interfaces with a structure. For example, EmployeeTimeSheetAllowedWarrantyGoodwillTypeByEmployeeResponseMessage message 78000 includes, among other things, EmployeeTimeSheet 78008. Accordingly, heterogeneous applications may communicate using this consistent message configured as such.

Figure 79:
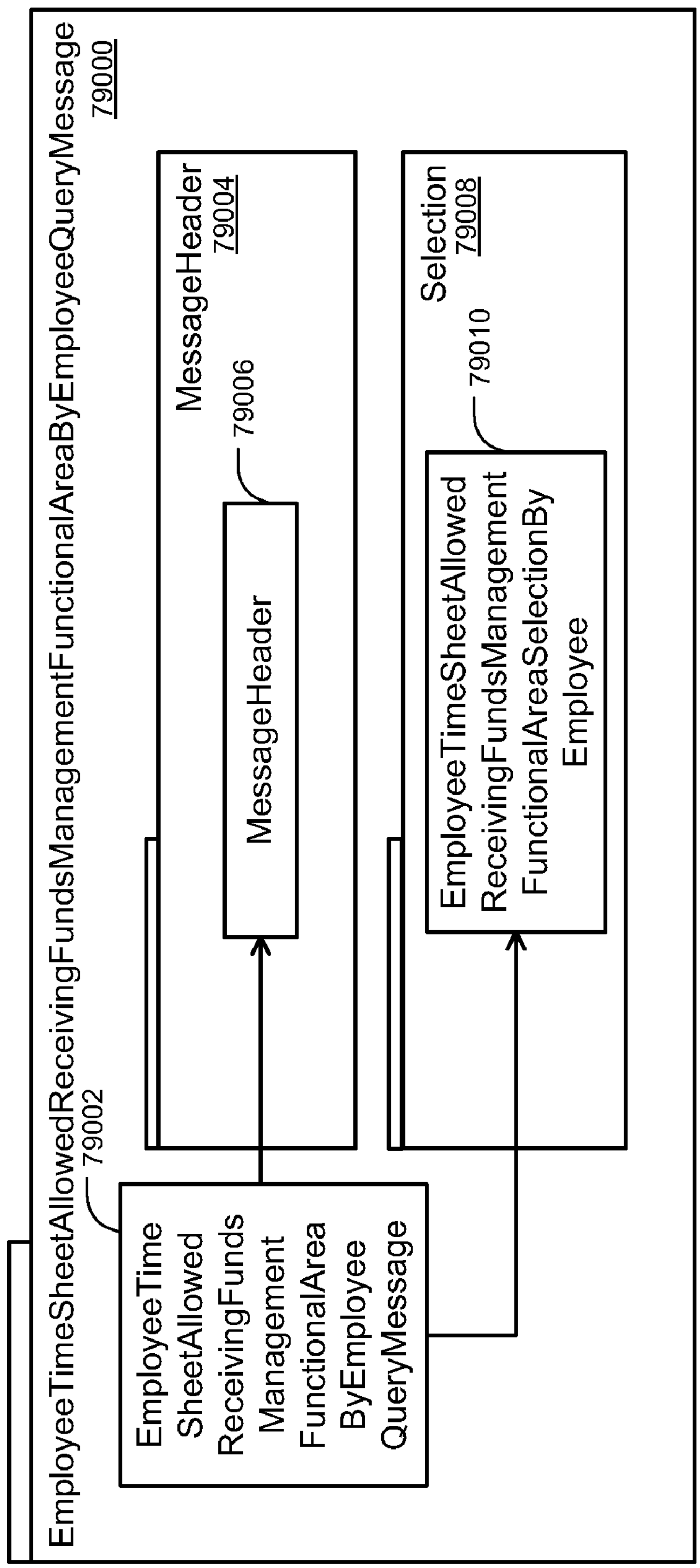
FIG. 79 shows an exemplary EmployeeTimeSheetAllowedFunctionalAreaByEmployeeQueryMessage Message Data Type.

Additionally, FIG. 79 illustrates one example logical configuration of EmployeeTimeSheetAllowedReceivingFundsManagementFunctionalAreaByEmployeeQueryMessage message 79000. Specifically, this figure depicts the arrangement and hierarchy of various components such as one or more levels of packages, entities, and datatypes, shown here as 79000 through 79010. As described above, packages may be used to represent hierarchy levels. Entities are discrete business elements that are used during a business transaction. Data types are used to type object entities and interfaces with a structure. For example, EmployeeTimeSheetAllowedReceivingFundsManagementFunctionalAreaByEmployeeQueryMessage message 79000 includes, among other things, Selection 79008. Accordingly, heterogeneous applications may communicate using this consistent message configured as such.

Figure 80:
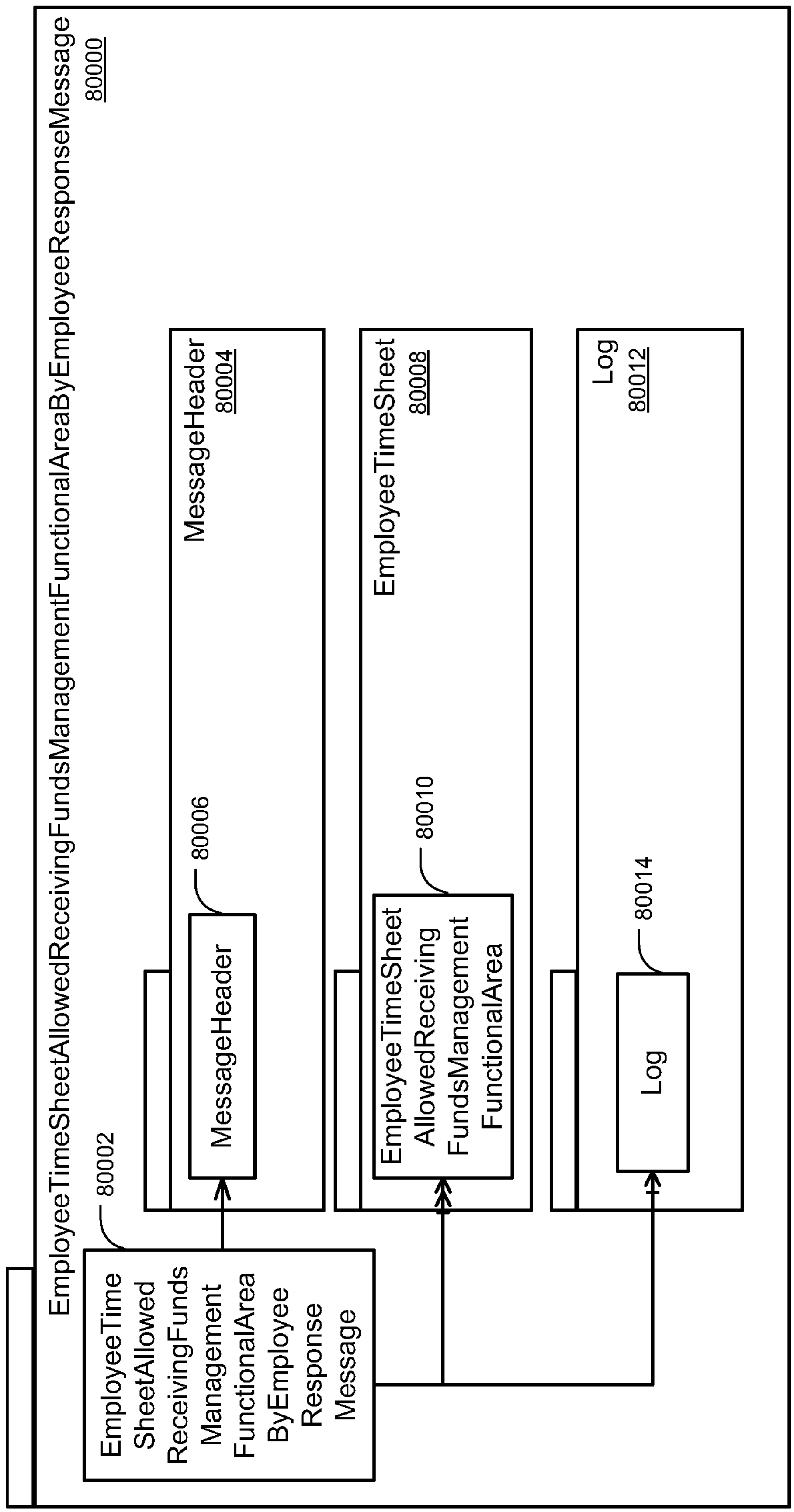
FIG. 80 shows an exemplary EmployeeTimeSheetAllowedFunctionalAreaByEmployeeResponseMessage Message Data Type.

Additionally, FIG. 80 illustrates one example logical configuration of EmployeeTimeSheetAllowedReceivingFundsManagementFunctionalAreaByEmployeeResponseMessage message 80000. Specifically, this figure depicts the arrangement and hierarchy of various components such as one or more levels of packages, entities, and datatypes, shown here as 80000 through 80014. As described above, packages may be used to represent hierarchy levels. Entities are discrete business elements that are used during a business transaction. Data types are used to type object entities and interfaces with a structure. For example, EmployeeTimeSheetAllowedReceivingFundsManagementFunctionalAreaByEmployeeResponseMessage message 80000 includes, among other things, EmployeeTimeSheet 80008. Accordingly, heterogeneous applications may communicate using this consistent message configured as such.

Figure 81:
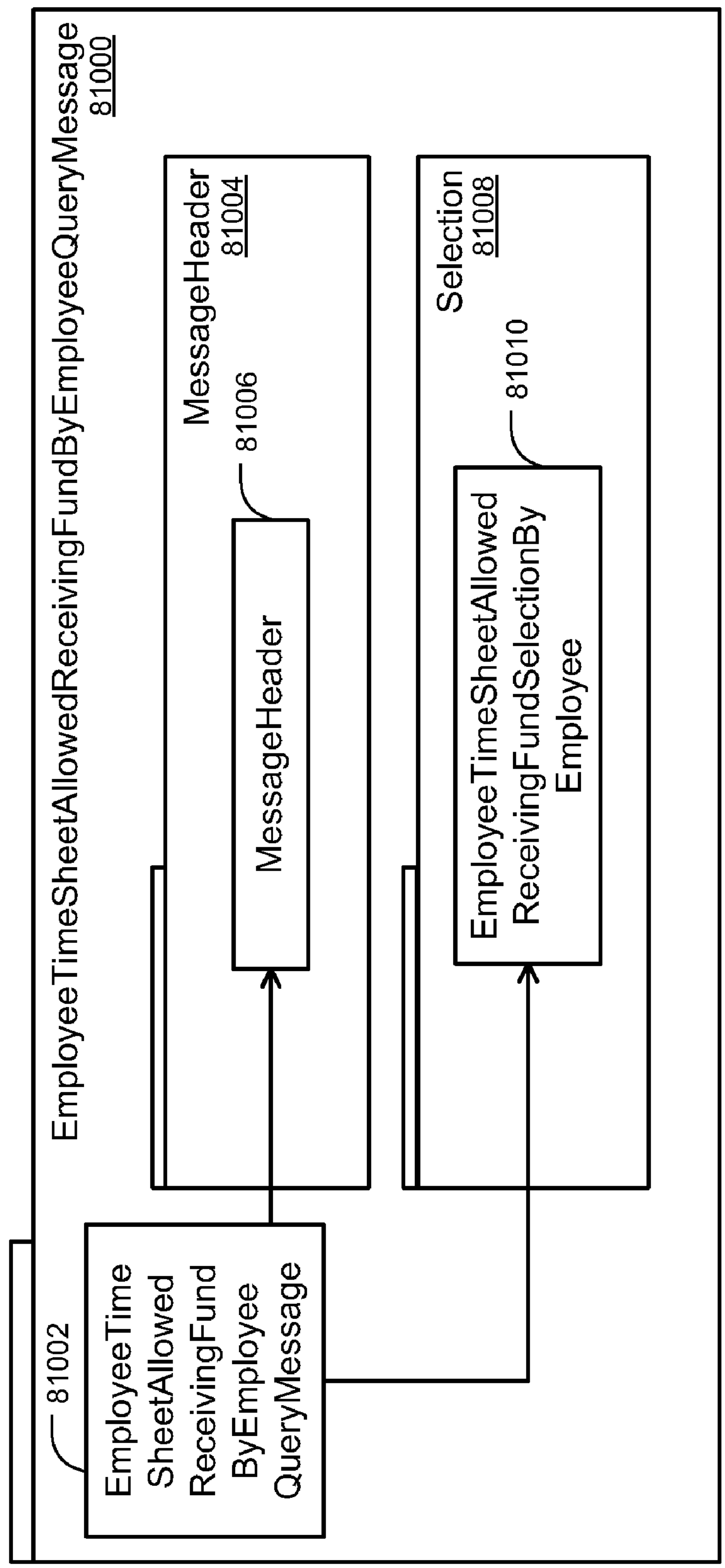
FIG. 81 shows an exemplary EmployeeTimeSheetAllowedReceivingFundByEmployeeQueryMessage Message Data Type.

Additionally, FIG. 81 illustrates one example logical configuration of EmployeeTimeSheetAllowedReceivingFundByEmployeeQueryMessage message 81000. Specifically, this figure depicts the arrangement and hierarchy of various components such as one or more levels of packages, entities, and datatypes, shown here as 81000 through 81010. As described above, packages may be used to represent hierarchy levels. Entities are discrete business elements that are used during a business transaction. Data types are used to type object entities and interfaces with a structure. For example, EmployeeTimeSheetAllowedReceivingFundByEmployeeQueryMessage message 81000 includes, among other things, Selection 81008. Accordingly, heterogeneous applications may communicate using this consistent message configured as such.

Figure 82:
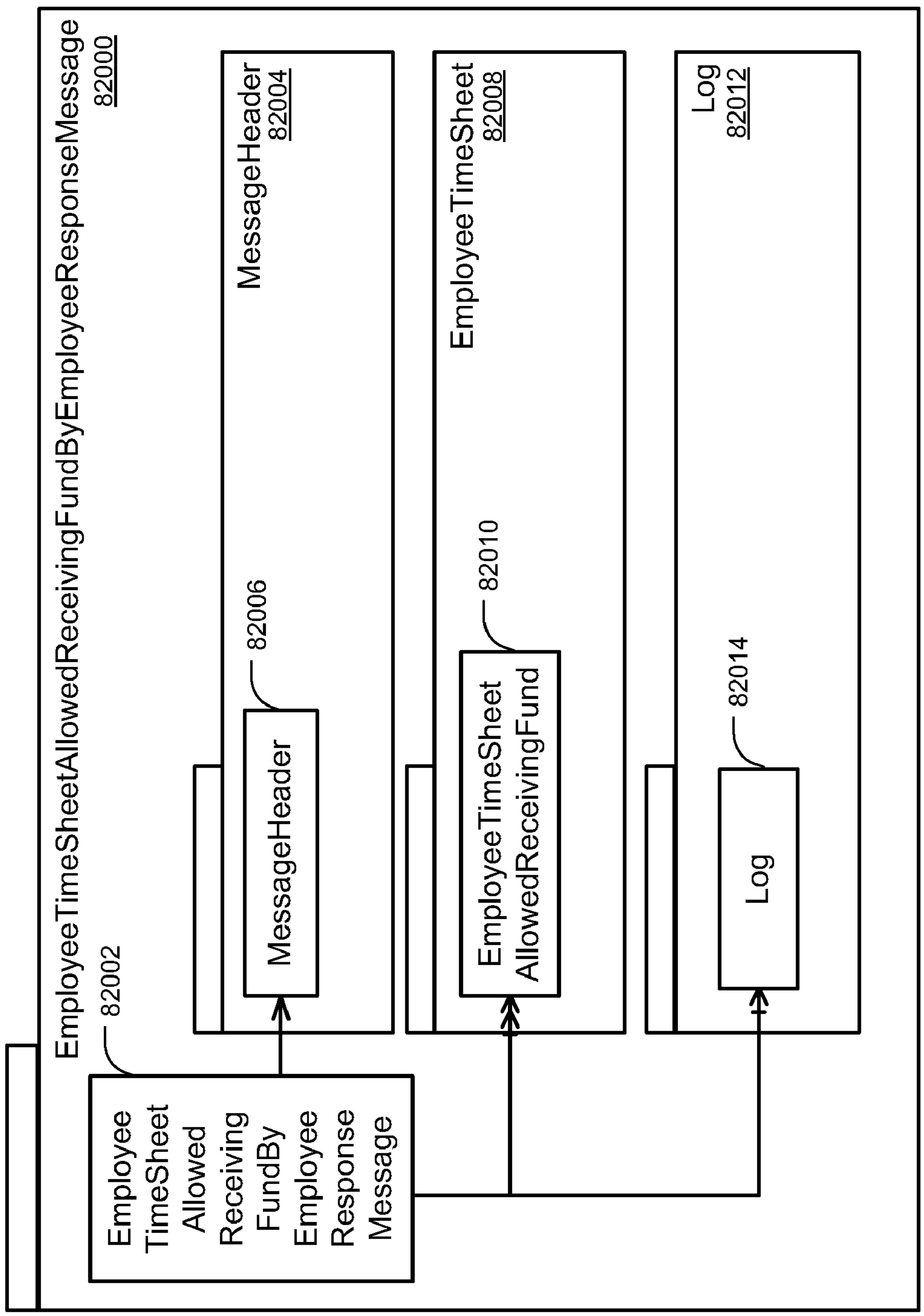
FIG. 82 shows an exemplary EmployeeTimeSheetAllowedReceivingFundByEmployeeResponseMessage Message Data Type.

Additionally, FIG. 82 illustrates one example logical configuration of EmployeeTimeSheetAllowedReceivingFundByEmployeeResponseMessage message 82000. Specifically, this figure depicts the arrangement and hierarchy of various components such as one or more levels of packages, entities, and datatypes, shown here as 82000 through 82014. As described above, packages may be used to represent hierarchy levels. Entities are discrete business elements that are used during a business transaction. Data types are used to type object entities and interfaces with a structure. For example, EmployeeTimeSheetAllowedReceivingFundByEmployeeResponseMessage message 82000 includes, among other things, EmployeeTimeSheet 82008. Accordingly, heterogeneous applications may communicate using this consistent message configured as such.

Figure 83:
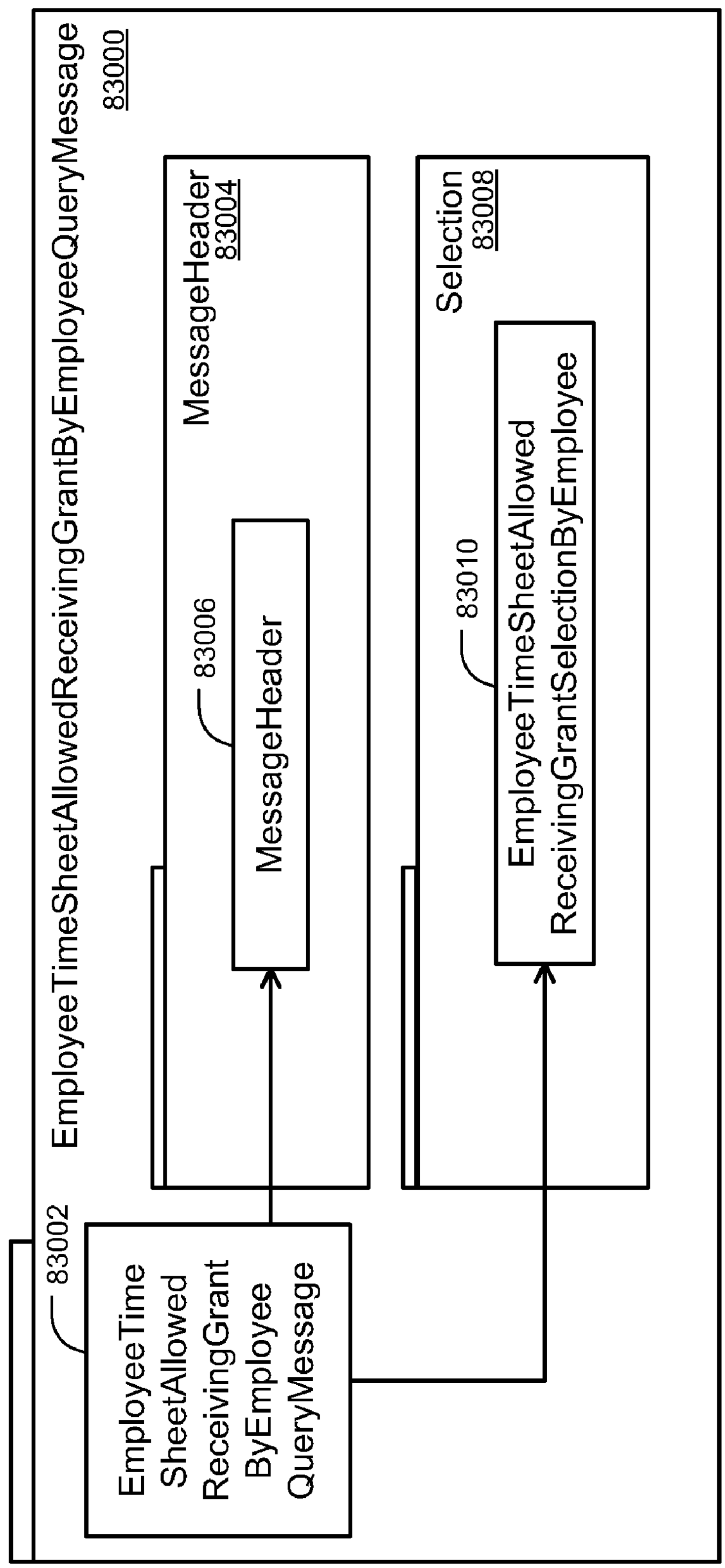
FIG. 83 shows an exemplary EmployeeTimeSheetAllowedReceivingGrantByEmployeeQueryMessage Message Data Type.

Additionally, FIG. 83 illustrates one example logical configuration of EmployeeTimeSheetAllowedReceivingGrantByEmployeeQueryMessage message 83000. Specifically, this figure depicts the arrangement and hierarchy of various components such as one or more levels of packages, entities, and datatypes, shown here as 83000 through 83010. As described above, packages may be used to represent hierarchy levels. Entities are discrete business elements that are used during a business transaction. Data types are used to type object entities and interfaces with a structure. For example, EmployeeTimeSheetAllowedReceivingGrantByEmployeeQueryMessage message 83000 includes, among other things, Selection 83008. Accordingly, heterogeneous applications may communicate using this consistent message configured as such.

Figure 84:
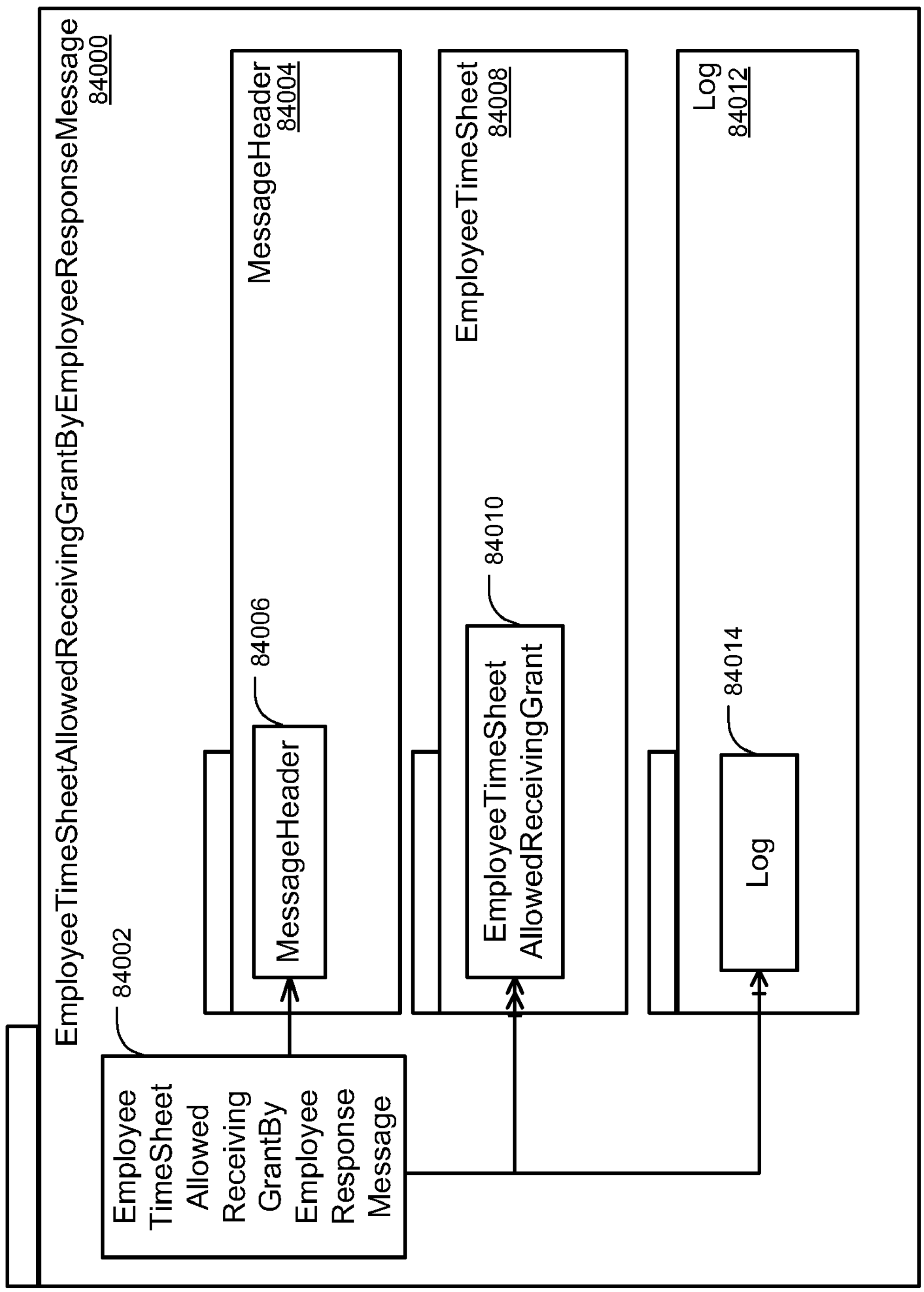
FIG. 84 shows an exemplary EmployeeTimeSheetAllowedReceivingGrantByEmployeeResponseMessage Message Data Type.

Additionally, FIG. 84 illustrates one example logical configuration of EmployeeTimeSheetAllowedReceivingGrantByEmployeeResponseMessage message 84000. Specifically, this figure depicts the arrangement and hierarchy of various components such as one or more levels of packages, entities, and datatypes, shown here as 84000 through 84014. As described above, packages may be used to represent hierarchy levels. Entities are discrete business elements that are used during a business transaction. Data types are used to type object entities and interfaces with a structure. For example, EmployeeTimeSheetAllowedReceivingGrantByEmployeeResponseMessage message 84000 includes, among other things, EmployeeTimeSheet 84008. Accordingly, heterogeneous applications may communicate using this consistent message configured as such.

Figure 85:
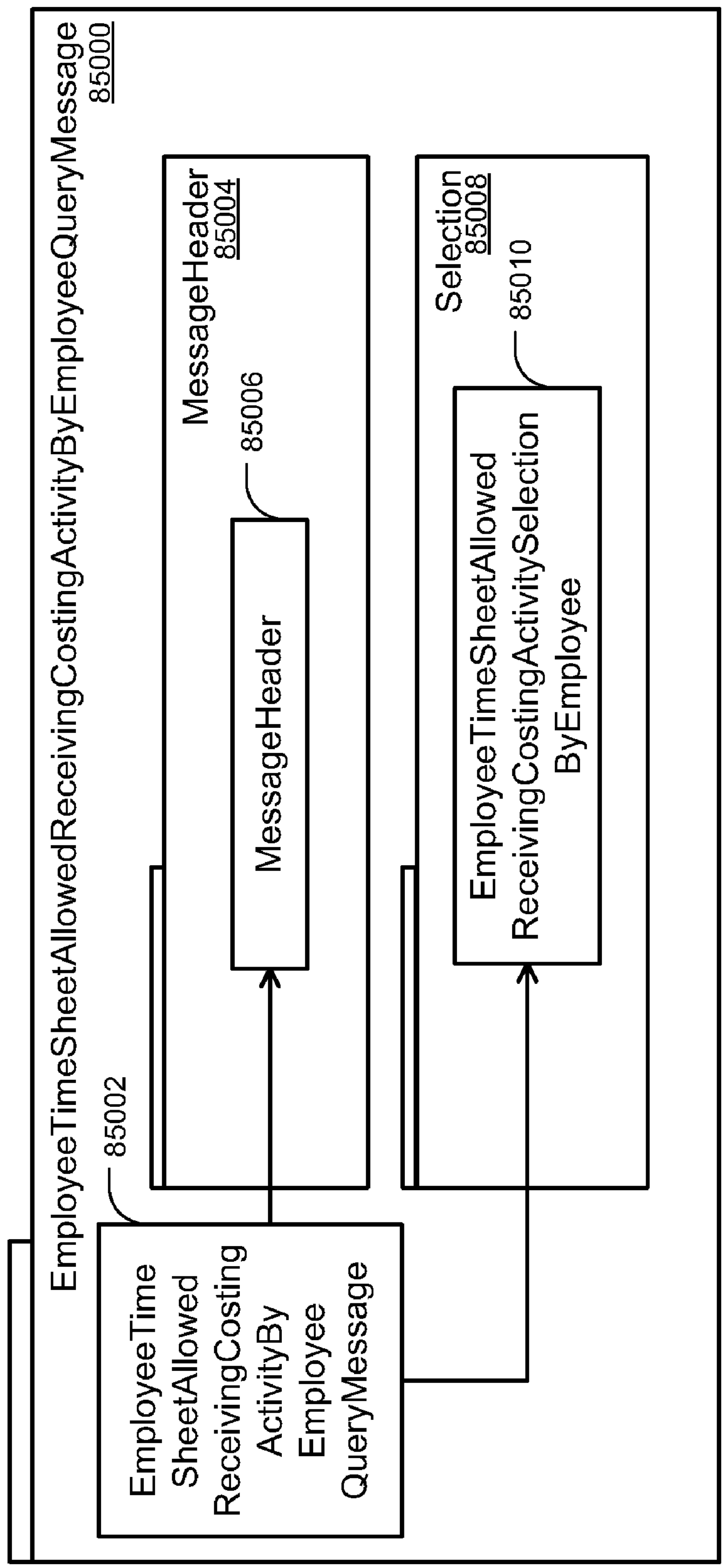
FIG. 85 shows an exemplary EmployeeTimeSheetAllowedReceivingCostingActivityByEmployeeQueryMessage Message Data Type.

Additionally, FIG. 85 illustrates one example logical configuration of EmployeeTimeSheetAllowedReceivingCostingActivityByEmployeeQueryMessage message 85000. Specifically, this figure depicts the arrangement and hierarchy of various components such as one or more levels of packages, entities, and datatypes, shown here as 85000 through 85010. As described above, packages may be used to represent hierarchy levels. Entities are discrete business elements that are used during a business transaction. Data types are used to type object entities and interfaces with a structure. For example, EmployeeTimeSheetAllowedReceivingCostingActivityByEmployeeQueryMessage message 85000 includes, among other things, Selection 85008. Accordingly, heterogeneous applications may communicate using this consistent message configured as such.

Figure 86:
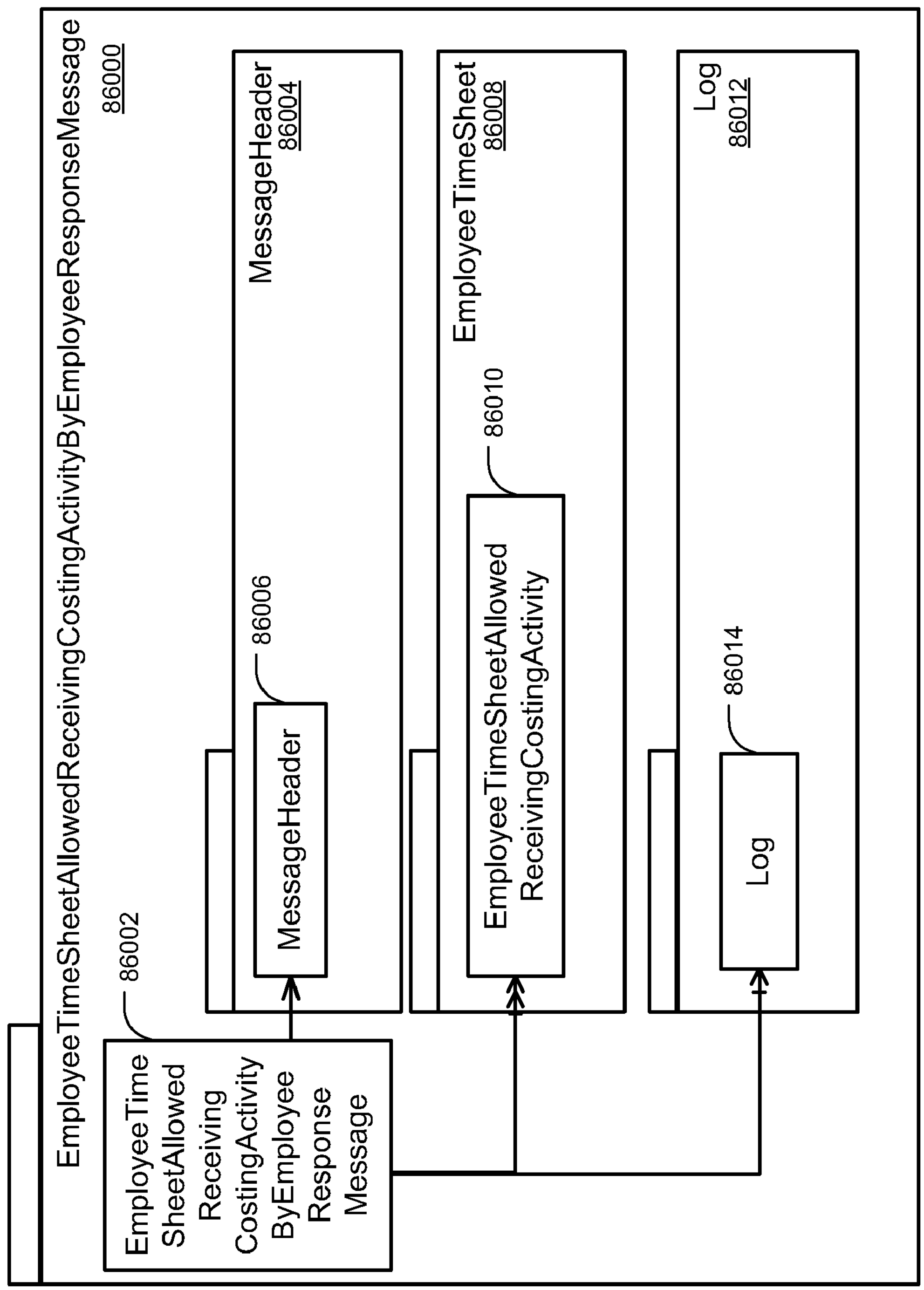
FIG. 86 shows an exemplary EmployeeTimeSheetAllowedReceivingCostingActivityByEmployeeResponseMessage Message Data Type.

Additionally, FIG. 86 illustrates one example logical configuration of EmployeeTimeSheetAllowedReceivingCostingActivityByEmployeeResponseMessage message 86000. Specifically, this figure depicts the arrangement and hierarchy of various components such as one or more levels of packages, entities, and datatypes, shown here as 86000 through 86014. As described above, packages may be used to represent hierarchy levels. Entities are discrete business elements that are used during a business transaction. Data types are used to type object entities and interfaces with a structure. For example, EmployeeTimeSheetAllowedReceivingCostingActivityByEmployeeResponseMessage message 86000 includes, among other things, EmployeeTimeSheet 86008. Accordingly, heterogeneous applications may communicate using this consistent message configured as such.

Figure 87:
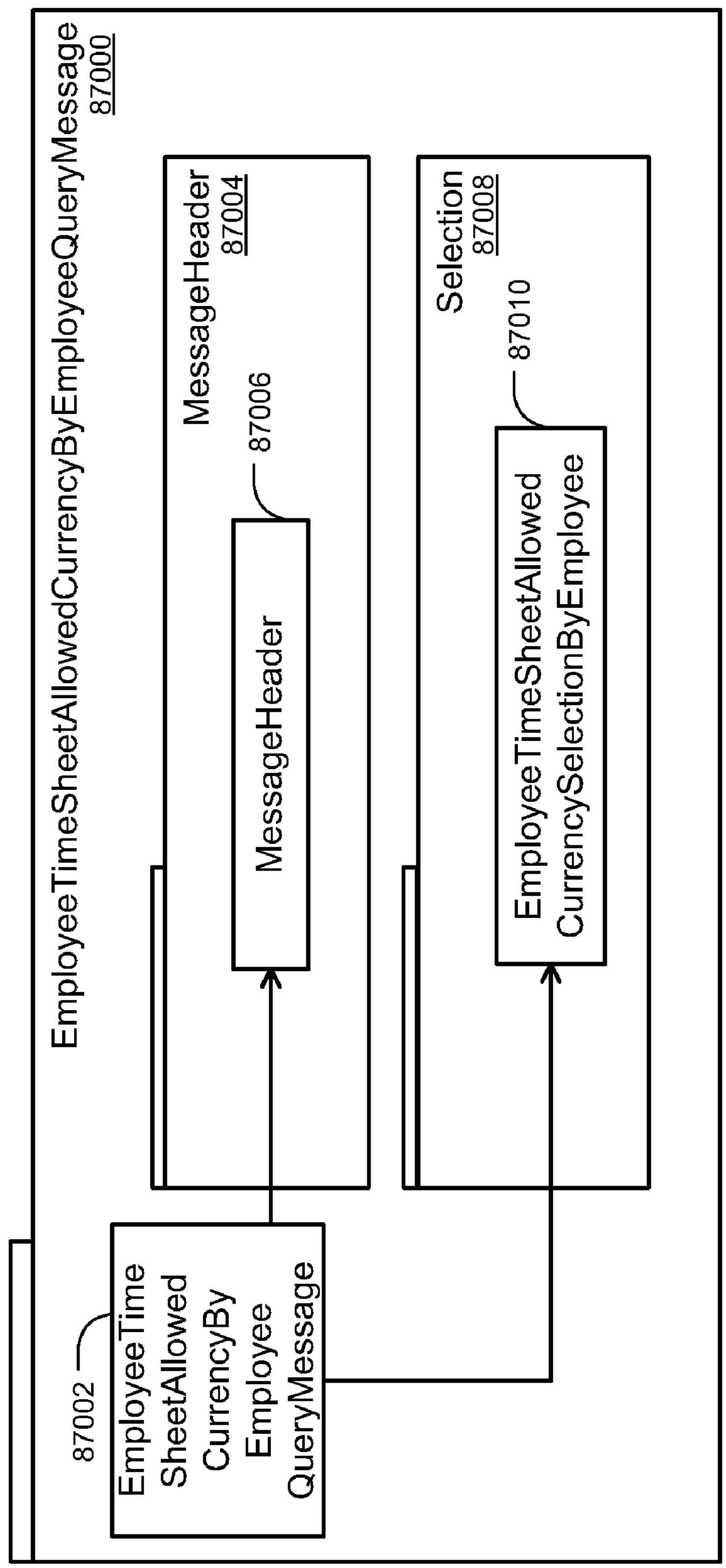
FIG. 87 shows an exemplary EmployeeTimeSheetAllowedCurrencyByEmployeeQueryMessage Message Data Type.

Additionally, FIG. 87 illustrates one example logical configuration of EmployeeTimeSheetAllowedCurrencyByEmployeeQueryMessage message 87000. Specifically, this figure depicts the arrangement and hierarchy of various components such as one or more levels of packages, entities, and datatypes, shown here as 87000 through 87010. As described above, packages may be used to represent hierarchy levels. Entities are discrete business elements that are used during a business transaction. Data types are used to type object entities and interfaces with a structure. For example, EmployeeTimeSheetAllowedCurrencyByEmployeeQueryMessage message 87000 includes, among other things, Selection 87008. Accordingly, heterogeneous applications may communicate using this consistent message configured as such.

Figure 88:
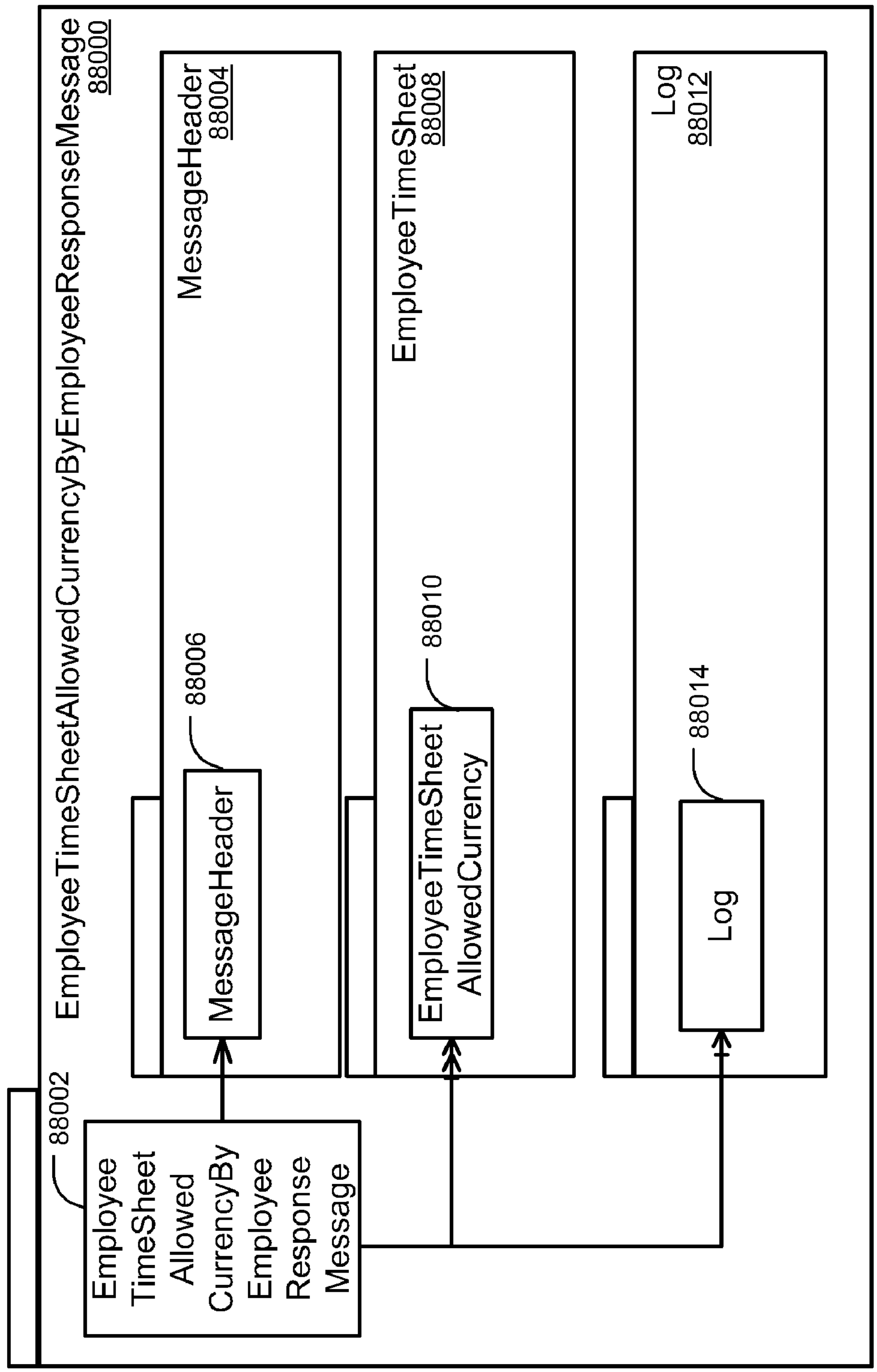
FIG. 88 shows an exemplary EmployeeTimeSheetAllowedCurrencyByEmployeeResponseMessage Message Data Type.

Additionally, FIG. 88 illustrates one example logical configuration of EmployeeTimeSheetAllowedCurrencyByEmployeeResponseMessage message 88000. Specifically, this figure depicts the arrangement and hierarchy of various components such as one or more levels of packages, entities, and datatypes, shown here as 88000 through 88014. As described above, packages may be used to represent hierarchy levels. Entities are discrete business elements that are used during a business transaction. Data types are used to type object entities and interfaces with a structure. For example, EmployeeTimeSheetAllowedCurrencyByEmployeeResponseMessage message 88000 includes, among other things, EmployeeTimeSheet 88008. Accordingly, heterogeneous applications may communicate using this consistent message configured as such.

Figure 89:
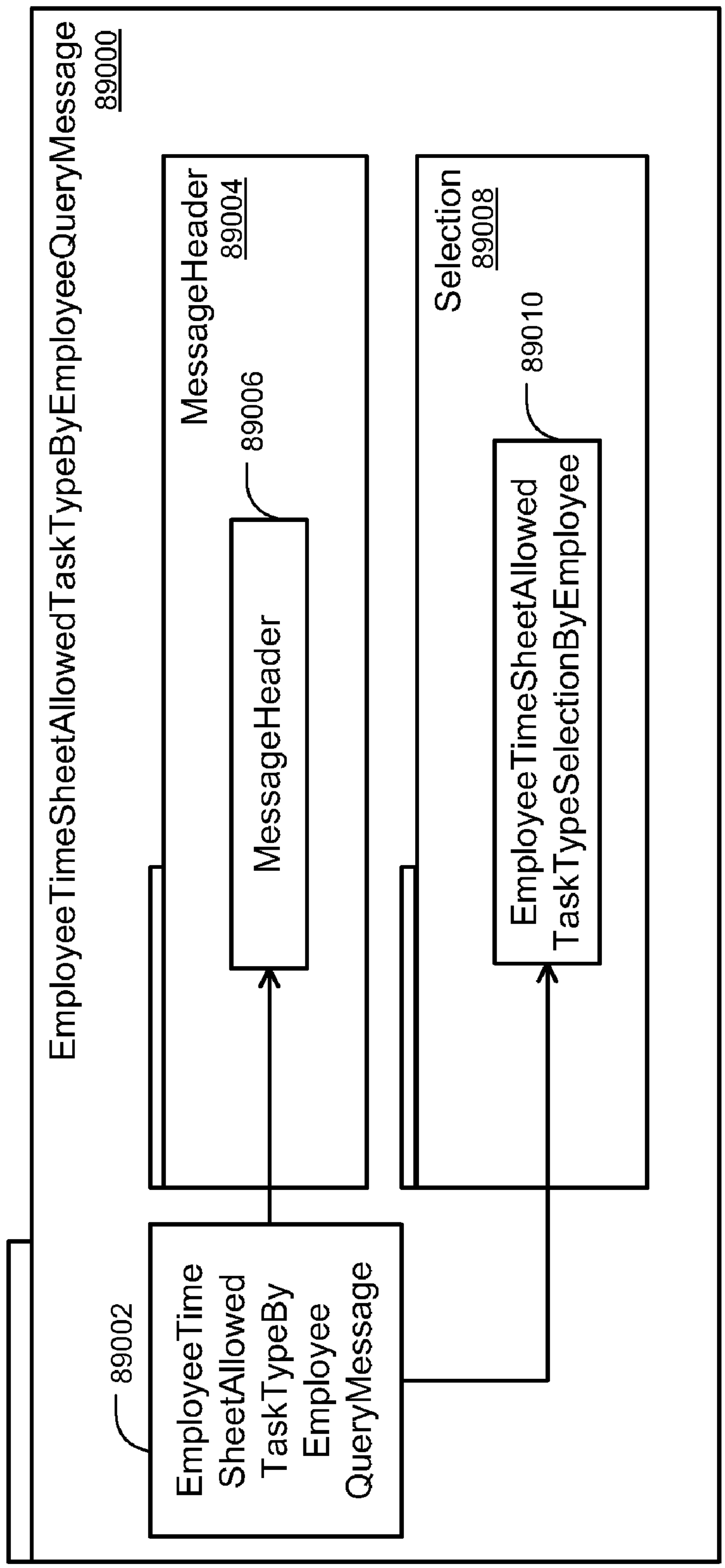
FIG. 89 shows an exemplary EmployeeTimeSheetAllowedTaskTypeByEmployeeQueryMessage Message Data Type.

Additionally, FIG. 89 illustrates one example logical configuration of EmployeeTimeSheetAllowedTaskTypeByEmployeeQueryMessage message 89000. Specifically, this figure depicts the arrangement and hierarchy of various components such as one or more levels of packages, entities, and datatypes, shown here as 89000 through 89010. As described above, packages may be used to represent hierarchy levels. Entities are discrete business elements that are used during a business transaction. Data types are used to type object entities and interfaces with a structure. For example, EmployeeTimeSheetAllowedTaskTypeByEmployeeQueryMessage message 89000 includes, among other things, Selection 89008. Accordingly, heterogeneous applications may communicate using this consistent message configured as such.

Figure 90:
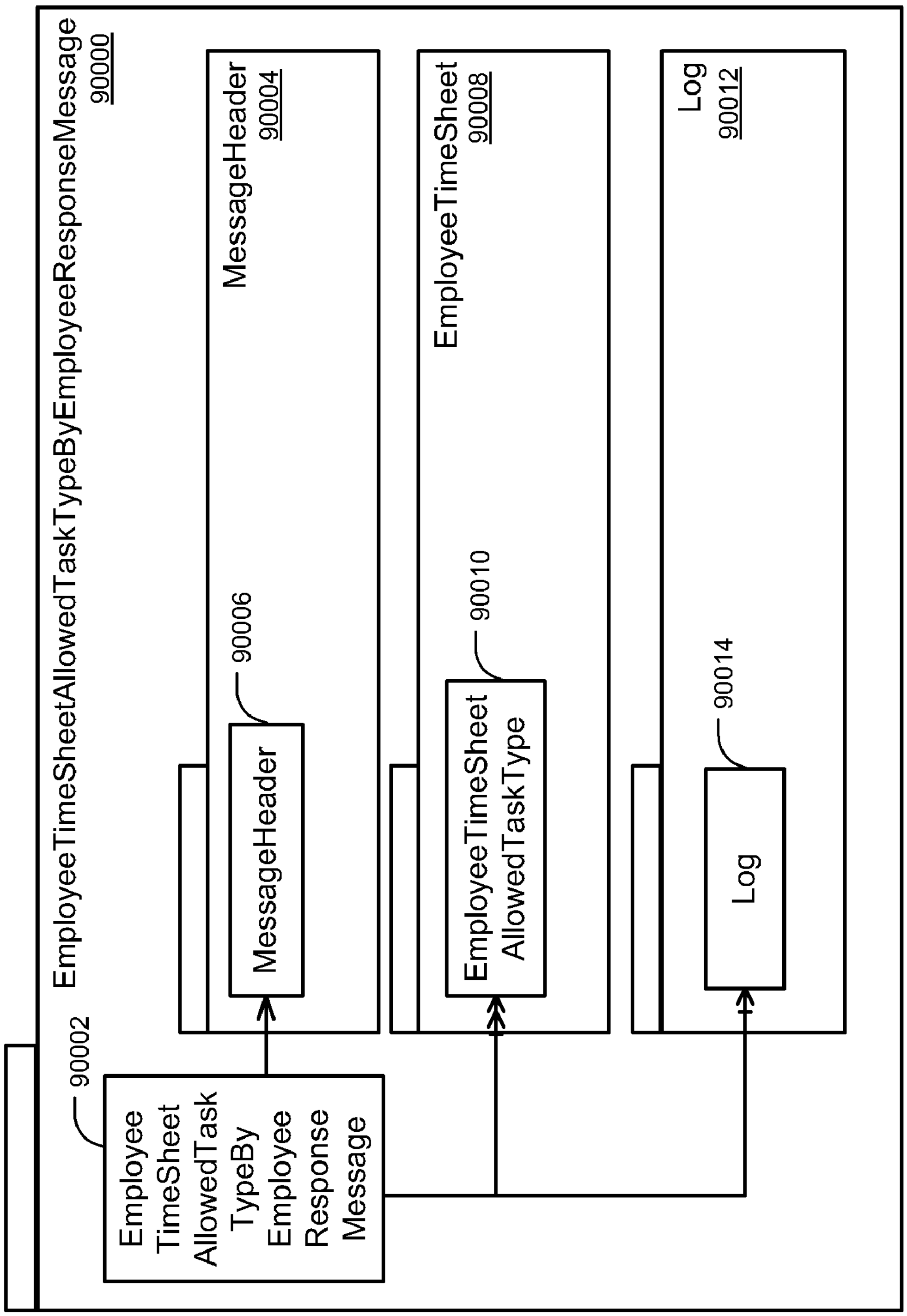
FIG. 90 shows an exemplary EmployeeTimeSheetAllowedTaskTypeByEmployeeResponseMessage Message Data Type.

Additionally, FIG. 90 illustrates one example logical configuration of EmployeeTimeSheetAllowedTaskTypeByEmployeeResponseMessage message 90000. Specifically, this figure depicts the arrangement and hierarchy of various components such as one or more levels of packages, entities, and datatypes, shown here as 90000 through 90014. As described above, packages may be used to represent hierarchy levels. Entities are discrete business elements that are used during a business transaction. Data types are used to type object entities and interfaces with a structure. For example, EmployeeTimeSheetAllowedTaskTypeByEmployeeResponseMessage message 90000 includes, among other things, EmployeeTimeSheet 90008. Accordingly, heterogeneous applications may communicate using this consistent message configured as such.

Figure 91:
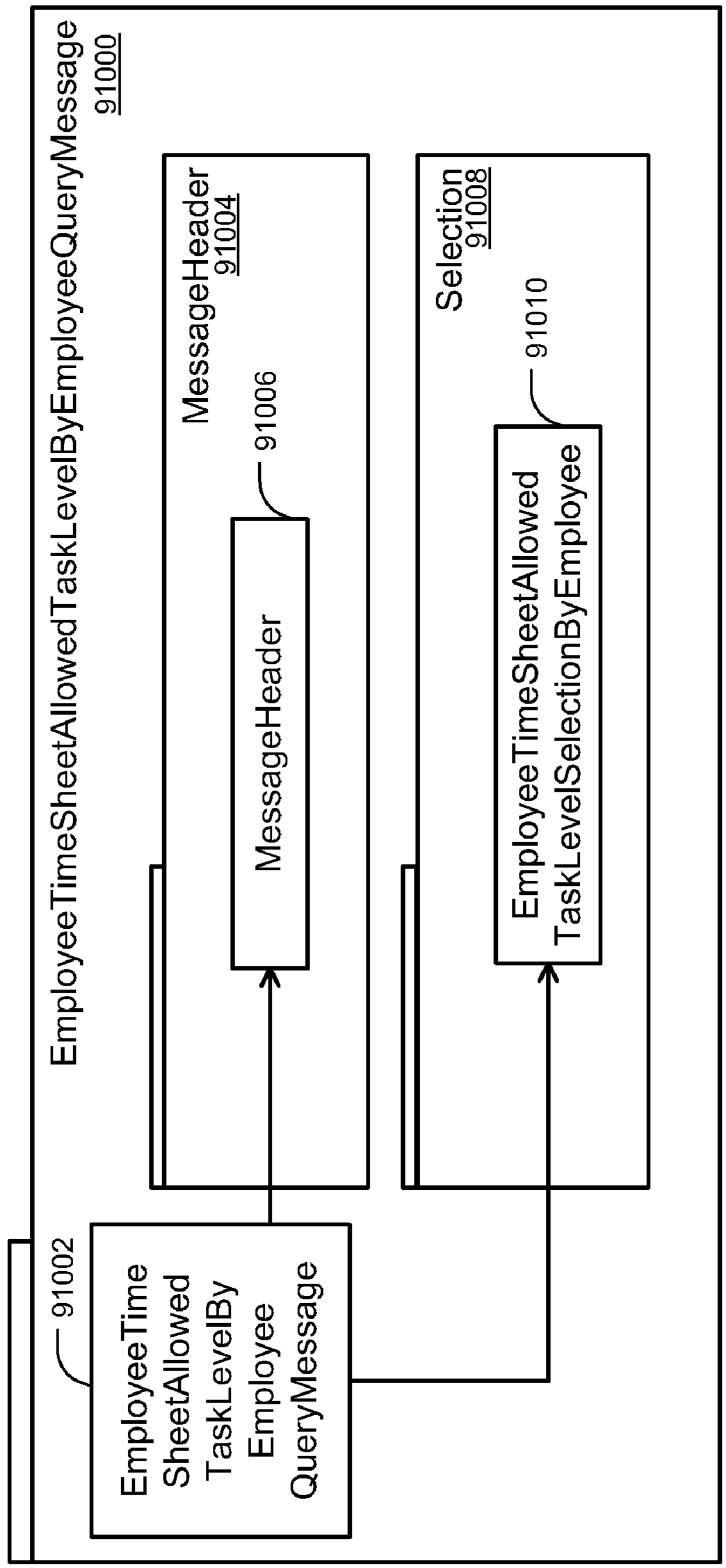
FIG. 91 shows an exemplary EmployeeTimeSheetAllowedTaskLevelByEmployeeQueryMessage Message Data Type.

Additionally, FIG. 91 illustrates one example logical configuration of EmployeeTimeSheetAllowedTaskLevelByEmployeeQueryMessage message 91000. Specifically, this figure depicts the arrangement and hierarchy of various components such as one or more levels of packages, entities, and datatypes, shown here as 91000 through 91010. As described above, packages may be used to represent hierarchy levels. Entities are discrete business elements that are used during a business transaction. Data types are used to type object entities and interfaces with a structure. For example, EmployeeTimeSheetAllowedTaskLevelByEmployeeQueryMessage message 91000 includes, among other things, Selection 91008. Accordingly, heterogeneous applications may communicate using this consistent message configured as such.

Figure 92:
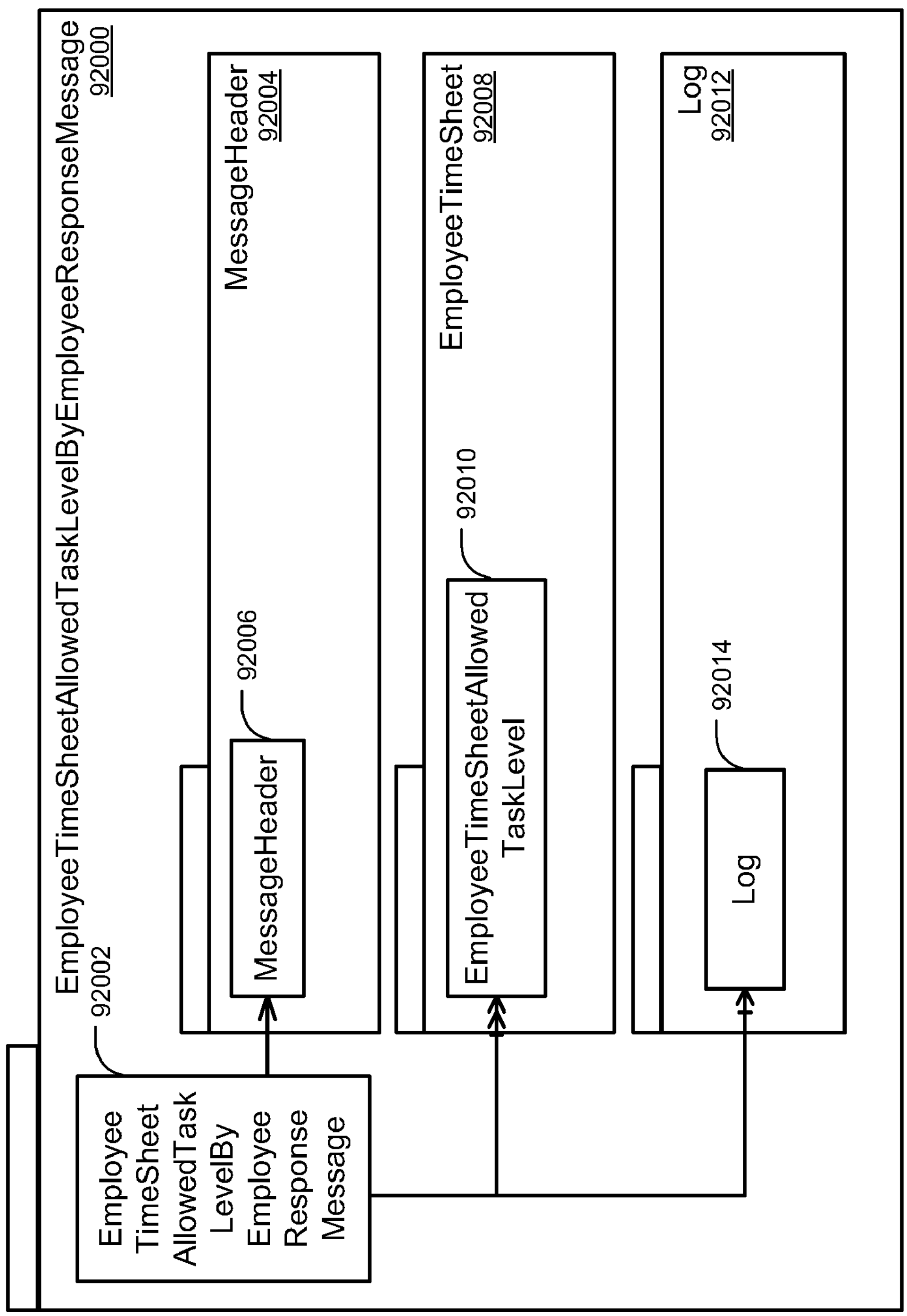
FIG. 92 shows an exemplary EmployeeTimeSheetAllowedTaskLevelByEmployeeResponseMessage Message Data Type.

Additionally, FIG. 92 illustrates one example logical configuration of EmployeeTimeSheetAllowedTaskLevelByEmployeeResponseMessage message 92000. Specifically, this figure depicts the arrangement and hierarchy of various components such as one or more levels of packages, entities, and datatypes, shown here as 92000 through 92014. As described above, packages may be used to represent hierarchy levels. Entities are discrete business elements that are used during a business transaction. Data types are used to type object entities and interfaces with a structure. For example, EmployeeTimeSheetAllowedTaskLevelByEmployeeResponseMessage message 92000 includes, among other things, EmployeeTimeSheet 92008. Accordingly, heterogeneous applications may communicate using this consistent message configured as such.

Figure 93:
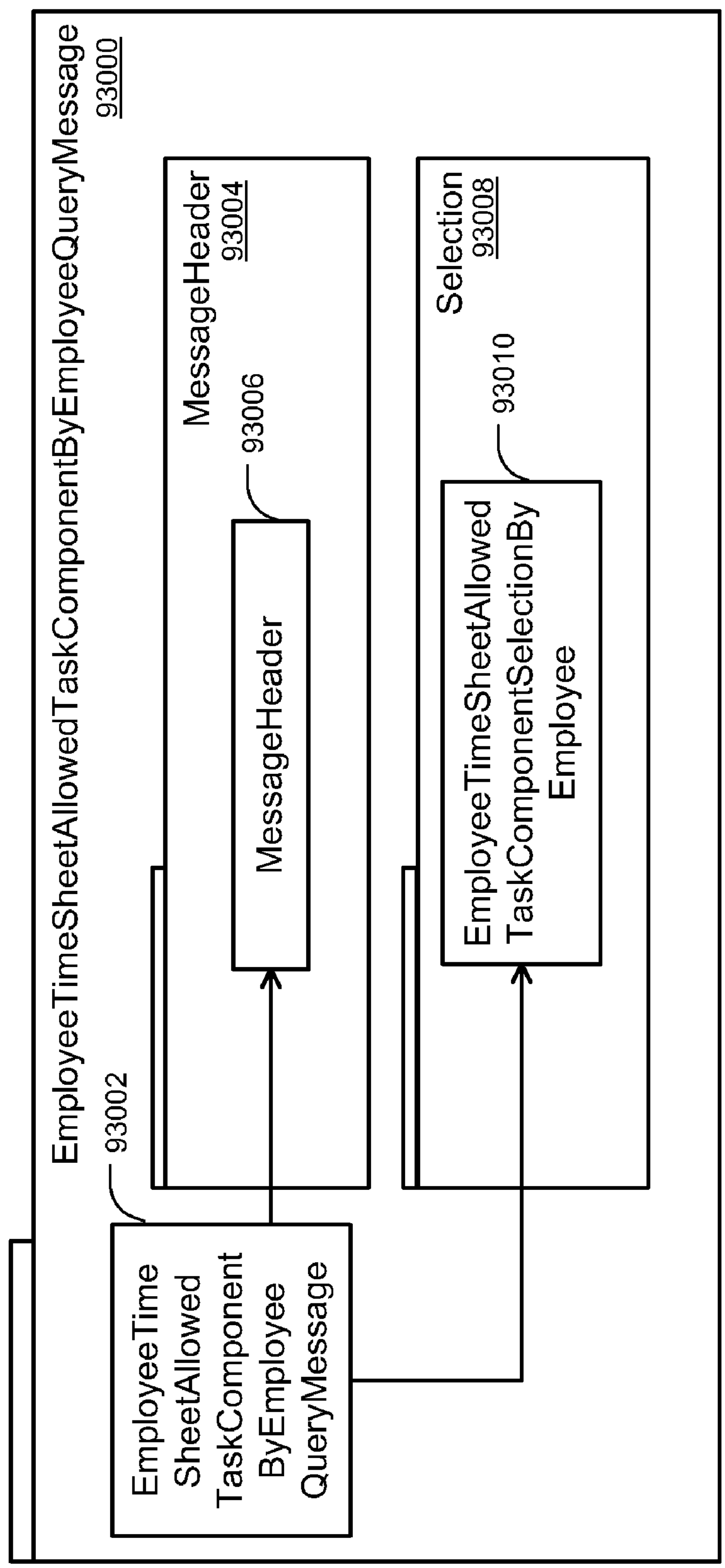
FIG. 93 shows an exemplary EmployeeTimeSheetAllowedTaskComponentByEmployeeQueryMessage Message Data Type.

Additionally, FIG. 93 illustrates one example logical configuration of EmployeeTimeSheetAllowedTaskComponentByEmployeeQueryMessage message 93000. Specifically, this figure depicts the arrangement and hierarchy of various components such as one or more levels of packages, entities, and datatypes, shown here as 93000 through 93010. As described above, packages may be used to represent hierarchy levels. Entities are discrete business elements that are used during a business transaction. Data types are used to type object entities and interfaces with a structure. For example, EmployeeTimeSheetAllowedTaskComponentByEmployeeQueryMessage message 93000 includes, among other things, Selection 93008. Accordingly, heterogeneous applications may communicate using this consistent message configured as such.

Figure 94:
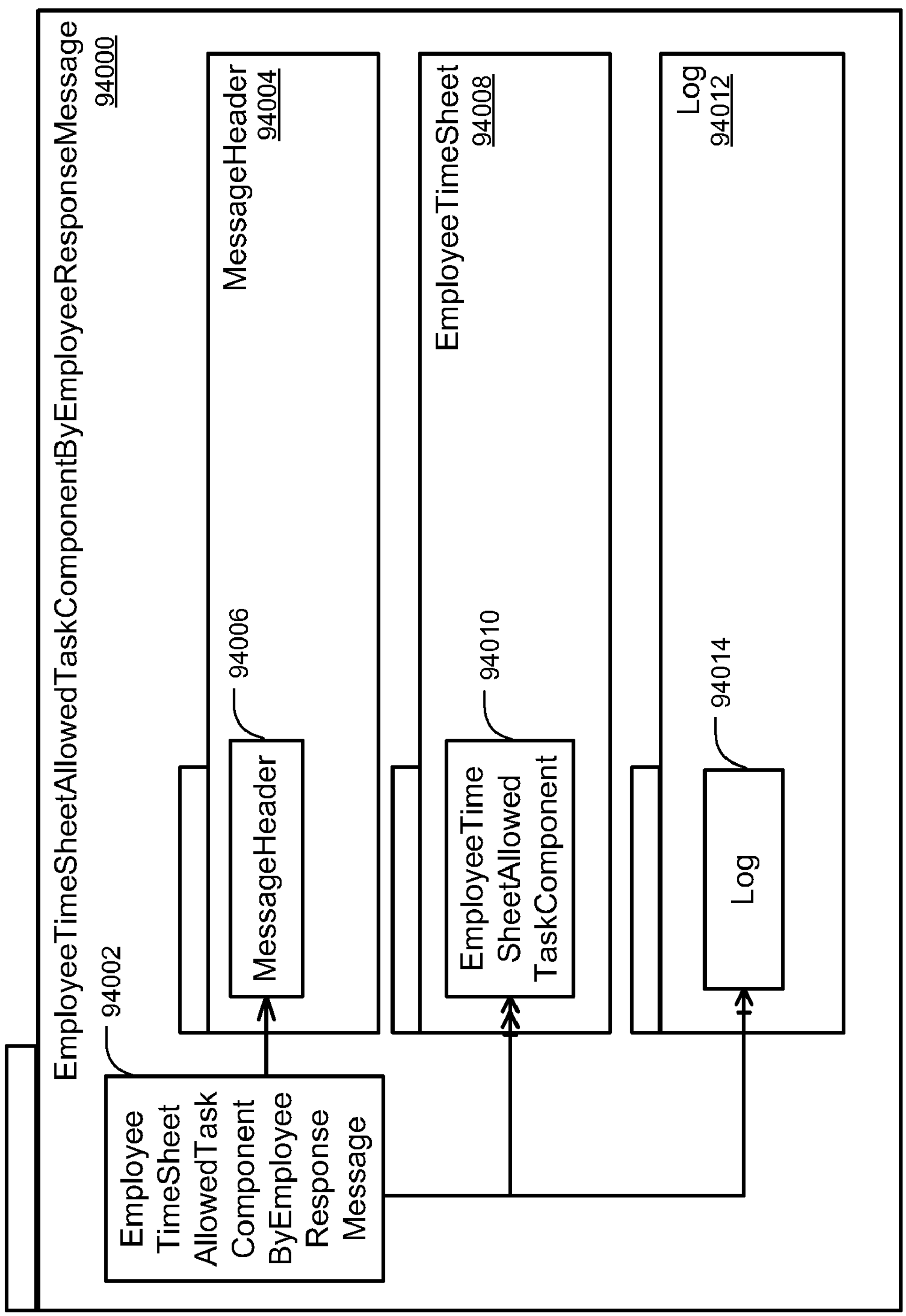
FIG. 94 shows an exemplary EmployeeTimeSheetAllowedTaskComponentByEmployeeResponseMessage Message Data Type.

Additionally, FIG. 94 illustrates one example logical configuration of EmployeeTimeSheetAllowedTaskComponentByEmployeeResponseMessage message 94000. Specifically, this figure depicts the arrangement and hierarchy of various components such as one or more levels of packages, entities, and datatypes, shown here as 94000 through 94014. As described above, packages may be used to represent hierarchy levels. Entities are discrete business elements that are used during a business transaction. Data types are used to type object entities and interfaces with a structure. For example, EmployeeTimeSheetAllowedTaskComponentByEmployeeResponseMessage message 94000 includes, among other things, EmployeeTimeSheet 94008. Accordingly, heterogeneous applications may communicate using this consistent message configured as such.

Additionally, FIG. 95 illustrates one example logical configuration of EmployeeTimeSheetAllowedControllingKeyFigureByEmployeeQueryMessage message 95000. Specifically, this figure depicts the arrangement and hierarchy of various components such as one or more levels of packages, entities, and datatypes, shown here as 95000 through 95032. As described above, packages may be used to represent hierarchy levels. Entities are discrete business elements that are used during a business transaction. Data types are used to type object entities and interfaces with a structure. For example, EmployeeTimeSheetAllowedControllingKeyFigureByEmployeeQueryMessage message 95000 includes, among other things, EmployeeTimeSheetAllowedControllingKeyFigureSelectionByEmployee 95016. Accordingly, heterogeneous applications may communicate using this consistent message configured as such.

Additionally, FIGS. 96-1 through 96-2 illustrate one example logical configuration of EmployeeTimeSheetAllowedControllingKeyFigureByEmployeeResponseMessagemessage 96000. Specifically, this figure depicts the arrangement and hierarchy of various components such as one or more levels of packages, entities, and datatypes, shown here as 96000 through 96052. As described above, packages may be used to represent hierarchy levels. Entities are discrete business elements that are used during a business transaction. Data types are used to type object entities and interfaces with a structure. For example, EmployeeTimeSheetAllowedControllingKeyFigureByEmployeeQueryMessage message 96000 includes, among other things, EmployeeTimeSheetAllowedControllingKeyF*igure* 96016. Accordingly, heterogeneous applications may communicate using this consistent message configured as such.

Additionally, FIG. 97 illustrates one example logical configuration of EmployeeTimeSheetAllowedCurrencyByEmployeeQueryMessage message 97000. Specifically, this figure depicts the arrangement and hierarchy of various components such as one or more levels of packages, entities, and datatypes, shown here as 97000 through 97038. As described above, packages may be used to represent hierarchy levels. Entities are discrete business elements that are used during a business transaction. Data types are used to type object entities and interfaces with a structure. For example, EmployeeTimeSheetAllowedCurrencyByEmployeeQueryMessage message 97000 includes, among other things, EmployeeTimeSheetAllowedCurrencySelectionByEmployee 97016. Accordingly, heterogeneous applications may communicate using this consistent message configured as such.

Additionally, FIGS. 98-1 through 98-2 illustrate one example logical configuration of EmployeeTimeSheetAllowedCurrencyByEmployeeResponseMessage message 98000. Specifically, this figure depicts the arrangement and hierarchy of various components such as one or more levels of packages, entities, and datatypes, shown here as 98000 through 98052. As described above, packages may be used to represent hierarchy levels. Entities are discrete business elements that are used during a business transaction. Data types are used to type object entities and interfaces with a structure. For example, EmployeeTimeSheetAllowedCurrencyByEmployeeResponseMessage message 98000 includes, among other things, EmployeeTimeSheetAllowedCurrency 98016. Accordingly, heterogeneous applications may communicate using this consistent message configured as such.

Additionally, FIG. 99 illustrates one example logical configuration of EmployeeTimeSheetAllowedEmployeeTimeItemTypeByEmployeeQueryMessage message 99000. Specifically, this figure depicts the arrangement and hierarchy of various components such as one or more levels of packages, entities, and datatypes, shown here as 99000 through 99032. As described above, packages may be used to represent hierarchy levels. Entities are discrete business elements that are used during a business transaction. Data types are used to type object entities and interfaces with a structure. For example, EmployeeTimeSheetAllowedEmployeeTimeItemTypeByEmployeeQueryMessage message 99000 includes, among other things, EmployeeTimeSheetAllowedEmployeeTimeItemTypeSelectionByEmployee 99016. Accordingly, heterogeneous applications may communicate using this consistent message configured as such.

Additionally, FIGS. 100-1 through 100-2 illustrate one example logical configuration of EmployeeTimeSheetAllowedEmployeeTimeItemTypeByEmployeeResponseMessage message 100000. Specifically, this figure depicts the arrangement and hierarchy of various components such as one or more levels of packages, entities, and datatypes, shown here as 100000 through 100058. As described above, packages may be used to represent hierarchy levels. Entities are discrete business elements that are used during a business transaction. Data types are used to type object entities and interfaces with a structure. For example, EmployeeTimeSheetAllowedEmployeeTimeItemTypeByEmployeeResponseMessage message 100000 includes, among other things, EmployeeTimeSheetAllowedEmployeeTimeItemType 100016. Accordingly, heterogeneous applications may communicate using this consistent message configured as such.

Additionally, FIGS. 101-1 through 101-2 illustrate one example logical configuration of EmployeeTimeSheetAllowedReceivingFundsManagementFunctionalAreaByEmployeeQueryMessage message 101000. Specifically, this figure depicts the arrangement and hierarchy of various components such as one or more levels of packages, entities, and datatypes, shown here as 101000 through 101032. As described above, packages may be used to represent hierarchy levels. Entities are discrete business elements that are used during a business transaction. Data types are used to type object entities and interfaces with a structure. For example, EmployeeTimeSheetAllowedReceivingFundsManagementFunctionalAreaByEmployeeQueryMessage message 101000 includes, among other things, EmployeeTimeSheetAllowedReceivingFundsManagementFunctionalAreaSelectionByEmployee 101016. Accordingly, heterogeneous applications may communicate using this consistent message configured as such.

Additionally, FIGS. 102-1 through 102-2 illustrate one example logical configuration of EmployeeTimeSheetAllowedReceivingFundsManagementFunctionalAreaByEmployeeResponseMessage message 102000. Specifically, this figure depicts the arrangement and hierarchy of various components such as one or more levels of packages, entities, and datatypes, shown here as 102000 through 102052. As described above, packages may be used to represent hierarchy levels. Entities are discrete business elements that are used during a business transaction. Data types are used to type object entities and interfaces with a structure. For example, EmployeeTimeSheetAllowedReceivingFundsManagementFunctionalAreaByEmployeeResponseMessage message 102000 includes, among other things, EmployeeTimeSheetAllowedReceivingFundsManagementFunctionalArea 102016. Accordingly, heterogeneous applications may communicate using this consistent message configured as such.

Additionally, FIG. 103 illustrates one example logical configuration of EmployeeTimeSheetAllowedMeasureUnitByEmployeeQueryMessagemessage 103000. Specifically, this figure depicts the arrangement and hierarchy of various components such as one or more levels of packages, entities, and datatypes, shown here as 103000 through 103032. As described above, packages may be used to represent hierarchy levels. Entities are discrete business elements that are used during a business transaction. Data types are used to type object entities and interfaces with a structure. For example, EmployeeTimeSheetAllowedReceivingFundsManagementFunctionalAreaByEmployeeResponseMessage message 103000 includes, among other things, EmployeeTimeSheetAllowedMeasureUnitSelectionByEmployee 103016. Accordingly, heterogeneous applications may communicate using this consistent message configured as such.

Additionally, FIGS. 104-1 through 104-2 illustrate one example logical configuration of EmployeeTimeSheetAllowedMeasureUnitByEmployeeResponseMessage message 104000. Specifically, this figure depicts the arrangement and hierarchy of various components such as one or more levels of packages, entities, and datatypes, shown here as 104000 through 104046. As described above, packages may be used to represent hierarchy levels. Entities are discrete business elements that are used during a business transaction. Data types are used to type object entities and interfaces with a structure. For example, EmployeeTimeSheetAllowedMeasureUnitByEmployeeResponseMessage message 104000 includes, among other things, EmployeeTimeSheetAllowedMeasureUnit 104016. Accordingly, heterogeneous applications may communicate using this consistent message configured as such.

Additionally, FIG. 105 illustrates one example logical configuration of EmployeeTimeSheetAllowedNetworkByEmployeeQueryMessage message 105000. Specifically, this figure depicts the arrangement and hierarchy of various components such as one or more levels of packages, entities, and datatypes, shown here as 105000 through 105032. As described above, packages may be used to represent hierarchy levels. Entities are discrete business elements that are used during a business transaction. Data types are used to type object entities and interfaces with a structure. For example, EmployeeTimeSheetAllowedNetworkByEmployeeQueryMessage message message 105000 includes, among other things, EmployeeTimeSheetAllowedNetworkSelectionByEmployee 105016. Accordingly, heterogeneous applications may communicate using this consistent message configured as such.

Additionally, FIGS. 106-1 through 106-2 illustrate one example logical configuration of EmployeeTimeSheetAllowedNetworkByEmployeeResponseMessage message 106000. Specifically, this figure depicts the arrangement and hierarchy of various components such as one or more levels of packages, entities, and datatypes, shown here as 106000 through 106070. As described above, packages may be used to represent hierarchy levels. Entities are discrete business elements that are used during a business transaction. Data types are used to type object entities and interfaces with a structure. For example, EmployeeTimeSheetAllowedNetworkByEmployeeResponseMessage message message 106000 includes, among other things, EmployeeTimeSheetAllowedNetwork 106016. Accordingly, heterogeneous applications may communicate using this consistent message configured as such.

Additionally, FIG. 107 illustrates one example logical configuration of EmployeeTimeSheetAllowedOrderByEmployeeQueryMessage message 107000. Specifically, this figure depicts the arrangement and hierarchy of various components such as one or more levels of packages, entities, and datatypes, shown here as 107000 through 107032. As described above, packages may be used to represent hierarchy levels. Entities are discrete business elements that are used during a business transaction. Data types are used to type object entities and interfaces with a structure. For example, EmployeeTimeSheetAllowedOrderByEmployeeQueryMessage message 107000 includes, among other things, EmployeeTimeSheetAllowedOrderSelectionByEmployee 107016. Accordingly, heterogeneous applications may communicate using this consistent message configured as such.

Additionally, FIGS. 108-1 through 108-2 illustrate one example logical configuration of EmployeeTimeSheetAllowedOrderByEmployeeResponseMessage message 108000. Specifically, this figure depicts the arrangement and hierarchy of various components such as one or more levels of packages, entities, and datatypes, shown here as 108000 through 108070. As described above, packages may be used to represent hierarchy levels. Entities are discrete business elements that are used during a business transaction. Data types are used to type object entities and interfaces with a structure. For example, EmployeeTimeSheetAllowedOrderByEmployeeResponseMessage message 108000 includes, among other things, EmployeeTimeSheetAllowedOrder 108016. Accordingly, heterogeneous applications may communicate using this consistent message configured as such.

Additionally, FIG. 109 illustrates one example logical configuration of EmployeeTimeSheetAllowedPurchaseOrderByEmployeeQueryMessage message 109000. Specifically, this figure depicts the arrangement and hierarchy of various components such as one or more levels of packages, entities, and datatypes, shown here as 109000 through 109032. As described above, packages may be used to represent hierarchy levels. Entities are discrete business elements that are used during a business transaction. Data types are used to type object entities and interfaces with a structure. For example, EmployeeTimeSheetAllowedPurchaseOrderByEmployeeQueryMessage message 109000 includes, among other things, EmployeeTimeSheetAllowedPurchaseOrderSelectionByEmployee 109016. Accordingly, heterogeneous applications may communicate using this consistent message configured as such.

Additionally, FIGS. 110-1 through 110-2 illustrate one example logical configuration of EmployeeTimeSheetAllowedPurchaseOrderByEmployeeResponseMessage message 110000. Specifically, this figure depicts the arrangement and hierarchy of various components such as one or more levels of packages, entities, and datatypes, shown here as 110000 through 110052. As described above, packages may be used to represent hierarchy levels. Entities are discrete business elements that are used during a business transaction. Data types are used to type object entities and interfaces with a structure. For example, EmployeeTimeSheetAllowedPurchaseOrderByEmployeeResponseMessage message 110000 includes, among other things, EmployeeTimeSheetAllowedPurchaseOrder 110016. Accordingly, heterogeneous applications may communicate using this consistent message configured as such.

Additionally, FIG. 111 illustrates one example logical configuration of EmployeeTimeSheetAllowedReceivingCostCentreByEmployeeQueryMessage message 111000. Specifically, this figure depicts the arrangement and hierarchy of various components such as one or more levels of packages, entities, and datatypes, shown here as 111000 through 111032. As described above, packages may be used to represent hierarchy levels. Entities are discrete business elements that are used during a business transaction. Data types are used to type object entities and interfaces with a structure. For example, EmployeeTimeSheetAllowedReceivingCostCentreByEmployeeQueryMessage message 111000 includes, among other things, EmployeeTimeSheetAllowedReceivingCostCentreSelectionByEmployee 111016. Accordingly, heterogeneous applications may communicate using this consistent message configured as such.

Additionally, FIGS. 112-1 through 112-2 illustrate one example logical configuration of EmployeeTimeSheetAllowedReceivingCostCentreByEmployeeResponseMessage message 112000. Specifically, this figure depicts the arrangement and hierarchy of various components such as one or more levels of packages, entities, and datatypes, shown here as 112000 through 112058. As described above, packages may be used to represent hierarchy levels. Entities are discrete business elements that are used during a business transaction. Data types are used to type object entities and interfaces with a structure. For example, EmployeeTimeSheetAllowedReceivingCostCentreByEmployeeResponseMessage message 112000 includes, among other things, EmployeeTimeSheetAllowedReceivingCostCentre 112016. Accordingly, heterogeneous applications may communicate using this consistent message configured as such.

Additionally, FIG. 113 illustrates one example logical configuration of EmployeeTimeSheetAllowedReceivingCostingActivityByEmployeeQueryMessage message 113000. Specifically, this figure depicts the arrangement and hierarchy of various components such as one or more levels of packages, entities, and datatypes, shown here as 113000 through 113032. As described above, packages may be used to represent hierarchy levels. Entities are discrete business elements that are used during a business transaction. Data types are used to type object entities and interfaces with a structure. For example, EmployeeTimeSheetAllowedReceivingCostingActivityByEmployeeQueryMessage message 113000 includes, among other things, EmployeeTimeSheetAllowedReceivingCostingActivitySelectionBy Employee 113016. Accordingly, heterogeneous applications may communicate using this consistent message configured as such.

Additionally, FIGS. 114-1 through 114-2 illustrate one example logical configuration of EmployeeTimeSheetAllowedReceivingCostingActivityByEmployeeResponseMessage message 114000. Specifically, this figure depicts the arrangement and hierarchy of various components such as one or more levels of packages, entities, and datatypes, shown here as 114000 through 114058. As described above, packages may be used to represent hierarchy levels. Entities are discrete business elements that are used during a business transaction. Data types are used to type object entities and interfaces with a structure. For example, EmployeeTimeSheetAllowedReceivingCostingActivityByEmployeeResponseMessage message 114000 includes, among other things, EmployeeTimeSheetAllowedReceivingCostingActivity 114016. Accordingly, heterogeneous applications may communicate using this consistent message configured as such.

Additionally, FIG. 115 illustrates one example logical configuration of EmployeeTimeSheetAllowedReceivingFundByEmployeeQueryMessage message 115000. Specifically, this figure depicts the arrangement and hierarchy of various components such as one or more levels of packages, entities, and datatypes, shown here as 115000 through 115032. As described above, packages may be used to represent hierarchy levels. Entities are discrete business elements that are used during a business transaction. Data types are used to type object entities and interfaces with a structure. For example, EmployeeTimeSheetAllowedReceivingFundByEmployeeQueryMessage message 115000 includes, among other things, EmployeeTimeSheetAllowedReceivingFundSelectionByEmployee 115016. Accordingly, heterogeneous applications may communicate using this consistent message configured as such.

Additionally, FIGS. 116-1 through 116-2 illustrate one example logical configuration of EmployeeTimeSheetAllowedReceivingFundByEmployeeResponseMessage message 116000. Specifically, this figure depicts the arrangement and hierarchy of various components such as one or more levels of packages, entities, and datatypes, shown here as 116000 through 116052. As described above, packages may be used to represent hierarchy levels. Entities are discrete business elements that are used during a business transaction. Data types are used to type object entities and interfaces with a structure. For example, EmployeeTimeSheetAllowedReceivingFundByEmployeeResponseMessage message 116000 includes, among other things, EmployeeTimeSheetAllowedReceivingFund 116016. Accordingly, heterogeneous applications may communicate using this consistent message configured as such.

Additionally, FIG. 117 illustrates one example logical configuration of EmployeeTimeSheetAllowedReceivingGrantByEmployeeQueryMessage message 117000. Specifically, this figure depicts the arrangement and hierarchy of various components such as one or more levels of packages, entities, and datatypes, shown here as 117000 through 117032. As described above, packages may be used to represent hierarchy levels. Entities are discrete business elements that are used during a business transaction. Data types are used to type object entities and interfaces with a structure. For example, EmployeeTimeSheetAllowedReceivingGrantByEmployeeQueryMessage message 117000 includes, among other things, EmployeeTimeSheetAllowedReceivingGrantSelectionByEmployee 117016. Accordingly, heterogeneous applications may communicate using this consistent message configured as such.

Additionally, FIGS. 118-1 through 118-2 illustrate one example logical configuration of EmployeeTimeSheetAllowedReceivingGrantByEmployeeResponseMessage message 118000. Specifically, this figure depicts the arrangement and hierarchy of various components such as one or more levels of packages, entities, and datatypes, shown here as 118000 through 118052. As described above, packages may be used to represent hierarchy levels. Entities are discrete business elements that are used during a business transaction. Data types are used to type object entities and interfaces with a structure. For example, EmployeeTimeSheetAllowedReceivingGrantByEmployeeResponseMessage message 118000 includes, among other things, EmployeeTimeSheetAllowedReceivingGrant 118016. Accordingly, heterogeneous applications may communicate using this consistent message configured as such.

Additionally, FIG. 119 illustrates one example logical configuration of EmployeeTimeSheetAllowedReceivingSalesOrderByEmployeeQueryMessage message 119000. Specifically, this figure depicts the arrangement and hierarchy of various components such as one or more levels of packages, entities, and datatypes, shown here as 119000 through 119032. As described above, packages may be used to represent hierarchy levels. Entities are discrete business elements that are used during a business transaction. Data types are used to type object entities and interfaces with a structure. For example, EmployeeTimeSheetAllowedReceivingSalesOrderByEmployeeQueryMessage message 119000 includes, among other things, EmployeeTimeSheetAllowedReceivingSalesOrderSelectionByEmployee 119016. Accordingly, heterogeneous applications may communicate using this consistent message configured as such.

Additionally, FIGS. 120-1 through 120-2 illustrate one example logical configuration of EmployeeTimeSheetAllowedReceivingSalesOrderByEmployeeResponseMessage message 120000. Specifically, this figure depicts the arrangement and hierarchy of various components such as one or more levels of packages, entities, and datatypes, shown here as 120000 through 120058. As described above, packages may be used to represent hierarchy levels. Entities are discrete business elements that are used during a business transaction. Data types are used to type object entities and interfaces with a structure. For example, EmployeeTimeSheetAllowedReceivingSalesOrderByEmployeeResponseMessage message 120000 includes, among other things, EmployeeTimeSheetAllowedReceivingSalesOrder 120016. Accordingly, heterogeneous applications may communicate using this consistent message configured as such.

Additionally, FIG. 121 illustrates one example logical configuration of EmployeeTimeSheetAllowedResourceClassByEmployeeQueryMessage message 121000. Specifically, this figure depicts the arrangement and hierarchy of various components such as one or more levels of packages, entities, and datatypes, shown here as 121000 through 121032. As described above, packages may be used to represent hierarchy levels. Entities are discrete business elements that are used during a business transaction. Data types are used to type object entities and interfaces with a structure. For example, EmployeeTimeSheetAllowedResourceClassByEmployeeQueryMessage message 121000 includes, among other things, EmployeeTimeSheetAllowedResourceClassSelectionByEmployee 121016. Accordingly, heterogeneous applications may communicate using this consistent message configured as such.

Additionally, FIGS. 122-1 through 122-2 illustrate one example logical configuration of EmployeeTimeSheetAllowedResourceClassByEmployeeResponseMessage message 122000. Specifically, this figure depicts the arrangement and hierarchy of various components such as one or more levels of packages, entities, and datatypes, shown here as 122000 through 122058. As described above, packages may be used to represent hierarchy levels. Entities are discrete business elements that are used during a business transaction. Data types are used to type object entities and interfaces with a structure. For example, EmployeeTimeSheetAllowedResourceClassByEmployeeResponseMessage message 122000 includes, among other things, EmployeeTimeSheetAllowedResourceClass 122016. Accordingly, heterogeneous applications may communicate using this consistent message configured as such.

Additionally, FIG. 123 illustrates one example logical configuration of EmployeeTimeSheetAllowedServiceProductByEmployeeQueryMessage message 123000. Specifically, this figure depicts the arrangement and hierarchy of various components such as one or more levels of packages, entities, and datatypes, shown here as 123000 through 123032. As described above, packages may be used to represent hierarchy levels. Entities are discrete business elements that are used during a business transaction. Data types are used to type object entities and interfaces with a structure. For example, EmployeeTimeSheetAllowedServiceProductByEmployeeQueryMessage message 123000 includes, among other things, EmployeeTimeSheetAllowedServiceProductSelectionByEmployee 123016. Accordingly, heterogeneous applications may communicate using this consistent message configured as such.

Additionally, FIGS. 124-1 through 124-2 illustrate one example logical configuration of EmployeeTimeSheetAllowedServiceProductByEmployeeResponseMessage message 124000. Specifically, this figure depicts the arrangement and hierarchy of various components such as one or more levels of packages, entities, and datatypes, shown here as 124000 through 124058. As described above, packages may be used to represent hierarchy levels. Entities are discrete business elements that are used during a business transaction. Data types are used to type object entities and interfaces with a structure. For example, EmployeeTimeSheetAllowedServiceProductByEmployeeResponseMessage message 124000 includes, among other things, EmployeeTimeSheetAllowedServiceProduct 124016. Accordingly, heterogeneous applications may communicate using this consistent message configured as such.

Additionally, FIG. 125 illustrates one example logical configuration of EmployeeTimeSheetAllowedTaskComponentByEmployeeQueryMessage message 125000. Specifically, this figure depicts the arrangement and hierarchy of various components such as one or more levels of packages, entities, and datatypes, shown here as 125000 through 125032. As described above, packages may be used to represent hierarchy levels. Entities are discrete business elements that are used during a business transaction. Data types are used to type object entities and interfaces with a structure. For example, EmployeeTimeSheetAllowedTaskComponentByEmployeeQueryMessage message 125000 includes, among other things, EmployeeTimeSheetAllowedTaskComponentSelectionByEmployee 125016. Accordingly, heterogeneous applications may communicate using this consistent message configured as such.

Additionally, FIGS. 126-1 through 126-2 illustrate one example logical configuration of EmployeeTimeSheetAllowedTaskComponentByEmployeeResponseMessage message 126000. Specifically, this figure depicts the arrangement and hierarchy of various components such as one or more levels of packages, entities, and datatypes, shown here as 126000 through 126052. As described above, packages may be used to represent hierarchy levels. Entities are discrete business elements that are used during a business transaction. Data types are used to type object entities and interfaces with a structure. For example, EmployeeTimeSheetAllowedTaskComponentByEmployeeResponseMessage message 126000 includes, among other things, EmployeeTimeSheetAllowedTaskComponent 126016. Accordingly, heterogeneous applications may communicate using this consistent message configured as such.

Additionally, FIG. 127 illustrates one example logical configuration of EmployeeTimeSheetAllowedTaskLevelByEmployeeQueryMessage message 127000. Specifically, this figure depicts the arrangement and hierarchy of various components such as one or more levels of packages, entities, and datatypes, shown here as 127000 through 127032. As described above, packages may be used to represent hierarchy levels. Entities are discrete business elements that are used during a business transaction. Data types are used to type object entities and interfaces with a structure. For example, EmployeeTimeSheetAllowedTaskLevelByEmployeeQueryMessage message 127000 includes, among other things, EmployeeTimeSheetAllowedTaskLevelSelectionByEmployee 127016. Accordingly, heterogeneous applications may communicate using this consistent message configured as such.

Additionally, FIGS. 128-1 through 128-2 illustrate one example logical configuration of EmployeeTimeSheetAllowedTaskTypeByEmployeeResponseMessage message 128000. Specifically, this figure depicts the arrangement and hierarchy of various components such as one or more levels of packages, entities, and datatypes, shown here as 128000 through 128052. As described above, packages may be used to represent hierarchy levels. Entities are discrete business elements that are used during a business transaction. Data types are used to type object entities and interfaces with a structure. For example, EmployeeTimeSheetAllowedTaskTypeByEmployeeResponseMessage message 128000 includes, among other things, EmployeeTimeSheetAllowedTaskType 128016. Accordingly, heterogeneous applications may communicate using this consistent message configured as such.

Additionally, FIG. 129 illustrates one example logical configuration of EmployeeTimeSheetAllowedTaskTypeByEmployeeQueryMessage message 129000. Specifically, this figure depicts the arrangement and hierarchy of various components such as one or more levels of packages, entities, and datatypes, shown here as 129000 through 129032. As described above, packages may be used to represent hierarchy levels. Entities are discrete business elements that are used during a business transaction. Data types are used to type object entities and interfaces with a structure. For example, EmployeeTimeSheetAllowedTaskTypeByEmployeeQueryMessage message 129000 includes, among other things, EmployeeTimeSheetAllowedTaskTypeSelectionByEmployee 129016. Accordingly, heterogeneous applications may communicate using this consistent message configured as such.

Additionally, FIGS. 130-1 through 130-2 illustrate one example logical configuration of EmployeeTimeSheetAllowedTaskTypeByEmployeeResponseMessage message 130000. Specifically, this figure depicts the arrangement and hierarchy of various components such as one or more levels of packages, entities, and datatypes, shown here as 130000 through 130046. As described above, packages may be used to represent hierarchy levels. Entities are discrete business elements that are used during a business transaction. Data types are used to type object entities and interfaces with a structure. For example, EmployeeTimeSheetAllowedTaskTypeByEmployeeResponseMessage message 130000 includes, among other things, EmployeeTimeSheetAllowedTaskType 130016. Accordingly, heterogeneous applications may communicate using this consistent message configured as such.

Additionally, FIG. 131 illustrates one example logical configuration of EmployeeTimeSheetAllowedWarrantyGoodwillTypeByEmployeeQueryMessage message 131000. Specifically, this figure depicts the arrangement and hierarchy of various components such as one or more levels of packages, entities, and datatypes, shown here as 131000 through 131032. As described above, packages may be used to represent hierarchy levels. Entities are discrete business elements that are used during a business transaction. Data types are used to type object entities and interfaces with a structure. For example, EmployeeTimeSheetAllowedWarrantyGoodwillTypeByEmployeeQueryMessage message 131000 includes, among other things, EmployeeTimeSheetAllowedWarrantyGoodwillTypeSelectionByEmployee 131016. Accordingly, heterogeneous applications may communicate using this consistent message configured as such.

Additionally, FIGS. 132-1 through 132-2 illustrate one example logical configuration of EmployeeTimeSheetAllowedWarrantyGoodwillTypeByEmployeeResponseMessage message 132000. Specifically, this figure depicts the arrangement and hierarchy of various components such as one or more levels of packages, entities, and datatypes, shown here as 132000 through 132046. As described above, packages may be used to represent hierarchy levels. Entities are discrete business elements that are used during a business transaction. Data types are used to type object entities and interfaces with a structure. For example, EmployeeTimeSheetAllowedWarrantyGoodwillTypeByEmployeeResponseMessage message 132000 includes, among other things, EmployeeTimeSheetAllowedWarrantyGoodwillType 132016. Accordingly, heterogeneous applications may communicate using this consistent message configured as such.

Additionally, FIG. 133 illustrates one example logical configuration of EmployeeTimeSheetAllowedWorkBreakDownStructureElementByEmployeeQueryMessage message 133000. Specifically, this figure depicts the arrangement and hierarchy of various components such as one or more levels of packages, entities, and datatypes, shown here as 133000 through 133032. As described above, packages may be used to represent hierarchy levels. Entities are discrete business elements that are used during a business transaction. Data types are used to type object entities and interfaces with a structure. For example, EmployeeTimeSheetAllowedWorkBreakDownStructureElementByEmployeeQueryMessage message 133000 includes, among other things, EmployeeTimeSheetAllowedWorkBreakDownStructureElementSelectionByEmployee 133016. Accordingly, heterogeneous applications may communicate using this consistent message configured as such.

Additionally, FIGS. 134-1 through 134-2 illustrate one example logical configuration of EmployeeTimeSheetAllowedWorkBreakDownStructureElemenByEmployeeResponseMessage message 134000. Specifically, this figure depicts the arrangement and hierarchy of various components such as one or more levels of packages, entities, and datatypes, shown here as 134000 through 134052. As described above, packages may be used to represent hierarchy levels. Entities are discrete business elements that are used during a business transaction. Data types are used to type object entities and interfaces with a structure. For example, EmployeeTimeSheetAllowedWorkBreakDownStructureElemenByEmployeeResponseMessage message 134000 includes, among other things, EmployeeTimeSheetAllowedWorkBreakDownStructureElement 134016. Accordingly, heterogeneous applications may communicate using this consistent message configured as such.

Additionally, FIG. 135 illustrates one example logical configuration of EmployeeTimeSheetByEmployeeQueryMessage message 135000. Specifically, this figure depicts the arrangement and hierarchy of various components such as one or more levels of packages, entities, and datatypes, shown here as 135000 through 135038. As described above, packages may be used to represent hierarchy levels. Entities are discrete business elements that are used during a business transaction. Data types are used to type object entities and interfaces with a structure. For example, EmployeeTimeSheetByEmployeeQueryMessage message 135000 includes, among other things, EmployeeTimeSheetSelectionByEmployee 135016. Accordingly, heterogeneous applications may communicate using this consistent message configured as such.

Additionally, FIGS. 136-1 through 136-16 illustrate one example logical configuration of EmployeeTimeSheet- ByEmployeeResponseMessage message 136000. Specifically, this figure depicts the arrangement and hierarchy of various components such as one or more levels of packages, entities, and datatypes, shown here as 136000 through 136440. As described above, packages may be used to represent hierarchy levels. Entities are discrete business elements that are used during a business transaction. Data types are used to type object entities and interfaces with a structure. For example, EmployeeTimeSheetByEmployeeResponseMessage message 136000 includes, among other things, EmployeeTimeSheet 136016. Accordingly, heterogeneous applications may communicate using this consistent message configured as such.

Additionally, FIGS. 137-1 through 137-13 illustrate one example logical configuration of EmployeeTimeSheetChangeCheckQueryMessage message 137000. Specifically, this figure depicts the arrangement and hierarchy of various components such as one or more levels of packages, entities, and datatypes, shown here as 137000 through 137396. As described above, packages may be used to represent hierarchy levels. Entities are discrete business elements that are used during a business transaction. Data types are used to type object entities and interfaces with a structure. For example, EmployeeTimeSheetChangeCheckQueryMessage message 137000 includes, among other things, EmployeeTimeSheet 137016. Accordingly, heterogeneous applications may communicate using this consistent message configured as such.

Additionally, FIGS. 138-1 through 138-15 illustrate one example logical configuration of EmployeeTimeSheetChangeCheckResponseMessage message 138000. Specifically, this figure depicts the arrangement and hierarchy of various components such as one or more levels of packages, entities, and datatypes, shown here as 138000 through 138440. As described above, packages may be used to represent hierarchy levels. Entities are discrete business elements that are used during a business transaction. Data types are used to type object entities and interfaces with a structure. For example, SheetChangeCheckResponseMessage message 138000 includes, among other things, EmployeeTimeSheet 138016. Accordingly, heterogeneous applications may communicate using this consistent message configured as such.

Additionally, FIGS. 139-1 through 139-14 illustrate one example logical configuration of EmployeeTimeSheetChangeConfirmationMessage message 139000. Specifically, this figure depicts the arrangement and hierarchy of various components such as one or more levels of packages, entities, and datatypes, shown here as 139000 through 139440. As described above, packages may be used to represent hierarchy levels. Entities are discrete business elements that are used during a business transaction. Data types are used to type object entities and interfaces with a structure. For example, EmployeeTimeSheetChangeConfirmationMessage message 139000 includes, among other things, EmployeeTimeSheet 139016. Accordingly, heterogeneous applications may communicate using this consistent message configured as such.

Additionally, FIGS. 140-1 through 140-13 illustrate one example logical configuration of EmployeeTimeSheetChangeRequestMessage message 140000. Specifically, this figure depicts the arrangement and hierarchy of various components such as one or more levels of packages, entities, and datatypes, shown here as 140000 through 140396. As described above, packages may be used to represent hierarchy levels. Entities are discrete business elements that are used during a business transaction. Data types are used to type object entities and interfaces with a structure. For example, EmployeeTimeSheetChangeRequestMessage message 140000 includes, among other things, EmployeeTimeSheet 140016. Accordingly, heterogeneous applications may communicate using this consistent message configured as such.

Additionally, FIGS. 141-1 through 141-15 illustrate one example logical configuration of EmployeeTimeSheetCompleteConfirmationMessage message 141000. Specifically, this figure depicts the arrangement and hierarchy of various components such as one or more levels of packages, entities, and datatypes, shown here as 141000 through 141440. As described above, packages may be used to represent hierarchy levels. Entities are discrete business elements that are used during a business transaction. Data types are used to type object entities and interfaces with a structure. For example, EmployeeTimeSheetCompleteConfirmationMessage message 141000 includes, among other things, EmployeeTimeSheet 141016. Accordingly, heterogeneous applications may communicate using this consistent message configured as such.

Additionally, FIG. 142 illustrates one example logical configuration of EmployeeTimeEmployeeTimeSheetCompleteRequestMessage message 142000. Specifically, this figure depicts the arrangement and hierarchy of various components such as one or more levels of packages, entities, and datatypes, shown here as 142000 through 142038. As described above, packages may be used to represent hierarchy levels. Entities are discrete business elements that are used during a business transaction. Data types are used to type object entities and interfaces with a structure. For example, EmployeeTimeEmployeeTimeSheetCompleteRequestMessage message 142000 includes, among other things, EmployeeTimeSheet 142016. Accordingly, heterogeneous applications may communicate using this consistent message configured as such.

Message Data Type EmployeeTimeSheetChangeRequestMessage

The message data type EmployeeTimeSheetChangeRequestMessage includes the EmployeeTimeSheet included in the business document and the business information that is relevant for sending a business document in a message. It includes the MessageHeader package and EmployeeTimeSheet package. A MessageHeader package groups the business information that is relevant for sending a business document in a message. The MessageHeader package includes the MessageHeader entity. A MessageHeader groups business information from the perspective of the sending application, such as information to identify the business document in a message, information about the sender, and (possibly) information about the recipient. The MessageHeader includes SenderParty and RecipientParty. The MessageHeader is of type GDT: BusinessDocumentMessageHeader, whereby the following elements of the GDT are used: ID, and ReferenceID. A SenderParty is the party responsible for sending a business document at business application level. The SenderParty can be of type GDT: BusinessDocumentMessageHeaderParty. A RecipientParty is the party responsible for receiving a business document at business application level. The RecipientParty can be of type GDT: BusinessDocumentMessageHeaderParty.

The EmployeeTimeSheet package groups the EmployeeTimeSheet information and includes the EmployeeTimeSheet entity, in a one to one cardinality relationship. An EmployeeTimeSheet is the collection of EmployeeTimes of a specific Employee with relation to an assigned WorkAgreement. The EmployeeTimeSheet includes the EmployeeTime package. The EmployeeTime package includes the EmployeeTime entity, in a1:n cardinality relationship. An EmployeeTime is a document of the working times of an internal or external employee. In addition to planned and actual working times and activities carried out for the company, it also documents absence times, break times, and availability times. In the viewpoint of the EmployeeTimeSheetChangeRequestMessage message, it includes actual working times. The EmployeeTime can include the ActionCode, ID, ExternalKey, WorkAgreementID, and Note elements. The ActionCode is a coded representation of an instruction to the recipient of a message telling it how to process a transmitted element. It determines if the EmployeeTime might be created (Code 01), changed (Code 02) or deleted (Code 03). In some implementations, other codes are not used. ID is the unique identifier for an EmployeeTime. It is assigned by the provider of the message, and may be based on GDT: BusinessTransactionDocumentID. ExternalKey is a key which can be assigned to an EmployeeTime directly by the consumer of this message. The consumer of the message is responsible for keeping the ExternalKey unique. ExternalKey may be based on the intermediate GDT: EmployeeTimeExternalKey. The ExternalKey can include ID, which is an external identifier of the EmployeeTime. ID can be assigned to an EmployeeTime directly by the consumer. ID may be based on GDT: BusinessTransactionDocumentID. ExternalKey may include OriginTypeCode, which is the coded representation of the origin type of an EmployeeTime. The origin type describes e.g. the application that is using this message. OriginTypeCode may be based on GDT: EmployeeTimeOriginTypeCode. WorkAgreementID is an identifier, which may be unique, for the work agreement the EmployeeTime belongs to. WorkAgreementID may be based on GDT: WorkAgreementID. Note is a comment about an EmployeeTime, and may be based on GDT: Note. In some implementations, the ID offers a possibility to specify an EmployeeTime. If ActionCode includes the Code '02' (Change) or '03' (Delete) the ID can be present. In the case that the message includes an ExternalKey the created, changed or deleted EmployeeTime may receive this ExternalKey. All used WorkAgreements can be assigned to the same Employee. The message EmployeeTimeForEmployeeTimeSheetByElements can be used to retrieve the EmployeeTimeID for a specified ExternalKey. The EmployeeTime includes the Item package. The Item package includes the Item entity, in a 1:1 cardinality relationship. An Item of an EmployeeTime is a document item concerning an employee's planned or recorded working time or other time (such as absence, break, availability). It includes information about the type and the start and end or duration of the time; it can reference a working time model. In the viewpoint of the EmployeeTimeSheetChangeRequestMessage message, it is a document item about recorded working time without a reference to a working time model. The elements located at the Item entity can include ID, CategoryCode, TypeCode, EmployeeTimeValidity, FullWorkingDayIndicator, Quantity, Amount, Description, TaskTypeCode, TaskLevelCode, and TaskComponentCode. ID is the unique identifier for an EmployeeTimeItem. It is assigned by the provider of this message, and may be of type GDT: EmployeeTimeItemID CategoryCode is the coded representation of a classification of the times and activities of a document item of an employee, and may be based on GDT: EmployeeTimeItemCategoryCode. TypeCode is the coded representation of the type of a document item of an employee time according to its company, collective agreement or statutory meaning, and may be based on GDT: EmployeeTimeItemTypeCode. EmployeeTimeValidity is a structure describing the date and time and duration of day or time intervals in which the EmployeeTimeItem is valid. The elements DatePeriod and Duration are used in this message, and may be based on GDT: EmployeeTimeValidity. A FullWorkingDayIndicator indicates whether the duration of an EmployeeTimeItem corresponds to the number of hours of an employee's normal working time or not, and may be based on GDT: FullWorkingDayIndicator. Quantity is a quantity belonging to the EmployeeTimeItem that specifies quantitative (non time-specific) information about the documented working time, and may be based on GDT: Quantity. The Amount is a monetary amount belonging to an EmployeeTimeItem, and may be based on GDT: Amount. Description is the description of an EmployeeTimeItem. In some implementations, the languageCode is not supported. Description may be based on GDT: EmployeeTimeItemDescription. TaskTypeCode is the coded representation of the task type of a document item of an employee time, and may be based on GDT: EmployeeTimeItemTaskTypeCode. TaskLevelCode is the coded representation of the task of a document item of an employee time according to the valuation level. TaskLevelCode may be based on GDT: EmployeeTimeItemTaskLevelCode. TaskComponentCode is the coded representation of the task of a document item of an employee time according to the evaluation, and may be based on GDT: EmployeeTimeItemTaskComponentCode. The Item can include the ValuationTerms entity, which may have a cardinality relationship of 1:c. The Item can include the ActivityAllocationAndCostAssignment entity, which may have a cardinality relationship of 1:c. The entity can include the ServiceProvisionAndResourceConsumption entity, which may have a cardinality relationship of 1:c. The item may include the LogisticConfirmation entity, which may have a 1:c cardinality relationship. The Item may include the ExternalServiceAcknowledgement entity, which may have a cardinality relationship of 1:c. The Item may include the DifferentPayment entity, which may have a cardinality relationship of 1:c. In some implementations, FullWorkingDayIndicator can be used instead of EmployeeTimeValidity or in addition to EmployeeTimeValidity. In both cases this can lead to a Duration of EmployeeTimeValidity which corresponds to the planned working time of the day. In some implementations, either EmployeeTimeValidity (and/or FullWorkingDayIndicator) or Quantity or Amount may be specified. In case that any of the entities ValuationTerms, ActivityAllocationAndCostAssignment, ServiceProvisionAndResourceConsumption, LogisticConfirmation, ExternalServiceAcknowledgement or DifferentPayment occur in the message at least one of the elements of the particular existing entities may be filled. In some implementations, the cardinality of the EmployeeTimeItem is 1:1. The entity Item is kept to retain the flexibility for later functional enhancements and to guarantee a stable interface.

ValuationTerms are specifications for the evaluation of a document item. The elements located directly at the entity ItemValuationTerms can include EmployeeTimeValuationTerms. EmployeeTimeValuationTerms is a description of conditions for employee time evaluation, and may be based on GDT: EmployeeTimeValuationTerms.

ActivityAllocationAndCostAssignment includes information relevant for further processing by controlling. The elements located directly at the entity ActivityAllocationAndCostAssignment can include SendingCostCentreID, ResourceClassID, SendingCostingActivityID, SendingFundID, SendingFundsManagementFunctionalAreaID, SendingGrantID, WorkBreakDownStructureElementID, ReceivingSalesOrderID, ReceivingSalesOrderItemID, ReceivingCostingActivityID, ReceivingFundID, ReceivingFundsManagementFunctionalAreaID, ReceivingGrantID, ControllingKeyFigureCode, and Price. A SendingCostCentreID is an identifier for a cost centre. The SendingCostCentreID refers to the cost center which provides a service, and may be based on GDT: CostCentreID. A ResourceClassID is an identifier for a resource class which is involved in providing a service. A resource class classifies resources of a particular nature (e.g. development resources, consulting resources). ResourceClassID may be based on GDT: ResourceClassID. A SendingCostingActivityID is an identifier for a costing activity which is performed in order to provide a service. Costing activities are the basis for activity based costing. A costing activity describes a structured set of work steps that consume resources and convert them into outputs (products and services). SendingCostingActivityID may be based on GDT: CostingActivityID. A SendingFundID is a unique identifier for a fund which performed a task. A fund is an internal identification of the source of monies and can be categorized according to source and use such as governmental, enterprise, fiduciary. It is budgeted and controlled for all expenditures and revenues in order to stay in budget. Fund does not represent an organizational unit. SendingFundID may be based on GDT: FundsManagementFundID. A SendingFundsManagementFunctionalAreaID is an identifier, which may be unique, for a functional area in Funds Management. A functional area represents a goal of an organization in Funds Management. SendingFundsManagementFunctionalAreaID may be based on GDT: FundsManagementFunctionalAreaID. A SendingGrantID is a unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. SendingGrantID may be based on GDT: GrantID. A WorkBreakDownStructureElementID is an identifier (which may be unique) for an element in a project.

An element in a project is a component of the project of a specific type, for example, a task or a role.

WorkBreakDownStructureElementID may be based on GDT: ProjectElementID. A ReceivingSalesOrderID is an identifier (which may be unique) for a sales order for which a service is provided. A Sales order is a customer request to a company for delivery of goods or services at a certain time. ReceivingSalesOrderID may be based on GDT: BusinessTransactionDocumentID. ReceivingSalesOrderItemID is an identifier (which may be unique) for an item number in a receiver sales order. ReceivingSalesOrderItemID may be based on GDT: BusinessTransactionDocumentItemID A ReceivingCostingActivityID is an identifier for a costing activity for which resources are provided. Costing activities are the basis for activity based costing. A costing activity describes a structured set of work steps that consume resources and convert them into outputs (products and services). ReceivingCostingActivityID may be based on GDT: CostingActivityID. A ReceivingFundID is an identifier (which may be unique) for a fund for which a task is performed. A fund is an internal identification of the source of monies and can be categorized according to source and use such as governmental, enterprise, fiduciary. It is budgeted and controlled for all expenditures and revenues in order to stay in budget. Fund does not represent an organizational unit. ReceivingFundID may be based on GDT: FundsManagementFundID. A ReceivingFundsManagementFunctionalAreaID is an identifier (which may be unique) for a Functional area in Funds Management. A Functional area represents a goal of an organization in Funds Management. ReceivingFundsManagementFunctionalAreaID may be based on GDT: FundsManagementFunctionalAreaID. A ReceivingGrantID is a unique identifier for a grant.

A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. ReceivingGrantID may be based on GDT: GrantID. A ControllingKeyFigureCode is a coded representation of a controlling key figure. Controlling key figures represent activities or statistics in a cost centre, profit centre, or order. They are measured in units of time or quantity. They are used in controlling as a basis for allocations or statistical evaluations. ControllingKeyFigureCode may be based on GDT: ControllingKeyFigureCode. A Price is the exchange value, expressed in a monetary unit, of a product or a service in relation to a basic amount. In the viewpoint of this message it determines a deviating evaluation of a resource class. Price may be based on GDT: Price.

A ServiceProvisionAndResourceConsumption is document item information for the process component Accounting Processing about the confirmation of a service provided or a personnel resource consumption. The elements located directly at the entity ServiceProvisionAndResourceConsumption can include ReceivingCostCentreID. A ReceivingCostCentreID is an identifier for a cost centre. The ReceivingCostCentreID refers to the cost center which consumes a service, and may be based on GDT: CostCentreID. LogisticConfirmation includes information relevant for further processing in a logistics area. The elements located directly at the entity LogisticConfirmation can include ResourceID, LogisticsAreaID, OrderID, OrderOperationID, OrderOperationActivityID, NetworkID, NetworkOperationID, NetworkOperationActivityID, WarrantyGoodwillCode, CapacityCategoryCode, CapacitySplitID, WorkForecastQuantity, ForecastEndDate, and ConfirmationStatusCode. A ResourceID is a unique identifier for a resource. A resource is an entity that offers capacity and services and can be used in planning or logistics process within a logistics facility. ResourceID may be based on GDT: ResourceID.

A LogisticsAreaID is a unique identifier for a LogisticsArea. A LogisticsArea is an area with physical and operational features of locations in a company, used for storage and production, and groups these locations based on their logistical functions. LogisticsArea may be based on GDT: LogisticsAreaID. OrderID is a unique identifier for an order. An Order is a description of a task or measure for a resource and supports action-oriented planning as well as monitoring and allocation of costs. OrderID may be based on GDT: BusinessTransactionDocumentID. An OrderOperationID is a unique identifier of an operation. An operation is a self-contained section of a process in a logistics process description that is always completely executed on one or more resources that represent the main resources. OrderOperationID may be based on GDT: OperationID. An OrderOperationActivityID is a unique identifier of an activity in an operation. An activity is a processing or transportation section of a process description in logistics on a lower-level than the operation. OrderOperationActivityID may be based on GDT: OperationActivityID. The NetworkID is a unique Identifier of a network, and may be based on GDT: BusinessTransactionDocumentID. A NetworkOperationID is a unique identifier of an operation.

An operation is a self-contained section of a process in a logistics process description that is always completely executed on one or more resources that represent the main resources. NetworkOperationID may be based on GDT: OperationID. A NetworkOperationActivityID is the unique identifier of an activity in an operation. An activity is a process description on a lower-level than the operation. NetworkOperationActivityID may be based on GDT: OperationActivityID. The WarrantyGoodwillCode is the coded representation stating to what extent something is seen as a case for warranty or goodwill, and may be based on GDT: WarrantyGoodwillCode. CapacityCategoryCode is a coded representation of the type of capacity that is offered by a resource, and may be based on GDT: CapacityCategoryCode.

A CapacitySplitID is the identifier that represents the assignment of a capacity to an Operation and is unique in the context of the Operation, and may be based on GDT: CapacitySplitID. WorkForecastQuantity may be based on GDT: WorkForecastQuantity. ForecastEndDate is the date on which the execution of the forecast will end, and may be based on GDT: Date. A ConfirmationStatusCode is the coded representation of a confirmation status that is intended to be activated, and may be based on GDT: ConfirmationStatusCode.

An ExternalServiceAcknowledgement is document item information for the process component Goods and Service Acknowledgement about the confirmation of a service provided by an external employee. The elements located directly at the entity ExternalServiceAcknowledgement can include: PurchaseOrderID, PurchaseOrderItemID, and ServiceProductID. A PurchaseOrderID is the unique identifier for a Purchase Order, and may be based on GDT: BusinessTransactionDocumentID. A PurchaseOrderItemID is an identifier, which may be unique, for a item within a Purchase Order, and may be based on GDT: BusinessTransactionDocumentItemID A ServiceProductID is a possibly unique identifier for a service product, and may be based on GDT: ProductID.

A DifferentPayment is document item information for the process component Payroll about a different payment. An example of a different payment is a special hourly rate for overtime worked. The elements located directly at the entity DifferentPayment can include PositionID and ValuationBasisAmount. PositionID is the unique identifier for a position. A position is an organizational element within the organizational plan of an enterprise. It combines tasks, competencies and responsibilities permanently that can be taken care of by one or more suitable employees. PositionID may be based on GDT: PositionID. ValuationBasisAmount is the amount which effects a different payment for the recorded working time in the evaluation, and may be based on GDT: Amount.

Message Data Type EmployeeTimeSheetChangeConfirmationMessage

The message data type EmployeeTimeSheetChangeConfirmationMessage includes the EmployeeTimeSheet included in the business document and the business information that is relevant for sending a business document in a message. It includes the MessageHeader package, EmployeeTimeSheet package and Log package. A MessageHeader package groups the business information that is relevant for sending a business document in a message. The MessageHeader package includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information, and includes the EmployeeTimeSheet entity, in a 1:1 cardinality relationship. An EmployeeTimeSheet is the collection of EmployeeTimes of a specific Employee with relation to an assigned WorkAgreement. The EmployeeTimeSheet includes the EmployeeTime package. The EmployeeTime package includes the EmployeeTime entity, in a 1:n cardinality relationship. An EmployeeTime is a document of the working times of an internal or external employee. In addition to planned and actual working times and activities carried out for the company, it also documents absence times, break times, and availability times. In the viewpoint of the EmployeeTimeSheetChangeConfirmationMessage message it may include actual working times. The EmployeeTime can include the following elements: ID, ExternalKey, WorkAgreementID, Note, Status, ApproverUserAccountID, ApprovalDate, and RejectionReasonCode. ID is the (possibly) unique identifier for an EmployeeTime. ID is assigned by the provider of this message, and may be based on GDT: BusinessTransactionDocumentID. ExternalKey is a key which can be assigned to an EmployeeTime directly by the consumer of this message. The consumer of the message is responsible for keeping the ExternalKey unique. ExternalKey may be based on the intermediate GDT: EmployeeTimeExternalKey. The ExternalKey can include ID and OriginTypeCode. ID is the external identifier of the EmployeeTime and can be assigned to an EmployeeTime directly by the consumer. ID may be based on GDT: BusinessTransactionDocumentID. OriginTypeCode is the coded representation of the origin type of an EmployeeTime. The origin type describes, for example, the application that is using this message. OriginTypeCode may be based on GDT: EmployeeTimeOriginTypeCode. WorkAgreementID is a (possibly) unique identifier for the work agreement the EmployeeTime belongs to, and may be based on GDT: WorkAgreementID. Note is a comment about an EmployeeTime, and may be based on GDT: Note. Status includes information about the life cycle of an EmployeeTime, and may be based on the intermediate GDT: EmployeeTimeStatus. The Status can include LifeCycleStatusCode and ApprovalStatusCode. LifeCycleStatusCode is a coded representation of the life cycle of an Employee Time. The life cycle of an EmployeeTime expresses the progress of the EmployeeTime.

LifeCycleStatusCode may be based on GDT: EmployeeTimeLifeCycleStatusCode. ApprovalStatusCode is a coded representation of an approval status, and may be based on GDT: EmployeeTimeApprovalStatusCode. ApproverUserAccountID is a (possibly) unique identifier for a system's user account. It is the user account of the user who has approved the EmployeeTime.

ApproverUserAccountID may be based on GDT: UserAccountID. ApprovalDate is the date when an EmployeeTime was approved, and may be based on GDT: Date. RejectionReasonCode is a coded representation of a reason for rejection of a working time, and can be filled when the EmployeeTime is rejected. RejectionReasonCode may be based on GDT: EmployeeTimeRejectionReasonCode.

The EmployeeTime can include the Item package. The Item package includes the Item entity, in a 1:1 cardinality relationship. An Item of an EmployeeTime is a document item concerning an employee's planned or recorded working time or other time (such as absence, break, availability). Item includes information about the type and the start and end or duration of the time, and it can reference a working time model. In the viewpoint of the EmployeeTimeSheetChangeConfirmationMessage message, it is a document item about recorded working time without a reference to a working time model. The elements located at the Item entity can include: ID, SystemAdministrativeData, CategoryCode, TypeCode, EmployeeTimeValidity, FullWorkingDayIndicator, Quantity, Amount, Description, TaskTypeCode, TaskLevelCode, and TaskComponentCode. ID is the (possibly) unique identifier for an EmployeeTimeItem and is assigned by the provider of this message. ID may be based on GDT: EmployeeTimeItemID SystemAdministrativeData is administrative data that is stored in a system including system users and change dates/times. SystemAdministrativeData may be based on GDT: SystemAdministrativeData. CategoryCode is the coded representation of a classification of the times and activities of a document item of an employee, and may be based on GDT: EmployeeTimeItemCategoryCode. TypeCode is the coded representation of the type of a document item of an employee time according to its company, collective agreement or statutory meaning, and may be based on GDT: EmployeeTimeItemTypeCode. EmployeeTimeValidity is a structure describing the date and time and duration of day or time intervals in which the EmployeeTimeItem is valid. The elements DatePeriod and Duration may be used in the EmployeeTimeSheetChangeConfirmationMessage message. EmployeeTimeValidity may be based on GDT: EmployeeTimeValidity.

A FullWorkingDayIndicator indicates whether the duration of an EmployeeTimeItem corresponds to the number of hours of an employee's normal working time or not, and may be based on GDT: FullWorkingDayIndicator. Quantity is a quantity belonging to the EmployeeTimeItem that specifies additional, quantitative (non time-specific) information about the documented working time, and may be based on GDT: Quantity. The Amount is a monetary amount belonging to an EmployeeTimeItem, and may be based on GDT: Amount. Description is the description of an EmployeeTimeItem. In some implementations, the languageCode is not supported in the EmployeeTimeSheetChangeConfirmationMessage message. Description may be based on GDT: EmployeeTimeItemDescription. TaskTypeCode is the coded representation of the task type of a document item of an employee time, and may be based on GDT: EmployeeTimeItemTaskTypeCode. TaskLevelCode is the coded representation of the task of a document item of an employee time according to the valuation level, and may be based on GDT: EmployeeTimeItemTaskLevelCode. TaskComponentCode is the coded representation of the task of a document item of an employee time according to the evaluation, and may be based on GDT: EmployeeTimeItemTaskComponentCode. The Item can include the ValuationTerms, ActivityAllocationAndCostAssignment, ServiceProvisionAndResourceConsumption, LogisticConfirmation, ExternalServiceAcknowledgement, and DifferentPayment entities in 1:c cardinality relationships. In some implementations, FullWorkingDayIndicator can be used instead of EmployeeTimeValidity or in addition to EmployeeTimeValidity. In both cases this can lead to a Duration of EmployeeTimeValidity which corresponds to the planned working time of the day. In some implementations, either EmployeeTimeValidity (and/or FullWorkingDayIndicator) or Quantity or Amount may be specified. In some implementations, in the case that any of the entities ValuationTerms, ActivityAllocationAndCostAssignment, ServiceProvisionAndResourceConsumption, LogisticConfirmation, ExternalServiceAcknowledgement or DifferentPayment occur in the message at least one of the elements of the particular existing entities may be filled. The cardinality of the EmployeeTimeItem is 1:1. The entity Item exists to retain the flexibility for later functional enhancements and to guarantee a stable interface.

ValuationTerms are specifications for the evaluation of a document item. The elements located directly at the entity ValuationTerms can include EmployeeTimeValuationTerms. EmployeeTimeValuationTerms is a description of conditions for employee time evaluation, and may be based on GDT: EmployeeTimeValuationTerms.

ActivityAllocationAndCostAssignment includes information relevant for further processing by controlling. The elements located directly at the entity ActivityAllocationAndCostAssignment can include: SendingCostCentreID, ResourceClassID, SendingCostingActivityID, SendingFundID, SendingFundsManagementFunctionalAreaID, SendingGrantID, WorkBreakDownStructureElementID, ReceivingSalesOrderID, ReceivingSalesOrderItemID, ReceivingCostingActivityID, ReceivingFundID, ReceivingFundsManagementFunctionalAreaID, ReceivingGrantID, ControllingKeyFigureCode, and Price. A SendingCostCentreID is an identifier for a cost centre. The SendingCostCentreID refers to the cost center which provides a service, and may be based on GDT: CostCentreID. A ResourceClassID is an identifier for a resource class which is involved in providing a service. A resource class classifies resources of a particular nature (e.g. development resources, consulting resources). ResourceClassID may be based on GDT: ResourceClassID. A SendingCostingActivityID is an identifier for a costing activity which is performed in order to provide a service. Costing activities are the basis for activity based costing. A costing activity describes a structured set of work steps that consume resources and convert them into outputs (products and services). SendingCostingActivityID may be based on GDT: CostingActivityID. A SendingFundID is a (possibly) unique identifier for a fund which performed a task. A fund is an internal identification of the source of monies and can be categorized according to source and use such as governmental, enterprise, fiduciary, and is budgeted and controlled for all expenditures and revenues in order to stay in budget. Fund does not represent an organizational unit. SendingFundID may be based on GDT: FundsManagementFundID. A SendingFundsManagementFunctionalAreaID is a (possibly) unique identifier for a functional area in Funds Management. A functional area represents a goal of an organization in Funds Management.

SendingFundsManagementFunctionalAreaID may be based on GDT: FundsManagementFunctionalAreaID. A SendingGrantID is a unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. SendingGrantID may be based on GDT: GrantID. A WorkBreakDownStructureElementID is a unique identifier for an element in a project, and may be based on GDT: ProjectElementID. An element in a project is a component of the project of a specific type, for example, a task or a role. A ReceivingSalesOrderID is a (possibly) unique identifier for a sales order for which a service is provided. A Sales order is a customer request to a company for delivery of goods or services at a certain time. ReceivingSalesOrderID may be based on GDT: BusinessTransactionDocumentID. ReceivingSalesOrderItemID is a (possibly) unique identifier for an item number in a receiver sales order, and may be based on GDT: BusinessTransactionDocumentItemID A ReceivingCostingActivityID is an identifier for a costing activity for which resources are provided. Costing activities are the basis for activity based costing. A costing activity describes a structured set of work steps that consume resources and convert them into outputs (products and services). ReceivingCostingActivityID may be based on GDT: CostingActivityID. A ReceivingFundID is a (possibly) unique identifier for a fund for which a task is performed, and may be based on GDT: FundsManagementFundID. A ReceivingFundsManagementFunctionalAreaID is a (possibly) unique identifier for a Functional area in Funds Management. A Functional area represents a goal of an organization in Funds Management, and may be based on GDT: FundsManagementFunctionalAreaID. A ReceivingGrantID is a unique identifier for a grant, and may be based on GDT: GrantID. A ControllingKeyFigureCode is a coded representation of a controlling key figure. Controlling key figures represent activities or statistics in a cost centre, profit centre, or order, are measured in units of time or quantity, and are used in controlling as a basis for allocations or statistical evaluations. ControllingKeyFigureCode may be based on GDT: ControllingKeyFigureCode. A Price is the exchange value, expressed in a monetary unit, of a product or a service in relation to a basic amount. In the viewpoint of the EmployeeTimeSheetChangeConfirmationMessage message, Price determines a deviating evaluation of a resource class. Price may be based on GDT: Price.

A ServiceProvisionAndResourceConsumption is document item information for the process component Accounting Processing about the confirmation of a service provided or a personnel resource consumption. The elements located directly at the entity ServiceProvisionAndResourceConsumption can include ReceivingCostCentreID. A ReceivingCostCentreID is an identifier for a cost centre. The ReceivingCostCentreID refers to the cost center which consumes a service, and may be based on GDT: CostCentreID.

LogisticConfirmation includes information relevant for further processing in a logistics area. The elements located directly at the entity LogisticConfirmation can include: ResourceID, LogisticsAreaID, OrderID, OrderOperationID, OrderOperationActivityID, NetworkID, NetworkOperationID, NetworkOperationActivityID, WarrantyGoodwillCode, CapacityCategoryCode, CapacitySplitID, WorkForecastQuantity, ForecastEndDate, and ConfirmationStatusCode. A ResourceID is a (possibly) unique identifier for a resource. A resource is an entity that offers capacity and services and can be used in planning or logistics process within a logistics facility. ResourceID may be based on GDT: ResourceID.

A LogisticsAreaID is a unique identifier for a LogisticsArea. A LogisticsArea is an area with physical and operational features of locations in a company, used for storage and production, and groups these locations based on their logistical functions. LogisticsAreaID may be based on GDT: LogisticsAreaID. OrderID is a (possibly) unique identifier for an order. An Order is a description of a task or measure for a resource and supports action-oriented planning as well as monitoring and allocation of costs. OrderID may be based on GDT: BusinessTransactionDocumentID. An OrderOperationID is a (possibly) unique identifier of an operation. An operation is a self-contained section of a process in a logistics process description that is always completely executed on one or more resources that represent the main resources. OrderOperationID may be based on GDT: OperationID. An OrderOperationActivityID is a (possibly) unique identifier of an activity in an operation. An activity is a processing or transportation section of a process description in logistics on a lower-level than the operation. OrderOperationActivityID may be based on GDT: OperationActivityID. The NetworkID is a (possibly) unique identifier of a network, and may be based on GDT: BusinessTransactionDocumentID. A NetworkOperationID is a (possibly) unique identifier of an operation, and may be based on GDT: OperationID. A NetworkOperationActivityID is the (possibly) unique identifier of an activity in an operation, and may be based on GDT: OperationActivityID. The WarrantyGoodwillCode is the coded representation stating to what extent something is seen as a case for warranty or goodwill, and may be based on GDT: WarrantyGoodwillCode. CapacityCategoryCode is a coded representation of the type of capacity that is offered by a resource, and may be based on GDT: CapacityCategoryCode. A CapacitySplitID is the identifier that represents the assignment of a capacity to an Operation and is unique in the context of the Operation, and may be based on GDT: CapacitySplitID. WorkForecastQuantity may be based on GDT: WorkForecastQuantity. ForecastEndDate is the date on which the execution of the forecast will end, and may be based on GDT: Date. A ConfirmationStatusCode is the coded representation of a confirmation status that is intended to be activated, and may be based on GDT: ConfirmationStatusCode.

An ExternalServiceAcknowledgement is document item information for the process component Goods and Service Acknowledgement about the confirmation of a service provided by an external employee. The elements located directly at the entity ExternalServiceAcknowledgement can include: PurchaseOrderID, PurchaseOrderItemID, and ServiceProductID. A PurchaseOrderID is the unique identifier for a Purchase Order, and may be based on GDT: BusinessTransactionDocumentID. A PurchaseOrderItemID is the (possibly) unique identifier for a item within a Purchase Order, and may be based on GDT: BusinessTransactionDocumentItemID A ServiceProductID is a (possibly) unique identifier for a service product, and may be based on GDT: ProductID.

A DifferentPayment is document item information for the process component Payroll about a different payment. An example of a different payment is a special hourly rate for overtime worked. The elements located directly at the entity DifferentPayment can include PositionID and ValuationBasisAmoun. PositionID is the (possibly) unique identifier for a position. A position is an organizational element within the organizational plan of an enterprise which combines tasks, competencies and responsibilities permanently that can be taken care of by one or more suitable employees. PositionID may be based on GDT: PositionID. ValuationBasisAmount is the amount which effects a different payment for the recorded working time in the evaluation, and may be based on GDT: Amount. A Log package groups the error messages used for user interaction and includes the Log entity.

Message Data Type EmployeeTimeSheetChangeCheckQueryMessage

The message data type EmployeeTimeSheetChangeCheckQueryMessage can include the EmployeeTimeSheet included in the business document and the business information that is relevant for sending a business document in a message. The EmployeeTimeSheetChangeCheckQueryMessage includes the MessageHeader package and the EmployeeTimeSheet package. A MessageHeader package groups the business information that is relevant for sending a business document in a message, and includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the EmployeeTimeSheet entity in a 1:1 cardinality relationship. An EmployeeTimeSheet is the collection of EmployeeTimes of a specific Employee with relation to an assigned WorkAgreement. The EmployeeTimeSheet includes the EmployeeTime package. The EmployeeTime package includes the EmployeeTime entity in a 1:n cardinality relationship. An EmployeeTime is a document of the working times of an internal or external employee. In addition to planned and actual working times and activities carried out for the company, it also documents absence times, break times, and availability times. In the viewpoint of the EmployeeTimeSheetChangeCheckQueryMessage message it can include actual working times. The EmployeeTime can include the following elements: ActionCode, ID, ExternalKey, WorkAgreementID, and Note. The ActionCode is a coded representation of an instruction to the recipient of a message telling it how to process a transmitted element. It determines if the EmployeeTime can be created (Code 01), changed (Code 02) or deleted (Code 03). In some implementations, other codes may not be used. ActionCode may be based on GDT: ActionCode. ID is the (possibly) unique identifier for an EmployeeTime and may be assigned by the provider of this message. ID may be based on GDT: BusinessTransactionDocumentID. ExternalKey is a key which can be assigned to an EmployeeTime directly by the consumer of this message. The consumer of the message is responsible for keeping the ExternalKey unique. ExternalKey may be based on Intermediate GDT: EmployeeTimeExternalKey.

The ExternalKey includes ID and OriginTypeCode. ID is the external identifier of the EmployeeTime. ID can be assigned to an EmployeeTime directly by the consumer. ID may be based on GDT: BusinessTransactionDocumentID. OriginTypeCode is the coded representation of the origin type of an EmployeeTime. The origin type describes e.g. the application that is using this message. OriginTypeCode may be based on GDT: EmployeeTimeOriginTypeCode. WorkAgreementID is a (possibly) unique identifier for the work agreement the EmployeeTime belongs to, and may be based on GDT: WorkAgreementID. Note is a comment about an EmployeeTime, and may be based on GDT: Note. In some implementations, in this message, the ID offers a possibility to specify an EmployeeTime. That means that if ActionCode includes the Code '02' (Change) or '03' (Delete) the ID is present. In the case that the message includes an ExternalKey the created, changed or deleted EmployeeTime may receive this ExternalKey. In some implementations, all used WorkAgreements are assigned to the same Employee. The message EmployeeTimeForEmployeeTimeSheetByElements can be used to retrieve the EmployeeTimeID for a specified ExternalKey. The EmployeeTime includes the Item package. The Item package includes the Item entity in a 1:1 cardinality relationship. An Item of an EmployeeTime is a document item concerning an employee's planned or recorded working time or other time (such as absence, break, availability). It includes information about the type and the start and end or duration of the time; it can reference a working time model. In the viewpoint of this message it is a document item about recorded working time without a reference to a working time model. The elements located at the Item entity can include: ID, CategoryCode, TypeCode, EmployeeTimeValidity, FullWorkingDayIndicator, Quantity, Amount, Description, TaskTypeCode, TaskLevelCode, and TaskComponentCode.

ID is the (possibly) unique identifier for an EmployeeTimeItem. It is assigned by the provider of this message, and may be based on GDT: EmployeeTimeItemID CategoryCode is the coded representation of a classification of the times and activities of a document item of an employee, and may be based on GDT: EmployeeTimeItemCategoryCode. TypeCode is the coded representation of the type of a document item of an employee time according to its company, collective agreement or statutory meaning, and may be based on GDT: EmployeeTimeItemTypeCode. EmployeeTimeValidity is a structure describing the date and time and duration of day or time intervals in which the EmployeeTimeItem is valid. In some implementations, the elements DatePeriod and Duration are used in this message.

EmployeeTimeValidity may be based on GDT: EmployeeTimeValidity. A FullWorkingDayIndicator indicates whether the duration of an EmployeeTimeItem corresponds to the number of hours of an employee's normal working time or not, and may be based on GDT: FullWorkingDayIndicator. Quantity is a quantity belonging to the EmployeeTimeItem that specifies additional, quantitative (non time-specific) information about the documented working time, and may be based on GDT: Quantity. The Amount is a monetary amount belonging to an EmployeeTimeItem, and may be based on GDT: Amount. Description is the description of an EmployeeTimeItem. In some implementations, the languageCode may not be supported in this message. Description may be based on GDT: EmployeeTimeItemDescription. TaskTypeCode is the coded representation of the task type of a document item of an employee time, and may be based on GDT: EmployeeTimeItemTaskTypeCode. TaskLevelCode is the coded representation of the task of a document item of an employee time according to the valuation level, and may be based on GDT: EmployeeTimeItemTaskLevelCode. TaskComponentCode is the coded representation of the task of a document item of an employee time according to the evaluation, and may be based on GDT: EmployeeTimeItemTaskComponentCode.

The Item can include the ValuationTerms, ActivityAllocationAndCostAssignment, ServiceProvisionAndResourceConsumption, LogisticConfirmation, ExternalServiceAcknowledgement, and DifferentPayment entities in 1:c cardinality relationships. In some implementations, FullWorkingDayIndicator can be used instead of EmployeeTimeValidity or in addition to EmployeeTimeValidity. In both cases this can lead to a Duration of EmployeeTimeValidity which corresponds to the planned working time of the day. In some implementations, either EmployeeTimeValidity (and/or FullWorkingDayIndicator) or Quantity or Amount are specified. In the case that any of the entities ValuationTerms, ActivityAllocationAndCostAssignment, ServiceProvisionAndResourceConsumption, LogisticConfirmation, ExternalServiceAcknowledgement or DifferentPayment occur in the message at least one of the elements of the particular existing entities is filled. The cardinality of the EmployeeTimeItem is 1:1. The entity Item may be kept to retain the flexibility for later functional enhancements and to guarantee a stable interface.

ValuationTerms are specifications for the evaluation of a document item. The elements located directly at the entity ValuationTerms can include EmployeeTimeValuationTerms. EmployeeTimeValuationTerms is a description of conditions for employee time evaluation, and may be based on GDT: EmployeeTimeValuationTerms. ActivityAllocationAndCostAssignment includes information relevant for further processing by controlling. The elements located directly at the entity ActivityAllocationAndCostAssignment can include SendingCostCentreID, ResourceClassID, SendingCostingActivityID, SendingFundID, SendingFundsManagementFunctionalAreaID, SendingGrantID, WorkBreakDownStructureElementID, ReceivingSalesOrderID, ReceivingSalesOrderItemID, ReceivingCostingActivityID, ReceivingFundID, ReceivingFundsManagementFunctionalAreaID, ReceivingGrantID, ControllingKeyFigureCode and Price.

A SendingCostCentreID is an identifier for a cost centre. The SendingCostCentreID refers to the cost center which provides a service, may be based on GDT: CostCentreID. A ResourceClassID is an identifier for a resource class which is involved in providing a service. A resource class classifies resources of a particular nature (e.g. development resources, consulting resources). ResourceClassID may be based on GDT: ResourceClassID. A SendingCostingActivityID is an identifier for a costing activity which is performed in order to provide a service. Costing activities are the basis for activity based costing. A costing activity describes a structured set of work steps that consume resources and convert them into outputs (products and services). SendingCostingActivityID may be based on GDT: CostingActivityID. A SendingFundID is a unique identifier for a fund which performed a task. A fund is an internal identification of the source of monies and can be categorized according to source and use such as governmental, enterprise, fiduciary. It is budgeted and controlled for all expenditures and revenues in order to stay in budget. Fund does not represent an organizational unit. SendingFundID may be based on GDT: FundsManagementFundID. A SendingFundsManagementFunctionalAreaID is a unique identifier for a functional area in Funds Management. A functional area represents a goal of an organization in Funds Management. SendingFundsManagementFunctionalAreaID may be based on GDT: FundsManagementFunctionalAreaID. A SendingGrantID is a unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. SendingGrantID may be based on GDT: GrantID. A WorkBreakDownStructureElementID is a unique identifier for an element in a project. An element in a project is a component of the project of a specific type, for example, a task or a role. WorkBreakDownStructureElementID may be based on GDT: ProjectElementID. A ReceivingSalesOrderID is a (possibly) unique identifier for a sales order for which a service is provided.

A Sales order is a customer request to a company for delivery of goods or services at a certain time. ReceivingSalesOrderID may be based on GDT: BusinessTransactionDocumentID. ReceivingSalesOrderItemID is a (possibly) unique identifier for an item number in a receiver sales order, and may be based on GDT: BusinessTransactionDocumentItemID A ReceivingCostingActivityID is an identifier for a costing activity for which resources are provided. Costing activities are the basis for activity based costing. A costing activity describes a structured set of work steps that consume resources and convert them into outputs (products and services). ReceivingCostingActivityID may be based on GDT: CostingActivityID. A ReceivingFundID is a unique identifier for a fund for which a task is performed. A fund is an internal identification of the source of monies and can be categorized according to source and use such as governmental, enterprise, fiduciary. It is budgeted and controlled for all expenditures and revenues in order to stay in budget. Fund does not represent an organizational unit. ReceivingFundID may be based on GDT: FundsManagementFundID. A ReceivingFundsManagementFunctionalAreaID is a (possibly) unique identifier for a Functional area in Funds Management. A Functional area represents a goal of an organization in Funds Management. ReceivingFundsManagementFunctionalAreaID may be based on GDT: FundsManagementFunctionalAreaID. A ReceivingGrantID is a (possibly) unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit.

ReceivingGrantID may be based on GDT: GrantID. A ControllingKeyFigureCode is a coded representation of a controlling key figure. Controlling key figures represent activities or statistics in a cost centre, profit centre, or order. They are measured in units of time or quantity. They are used in controlling as a basis for allocations or statistical evaluations.

ControllingKeyFigureCode may be based on GDT: ControllingKeyFigureCode. A Price is the exchange value, expressed in a monetary unit, of a product or a service in relation to a basic amount. In the viewpoint of the EmployeeTimeSheetChangeCheckQueryMessage message, Price determines a deviating evaluation of a resource class. Price may be based on GDT: Price.

A ServiceProvisionAndResourceConsumption is document item information for the process component Accounting Processing about the confirmation of a service provided or a personnel resource consumption. The elements located directly at the entity ServiceProvisionAndResourceConsumption can include ReceivingCostCentreID. A ReceivingCostCentreID is an identifier for a cost centre. The ReceivingCostCentreID refers to the cost center which consumes a service, and may be based on GDT: CostCentreID.

LogisticConfirmation includes information relevant for further processing in a logistics area. The elements located directly at the entity LogisticConfirmation can include: ResourceID, LogisticsAreaID, OrderID, OrderOperationID, OrderOperationActivityID, NetworkID, NetworkOperationID, NetworkOperationActivityID, WarrantyGoodwillCode, CapacityCategoryCode, CapacitySplitID, WorkForecastQuantity, ForecastEndDate, and ConfirmationStatusCode. A ResourceID is a unique identifier for a resource. A resource is an entity that offers capacity and services and can be used in planning or logistics process within a logistics facility. ResourceID may be based on GDT: ResourceID. A LogisticsAreaID is a (possibly) unique identifier for a LogisticsArea. A LogisticsArea is an area with physical and operational features of locations in a company, used for storage and production, and groups these locations based on their logistical functions. LogisticsAreaID may be based on GDT: LogisticsAreaID. OrderID is a (possibly) unique identifier for an order. An Order is a description of a task or measure for a resource and supports action-oriented planning as well as monitoring and allocation of costs. OrderID may be based on GDT: BusinessTransactionDocumentID. An OrderOperationID is a (possibly) unique identifier of an operation. An operation is a self-contained section of a process in a logistics process description that is always completely executed on one or more resources that represent the main resources. OrderOperationID may be based on GDT: OperationID. An OrderOperationActivityID is a (possibly) unique identifier of an activity in an operation. An activity is a processing or transportation section of a process description in logistics on a lower-level than the operation. OrderOperationActivityID may be based on GDT: OperationActivityID. The NetworkID is a unique Identifier of a network. NetworkID may be based on GDT: BusinessTransactionDocumentID. A NetworkOperationID is a (possibly) unique identifier of an operation. An operation is a self-contained section of a process in a logistics process description that is always completely executed on one or more resources that represent the main resources. NetworkOperationID may be based on GDT: OperationID. A NetworkOperationActivityID is the unique identifier of an activity in an operation. An activity is a process description on a lower-level than the operation. NetworkOperationActivityID may be based on GDT: OperationActivityID. The WarrantyGoodwillCode is the coded representation stating to what extent something is seen as a case for warranty or goodwill. WarrantyGoodwillCode may be based on GDT: WarrantyGoodwillCode. CapacityCategoryCode is a coded representation of the type of capacity that is offered by a resource. CapacityCategoryCode may be based on GDT: CapacityCategoryCode. A CapacitySplitID is the identifier that represents the assignment of a capacity to an Operation and is unique in the context of the Operation. CapacitySplitID may be based on GDT: CapacitySplitID.

WorkForecastQuantity may be based on GDT: WorkForecastQuantity. ForecastEndDate is the date on which the execution of the forecast will end, and may be based on GDT: Date. A ConfirmationStatusCode is the coded representation of a confirmation status that is intended to be activated, and may be based on GDT: ConfirmationStatusCode.

An ExternalServiceAcknowledgement is document item information for the process component Goods and Service Acknowledgement about the confirmation of a service provided by an external employee. The elements located directly at the entity ExternalServiceAcknowledgement can include PurchaseOrderID, PurchaseOrderItemID, and ServiceProductID. A PurchaseOrderID is the (possibly) unique identifier for a Purchase Order, and may be based on GDT: BusinessTransactionDocumentID. A PurchaseOrderItemID is the (possibly) unique identifier for a item within a Purchase Order, and may be based on GDT: BusinessTransactionDocumentItemID A ServiceProductID is a (possibly) unique identifier for a service product, and may be based on GDT: ProductID.

A DifferentPayment is document item information for the process component Payroll about a different payment. An example of a different payment is a special hourly rate for overtime worked. The elements located directly at the entity DifferentPayment include PositionID and ValuationBasisAmount. PositionID is the (possibly) unique identifier for a position. A position is an organizational element within the organizational plan of an enterprise, which combines tasks, competencies and responsibilities permanently that can be taken care of by one or more suitable employees. PositionID may be based on GDT: PositionID. ValuationBasisAmount is the amount which effects a different payment for the recorded working time in the evaluation, and may be based on GDT: Amount.

Message Data Type EmployeeTimeSheetChangeCheckResponseMessage

The message data type EmployeeTimeSheetChangeCheckResponseMessage includes the EmployeeTimeSheet included in the business document and the business information that is relevant for sending a business document in a message. EmployeeTimeSheetChangeCheckResponseMessage includes the MessageHeader package, EmployeeTimeSheet package, and Log package. A MessageHeader package groups the business information that is relevant for sending a business document in a message. MessageHeader includes the MessageHeader entity. A MessageHeader groups business information from the perspective of the sending application, such as information to identify the business document in a message, information about the sender, and (possibly) information about the recipient. The MessageHeader includes SenderParty and RecipientParty, and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

An EmployeeTimeSheet is the collection of EmployeeTimes of a specific Employee with relation to an assigned WorkAgreement. The EmployeeTimeSheet includes the EmployeeTime package. The EmployeeTime package includes the EmployeeTime entity in a 1:n cardinality relationship. An EmployeeTime is a document of the working times of an internal or external employee. In addition to planned and actual working times and activities carried out for the company, it also documents absence times, break times, and availability times. In the viewpoint of this message it includes actual working times. The EmployeeTime can include the following elements: ID, ExternalKey, WorkAgreementID, Note, Status, LifeCycleStatusCode, ApprovalStatusCode, ApproverUserAccountID, ApprovalDate, and RejectionReasonCode.

ID is the unique identifier for an EmployeeTime. ID is assigned by the provider of this message, and may be based on GDT: BusinessTransactionDocumentID. ExternalKey is a key which can be assigned to an EmployeeTime directly by the consumer of this message. The consumer of the message is responsible for keeping the ExternalKey unique. ExternalKey may be based on Intermediate GDT: EmployeeTimeExternalKey. The ExternalKey can include ID and OriginTypeCode. ID is the external identifier of the EmployeeTime. ID can be assigned to an EmployeeTime directly by the consumer, and may be based on GDT: BusinessTransactionDocumentID. OriginTypeCode is the coded representation of the origin type of an EmployeeTime. The origin type describes e.g. the application that is using this message. OriginTypeCode may be based on GDT: EmployeeTimeOriginTypeCode.

WorkAgreementID is a (possibly) unique identifier for the work agreement the EmployeeTime belongs to, and may be based on GDT: WorkAgreementID. Note is a comment about an EmployeeTime, and may be based on GDT: Note. Status includes information about the life cycle of an EmployeeTime, and may be based on Intermediate GDT: EmployeeTimeStatus. The Status includes LifeCycleStatusCode and ApprovalStatusCode. LifeCycleStatusCode is a coded representation of the life cycle of an Employee Time. The life cycle of an EmployeeTime expresses the progress of the EmployeeTime, and may be based on GDT: EmployeeTimeLifeCycleStatusCode. ApprovalStatusCode is a coded representation of an approval status, and may be based on GDT: EmployeeTimeApprovalStatusCode. ApproverUserAccountID is a (possibly) unique identifier for a system's user account. ApprovalUserAccountID is the user account of the user who has approved the EmployeeTime, and may be based on GDT: UserAccountID. ApprovalDate is the date when an EmployeeTime was approved, and may be based on GDT: Date. RejectionReasonCode is a coded representation of a reason for rejection of a working time, may be filled when the EmployeeTime is rejected, and may be based on GDT: EmployeeTimeRejectionReasonCode.

The EmployeeTime includes the Item package. The Item package includes the Item entity in a 1:1 cardinality relationship. An Item of an EmployeeTime is a document item concerning an employee's planned or recorded working time or other time (such as absence, break, availability) which includes information about the type and the start and end or duration of the time. Item can reference a working time model. In the viewpoint of the EmployeeTimeSheetChangeCheckResponseMessage message it is a document item about recorded working time without a reference to a working time model. The elements located at the Item entity can include ID, SystemAdministrativeData, CategoryCode, TypeCode, EmployeeTimeValidity, FullWorkingDayIndicator, Quantity, Amount, Description, TaskTypeCode, TaskLevelCode, and TaskComponentCode.

ID is the unique identifier for an EmployeeTimeItem, is assigned by the provider of this message, and may be based on GDT: EmployeeTimeItemID SystemAdministrativeData is administrative data that is stored in a system. This data includes system users and change dates/times. SystemAdministrativeData may be based on GDT: SystemAdministrativeData. CategoryCode is the coded representation of a classification of the times and activities of a document item of an employee, and may be based on GDT: EmployeeTimeItemCategoryCode. TypeCode is the coded representation of the type of a document item of an employee time according to its company, collective agreement or statutory meaning, and may be based on GDT: EmployeeTimeItemTypeCode. EmployeeTimeValidity is a structure describing the date and time and duration of day or time intervals in which the EmployeeTimeItem is valid. The elements DatePeriod and Duration are used in this message. EmployeeTimeValidity may be based on GDT: EmployeeTimeValidity. A FullWorkingDayIndicator indicates whether the duration of an EmployeeTimeItem corresponds to the number of hours of an employee's normal working time or not, and may be based on GDT: FullWorkingDayIndicator. Quantity is a quantity belonging to the EmployeeTimeItem that specifies additional, quantitative (non time-specific) information about the documented working time, and may be based on GDT: Quantity. The Amount is a monetary amount belonging to an EmployeeTimeItem, and may be based on GDT: Amount. Description is the description of an EmployeeTimeItem. In some implementations, the languageCode may not be supported in this message. Description may be based on GDT: EmployeeTimeItemDescription. TaskTypeCode is the coded representation of the task type of a document item of an employee time, and may be based on GDT: EmployeeTimeItemTaskTypeCode. TaskLevelCode is the coded representation of the task of a document item of an employee time according to the valuation level, and may be based on GDT: EmployeeTimeItemTaskLevelCode. TaskComponentCode is the coded representation of the task of a document item of an employee time according to the evaluation, and may be based on GDT: EmployeeTimeItemTaskComponentCode. The Item includes the ValuationTerms, ActivityAllocationAndCostAssignment, ServiceProvisionAndResourceConsumption, LogisticConfirmation, ExternalServiceAcknowledgement, and DifferentPayment entities, each in 1:c relationships. In some implementations, FullWorkingDayIndicator can be used instead of EmployeeTimeValidity or in addition to EmployeeTimeValidity. In both cases this can lead to a Duration of EmployeeTimeValidity which corresponds to the planned working time of the day. In some implementations, either EmployeeTimeValidity (and/or FullWorkingDayIndicator) or Quantity or Amount can be specified. In some implementations, in the case that any of the entities ValuationTerms, ActivityAllocationAndCostAssignment, ServiceProvisionAndResourceConsumption, LogisticConfirmation, ExternalServiceAcknowledgement or DifferentPayment occur in the message at least one of the elements of the particular existing entities are filled. The cardinality of the EmployeeTimeItem is 1:1. The entity Item exists to retain the flexibility for later functional enhancements and to guarantee a stable interface.

ValuationTerms are specifications for the evaluation of a document item. The elements located directly at the entity ValuationTerms can include EmployeeTimeValuationTerms. EmployeeTimeValuationTerms is a description of conditions for employee time evaluation, and may be based on GDT: EmployeeTimeValuationTerms.

ActivityAllocationAndCostAssignment includes information relevant for further processing by controlling. The elements located directly at the entity ActivityAllocationAndCostAssignment can include: SendingCostCentreID, ResourceClassID, SendingCostingActivityID, SendingFundID, SendingFundsManagementFunctionalAreaID, SendingGrantID, WorkBreakDownStructureElementID, ReceivingSalesOrderID, ReceivingSalesOrderItemID, ReceivingCostingActivityID, ReceivingFundID, ReceivingFundsManagementFunctionalAreaID, ReceivingGrantID, ControllingKeyFigureCode, and Price. A SendingCostCentreID is an identifier for a cost centre. The SendingCostCentreID refers to the cost center which provides a service, and may be based on GDT: CostCentreID. A ResourceClassID is an identifier for a resource class which is involved in providing a service. A resource class classifies resources of a particular nature (e.g. development resources, consulting resources). ResourceClassID may be based on GDT: ResourceClassID. A SendingCostingActivityID is an identifier for a costing activity which is performed in order to provide a service. Costing activities are the basis for activity based costing. A costing activity describes a structured set of work steps that consume resources and convert them into outputs (products and services). SendingCostingActivityID may be based on GDT: CostingActivityID. A SendingFundID is a (possibly) unique identifier for a fund which performed a task.

A fund is an internal identification of the source of monies and can be categorized according to source and use such as governmental, enterprise, and fiduciary. It is budgeted and controlled for all expenditures and revenues in order to stay in budget. Fund does not represent an organizational unit. SendingFundID may be based on GDT: FundsManagementFundID. A SendingFundsManagementFunctionalAreaID is a unique identifier for a functional area in Funds Management. A functional area represents a goal of an organization in Funds Management. SendingFundsManagementFunctionalAreaID may be based on GDT: FundsManagementFunctionalAreaID. A SendingGrantID is a (possibly) unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. SendingGrantID may be based on GDT: GrantID. A WorkBreakDownStructureElementID is a (possibly) unique identifier for an element in a project. An element in a project is a component of the project of a specific type, for example, a task or a role. WorkBreakDownStructureElementID may be based on GDT: ProjectElementID. A ReceivingSalesOrderID is a (possibly) unique identifier for a sales order for which a service is provided.

A Sales order is a customer request to a company for delivery of goods or services at a certain time. ReceivingSalesOrderID may be based on GDT: BusinessTransactionDocumentID. ReceivingSalesOrderItemID is a (possibly) unique identifier for an item number in a receiver sales order. ReceivingSalesOrderItemID may be based on GDT: BusinessTransactionDocumentItemID A ReceivingCostingActivityID is an identifier for a costing activity for which resources are provided. Costing activities are the basis for activity based costing. A costing activity describes a structured set of work steps that consume resources and convert them into outputs (products and services). ReceivingCostingActivityID may be based on GDT: CostingActivityID. A ReceivingFundID is a (possibly) unique identifier for a fund for which a task is performed. A fund is an internal identification of the source of monies and can be categorized according to source and use such as governmental, enterprise, or fiduciary. It is budgeted and controlled for all expenditures and revenues in order to stay in budget. Fund does not represent an organizational unit. ReceivingFundID may be based on GDT: FundsManagementFundID. A ReceivingFundsManagementFunctionalAreaID is a (possibly) unique identifier for a Functional area in Funds Management. A Functional area represents a goal of an organization in Funds Management. ReceivingFundsManagementFunctionalAreaID may be based on GDT: FundsManagementFunctionalAreaID. A ReceivingGrantID is a (possibly) unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. ReceivingGrantID may be based on GDT: GrantID. A ControllingKeyFigureCode is a coded representation of a controlling key figure. Controlling key figures represent activities or statistics in a cost centre, profit centre, or order. They are measured in units of time or quantity. They are used in controlling as a basis for allocations or statistical evaluations. ControllingKeyFigureCode may be based on GDT: ControllingKeyFigureCode. A Price is the exchange value, expressed in a monetary unit, of a product or a service in relation to a basic amount. In the viewpoint of this message it determines a deviating evaluation of a resource class. Price may be based on GDT: Price.

A ServiceProvisionAndResourceConsumption is a document item information for the process component Accounting Processing about the confirmation of a service provided or a personnel resource consumption. The elements located directly at the entity ServiceProvisionAndResourceConsumption can include ReceivingCostCentreID. A ReceivingCostCentreID is an identifier for a cost centre. The ReceivingCostCentreID refers to the cost center which consumes a service, and may be based on GDT: CostCentreID. LogisticConfirmation includes information relevant for further processing in a logistics area. The elements located directly at the entity LogisticConfirmation can include ResourceID, LogisticsAreaID, OrderID, OrderOperationID, OrderOperationActivityID, NetworkID, NetworkOperationID, NetworkOperationActivityID, WarrantyGoodwillCode, CapacityCategoryCode, CapacitySplitID, WorkForecastQuantity, ForecastEndDate, and ConfirmationStatusCode. A ResourceID is a unique identifier for a resource. A resource is an entity that offers capacity and services and can be used in planning or logistics process within a logistics facility. ResourceID may be based on GDT: ResourceID. A LogisticsAreaID is a (possibly) unique identifier for a LogisticsArea. A LogisticsArea is an area with physical and operational features of locations in a company, used for storage and production, and groups these locations based on their logistical functions. LogisticsAreaID may be based on GDT: LogisticsAreaID. ReceivingOrderID is a (possibly) unique identifier for an order. An Order is a description of a task or measure for a resource and supports action-oriented planning as well as monitoring and allocation of costs. ReceivingOrderID may be based on GDT: BusinessTransactionDocumentID. An OrderOperationID is a (possibly) unique identifier of an operation.

An operation is a self-contained section of a process in a logistics process description that is always completely executed on one or more resources that represent the main resources. OrderOperationID may be based on GDT: OperationID. An OrderOperationActivityID is a (possibly) unique identifier of an activity in an operation. An activity is a processing or transportation section of a process description in logistics on a lower-level than the operation. OrderOperationActivityID may be based on GDT: OperationActivityID. The NetworkID is a (possibly) unique Identifier of a network, which may be based on GDT: BusinessTransactionDocumentID. A NetworkOperationID is a (possibly) unique identifier of an operation. An operation is a self-contained section of a process in a logistics process description that is always completely executed on one or more resources that represent the main resources. NetworkOperationID may be based on GDT: OperationID. A NetworkOperationActivityID is the (possibly) unique identifier of an activity in an operation. An activity is a process description on a lower-level than the operation. NetworkOperationActivityID may be based on GDT: OperationActivityID. The WarrantyGoodwillCode is the coded representation stating to what extent something is seen as a case for warranty or goodwill. WarrantyGoodwillCode may be based on GDT: WarrantyGoodwillCode. CapacityCategoryCode is a coded representation of the type of capacity that is offered by a resource, and may be based on GDT: CapacityCategoryCode. A CapacitySplitID is the identifier that represents the assignment of a capacity to an Operation and is unique in the context of the Operation, and may be based on GDT: CapacitySplitID. WorkForecastQuantity may be based on GDT: WorkForecastQuantity. ForecastEndDate is the date on which the execution of the forecast will end, and may be based on GDT: Date. A ConfirmationStatusCode is the coded representation of a confirmation status that is intended to be activated, and may be based on GDT: ConfirmationStatusCode.

An ExternalServiceAcknowledgement is document item information for the process component Goods and Service Acknowledgement about the confirmation of a service provided by an external employee. The elements located directly at the entity ExternalServiceAcknowledgement can include:

PurchaseOrderID, PurchaseOrderItemID, and ServiceProductID. A PurchaseOrderID is the (possibly) unique identifier for a Purchase Order, and may be based on GDT: BusinessTransactionDocumentID. A PurchaseOrderItemID is the (possibly) unique identifier for a item within a Purchase Order, and may be based on GDT: BusinessTransactionDocumentItemID A ServiceProductID is a (possibly) unique identifier for a service product, and may be based on GDT: ProductID.

A DifferentPayment is document item information for the process component Payroll about a different payment. An example of a different payment is a special hourly rate for overtime worked. The elements located directly at the entity DifferentPayment can include PositionID and ValuationBasisAmount. PositionID is the (possibly) unique identifier for a position. A position is an organizational element within the organizational plan of an enterprise. It combines tasks, competencies and responsibilities permanently that can be taken care of by one or more suitable employees. PositionID may be based on GDT: PositionID. ValuationBasisAmount is the amount which effects a different payment for the recorded working time in the evaluation, and may be based on GDT: Amount. A Log package groups the error messages used for user interaction and includes the Log entity.

Message Data Type EmployeeTimeSheetCompleteRequestMessage

The message data type EmployeeTimeSheetCompleteRequestMessage includes the EmployeeTimeSheet included in the business document and the business information that is relevant for sending a business document in a message, and includes the MessageHeader package and EmployeeTimeSheet package.

A MessageHeader package groups the business information that is relevant for sending a business document in a message. MessageHeader includes the MessageHeader entity. A MessageHeader groups business information from the perspective of the sending application, such as information to identify the business document in a message, information about the sender, and (possibly) information about the recipient. The MessageHeader includes SenderParty and RecipientParty, and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the EmployeeTimeSheet in a 1:1 cardinality relationship. An EmployeeTimeSheet is the collection of EmployeeTimes of a specific Employee with relation to an assigned WorkAgreement. The elements located directly at the EmployeeTimeSheet can include EmployeeID, WorkAgreementID, and DatePeriod.

EmployeeID is the identifier of the employee for whom the EmployeeTimeSheet can be auto completed, and may be based on GDT: EmployeeID. WorkAgreementID is a (possibly) unique identifier for a work agreement that the employee has with the employer. In the viewpoint of this message WorkAgreementID specifies for which WorkAgreement the EmployeeTimeSheet should be auto completed. WorkAgreementID may be based on GDT: WorkAgreementID. The DatePeriod specifies the date period for which the EmployeeTimeSheet should be auto completed, and may be based on GDT: CLOSED_DatePeriod. In some implementations, EmployeeID or WorkAgreementID can be filled. If only EmployeeID is filled the EmployeeTimeSheets for all WorkAgreements related to this EmployeeID may be auto completed.

Message Data Type EmployeeTimeSheetCompleteConfirmationMessage

The message data type EmployeeTimeSheetCompleteConfirmationMessage includes the EmployeeTimeSheet included in the business document and the business information that is relevant for sending a business document in a message. EmployeeTimeSheetCompleteConfirmationMessage includes the MessageHeader package, EmployeeTimeSheet package, and Log package.

A MessageHeader package groups the business information that is relevant for sending a business document in a message. The MessageHeader package includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the EmployeeTimeSheet entity in a 1:1 cardinality relationship. An EmployeeTimeSheet is the collection of EmployeeTimes of a specific Employee with relation to an assigned WorkAgreement. The EmployeeTimeSheet includes EmployeeTime package. The EmployeeTime package includes the EmployeeTime entity in a 1:cn cardinality relationship. An EmployeeTime is a document of the working times of an internal or external employee. In addition to planned and actual working times and activities carried out for the company, it also documents absence times, break times, and availability times. In the viewpoint of this message it includes actual working times. The EmployeeTime includes the following elements: ID, ExternalKey, WorkAgreementID, Note, Status, ApproverUserAccountID, ApprovalDate, and RejectionReasonCode. ID is the (possibly) unique identifier for an EmployeeTime. ID is assigned by the provider of this message, and may be based on GDT: BusinessTransactionDocumentID. ExternalKey is a key which can be assigned to an EmployeeTime directly by the consumer of this message. The consumer of the message is responsible for keeping the ExternalKey unique. ExternalKey may be based on Intermediate GDT: EmployeeTimeExternalKey. The ExternalKey includes ID and OriginTypeCode. ID is the external identifier of the EmployeeTime. ID can be assigned to an EmployeeTime directly by the consumer, and may be based on GDT: BusinessTransactionDocumentID. OriginTypeCode is the coded representation of the origin type of an EmployeeTime. The origin type describes, for example, the application that is using this message.

OriginTypeCode may be based on GDT: EmployeeTimeOriginTypeCode. WorkAgreementID is a (possibly) unique identifier for the work agreement the EmployeeTime belongs to. WorkAgreementID may be based on GDT: WorkAgreementID. Note is a comment about an EmployeeTime, and may be based on GDT: Note. Status includes information about the life cycle of an EmployeeTime, and may be based on Intermediate GDT: EmployeeTimeStatus. The Status includes LifeCycleStatusCode and ApprovalStatusCode. LifeCycleStatusCode is a coded representation of the life cycle of an Employee Time. The life cycle of an EmployeeTime expresses the progress of the EmployeeTime, and may be based on GDT: EmployeeTimeLifeCycleStatusCode. ApprovalStatusCode is a coded representation of an approval status, and may be based on GDT: EmployeeTimeApprovalStatusCode. ApproverUserAccountID is a (possibly) unique identifier for a system's user account and is the user account of the user who has approved the EmployeeTime, and may be based on GDT: UserAccountID.

ApprovalDate is the date when an EmployeeTime was approved, and may be based on GDT: Date. RejectionReasonCode is a coded representation of a reason for rejection of a working time, and may be based on GDT: EmployeeTimeRejectionReasonCode.

The EmployeeTime includes the Item package. The Item package includes the Item entity in a 1:1 cardinality relationship. An Item of an EmployeeTime is a document item concerning an employee's planned or recorded working time or other time (such as absence, break, availability). It includes information about the type and the start and end or duration of the time; it can reference a working time model. In the viewpoint of this message it is a document item about recorded working time without a reference to a working time model. The elements located at the Item entity can include: ID, SystemAdministrativeData, CategoryCode, TypeCode, EmployeeTimeValidity, FullWorkingDayIndicator, Quantity, Amount, Description, TaskTypeCode, TaskLevelCode, and TaskComponentCode.

ID is the unique identifier for an EmployeeTimeItem. It is assigned by the provider of this message, and may be based on GDT: EmployeeTimeItemID SystemAdministrativeData is administrative data that is stored in a system. This data includes system users and change dates/times. SystemAdministrativeData may include GDT: SystemAdministrativeData. CategoryCode is the coded representation of a classification of the times and activities of a document item of an employee, and may be based on GDT: EmployeeTimeItemCategoryCode. TypeCode is the coded representation of the type of a document item of an employee time according to its company, collective agreement or statutory meaning, and may be based on GDT: EmployeeTimeItemTypeCode. EmployeeTimeValidity is a structure describing the date and time and duration of day or time intervals in which the EmployeeTimeItem is valid. The elements DatePeriod and Duration are used in this message. EmployeeTimeValidity may be based on GDT: EmployeeTimeValidity. A FullWorkingDayIndicator indicates whether the duration of an EmployeeTimeItem corresponds to the number of hours of an employee's normal working time or not, and may be based on GDT: FullWorkingDayIndicator. Quantity is a quantity belonging to the EmployeeTimeItem that specifies additional, quantitative (non time-specific) information about the documented working time, and may be based on GDT: Quantity. The Amount is a monetary amount belonging to an EmployeeTimeItem, and may be based on GDT: Amount. Description is the description of an EmployeeTimeItem. In some implementations, the languageCode may not be supported in this message. Description may be based on GDT: EmployeeTimeItemDescription. TaskTypeCode is the coded representation of the task type of a document item of an employee time, and may be based on GDT: EmployeeTimeItemTaskTypeCode. TaskLevelCode is the coded representation of the task of a document item of an employee time according to the valuation level, and may be based on GDT: EmployeeTimeItemTaskLevelCode. TaskComponentCode is the coded representation of the task of a document item of an employee time according to the evaluation, and may be based on GDT: EmployeeTimeItemTaskComponentCode.

The Item includes the ValuationTerms, ActivityAllocationAndCostAssignment, ServiceProvisionAndResourceConsumption, LogisticConfirmation, ExternalServiceAcknowledgement, and DifferentPayment, each in 1:c cardinality relationships. In some implementations, FullWorkingDayIndicator can be used instead of EmployeeTimeValidity or in addition to EmployeeTimeValidity. In both cases this can lead to a Duration of EmployeeTimeValidity which corresponds to the planned working time of the day. In some implementations, either EmployeeTimeValidity (and/or FullWorkingDayIndicator) or Quantity or Amount can be specified. In case that any of the entities ValuationTerms, ActivityAllocationAndCostAssignment, ServiceProvisionAndResourceConsumption, LogisticConfirmation, ExternalServiceAcknowledgement or DifferentPayment occur in the message at least one of the elements of the particular existing entities can be filled. The cardinality of the EmployeeTimeItem is 1:1. The entity Item exists to retain the flexibility for later functional enhancements and to guarantee a stable interface.

ValuationTerms are specifications for the evaluation of a document item. The elements located directly at the entity ValuationTerms can include EmployeeTimeValuationTerms. EmployeeTimeValuationTerms is a description of conditions for employee time evaluation, and may be based on GDT: EmployeeTimeValuationTerms. ActivityAllocationAndCostAssignment includes information relevant for further processing by controlling.

The elements located directly at the entity ActivityAllocationAndCostAssignment can include: SendingCostCentreID, ResourceClassID, SendingCostingActivityID, SendingFundID, SendingFundsManagementFunctionalAreaID, SendingGrantID, WorkBreakDownStructureElementID, ReceivingSalesOrderID, ReceivingSalesOrderItemID, ReceivingCostingActivityID, ReceivingFundID, ReceivingFundsManagementFunctionalAreaID, ReceivingGrantID, ControllingKeyFigureCode, and Price. A SendingCostCentreID is an identifier for a cost centre. The SendingCostCentreID refers to the cost center which provides a service, and may be based on GDT: CostCentreID. A ResourceClassID is an identifier for a resource class which is involved in providing a service. A resource class classifies resources of a particular nature (e.g. development resources, consulting resources). ResourceClassID may be based on GDT: ResourceClassID. A SendingCostingActivityID is an identifier for a costing activity which is performed in order to provide a service. Costing activities are the basis for activity based costing. A costing activity describes a structured set of work steps that consume resources and convert them into outputs (products and services). SendingCostingActivityID may be based on GDT: CostingActivityID. A SendingFundID is a unique identifier for a fund which performed a task. A fund is an internal identification of the source of monies and can be categorized according to source and use such as governmental, enterprise, fiduciary. It is budgeted and controlled for all expenditures and revenues in order to stay in budget. Fund does not represent an organizational unit. SendingFundID may be based on GDT: FundsManagementFundID. A SendingFundsManagementFunctionalAreaID is a (possibly) unique identifier for a functional area in Funds Management.

A functional area represents a goal of an organization in Funds Management. SendingFundsManagementFunctionalAreaID may be based on GDT: FundsManagementFunctionalAreaID. A SendingGrantID is a (possibly) unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. SendingGrantID may be based on GDT: GrantID. A WorkBreakDownStructureElementID is a (possibly) unique identifier for an element in a project. An element in a project is a component of the project of a specific type, for example, a task or a role. WorkBreakDownStructureElementID may be based on GDT: ProjectElementID. A ReceivingSalesOrderID is a (possibly) unique identifier for a sales order for which a service is provided.

A Sales order is a customer request to a company for delivery of goods or services at a certain time. ReceivingSalesOrderID may be based on GDT: BusinessTransactionDocumentID. ReceivingSalesOrderItemID is a (possibly) unique identifier for an item number in a receiver sales order. ReceivingSalesOrderItemID may be based on GDT: BusinessTransactionDocumentItemID A ReceivingCostingActivityID is an identifier for a costing activity for which resources are provided. Costing activities are the basis for activity based costing. A costing activity describes a structured set of work steps that consume resources and convert them into outputs (products and services). ReceivingCostingActivityID may be based on GDT: CostingActivityID. A ReceivingFundID is a (possibly) unique identifier for a fund for which a task is performed. A fund is an internal identification of the source of monies and can be categorized according to source and use such as governmental, enterprise, or fiduciary. It is budgeted and controlled for all expenditures and revenues in order to stay in budget. Fund does not represent an organizational unit. ReceivingFundID may be based on GDT: FundsManagementFundID. A ReceivingFundsManagementFunctionalAreaID is a (possibly) unique identifier for a Functional area in Funds Management. A Functional area represents a goal of an organization in Funds Management. ReceivingFundsManagementFunctionalAreaID may be based on GDT: FundsManagementFunctionalAreaID. A ReceivingGrantID is a (possibly) unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. ReceivingGrantID may be based on GDT: GrantID. A ControllingKeyFigureCode is a coded representation of a controlling key figure. Controlling key figures represent activities or statistics in a cost centre, profit centre, or order. They are measured in units of time or quantity. They are used in controlling as a basis for allocations or statistical evaluations.

ControllingKeyFigureCode may be based on GDT: ControllingKeyFigureCode. A Price is the exchange value, expressed in a monetary unit, of a product or a service in relation to a basic amount. In the viewpoint of this message it determines a deviating evaluation of a resource class. Price may be based on GDT: Price.

A ServiceProvisionAndResourceConsumption is document item information for the process component Accounting Processing about the confirmation of a service provided or a personnel resource consumption. The elements located directly at the entity ServiceProvisionAndResourceConsumption can include ReceivingCostCentreID. A ReceivingCostCentreID is an identifier for a cost centre. The ReceivingCostCentreID refers to the cost center which consumes a service, and may be based on GDT: CostCentreID.

LogisticConfirmation includes information relevant for further processing in a logistics area. The elements located directly at the entity LogisticConfirmation are: ResourceID, LogisticsAreaID, OrderID, OrderOperationID, OrderOperationActivityID, NetworkID, NetworkOperationID, NetworkOperationActivityID, WarrantyGoodwillCode, CapacityCategoryCode, CapacitySplitID, WorkForecastQuantity, ForecastEndDate, and ConfirmationStatusCode. A ResourceID is a (possibly) unique identifier for a resource. A resource is an entity that offers capacity and services and can be used in planning or logistics process within a logistics facility. ResourceID may be based on GDT: ResourceID. A LogisticsAreaID is a (possibly) unique identifier for a LogisticsArea. A LogisticsArea is an area with physical and operational features of locations in a company, used for storage and production, and groups these locations based on their logistical functions. LogisticsAreaID may be based on GDT: LogisticsAreaID. OrderID is a (possibly) unique identifier for an order. An Order is a description of a task or measure for a resource and supports action-oriented planning as well as monitoring and allocation of costs. OrderID may be based on GDT: BusinessTransactionDocumentID. An OrderOperationID is a (possibly) unique identifier of an operation. An operation is a self-contained section of a process in a logistics process description that is always completely executed on one or more resources that represent the main resources. OrderOperationID may be based on (GDT: OperationID).

An OrderOperationActivityID is a (possibly) unique identifier of an activity in an operation. An activity is a processing or transportation section of a process description in logistics on a lower-level than the operation. OrderOperationActivityID may be based on GDT: OperationActivityID. The NetworkID is a (possibly) unique Identifier of a network, and may be based on GDT: BusinessTransactionDocumentID. A NetworkOperationID is a (possibly) unique identifier of an operation. An operation is a self-contained section of a process in a logistics process description that is always completely executed on one or more resources that represent the main resources. NetworkOperationID may be based on GDT: OperationID. A NetworkOperationActivityID is the (possibly) unique identifier of an activity in an operation. An activity is a process description on a lower-level than the operation. NetworkOperationActivityID may be based on GDT: OperationActivityID. The WarrantyGoodwillCode is the coded representation stating to what extent something is seen as a case for warranty or goodwill, and may be based on GDT: WarrantyGoodwillCode. CapacityCategoryCode is a coded representation of the type of capacity that is offered by a resource. CapacityCategoryCode may be based on GDT: CapacityCategoryCode. A CapacitySplitID is the identifier that represents the assignment of a capacity to an Operation and may be unique in the context of the Operation. CapacitySplitID may be based on GDT: CapacitySplitID. WorkForecastQuantity may be based on GDT: WorkForecastQuantity. ForecastEndDate is the date on which the execution of the forecast will end, and may be based on GDT: Date. A ConfirmationStatusCode is the coded representation of a confirmation status that is intended to be activated, and may be based on GDT: ConfirmationStatusCode.

An ExternalServiceAcknowledgement is document item information for the process component Goods and Service Acknowledgement about the confirmation of a service provided by an external employee. The elements located directly at the entity ExternalServiceAcknowledgement can include; PurchaseOrderID, PurchaseOrderItemID, and ServiceProductID. A PurchaseOrderID is the unique identifier for a Purchase Order, and may be based on GDT: BusinessTransactionDocumentID. A PurchaseOrderItemID is the (possibly) unique identifier for a item within a Purchase Order, and may be based on GDT: BusinessTransactionDocumentItemID A ServiceProductID is a (possibly) unique identifier for a service product, and may be based on GDT: ProductID. A DifferentPayment is document item information for the process component Payroll about a different payment. An example of a different payment is a special hourly rate for overtime worked. The elements located directly at the entity DifferentPayment can include PositionID and ValuationBasisAmount. PositionID is the (possibly) unique identifier for a position. A position is an organizational element within the organizational plan of an enterprise. It combines tasks, competencies and responsibilities permanently that can be taken care of by one or more suitable employees. Position may be based on GDT: PositionID. ValuationBasisAmount is the amount which effects a different payment for the recorded working time in the evaluation, and may be based on GDT: Amount. A Log package groups the error messages used for user interaction, and includes the Log entity.

Message Data Type EmployeeTimeSheetByEmployeeQueryMessage

The message data type EmployeeTimeSheetByEmployeeQueryMessage includes the Selection included in the business document and the business information that is relevant for sending a business document in a message. EmployeeTimeSheetByEmployeeQueryMessage includes the MessageHeader package and the Selection package. A MessageHeader package groups the business information that is relevant for sending a business document in a message and includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet. The Selection package includes the entity EmployeeTimeSheetSelectionByEmployee in a 1:1 cardinality relationship. The EmployeeTimeSheetSelectionByEmployee specifies an Employee for whom to select EmployeeTimeSheet. The selection criteria elements located directly at the EmployeeTimeSheetSelectionByEmployee can include: Employee_ID, WorkAgreement_ID, and DatePeriod. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. The DatePeriod specifies the date period for which the EmployeeTimeSheet is used, and may be based on GDT: CLOSED_DatePeriod. In some implementations, Employee_ID or WorkAgreement_ID can be filled. If only Employee_ID is filled the EmployeeTimeSheet for all WorkAgreements related to this Employee_ID can be returned. In some implementations, in the case that DatePeriod is not specified the current date is used to determine the result of the selection.

Message Data Type EmployeeTimeSheetByEmployeeResponseMessage

The message data type EmployeeTimeSheetByEmployeeResponseMessage includes the EmployeeTimeSheet included in the business document and the business information that is relevant for sending a business document in a message. EmployeeTimeSheetByEmployeeResponseMessage includes the MessageHeader package, the EmployeeTimeSheet package, and the Log package.

A MessageHeader package groups the business information that is relevant for sending a business document in a message. The MessageHeader package includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the EmployeeTimeSheet in a 1:1 cardinality relationship. An EmployeeTimeSheet is the collection of EmployeeTimes of a specific Employee with relation to an assigned WorkAgreement. The EmployeeTimeSheet includes the EmployeeTime package. The EmployeeTime package includes the EmployeeTime entity in a 1:cn cardinality relationship. An EmployeeTime is a document of the working times of an internal or external employee. In addition to planned and actual working times and activities carried out for the company, it also documents absence times, break times, and availability times. In the viewpoint of this message it includes actual working times.

The EmployeeTime includes the following elements: ID, ExternalKey, WorkAgreementID, Note, Status, LifeCycleStatusCode, ApprovalStatusCode, ApproverUserAccountID, ApprovalDate, and RejectionReasonCode. ID is the unique identifier for an EmployeeTime. ID is assigned by the provider of this message, and may be based on GDT: BusinessTransactionDocumentID. ExternalKey is a key which can be assigned to an EmployeeTime directly by the consumer of this message. The consumer of the message is responsible for keeping the ExternalKey unique. ExternalKey may be based on Intermediate GDT: EmployeeTimeExternalKey. The ExternalKey includes ID and OriginTypeCode. ID is the external identifier of the EmployeeTime. ID can be assigned to an EmployeeTime directly by the consumer, and may be based on GDT: BusinessTransactionDocumentID. OriginTypeCode is the coded representation of the origin type of an EmployeeTime. The origin type describes, for example, the application that is using this message. OriginTypeCode may be based on GDT: EmployeeTimeOriginTypeCode. WorkAgreementID is a (possibly) unique identifier for the work agreement the EmployeeTime belongs to, and may be based on GDT: WorkAgreementID. Note is a comment about an EmployeeTime, and may be based on GDT: Note. Status includes information about the life cycle of an EmployeeTime, and may be based on Intermediate GDT: EmployeeTimeStatus. The Status includes LifeCycleStatusCode and ApprovalStatusCode. LifeCycleStatusCode is a coded representation of the life cycle of an Employee Time. The life cycle of an EmployeeTime expresses the progress of the EmployeeTime. LifeCycleStatusCode may be based on GDT: EmployeeTimeLifeCycleStatusCode. ApprovalStatusCode is a coded representation of an approval status, and may be based on GDT: EmployeeTimeApprovalStatusCode. ApproverUserAccountID is a (possibly) unique identifier for a system's user account, is the user account of the user who has approved the EmployeeTime, and may be based on GDT: UserAccountID. ApprovalDate is the date when an EmployeeTime was approved, and may be based on GDT: Date. RejectionReasonCode is a coded representation of a reason for rejection of a working time, and may be based on GDT: EmployeeTimeRejectionReasonCode.

The EmployeeTime includes the Item package. The Item package includes the Item entity in a 1:n cardinality relationship. An Item of an EmployeeTime is a document item concerning an employee's planned or recorded working time or other time (such as absence, break, availability). It includes information about the type and the start and end or duration of the time; it can reference a working time model. In the viewpoint of this message it is a document item about recorded working time without a reference to a working time model. The elements located at the Item entity can include: ID, SystemAdministrativeData, CategoryCode, TypeCode, EmployeeTimeValidity, FullWorkingDayIndicator, Quantity, Amount, Description, TaskTypeCode, TaskLevelCode, and TaskComponentCode. ID is the (possibly) unique identifier for an EmployeeTimeItem, is assigned by the provider of this message, and may be based on GDT: EmployeeTimeItemID SystemAdministrativeData is administrative data that is stored in a system. This data includes system users and change dates/times. SystemAdministrativeData may be based on GDT: SystemAdministrativeData. Code is the coded representation of a classification of the times and activities of a document item of an employee, and may be based on GDT: EmployeeTimeItemCategoryCode. TypeCode is the coded representation of the type of a document item of an employee time according to its company, collective agreement or statutory meaning, and may be based on GDT: EmployeeTimeItemTypeCode. EmployeeTimeValidity is a structure describing the date and time and duration of day or time intervals in which the EmployeeTimeItem is valid. The elements DatePeriod and Duration are used in this message. EmployeeTimeValidity may be based on GDT: EmployeeTimeValidity. A FullWorkingDayIndicator indicates whether the duration of an EmployeeTimeItem corresponds to the number of hours of an employee's normal working time or not, and may be based on GDT: FullWorkingDayIndicator. Quantity is a quantity belonging to the EmployeeTimeItem that specifies additional, quantitative (non time-specific) information about the documented working time, and may be based on GDT: Quantity. The Amount is a monetary amount belonging to an EmployeeTimeItem, and may be based on GDT: Amount. Description is the description of an EmployeeTimeItem. The languageCode may not be supported in this message. Description may be based on GDT: EmployeeTimeItemDescription. TaskTypeCode is the coded representation of the task type of a document item of an employee time, and may be based on GDT: EmployeeTimeItemTaskTypeCode. TaskLevelCode is the coded representation of the task of a document item of an employee time according to the valuation level, and may be based on GDT: EmployeeTimeItemTaskLevelCode. TaskComponentCode is the coded representation of the task of a document item of an employee time according to the evaluation, and may be based on GDT: EmployeeTimeItemTaskComponentCode.

The Item includes the ValuationTerms, ActivityAllocationAndCostAssignment, ServiceProvisionAndResourceConsumption, LogisticConfirmation, ExternalServiceAcknowledgement, and DifferentPayment entities, each in a 1:c cardinality relationship. In some implementations, FullWorkingDayIndicator can be used instead of EmployeeTimeValidity or in addition to EmployeeTimeValidity. In both cases this will lead to a Duration of EmployeeTimeValidity which corresponds to the planned working time of the day. In some implementations, either EmployeeTimeValidity (and/or FullWorkingDayIndicator) or Quantity or Amount can be specified. In some implementations, in the case that any of the entities ValuationTerms, ActivityAllocationAndCostAssignment, ServiceProvisionAndResourceConsumption, LogisticConfirmation, ExternalServiceAcknowledgement or DifferentPayment occur in the message at least one of the elements of the particular existing entities can be filled. The cardinality of the EmployeeTimeItem is 1:1. The entity Item exists to retain the flexibility for later functional enhancements and to guarantee a stable interface.

ValuationTerms are specifications for the evaluation of a document item. The elements located directly at the entity ValuationTerms can include EmployeeTimeValuationTerms. EmployeeTimeValuationTerms is a description of conditions for employee time evaluation, and may be based on GDT: EmployeeTimeValuationTerms. ActivityAllocationAndCostAssignment includes information relevant for further processing by controlling.

The elements located directly at the entity ActivityAllocationAndCostAssignment can include: SendingCostCentreID, ResourceClassID, SendingCostingActivityID, SendingFundID, SendingFundsManagementFunctionalAreaID, SendingGrantID, WorkBreakDownStructureElementID, ReceivingSalesOrderID, ReceivingSalesOrderItemID, ReceivingCostingActivityID, ReceivingFundID, ReceivingFundsManagementFunctionalAreaID, ReceivingGrantID, ControllingKeyFigureCode, and Price.

A SendingCostCentreID is an identifier for a cost centre. The SendingCostCentreID refers to the cost center which provides a service, and may be based on GDT: CostCentreID. A ResourceClassID is an identifier for a resource class which is involved in providing a service. A resource class classifies resources of a particular nature (e.g. development resources, consulting resources). ResourceID may be based on GDT: ResourceClassID. A SendingCostingActivityID is an identifier for a costing activity which is performed in order to provide a service. Costing activities are the basis for activity based costing. A costing activity describes a structured set of work steps that consume resources and convert them into outputs (products and services). SendingCostingActivityID may be based on GDT: CostingActivityID. A SendingFundID is a (possibly) unique identifier for a fund which performed a task. A fund is an internal identification of the source of monies and can be categorized according to source and use such as governmental, enterprise, or fiduciary. It is budgeted and controlled for all expenditures and revenues in order to stay in budget. Fund does not represent an organizational unit. SendingFundID may be based on GDT: FundsManagementFundID. A SendingFundsManagementFunctionalAreaID is a (possibly) unique identifier for a functional area in Funds Management. A functional area represents a goal of an organization in Funds Management. SendingFundsManagementFunctionalAreaID may be based on GDT: FundsManagementFunctionalAreaID. A SendingGrantID is a (possibly) unique identifier for a grant. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. SendingGrantID may be based on GDT: GrantID. A WorkBreakDownStructureElementID is a (possibly) unique identifier for an element in a project. An element in a project is a component of the project of a specific type, for example, a task or a role. WorkBreakDownStructureElementID may be based on GDT: ProjectElementID. A ReceivingSalesOrderID is a (possibly) unique identifier for a sales order for which a service is provided.

A Sales order is a customer request to a company for delivery of goods or services at a certain time. ReceivingSalesOrderID may be based on GDT: BusinessTransactionDocumentID. ReceivingSalesOrderItemID is a (possibly) unique identifier for an item number in a receiver sales order, and may be based on GDT: BusinessTransactionDocumentItemID A ReceivingCostingActivityID is an identifier for a costing activity for which resources are provided. Costing activities are the basis for activity based costing. A costing activity describes a structured set of work steps that consume resources and convert them into outputs (products and services). ReceivingCostingActivityID may be based on GDT: CostingActivityID. A ReceivingFundID is a (possibly) unique identifier for a fund for which a task is performed. A fund is an internal identification of the source of monies and can be categorized according to source and use such as governmental, enterprise, or fiduciary. It is budgeted and controlled for all expenditures and revenues in order to stay in budget. Fund does not represent an organizational unit. ReceivingFundID may be based on GDT: FundsManagementFundID. A ReceivingFundsManagementFunctionalAreaID is a (possibly) unique identifier for a Functional area in Funds Management. A Functional area represents a goal of an organization in Funds Management.

ReceivingFundsManagementFunctionalAreaID may be based on GDT: FundsManagementFunctionalAreaID. A ReceivingGrantID is a unique identifier for a grant, and may be based on GDT: GrantID. A ControllingKeyFigureCode is a coded representation of a controlling key figure. Controlling key figures represent activities or statistics in a cost centre, profit centre, or order. They are measured in units of time or quantity. They are used in controlling as a basis for allocations or statistical evaluations. ControllingKeyFigureCode may be based on GDT: ControllingKeyFigureCode. A Price is the exchange value, expressed in a monetary unit, of a product or a service in relation to a basic amount. In the viewpoint of this message it determines a deviating evaluation of a resource class, and may be based on GDT: Price.

A ServiceProvisionAndResourceConsumption is document item information for the process component Accounting Processing about the confirmation of a service provided or a personnel resource consumption. The elements located directly at the entity ServiceProvisionAndResourceConsumption can include ReceivingCostCentreID. A ReceivingCostCentreID is an identifier for a cost centre. The ReceivingCostCentreID refers to the cost center which consumes a service, and may be based on GDT: CostCentreID.

LogisticConfirmation includes information relevant for further processing in a logistics area. The elements located directly at the entity LogisticConfirmation can include: ResourceID, LogisticsAreaID, OrderID, OrderOperationID, OrderOperationActivityID, NetworkID, NetworkOperationID, NetworkOperationActivityID, WarrantyGoodwillCode, CapacityCategoryCode, CapacitySplitID, WorkForecastQuantity, ForecastEndDate, and ConfirmationStatusCode. A ResourceID is a (possibly) unique identifier for a resource. A resource is an entity that offers capacity and services and can be used in planning or logistics process within a logistics facility. ResourceID may be based on GDT: ResourceID. A LogisticsAreaID is a (possibly) unique identifier for a LogisticsArea. A LogisticsArea is an area with physical and operational features of locations in a company, required for storage and production, and groups these locations based on their logistical functions. LogisticsAreaID may be based on GDT: LogisticsAreaID. OrderID is a (possibly) unique identifier for an order. An Order is a description of a task or measure for a resource and supports action-oriented planning as well as monitoring and allocation of costs. OrderID may be based on GDT: BusinessTransactionDocumentID. An OrderOperationID is a (possibly) unique identifier of an operation. An operation is a self-contained section of a process in a logistics process description that is always completely executed on one or more resources that represent the main resources. OrderOperationID may be based on GDT: OperationID. An OrderOperationActivityID is a (possibly) unique identifier of an activity in an operation. An activity is a processing or transportation section of a process description in logistics on a lower-level than the operation. OrderOperationActivityID may be based on GDT: OperationActivityID. The NetworkID is a (possibly) unique Identifier of a network, and may be based on GDT: BusinessTransactionDocumentID. A NetworkOperationID is a (possibly) unique identifier of an operation. An operation is a self-contained section of a process in a logistics process description that is always completely executed on one or more resources that represent the main resources. NetworkOperationID may be based on GDT: OperationID. A NetworkOperationActivityID is the (possibly) unique identifier of an activity in an operation. An activity is a process description on a lower-level than the operation. NetworkOperationActivityID may be based on GDT: OperationActivityID. The WarrantyGoodwillCode is the coded representation stating to what extent something is seen as a case for warranty or goodwill, and may be based on GDT: WarrantyGoodwillCode. CapacityCategoryCode is a coded representation of the type of capacity that is offered by a resource, and may be based on GDT: CapacityCategoryCode. A CapacitySplitID is the identifier that represents the assignment of a capacity to an Operation and is unique in the context of the Operation, and may be based on GDT: CapacitySplitID. WorkForecastQuantity may be based on GDT: WorkForecastQuantity. ForecastEndDate is the date on which the execution of the forecast will end, and may be based on GDT: Date. A ConfirmationStatusCode is the coded representation of a confirmation status that is intended to be activated, and may be based on GDT: ConfirmationStatusCode.

An ExternalServiceAcknowledgement is document item information for the process component Goods and Service Acknowledgement about the confirmation of a service provided by an external employee. The elements located directly at the entity ExternalServiceAcknowledgement can include: PurchaseOrderID, PurchaseOrderItemID, and ServiceProductID. A PurchaseOrderID is the (possibly) unique identifier for a Purchase Order, and may be based on GDT: BusinessTransactionDocumentID. A PurchaseOrderItemID is the (possibly) unique identifier for a item within a Purchase Order, and may be based on GDT: BusinessTransactionDocumentItemID A ServiceProductID is a (possibly) unique identifier for a service product, and may be based on GDT: ProductID. A DifferentPayment is document item information for the process component Payroll about a different payment. An example of a different payment is a special hourly rate for overtime worked. The elements located directly at the entity DifferentPayment can include PositionID and ValuationBasisAmount. PositionID is the (possibly) unique identifier for a position. A position is an organizational element within the organizational plan of an enterprise. It combines tasks, competencies and responsibilities permanently that can be taken care of by one or more suitable employees. PositionID may be based on GDT: PositionID. ValuationBasisAmount is the amount which effects a different payment for the recorded working time in the evaluation, and may be based on GDT: Amount. A Log package groups the error messages used for user interaction and includes the Log entity.

Message Data Type EmployeeTimeSheetAllowedReceivingCostCentreByEmployeeQueryMessage The message data type EmployeeTimeSheetAllowedReceivingCostCentreByEmployeeQueryMessage includes the Selection included in the business document and the business information that is relevant for sending a business document in a message. EmployeeTimeSheetAllowedReceivingCostCentreByEmployeeQueryMessage includes the MessageHeader package and Selection package. A MessageHeader package groups the business information that is relevant for sending a business document in a message and includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the EmployeeTimeSheetAllowedReceivingCostCentreSelectionByEmployee entity in a 1:1 cardinality relationship.

The EmployeeTimeSheetAllowedReceivingCostCentreSelectionByEmployee specifies an Employee for whom to select AllowedReceivingCostCentres. The selection criteria elements located directly at the EmployeeTimeSheetAllowedReceivingCostCentreSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID are filled. If only Employee_ID is filled the AllowedReceivingCostCentres for all WorkAgreements related to this Employee_ID can be returned.

Message Data Type EmployeeTimeSheetAllowedReceivingCostCentreByEmployeeResponseMessage The message data type EmployeeTimeSheetAllowedReceivingCostCentreByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the MessageHeader entity. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the entity EmployeeTimeSheetAllowedReceivingCostCentre in a 1:cn cardinality relationship. An EmployeeTimeSheetAllowedReceivingCostCentre groups the information about a ReceivingCostCentre which can be used in the EmployeeTimeSheet for a specific Employee with relation to an assigned WorkAgreement. The elements located at the EmployeeTimeSheetReceivingCostCentre can include: WorkAgreementID, ID, Description, ValidityPeriod, and Note. WorkAgreementID is a (possibly) unique identifier for the work agreement the EmployeeTime belongs to, and may be based on GDT: WorkAgreementID. An ID is an identifier for a cost centre. The ID refers to the cost center which consumes a service, and may be based on GDT: CostCentreID. Description is the description of a ReceivingCostCentre, and may be based on GDT: CostCentreDescription. ValidityPeriod specifies the validity period of a ReceivingCostCentre, and may be based on GDT: CLOSED_DatePeriod. Note is a comment about a ReceivingCostCentre, and may be based on GDT: Note. A Log package groups the error messages used for user interaction and includes the entity Log.

Message Data Type EmployeeTimeSheetAllowedNetworkByEmployeeQueryMessage

The message data type EmployeeTimeSheetAllowedNetworkByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty, and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedNetworkSelectionByEmployee in a 1:1 cardinality relationship.

The EmployeeTimeSheetAllowedNetworkSelectionByEmployee specifies an Employee for whom to select AllowedNetworks. The selection criteria elements located directly at the EmployeeTimeSheetAllowedNetworkSelectionByEmployee can include: Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedNetworks for all WorkAgreements related to this Employee_ID can be returned.

Message Data Type EmployeeTimeSheetAllowedNetworkByEmployeeResponseMessage

The message data type EmployeeTimeSheetAllowedNetworkByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the entity EmployeeTimeSheetAllowedNetwork in a 1:cn cardinality relationship. An EmployeeTimeSheetAllowedNetwork groups the information about a Network which can be used in the EmployeeTimeSheet for a specific Employee with relation to an assigned WorkAgreement. The elements located directly at the EmployeeTimeSheetAllowedNetwork can include WorkAgreementID, ID, Description, OperationID, OperationDescription, OperationActivityID, and Note. WorkAgreementID is a (possibly) unique identifier for the work agreement the EmployeeTime belongs to, and may be based on GDT: WorkAgreementID. The ID is a (possibly) unique Identifier of a network, and may be based on GDT: BusinessTransactionDocumentID. Description is the description of a Network, and may be based on GDT: ProjectNetworkDescription. An OperationID is a (possibly) unique identifier of an operation.

An operation is a self-contained section of a process in a logistics process description that is always completely executed on one or more resources that represent the main resources. OperationID may be based on GDT: OperationID. OperationDescription is the description of a NetworkOperation, and may be based on GDT: OperationDescription. An OperationActivityID is the (possibly) unique identifier of an activity in an operation. An activity is a process description on a lower-level than the operation. OperationActivityID may be based on GDT: OperationActivityID. Note is a comment about a Network, and may be based on GDT: NetworkAdditionalDescription. A Log package groups the error messages used for user interaction and includes the entity Log.

Message Data Type EmployeeTimeSheetAllowedOrderByEmployeeQueryMessage

The message data type EmployeeTimeSheetAllowedOrderByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedOrderSelectionByEmployee in a 1:1 cardinality relationship.

The EmployeeTimeSheetAllowedOrderSelectionByEmployee specifies an Employee for whom to select AllowedOrders. The selection criteria elements located directly at the EmployeeTimeSheetAllowedOrderSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedOrders for all WorkAgreements related to this Employee_ID can be returned.

Message Data Type EmployeeTimeSheetAllowedOrderByEmployeeResponseMessage

The message data type EmployeeTimeSheetAllowedOrderByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the entity EmployeeTimeSheetAllowedOrder in a 1:cn cardinality relationship. An EmployeeTimeSheetAllowedOrder groups the information about an Order which can be used in the EmployeeTimeSheet for a specific Employee with relation to an assigned WorkAgreement. The elements located directly at the EmployeeTimeSheetAllowedOrder are: WorkAgreementID, ID, Description, OperationID, OperationDescription, OperationActivityID, and Note.

WorkAgreementID is a (possibly) unique identifier for the work agreement the EmployeeTime belongs to, and may be based on GDT: WorkAgreementID. ID is a (possibly) unique identifier for an order. An Order is a description of a task or measure for a resource and supports action-oriented planning as well as monitoring and allocation of costs. ID may be based on GDT: BusinessTransactionDocumentID. Description is the description of an Order, and may be based on GDT: OrderDescription. An OperationID is a (possibly) unique identifier of an operation. An operation is a self-contained section of a process in a logistics process description that is always completely executed on one or more resources that represent the main resources. OperationID may be based on GDT: OperationID. OperationDescription is the description of an OrderOperation, and may be based on GDT: OperationDescription. An OperationActivityID is a (possibly) unique identifier of an activity in an operation. An activity is a processing or transportation section of a process description in logistics on a lower-level than the operation. OperationActivityID may be based on GDT: OperationActivityID. Note is comment about an Order, and may be based on GDT: Note. A Log package groups the error messages used for user interaction and includes the entity Log.

Message Data Type EmployeeTimeSheetAllowedReceivingSalesOrderByEmployeeQueryMessage The message data type EmployeeTimeSheetAllowedReceivingSalesOrderByEmployeeQueryMessage includes the Selection included in the business document, the business information that is relevant for sending a business document in a message, the MessageHeader package and the Selection package.

A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedReceivingSalesOrderSelectionByEmployee in a 1:1 cardinality relationship.

The EmployeeTimeSheetAllowedReceivingSalesOrderSelectionByEmployee specifies an Employee for whom to select AllowedReceivingSalesOrders. The selection criteria elements located directly at the EmployeeTimeSheetAllowedReceivingSalesOrderSelectionByEmployee can include Employee_ID and WorkAgreementID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedReceivingSalesOrders for all WorkAgreements related to this Employee_ID can be returned.

Message Data Type EmployeeTimeSheetAllowedReceivingSalesOrderByEmployeeResponseMessage The message data type EmployeeTimeSheetAllowedReceivingSalesOrderByEmployeeResponseMessage includes the EmployeeTimeSheet included in the business document, the business information that is relevant for sending a business document in a message, the MessageHeader package, EmployeeTimeSheet package and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information. It includes the entity EmployeeTimeSheetAllowedReceivingSalesOrder in a 1:cn cardinality relationship. An EmployeeTimeSheetAllowedReceivingSalesOrder groups the information about a ReceivingSalesOrder which can be used in the EmployeeTimeSheet for a specific Employee with relation to an assigned WorkAgreement. The elements located directly at the EmployeeTimeSheetAllowedReceivingSalesOrder can include WorkAgreementID, ID, ItemID, ItemDescription, and Note. WorkAgreementID is a (possibly) unique identifier for the work agreement the EmployeeTime belongs to, and may be based on GDT: WorkAgreementID. An ID is a (possibly) unique identifier for a sales order for which a service is provided. A Sales order is a customer request to a company for delivery of goods or services at a certain time. ID may be based on GDT: BusinessTransactionDocumentID. ItemID is a (possibly) unique identifier for an item number in a receiver sales order, and may be based on GDT: BusinessTransactionDocumentItemID ItemDescription is the description of a ReceivingSalesOrderItem, and may be based on GDT: SalesOrderItemDescription. Note is a comment about a ReceivingSalesOrderItem, and may be based on GDT: Note. A Log package groups the error messages used for user interaction and includes the entity Log.

Message Data Type EmployeeTimeSheetAllowedWorkBreakDownStructureElementByEmployeeQueryMessage The message data type EmployeeTimeSheetAllowedWorkBreakDownStructureElementByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedWorkBreakDownStructureElementSelectionByEmployee in a 1:1 cardinality relationship.

The EmployeeTimeSheetAllowedWorkBreakDownStructureElementSelectionByEmployee specifies an Employee for whom to select AllowedWorkBreakDownStructureElements. The selection criteria elements located directly at the EmployeeTimeSheetAllowedWorkBreakDownStructureElementSelectionByEmployee can include Employee_ID and WorkAgreementID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID may be filled. If only Employee_ID is filled the AllowedWorkBreakDownStructureElements for all WorkAgreements related to this Employee_ID can be returned.

Message Data Type EmployeeTimeSheetAllowedWorkBreakDownStructureElementByEmployeeResponseMessage The message data type EmployeeTimeSheetAllowedWorkBreakDownStructureElementByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information. It includes the entity EmployeeTimeSheetAllowedWorkBreakDownStructureElement in a 1:cn cardinality relationship.

An EmployeeTimeSheetAllowedWorkBreakDownStructureElement groups the information about a WorkBreakDownStructureElement which can be used in the EmployeeTimeSheet for a specific Employee with relation to an assigned WorkAgreement. The elements located directly at the EmployeeTimeSheetAllowedWorkBreakDownStructureElement can include WorkAgreementID, ID, Description, and Note. WorkAgreementID is a (possibly) unique identifier for the work agreement the EmployeeTime belongs to, and may be based on GDT: WorkAgreementID. An ID is a (possibly) unique identifier for an element in a project. An element in a project is a component of the project of a specific type, for example, a task or a role. ID may be based on GDT: ProjectElementID. Description is the description of a WorkBreakDownStructureElement, and may be based on GDT: WorkBreakDownStructureElementDescription. Note is a comment about a WorkBreakDownStructureElement, and may be based on GDT: Note. A Log package groups the error messages used for user interaction and includes the entity Log.

Message Data Type EmployeeTimeSheetAllowedMeasureUnitByEmployeeQueryMessage

The message data type EmployeeTimeSheetAllowedMeasureUnitByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedMeasureUnitSelectionByEmployee in a 1:1 cardinality relationship.

The EmployeeTimeSheetAllowedMeasureUnitSelectionByEmployee specifies an Employee for whom to select AllowedMeasureUnits. The selection criteria elements located directly at the EmployeeTimeSheetAllowedMeasureUnitSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedMeasureUnits for all WorkAgreements related to this Employee_ID can be returned.

Message Data Type EmployeeTimeSheetAllowedMeasureUnitByEmployeeResponseMessage

The message data type EmployeeTimeSheetAllowedMeasureUnitByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the entity EmployeeTimeSheetAllowedMeasureUnit in a 1:cn cardinality relationship. An EmployeeTimeSheetAllowedMeasureUnit groups the information about a MeasureUnit which can be used in the EmployeeTimeSheet for a specific Employee with relation to an assigned WorkAgreement. The elements located directly at the EmployeeTimeSheetAllowedMeasureUnit can include: WorkAgreementID, Code, and Note. WorkAgreementID is a (possibly) unique identifier for the work agreement the EmployeeTime belongs to, and may be based on GDT: WorkAgreementID. Code is the coded representation of a non-monetary unit of measurement, and may be based on GDT: MeasureUnitCode. Note is a comment about a MeasureUnit, and may be based on GDT: Note. A Log package groups the error messages used for user interaction and includes the Log entity.

Message Data Type EmployeeTimeSheetAllowedEmployeeTimeItemTypeByEmployeeQueryMessage The message data type EmployeeTimeSheetAllowedEmployeeTimeItemTypeByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedEmployeeTimeItemTypeSelectionByEmployee in a 1:1 cardinality relationship.

The EmployeeTimeSheetAllowedEmployeeTimeItemTypeSelectionByEmployee specifies an Employee for whom to select AllowedEmployeeTimeItemTypes. The selection criteria elements located directly at the EmployeeTimeSheetAllowedEmployeeTimeItemTypeSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedEmployeeTimeItemTypeByEmployeeResponseMessage The message data type EmployeeTimeSheetAllowedEmployeeTimeItemTypeByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information. It includes the entity EmployeeTimeSheetAllowedEmployeeTimeItemType in a 1:cn cardinality relationship. An EmployeeTimeSheetAllowedEmployeeTimeItemType groups the information about a EmployeeTimeItemType which can be used in the EmployeeTimeSheet for a specific Employee with relation to an assigned WorkAgreement. The elements located directly at the EmployeeTimeSheetAllowedEmployeeTimeItemType can include WorkAgreementID, EmployeeTimeItemCategoryCode, EmployeeTimeItemTypeCode, ValidityPeriod, and Note. WorkAgreementID is a (possibly) unique identifier for the work agreement the EmployeeTime belongs to, and may be based on GDT: WorkAgreementID. EmployeeTimeItemCategoryCode is the coded representation of a classification of the times and activities of a document item of an employee, and may be based on GDT: EmployeeTimeItemCategoryCode. EmployeeTimeItemTypeCode is the coded representation of the type of a document item of an employee time according to its company, collective agreement or statutory meaning, and may be based on GDT: EmployeeTimeItemTypeCode. ValidityPeriod is the validity period of an EmployeeTimeItemTypeCode, and may be based on GDT: CLOSED_DatePeriod. Note is a comment about an EmployeeTimeItemType, and may be based on GDT: Note. A Log package groups the error messages used for user interaction and includes the entity Log.

Message Data Type EmployeeTimeSheetAllowedResourceClassByEmployeeQueryMessage

The message data type EmployeeTimeSheetAllowedResourceClassByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedResourceClassSelectionByEmployee in a 1:1 cardinality relationship. The EmployeeTimeSheetAllowedResourceClassSelectionByEmployee specifies an Employee for whom to select AllowedResourceClasses. The selection criteria elements located directly at the EmployeeTimeSheetAllowedResourceClassSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedResourceClassByEmployeeResponseMessage The message data type EmployeeTimeSheetAllowedResourceClassByEmployeeResponseMessage includes the EmployeeTimeSheet included in the business document, the business information that is relevant for sending a business document in a message, the MessageHeader package, the EmployeeTimeSheet package and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the entity EmployeeTimeSheetAllowedResourceClass in a 1:cn cardinality relationship.

An EmployeeTimeSheetAllowedResourceClass groups the information about a ResourceClass which can be used in the EmployeeTimeSheet for a specific Employee with relation to an assigned WorkAgreement. The elements located directly at the EmployeeTimeSheetAllowedResourceClass can include WorkAgreementID, ID, Description, MeasureUnitCode, and Note. WorkAgreementID is a (possibly) unique identifier for the work agreement the EmployeeTime belongs to, and may be based on GDT: WorkAgreementID. ID is an identifier for a resource class which is involved in providing a service.

A resource class classifies resources of a particular nature (e.g. development resources, consulting resources). ResourceClassID may be based on GDT: ResourceClassID. Description is the description of a ResourceClass, and may be based on GDT: ResourceClassDescription. MeasureUnitCode is the coded representation of a non-monetary unit of measurement which is allowed to be used for the ResourceClass, and may be based on GDT: MeasureUnitCode. Note is a comment about a ResourceClass, and may be based on GDT: Note. A Log package groups the error messages used for user interaction and includes the entity Log.

Message Data Type EmployeeTimeSheetAllowedPurchaseOrderByEmployeeQueryMessage

The message data type EmployeeTimeSheetAllowedPurchaseOrderByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedPurchaseOrderSelectionByEmployee in a 1:1 cardinality relationship.

The EmployeeTimeSheetAllowedPurchaseOrderSelectionByEmployee specifies an Employee for whom to select AllowedPurchaseOrders. The selection criteria elements located directly at the EmployeeTimeSheetAllowedPurchaseOrderSelectionByEmployee can include Employee_ID and WorkAgreementID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedPurchaseOrderByEmployeeResponseMessage The message data type EmployeeTimeSheetAllowedPurchaseOrderByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the entity EmployeeTimeSheetAllowedPurchaseOrder in a 1:cn cardinality relationship. An EmployeeTimeSheetAllowedPurchaseOrder groups the information about a PurchaseOrder which can be used in the EmployeeTimeSheet for a specific Employee with relation to an assigned WorkAgreement. The elements located directly at the EmployeeTimeSheetAllowedPurchaseOrder can include WorkAgreementID, ID, ItemID, and Note. WorkAgreementID is a (possibly) unique identifier for the work agreement the EmployeeTime belongs to, and may be based on GDT: WorkAgreementID. ID is the (possibly) unique identifier for a Purchase Order, and may be based on GDT: BusinessTransactionDocumentID. ItemID is the (possibly) unique identifier for a item within a Purchase Order, and may be based on GDT: BusinessTransactionDocumentItemID Note is a comment about a PurchaseOrder, and may be based on GDT: Note. A Log package groups the error messages used for user interaction and includes the entity Log.

Message Data Type EmployeeTimeSheetAllowedControllingKeyFigureByEmployeeQueryMessage The message data type EmployeeTimeSheetAllowedControllingKeyFigureByEmployeeQueryMessage includes the Selection included in the business document, the business information that is relevant for sending a business document in a message, the MessageHeader package, and the Selection package.

A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedControllingKeyFigureSelectionByEmployee in a 1:1 cardinality relationship. The EmployeeTimeSheetAllowedControllingKeyFigureSelectionByEmployee specifies an Employee for whom to select AllowedControllingKeyFigures. The selection criteria elements located directly at the EmployeeTimeSheetAllowedControllingKeyFigureSelectionByEmployee can include: Employee_ID and WorkAgreement_ID. Employee_ID is the identifier of the employee to whom the EmployeeTimeSheet belongs, and may be of type GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedControllingKeyFigureByEmployeeResponseMessage The message data type EmployeeTimeSheetAllowedControllingKeyFigureByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the entity EmployeeTimeSheetAllowedControllingKeyFigure in a 1:cn cardinality relationship. An EmployeeTimeSheetAllowedControllingKeyFigure groups the information about a ControllingKeyFigure which can be used in the EmployeeTimeSheet for a specific Employee with relation to an assigned WorkAgreement. The elements located directly at the EmployeeTimeSheetAllowedControllingKeyFigure can include: WorkAgreementID, Code, MeasureUnitCode, and Note. WorkAgreementID is a (possibly) unique identifier for the work agreement the EmployeeTime belongs to, and may be based on GDT: WorkAgreementID. A Code is a coded representation of a controlling key figure. Controlling key figures represent activities or statistics in a cost centre, profit centre, or order. They are measured in units of time or quantity. They are used in controlling as a basis for allocations or statistical evaluations. ControllingKeyFigureCode may be based on GDT: ControllingKeyFigureCode. MeasureUnitCode is the coded representation of a non-monetary unit of measurement which is allowed to be used for the ControllingKeyFigure, and may be based on GDT: MeasureUnitCode. Note is a comment about a ControllingKeyFigure, and may be based on GDT: Note. A Log package groups the error messages used for user interaction and includes the entity Log.

Message Data Type EmployeeTimeSheetAllowedServiceProductByEmployeeQueryMessage

The message data type EmployeeTimeSheetAllowedServiceProductByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedServiceProductSelectionByEmployee in a 1:1 cardinality relationship.

The EmployeeTimeSheetAllowedServiceProductSelectionByEmployee specifies an Employee for whom to select AllowedServiceProducts. The selection criteria elements located directly at the EmployeeTimeSheetAllowedServiceProductSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedServiceProductByEmployeeResponseMessage The message data type EmployeeTimeSheetAllowedServiceProductByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the entity EmployeeTimeSheetAllowedServiceProduct in a 1:cn cardinality relationship.

An EmployeeTimeSheetAllowedServiceProduct groups the information about a ServiceProduct which can be used in the EmployeeTimeSheet for a specific Employee with relation to an assigned WorkAgreement. The elements located directly at the EmployeeTimeSheetAllowedServiceProduct can include: WorkAgreementID, ID, Description, MeasureUnitCode, and Note. WorkAgreementID is a (possibly) unique identifier for the work agreement the EmployeeTime belongs to, and may be based on GDT: WorkAgreementID. ID is a (possibly) unique identifier for a service product, and may be based on GDT: ProductID. Description is the description of a ServiceProduct, and may be based on GDT: ProductDescription. MeasureUnitCode is the coded representation of a non-monetary unit of measurement which is allowed to be used for the ServiceProduct, and may be based on GDT: MeasureUnitCode. Note is a comment about a ServiceProduct, and may be based on GDT: Note. A Log package groups the error messages used for user interaction and includes the entity Log.

Message Data Type EmployeeTimeSheetAllowedWarrantyGoodwillTypeByEmployeeQueryMessage The message data type EmployeeTimeSheetAllowedWarrantyGoodwillTypeByEmployeeQueryMessage includes the Selection included in the business document, the business information that is relevant for sending a business document in a message, the MessageHeader package, and the Selection package.

A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedWarrantyGoodwillTypeSelectionByEmployee in a 1:1 cardinality relationship.

The EmployeeTimeSheetAllowedWarrantyGoodwillTypeSelectionByEmployee specifies an Employee for whom to select AllowedWarrantyGoodwillTypes. The selection criteria elements located directly at the EmployeeTimeSheetAllowedWarrantyGoodwillTypeSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID will be returned.

Message Data Type EmployeeTimeSheetAllowedWanantyGoodwillTypeByEmployeeResponseMessage The message data type EmployeeTimeSheetAllowedWanantyGoodwillTypeByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the entity EmployeeTimeSheetAllowedWarrantyGoodwillType in a 1:cn cardinality relationship. An EmployeeTimeSheetAllowedWarrantyGoodwillType groups the information about a WarrantyGoodwillType which can be used in the EmployeeTimeSheet for a specific Employee with relation to an assigned WorkAgreement. The elements located directly at the EmployeeTimeSheetAllowedWarrantyGoodwillType can include WorkAgreementID, WarrantyGoodwillCode, and Note. WorkAgreementID is a (possibly) unique identifier for the work agreement the EmployeeTime belongs to, and may be based on GDT: WorkAgreementID. The WarrantyGoodwillCode is the coded representation stating to what extent something is seen as a case for warranty or goodwill and may be based on GDT: WarrantyGoodwillCode. Note is a comment about a WarrantyGoodwillCode, and may be based on GDT: Note. A Log package groups the error messages used for user interaction and includes the entity Log.

Message Data Type EmployeeTimeSheetAllowedReceivingFundsManagementFunctionalAreaByEmployeeQueryMessage The message data type EmployeeTimeSheetAllowedReceivingFundsManagementFunctionalAreaByEmployeeQuery Message includes the Selection included in the business document, the business information that is relevant for sending a business document in a message, the MessageHeader package, and the Selection package.

A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The Selection Package collects all the selection criteria for EmployeeTimeSheet and includes the entity EmployeeTimeSheetAllowedReceivingFundsManagementFunctionalAreaSelectionByEmployee in a 1:1 cardinality relationship.

The EmployeeTimeSheetAllowedReceivingFundsManagementFunctionalAreaSelectionByEmployee specifies an Employee for whom to select AllowedReceivingFundsManagementFunctionalAreas. The selection criteria elements located directly at the EmployeeTimeSheetAllowedReceivingFundsManagementFunctionalAreaSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedReceivingFundsManagementFunctionalAreaByEmployeeResponseMessage The message data type EmployeeTimeSheetAllowedReceivingFundsManagementFunctionalAreaByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The Recipient- Party is of type GDT: BusinessDocumentMessageHeaderParty. The EmployeeTimeSheet package groups the EmployeeTimeSheet information and includes the entity EmployeeTimeSheetAllowedReceivingFundsManagementFunctionalArea in a 1:cn cardinality relationship.

An EmployeeTimeSheetAllowedReceivingFundsManagementFunctionalArea groups the information about a ReceivingFundsManagementFunctionalArea which can be used in the EmployeeTimeSheet for a specific Employee with relation to an assigned WorkAgreement. The elements located directly at the EmployeeTimeSheetAllowedReceivingFundsManagementFunctionalArea can include WorkAgreementID, ID, Description, and Note. WorkAgreementID is a (possibly) unique identifier for the work agreement the EmployeeTime belongs to, and may be based on GDT: WorkAgreementID. ID is a (possibly) unique identifier for a Functional area in Funds Management. A Functional area represents a goal of an organization in Funds Management. ID may be based on GDT: FundsManagementFunctionalAreaID. Description is the description of a ReceivingFundsManagementFunctionalArea, and may be based on GDT: FundsManagementFunctionalAreaDescription. Note is a comment about a ReceivingFundsManagementFunctionalArea, and may be based on GDT: Note. A Log package groups the error messages used for user interaction and includes the entity Log.

Message Data Type EmployeeTimeSheetAllowedReceivingFundByEmployeeQueryMessage

The message data type EmployeeTimeSheetAllowedReceivingFundByEmployeeQueryMessage includes the Selection included in the business document, the business information that is relevant for sending a business document in a message, the MessageHeader package, the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedReceivingFundSelectionByEmployee in a 1:1 cardinality relationship. The EmployeeTimeSheetAllowedReceivingFundSelectionByEmployee specifies an Employee for whom to select AllowedReceivingFunds. The selection criteria elements located directly at the EmployeeTimeSheetAllowedReceivingFundSelectionByEmployee can include Employee_ID and WorkAgreement_ID. Employee_ID is the identifier of the employee to whom the EmployeeTimeSheet belongs, and may be of type GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID needs to be filled. If only Employee_ID is filled the AllowedEmployeeTimeItemTypes for all WorkAgreements related to this Employee_ID will be returned.

Message Data Type EmployeeTimeSheetAllowedReceivingFundByEmployeeResponseMessage The message data type EmployeeTimeSheetAllowedReceivingFundByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the entity EmployeeTimeSheetAllowedReceivingFund in a 1:cn cardinality relationship.

An EmployeeTimeSheetAllowedReceivingFund groups the information about a ReceivingFund which can be used in the EmployeeTimeSheet for a specific Employee with relation to an assigned WorkAgreement. The elements located directly at the EmployeeTimeSheetAllowedReceivingFund can include WorkAgreementID, ID, Description, and Note. WorkAgreementID is a (possibly) unique identifier for the work agreement the EmployeeTime belongs to, and may be based on GDT: WorkAgreementID. ID is a (possibly) unique identifier for a fund for which a task is performed. A fund is an internal identification of the source of monies and can be categorized according to source and use such as governmental, enterprise, or fiduciary. It is budgeted and controlled for all expenditures and revenues in order to stay in budget. Fund does not represent an organizational unit. ID may be based on GDT: FundsManagementFundID. Description is the description of a ReceivingFund, and may be based on GDT: FundDescription. Note is a comment about a ReceivingFund, and may be based on GDT: Note. A Log package groups the error messages used for user interaction and includes the entity Log.

Message Data Type EmployeeTimeSheetAllowedReceivingGrantByEmployeeQueryMessage

The message data type EmployeeTimeSheetAllowedReceivingGrantByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedReceivingGrantSelectionByEmployee in a 1:1 cardinality relationship.

The EmployeeTimeSheetAllowedReceivingGrantSelectionByEmployee specifies an Employee for whom to select AllowedReceivingGrants. The selection criteria elements located directly at the EmployeeTimeSheetAllowedReceivingGrantSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedReceivingGrantByEmployeeResponseMessage The message data type EmployeeTimeSheetAllowedReceivingGrantByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the entity EmployeeTimeSheetAllowedReceivingGrant in a 1:cn cardinality relationship. An EmployeeTimeSheetAllowedReceivingGrant groups the information about a ReceivingGrant which can be used in the EmployeeTimeSheet for a specific Employee with relation to an assigned WorkAgreement. The elements located directly at the EmployeeTimeSheetAllowedReceivingGrant can include WorkAgreementID, ID, Description, and Note. WorkAgreementID is a unique identifier for the work agreement the EmployeeTime belongs to, and may be based on GDT: WorkAgreementID. ID is a unique identifier for a grant for which a task is performed. A grant is an external source of monies that is budgeted and controlled for all expenditures and revenues in order to stay in budget. A grant is driven and monitored by the sponsor who provides the resource and for this purpose it is represented according to the requirements of the sponsor. Grant does not represent an organizational unit. ID may be based on GDT: GrantID. Description is the description of a ReceivingGrant, and may be based on GDT: GrantDescription. Note is a comment about a ReceivingGrant, and may be based on GDT: Note. A Log package groups the error messages used for user interaction and includes the entity Log.

Message Data Type EmployeeTimeSheetAllowedReceivingCostingActivityByEmployeeQueryMessage The message data type EmployeeTimeSheetAllowedReceivingCostingActivityByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedReceivingCostingActivitySelectionByEmployee in a 1:1 cardinality relationship.

The EmployeeTimeSheetAllowedReceivingCostingActivitySelectionByEmployee specifies an Employee for whom to select AllowedReceivingCostingActivities. The selection criteria elements located directly at the EmployeeTimeSheetAllowedReceivingCostingActivitySelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedReceivingCostingActivityByEmployeeResponseMessage The message data type EmployeeTimeSheetAllowedReceivingCostingActivityByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the entity EmployeeTimeSheetAllowedReceivingCostingActivity in a 1:cn cardinality relationship. An EmployeeTimeSheetAllowedReceivingCostingActivity groups the information about a ReceivingCostingActivity which can be used in the EmployeeTimeSheet for a specific Employee with relation to an assigned WorkAgreement. The elements located directly at the EmployeeTimeSheetAllowedReceivingCostingActivity can include WorkAgreementID, ID, Description, ValidityPeriod, and Note.

WorkAgreementID is a (possibly) unique identifier for the work agreement the EmployeeTime belongs to, and may be based on GDT: WorkAgreementID. ID is an identifier for a costing activity for which resources are provided. Costing activities are the basis for activity based costing. A costing activity describes a structured set of work steps that consume resources and convert them into outputs (products and services). ID may be based on GDT: CostingActivityID. Description is the description of a ReceivingCostingActivity, and may be based on GDT: CostingActivityDescription. ValidityPeriod is the validity period of a ReceivingCostingActivity, and may be based on GDT: CLOSED_DatePeriod. Note is a comment about a ReceivingCostingActivity, and may be based on GDT: Note. A Log package groups the error messages used for user interaction and includes the entity Log.

Message Data Type EmployeeTimeSheetAllowedCurrencyByEmployeeQueryMessage

The message data type EmployeeTimeSheetAllowedCurrencyByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedCurrencySelectionByEmployee in a 1:1 cardinality relationship.

The EmployeeTimeSheetAllowedCurrencySelectionByEmployee specifies an Employee for whom to select AllowedCurrencies. The selection criteria elements located directly at the EmployeeTimeSheetAllowedCurrencySelectionByEmployee can include Employee_ID, WorkAgreement_ID, and DatePeriod. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. DatePeriod is the date period for which AllowedCurrencies shall be selected, and may be based on GDT: CLOSED_DatePeriod. Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedCurrencyByEmployeeResponseMessage

The message data type EmployeeTimeSheetAllowedCurrencyByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, nd (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the entity EmployeeTimeSheetAllowedCurrency in a 1:cn cardinality relationship.

An EmployeeTimeSheetAllowedCurrency groups the information about a Currency which can be used in the EmployeeTimeSheet for a specific Employee with relation to an assigned WorkAgreement. The elements located directly at the EmployeeTimeSheetAllowedCurrency can include WorkAgreementID, Code, ValidityPeriod, and Note. WorkAgreementID is a (possibly) unique identifier for the work agreement the EmployeeTime belongs to, and may be based on GDT: WorkAgreementID. The Code is a coded representation of the currency, and may be based on GDT: CurrencyCode. ValidityPeriod is the validity period of a Currency, and may be based on GDT: CLOSED_DatePeriod. Note is a comment about a Currency, and may be based on GDT: Note. A Log package groups the error messages used for user interaction and includes the entity Log.

Message Data Type EmployeeTimeSheetAllowedTaskTypeByEmployeeQueryMessage

The message data type EmployeeTimeSheetAllowedTaskTypeByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedTaskTypeSelectionByEmployee in a 1:1 cardinality relationship. The EmployeeTimeSheetAllowedTaskTypeSelectionByEmployee specifies an Employee for whom to select AllowedTaskTypes. The selection criteria elements located directly at the EmployeeTimeSheetAllowedTaskTypeSelectionByEmployee can include Employee_ID, and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedTaskTypeByEmployeeResponseMessage

The message data type EmployeeTimeSheetAllowedTaskTypeByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message, and includes the entity MessageHeader. A MessageHeader groups business information from the perspective of the sending application, such as information to identify the business document in a message, information about the sender, and (possibly) information about the recipient. The MessageHeader includes SenderParty and RecipientParty, and is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the entity EmployeeTimeSheetAllowedTaskType in a 1:cn cardinality relationship. An EmployeeTimeSheetAllowedTaskType groups the information about a TaskType which can be used in the EmployeeTimeSheet for a specific Employee with relation to an assigned WorkAgreement. The elements located directly at the EmployeeTimeSheetAllowedTaskType can include WorkAgreementID, Code, and Note. WorkAgreementID is a (possibly) unique identifier for the work agreement the EmployeeTime belongs to, and may be based on GDT: WorkAgreementID. Code is the coded representation of the task type of a document item of an employee time, and may be based on GDT: EmployeeTimeItemTaskTypeCode. Note is a comment about a TaskType, and may be based on GDT: Note. A Log package groups the error messages used for user interaction and includes the entity Log.

Message Data Type EmployeeTimeSheetAllowedTaskLevelByEmployeeQueryMessage

The message data type EmployeeTimeSheetAllowedTaskLevelByEmployeeQueryMessage includes the Selection included in the business document, the business information that is relevant for sending a business document in a message, the MessageHeader package, and the Selection package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty and is of type GDT: BusinessDocumentMessageHeader, whereby the following elements of the GDT are used: ID ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the entity EmployeeTimeSheetAllowedTaskLevelSelectionByEmployee in a 1:1 cardinality relationship.

The EmployeeTimeSheetAllowedTaskLevelSelectionByEmployee specifies an Employee for whom to select AllowedTaskLevels. The selection criteria elements located directly at the EmployeeTimeSheetAllowedTaskLevelSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID can be filled. If only Employee_ID is filled the AllowedEmployeeTimeItemTypes for all WorkAgreements related to this Employee_ID can be returned.

Message Data Type EmployeeTimeSheetAllowedTaskLevelByEmployeeResponseMessage

The message data type EmployeeTimeSheetAllowedTaskLevelByEmployeeResponseMessage includes the EmployeeTimeSheet included in the business document, the business information that is relevant for sending a business document in a message, the MessageHeader package, the EmployeeTimeSheet package, and the Log package. A MessageHeader package groups the business information that is relevant for sending a business document in a message and includes the entity MessageHeader. A MessageHeader groups business information from the perspective of the sending application, such as information to identify the business document in a message, information about the sender, and (possibly) information about the recipient. The MessageHeader includes SenderParty and RecipientParty, and is of type GDT: BusinessDocumentMessageHeader, whereby the following elements of the GDT are used: ID and ReferenceID. A SenderParty is the party responsible for sending a business document at business application level. The Sender- Party is of type GDT: BusinessDocumentMessageHeaderParty. A RecipientParty is the party responsible for receiving a business document at business application level. The RecipientParty is of type GDT: BusinessDocumentMessageHeaderParty.

The EmployeeTimeSheet package groups the EmployeeTimeSheet information and includes the entity EmployeeTimeSheetAllowedTaskLevel in a 1:cn cardinality relationship. An EmployeeTimeSheetAllowedTaskLevel groups the information about a TaskLevel which can be used in the EmployeeTimeSheet for a specific Employee with relation to an assigned WorkAgreement. The elements located directly at the EmployeeTimeSheetAllowedTaskLevel can include WorkAgreementID, Code, TaskTypeCode, and Note. WorkAgreementID is a (possibly) unique identifier for the work agreement the EmployeeTime belongs to, and may be based on GDT: WorkAgreementID. Code is the coded representation of the task level of a document item of an employee time according to the valuation level, and may be based on GDT: EmployeeTimeItemTaskLevelCode. TaskTypeCode is the coded representation of the task type of a document item of an employee time, and may be based on GDT: EmployeeTimeItemTaskTypeCode. Note is a comment about a TaskType, and may be based on GDT: Note. A Log package groups the error messages used for user interaction and includes the entity Log.

Message Data Type EmployeeTimeSheetAllowedTaskComponentByEmployeeQueryMessage

The message data type EmployeeTimeSheetAllowedTaskComponentByEmployeeQueryMessage includes the Selection included in the business document and the business information that is relevant for sending a business document in a message. EmployeeTimeSheetAllowedTaskComponentByEmployeeQueryMessage includes the MessageHeader package and the Selection package. A MessageHeader package groups the business information that is relevant for sending a business document in a message. MessageHeader includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The Selection Package collects all the selection criteria for EmployeeTimeSheet and includes the EmployeeTimeSheetAllowedTaskComponentSelectionByEmployee entity in a 1:1 cardinality relationship. The EmployeeTimeSheetAllowedTaskComponentSelectionByEmployee specifies an Employee for whom to select AllowedTaskComponents. The selection criteria elements located directly at the EmployeeTimeSheetAllowedTaskComponentSelectionByEmployee can include Employee_ID and WorkAgreement_ID. Employee_ID is the identifier of the employee to whom the EmployeeTimeSheet belongs, and may be based on GDT: EmployeeID. WorkAgreement_ID is a (possibly) unique identifier for a work agreement that the employee has with the employer, and may be based on GDT: WorkAgreementID. In some implementations, Employee_ID or WorkAgreement_ID are filled. If only Employee_ID is filled the AllowedEmployeeTimeItemTypes for all WorkAgreements related to this Employee_ID can be returned.

Message Data Type EmployeeTimeSheetAllowedTaskComponentByEmployeeResponseMessage The message data type EmployeeTimeSheetAllowedTaskComponentByEmployeeResponseMessage includes the EmployeeTimeSheet included in the business document and the business information that is relevant for sending a business document in a message. EmployeeTimeSheetAllowedTaskComponentByEmployeeResponseMessage includes the MessageHeader package, EmployeeTimeSheet package, and Log package. A MessageHeader package groups the business information that is relevant for sending a business document in a message. MessageHeader includes the MessageHeader entity. A MessageHeader groups business information from the perspective of the sending application, such as information to identify the business document in a message, information about the sender, and (possibly) information about the recipient. The MessageHeader includes SenderParty and RecipientParty. MessageHeader is of type GDT: BusinessDocumentMessageHeader, whereby the following elements of the GDT are used: ID and ReferenceID. A SenderParty is the party responsible for sending a business document at business application level. The SenderParty is of type GDT: BusinessDocumentMessageHeaderParty. A RecipientParty is the party responsible for receiving a business document at business application level. The RecipientParty is of type GDT: BusinessDocumentMessageHeaderParty. The EmployeeTimeSheet package groups the EmployeeTimeSheet information and includes the EmployeeTimeSheetAllowedTaskComponent entity in a 1:cn cardinality relationship. An EmployeeTimeSheetAllowedTaskComponent groups the information about a TaskComponent which can be used in the EmployeeTimeSheet for a specific Employee with relation to an assigned WorkAgreement.

The elements located directly at the EmployeeTimeSheetAllowedTaskComponent can include: WorkAgreementID, Code, TaskTypeCode, Note, WorkAgreementID, Code, TaskTypeCode and Note. A Log package groups the error messages used for user interaction, and includes the Log entity.

As described in more detail above, variations of the subject matter described herein and all of the functional operations described in this specification can be implemented in digital electronic circuitry, or in computer software, including the structures disclosed in this specification and their structural equivalents, or in combinations of one or more of them. Variations of the subject matter described herein can be implemented as one or more computer program products, i.e., one or more modules of computer program instructions encoded on a computer readable medium for execution by, or to control the operation of, data processing apparatus. Such computer readable medium can be a machine-readable storage device, a machine-readable storage substrate, a memory device, a composition of matter effecting a machine-readable propagated signal, or a combination of one or more them. A propagated signal is an artificially generated signal, e.g., a machine-generated electrical, optical, or electromagnetic signal, that is generated to encode information for transmission to suitable receiver apparatus. In short, although a few variations have been described in detail above, other modifications are possible. For example, the logic flow depicted in the accompanying figures and described herein do not require the particular order shown, or sequential order, to achieve desirable results. Other embodiments may be within the scope of the following claims. In short, although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer-implemented method for providing the accounting master data and budget information related to a financial accounting view of project, the method comprising:

generating a first message by a first application, the first application executing in an environment of computer systems providing message-based services via message-based interfaces, wherein the first message comprises a request to return the elements of a specific project including elements related to budget information and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a financial accounting view of project simple by project ID query message entity; and at a first hierarchical level within the first message package, a selection package comprising, at a second hierarchical level within the first message package, a financial accounting view of project selection by ID entity, where the financial accounting view of project selection by ID entity includes, at a third hierarchical level within the first message package, a financial accounting view of project ID;

processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message comprises a response to the request to return the elements of a specific project including elements related to budget information and includes a second message package structured by the second message-based interface derived from the common business object model, and where the second message package is hierarchically organized in memory as:

a financial accounting view of project message entity; and at a first hierarchical level within the second message package, a financial accounting view of project package comprising, at a second hierarchical level within the second message package, a financial accounting view of project entity;

generating a third message by the first application, wherein the third message comprises a request to return the elements describing the structure of a specific financial accounting view of project and includes a third message package structured by the first message-based interface derived from the common business object model and hierarchically organized in memory as:

a financial accounting view of project structure by ID query message entity; and at a first hierarchical level within the third message package, a selection package comprising, at a second hierarchical level within the third message package a financial accounting view of project structure selection by ID entity;

processing, via the first message-based interface, a fourth message received from the second application in response to the second application's processing of the third message according to the hierarchical organization of the third message package via the second message-based interface, where processing the third message by the second message-based interface includes unpacking the third message package based on the common business object model, and wherein the fourth message comprises a response to the request to return the elements describing the structure of the specific financial accounting view of project and includes a fourth message package structured by the second message-based interface derived from the common business object model and hierarchically organized in memory as:

a financial accounting view of project structure by ID response message entity; and at a first hierarchical level within the fourth message package, a financial accounting view of project package comprising, at a second hierarchical level within the fourth message package, a financial accounting view of project entity, a project package, an element package, and a log package, where the financial accounting view of project entity includes, at a third hierarchical level within the fourth message package, an ID, where the project package include, at the third hierarchical level within the fourth message package, a project entity including a project ID, where the element package comprises, at the third hierarchical level within the fourth message package, at least one element entity, each element entity comprising, at a fourth hierarchical level within the fourth message package, a project element ID, a type code, and a type name, and where the log package includes, at the third hierarchical level within the fourth message package, a log entity;

generating a fifth message by the first application, wherein the fifth message comprises an inquiry to find the financial accounting views of project to which a specific project is assigned and includes a fifth message package structured by the first message-based interface derived from the common business object model and hierarchically organized in memory as:

a financial accounting view of project by ID query message entity; and at a first hierarchical level within the fifth message package, a selection package comprising, at a second hierarchical level within the fifth message package, a financial accounting view of project selection by ID entity; and processing, via the first message-based interface, a sixth message received from the second application in response to the second application's processing of the fifth message according to the hierarchical organization of the fifth message package via the second message-based interface, where processing the fifth message by the second message-based interface includes unpacking the fifth message package based on the common business object model, and, wherein the sixth message comprises a response to the inquiry to find the financial accounting views on project to which a specific project is assigned and includes a sixth message package structured by the second message-based interface derived from the common business object model and hierarchically organized in memory as:

a financial accounting view of project by ID response message entity; and at a first hierarchical level within the sixth message package, a financial accounting view of project package comprising, at a second hierarchical level within the sixth message package, a financial accounting view of project entity, a project package, an element package, and a log package, where the financial accounting view of project entity includes, at a third hierarchical level within the sixth message package, an ID, where the project package includes, at the third hierarchical level within the sixth message package, a project entity including, at the third hierarchical level within the sixth message package, a project ID, where the element package includes, at the third hierarchical level within the sixth message package, at least one element entity and a budget item package, each element entity including, at a fourth hierarchical level within the sixth message package, a project element ID, a type code, and a type name, and the budget item package including, at the third hierarchical level within the sixth message package, a valuation view type code, and where the log package includes, at the third hierarchical level within the sixth message package, a log entity.

2. A computer-implemented method for providing information regarding the working times, tasks, and working time attributes of one or more employees, the method comprising:

generating a first message by a first application, the first application executing in an environment of computer systems providing message-based services via message-based interfaces, wherein the first message requests a change to an employee time sheet and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

an employee time sheet change request message entity; and at a first hierarchical level within the first message package, an employee time sheet package comprising, at a second hierarchical level within the first message package, an employee time sheet entity and an employee time package, the employee time package comprising, at a third hierarchical level within the first message package, at least one employee time entity and an item package, where each employee time entity includes, at a fourth hierarchical level within the first message package, an action code and a work agreement ID, and where the item package includes, at the fourth hierarchical level within the first message package, an item entity, further where the item entity includes, at a fifth hierarchical level within the first message package, a category code and an employee time validity;

processing, via the first message-based interface, a second message received from a second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message comprises a confirmation to the request for the change to the employee time sheet and includes a second message package structured by the second message-based interface derived from the common business object model, and where the second message package is hierarchically organized in memory as:

an employee time sheet change confirmation message entity; and at a first hierarchical level within the second message package, an employee time sheet package and a log package, the employee time sheet package comprising, at a second hierarchical level within the second message package, an employee time sheet entity and an employee time package, the log package comprising, at the second hierarchical level within the second message package, a log entity, where the employee time package includes, at the third hierarchical level within the second message package, at least one employee time entity and an item package, where each employee time entity includes, at a fourth hierarchical level within the second message package, an ID, a work agreement ID, and a status, where each item package includes, at the fourth hierarchical level within the second message package, an item entity, and where each item entity includes, at a fifth hierarchical level within the second message package, an ID, a system administrative data, and a category code; and further where each status includes a life cycle status code and an approval status code;

generating a third message by the first application, wherein the third message inquires to check the processing of an employee time sheet change request message and includes a third message package structured by the first message-based interface derived from the common business object model and hierarchically organized in memory as:

an employee time sheet change check query message entity; and at a first hierarchical level within the third message package, an employee time sheet package comprising, at a second hierarchical level within the third message package, an employee time sheet entity and an employee time package, where the employee time package includes, at a third hierarchical level within the third message package, at least one employee time entity and an item package, where each employee time entity includes, at a fourth hierarchical level within the third message package, an action code and a work agreement ID, where the item package includes, at the fourth hierarchical level within the third message package, an item entity, and further where the item entity includes, at a fifth hierarchical level within the third message package, a category code and an employee time validity;

processing, via the first message-based interface, a fourth message received from the second application in response to the second application's processing of the third message according to the hierarchical organization of the third message package via the second message-based interface, where processing the third message by the second message-based interface includes unpacking the third message package based on the common business object model, and wherein the fourth message comprises a response to the inquiry checking the processing of the employee time sheet change request message and includes a fourth message package structured by the second message-based interface derived from the common business object model and hierarchically organized in memory as:

an employee time sheet change check response message entity; and at a first hierarchical level within the fourth message package, an employee time sheet package and a log package, the employee time sheet package comprising, at a second hierarchical level within the fourth message package, an employee time sheet entity and an employee time package, the log package comprising, at the second hierarchical level within the fourth message package, a log entity, where the employee time package includes, at a third hierarchical level within the fourth message package, at least one employee time entity and an item package, where each employee time entity includes, at a fourth hierarchical level within the fourth message package, a work agreement ID and a status, where each item package includes, at the fourth hierarchical level within the fourth message package, an item entity, where each item entity includes, at a fifth hierarchical level within the fourth message package, a category code, and further where the status includes a life cycle status code and an approval status code;

generating a fifth message by the first application, wherein the fifth message comprises a request to complete an employee time sheet and includes a fifth message package structured by the first message-based interface derived from the common business object model and hierarchically organized in memory as:

an employee time sheet complete request message entity; and at a first hierarchical level within the fifth message package, an employee time sheet package comprising, at a second hierarchical level within the fifth message package, an employee time sheet entity;

processing, via the first message-based interface, a sixth message received from the second application in response to the second application's processing of the fifth message according to the hierarchical organization of the fifth message package via the second message-based interface, where processing the fifth message by the second message-based interface includes unpacking the fifth message package based on the common business object model, and, wherein the sixth message comprises a confirmation of the request to complete the employee time sheet and includes a sixth message package structured by the second message-based interface derived from the common business object model and hierarchically organized in memory as:

an employee time sheet complete confirmation message entity; and at a first hierarchical level within the sixth message package, an employee time sheet package and a log package, the employee time sheet package comprising, at a second hierarchical level within the sixth message package, an employee time sheet entity, and the log package comprising at the second hierarchical level within the sixth message package, a log entity;

generating a seventh message by the first application, wherein the seventh message comprises an inquiry to provide the employee times for an employee and time period and includes a seventh message package structured by the first message-based interface derived from the common business object model and hierarchically organized in memory as:

an employee time sheet by employee query message entity; and at a first hierarchical level within the seventh message package, a selection package comprising, at a second hierarchical level within the seventh message package, an employee time sheet selection by employee entity; and processing, via the first message-based interface, an eighth message received from the second application in response to the second application's processing of the seventh message according to the hierarchical organization of the seventh message package via the second message-based interface, where processing the fifth message by the second message-based interface includes unpacking the fifth message package based on the common business object model, and wherein the eighth message comprises a response to the inquiry to the employee time sheet and includes an eighth message package structured by the second message-based interface derived from the common business object model and hierarchically organized in memory as:

an employee time sheet by employee response message entity; and at a first hierarchical level within the eighth message package, an employee time sheet package and a log package, the employee time sheet package comprising, at a second hierarchical level within the eighth message package, an employee time sheet entity, and the log package comprising, at the second hierarchical level within the eighth message package, a log entity.

* * * * *